US011654314B2

(12) United States Patent
Conboy

(10) Patent No.: US 11,654,314 B2
(45) Date of Patent: *May 23, 2023

(54) METHOD OF MANAGING THE PROACTIVE SPRAYING OF ENVIRONMENT ALLY-CLEAN ANTI-FIRE CHEMICAL LIQUID ON GPS-SPECIFIED PROPERTY SURFACES SO AS TO INHIBIT FIRE IGNITION AND FLAME SPREAD IN THE PRESENCE OF WILD FIRE

(71) Applicant: Mighty Fire Breaker LLC, Lima, OH (US)

(72) Inventor: Stephen Conboy, Carlsbad, CA (US)

(73) Assignee: MIGHTY FIRE BREAKER LLC, Lima, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,952

(22) Filed: Oct. 10, 2021

(65) Prior Publication Data

US 2022/0126141 A1 Apr. 28, 2022

Related U.S. Application Data

(63) Continuation of application No. 16/805,811, filed on Mar. 1, 2020, now Pat. No. 11,400,324, which is a
(Continued)

(51) Int. Cl.
*A62C 3/00* (2006.01)
*H04W 4/12* (2009.01)
(Continued)

(52) U.S. Cl.
CPC .............. *A62C 3/00* (2013.01); *A62C 3/0214* (2013.01); *A62C 3/0228* (2013.01);
(Continued)

(58) Field of Classification Search
CPC ........... A62C 3/00; A62C 3/02; A62C 3/0214; A62C 3/0271; A62C 3/0278;
(Continued)

(56) References Cited

U.S. PATENT DOCUMENTS 25,358 A 9/1859 Wilder
625,871 A 5/1899 Busha
(Continued)

FOREIGN PATENT DOCUMENTS

AU 5986501 11/2001
AU 2001259865 2/2007
(Continued)

OTHER PUBLICATIONS

US 8,460,513 B2, 06/2013, Sealey (withdrawn)
(Continued)

*Primary Examiner* — Steven J Ganey
(74) *Attorney, Agent, or Firm* — Thomas J. Perkowski Esq, PC

(57) ABSTRACT

A method of managing the proactive spraying of environmentally-clean anti-fire (AF) chemical liquid on GPS-specified property surfaces so as to inhibit fire ignition and flame spread in the presence of wild fire. The method includes deploying a wireless system network supporting a command center, a network database, a plurality of mobile anti-fire chemical liquid spraying systems, and a plurality of mobile computing systems, each being operably connected to a wireless communication network. The GPS address of one or more GPS-specified parcels of property in a specified region, are registered in the network database. at least one of the mobile anti-fire chemical liquid spraying systems are deployed to a GPS-specified location, for spraying the GPS-specified parcels of property with an environmentally-clean anti-fire chemical liquid. A supply of said environ-
(Continued)

mentally-clean anti-fire chemical liquid is deployed to the GPS-specified location of each mobile anti-fire chemical liquid spraying system, and the mobile anti-fire chemical liquid spraying system is filled with the supply of environmentally-clean anti-fire chemical liquid. The deployed anti-fire chemical liquid spraying system is used to apply the environmentally-clean anti-fire chemical liquid spray to the parcel of property, while remotely monitoring the application of the environmentally-clean anti-fire chemical liquid sprayed on the GPS-specified parcel of property on a given date, and automatically recording the GPS-tracked spraying operations in the network database. The data records are updated in the network database associated with each application of environmentally-clean anti-fire chemical liquid spray on one or more the GPS-specified parcels of property.

9 Claims, 52 Drawing Sheets

Related U.S. Application Data continuation of application No. 15/866,451, filed on Jan. 9, 2018, now Pat. No. 10,653,904, which is a continuation-in-part of application No. 15/829,914, filed on Dec. 2, 2017, now Pat. No. 10,260,232.

(51) Int. Cl.
*A62C 31/00* (2006.01)
*G06Q 10/0631* (2023.01)
*A62C 3/02* (2006.01)

(52) U.S. Cl.
CPC .......... *A62C 3/0271* (2013.01); *A62C 31/005* (2013.01); *G06Q 10/06311* (2013.01); *H04W 4/12* (2013.01)

(58) Field of Classification Search
CPC ... A62C 3/0228; A62C 31/005; A62C 99/009; A62C 99/0009; G06Q 10/06311; H04W 4/12
USPC ..... 169/43, 45, 52, 16, 70, 24; 239/152, 172
See application file for complete search history.

(56) References Cited

U.S. PATENT DOCUMENTS

| | | |
|---|---|---|
| 867,560 A | 10/1907 | Fremont |
| 989,655 A | 4/1911 | Sicka |
| 1,003,854 A | 9/1911 | Adams |
| 1,009,620 A | 11/1911 | Adams |
| 1,185,154 A | 5/1916 | Wilds |
| 1,278,716 A | 9/1918 | Mork |
| 1,293,377 A | 2/1919 | Donaldson |
| 1,451,896 A | 4/1923 | Turner |
| 1,468,163 A | 9/1923 | Matson |
| 1,469,957 A | 10/1923 | Rich |
| 1,504,454 A | 8/1924 | Tyson |
| 1,532,443 A | 4/1925 | Sammis |
| 1,561,193 A | 11/1925 | Spring |
| 1,580,816 A | 4/1926 | Dunn |
| 1,585,146 A | 5/1926 | Himberger |
| 1,634,462 A | 7/1927 | Hallauer |
| 1,665,995 A | 4/1928 | Wiley |
| 1,708,867 A | 4/1929 | Bronander |
| 1,786,963 A | 12/1930 | Schoenberger |
| 1,817,342 A | 8/1931 | Beecher |
| 1,871,096 A | 8/1932 | Torseth |
| 1,897,318 A | 2/1933 | McIlvaine |
| 1,907,153 A | 5/1933 | Greider |
| 1,945,457 A | 1/1934 | Warr |
| 1,948,880 A | 2/1934 | Hamm |
| 1,953,331 A | 4/1934 | Armstrong |
| 1,978,807 A | 10/1934 | Merritt |
| 1,995,874 A | 3/1935 | Van de Mark |
| 2,119,962 A | 6/1938 | Raleigh |
| 2,150,188 A | 3/1939 | Rippey |
| 2,246,616 A | 6/1941 | Cherry |
| 2,247,608 A | 7/1941 | De Groff |
| 2,336,648 A | 12/1943 | Sparks |
| 2,349,980 A | 5/1944 | Moore |
| 2,359,573 A | 10/1944 | Mackay |
| 2,671,454 A | 3/1954 | Williams |
| 2,886,425 A | 5/1959 | Seibert |
| 2,931,083 A | 4/1960 | Sidenmark |
| 3,196,108 A | 7/1965 | Nelson |
| 3,229,769 A | 1/1966 | Bashaw |
| 3,238,129 A | 3/1966 | Veltman |
| 3,274,105 A | 9/1966 | Mevel |
| 3,304,675 A | 2/1967 | Graham-Wood |
| 3,305,431 A | 2/1967 | Peterson |
| 3,309,824 A | 3/1967 | Barrett |
| 3,328,231 A | 6/1967 | Sergovic |
| 3,334,045 A | 8/1967 | Nelson |
| 3,350,822 A | 11/1967 | Nachazel |
| 3,362,124 A | 1/1968 | Cravens |
| 3,383,274 A | 5/1968 | Craig |
| 3,400,766 A | 9/1968 | Foley |
| 3,409,550 A | 11/1968 | Gould |
| 3,427,216 A | 2/1969 | Quinn |
| 3,442,334 A | 5/1969 | Gousetis |
| 3,457,702 A | 7/1969 | Brown |
| 3,468,092 A | 9/1969 | Chalmers |
| 3,470,062 A | 9/1969 | Ollinger |
| 3,484,372 A | 12/1969 | Birchall |
| 3,501,419 A | 3/1970 | Bridgeford |
| 3,506,479 A | 4/1970 | Breens |
| 3,508,872 A | 4/1970 | Stuetz |
| 3,509,083 A | 4/1970 | Winebrenner |
| 3,511,748 A | 5/1970 | Heeb |
| 3,539,423 A | 11/1970 | Simison |
| 3,558,485 A | 1/1971 | Skvarla |
| 3,584,412 A | 6/1971 | Palmer |
| 3,607,811 A | 9/1971 | Hovd |
| 3,609,074 A | 9/1971 | Rainaldi |
| 3,621,917 A | 11/1971 | Rosen |
| 3,635,290 A | 1/1972 | Schneider |
| 3,639,326 A | 2/1972 | Kray |
| 3,650,820 A | 3/1972 | DiPietro |
| 3,661,809 A | 5/1972 | Pitts |
| 3,663,267 A | 5/1972 | Moran |
| 3,698,480 A | 10/1972 | Newton |
| 3,703,394 A | 11/1972 | Hemming |
| 3,730,890 A | 5/1973 | Nelson |
| 3,738,072 A | 6/1973 | Adrian |
| 3,752,234 A | 8/1973 | Degginger |
| 3,755,163 A | 8/1973 | Broll |
| 3,755,448 A | 8/1973 | Merianos |
| 3,763,238 A | 10/1973 | Adams |
| 3,795,637 A | 3/1974 | Kandler |
| 3,809,223 A | 5/1974 | Kendall |
| 3,827,869 A | 8/1974 | Von |
| 3,899,855 A | 8/1975 | Gadsby |
| 3,934,066 A | 1/1976 | Murch |
| 3,935,343 A | 1/1976 | Nuttall |
| 3,944,688 A | 3/1976 | Inman |
| 3,984,334 A | 10/1976 | Hopper |
| 3,994,110 A | 11/1976 | Ropella |
| 4,013,599 A | 3/1977 | Strauss |
| 4,037,665 A | 7/1977 | Hopper |
| 4,049,556 A | 9/1977 | Tujimoto |
| 4,049,849 A | 9/1977 | Brown |
| 4,065,413 A | 12/1977 | MacInnis |
| 4,076,862 A | 2/1978 | Kobeski |
| 4,092,281 A | 5/1978 | Bertrand |
| 4,104,073 A | 8/1978 | Koide |
| 4,153,466 A | 5/1979 | Smith |
| 4,168,175 A | 9/1979 | Shutt |
| 4,172,858 A | 10/1979 | Clubley |
| 4,176,071 A | 11/1979 | Crouch |
| 4,176,115 A | 11/1979 | Hartman |

(56) References Cited

U.S. PATENT DOCUMENTS

| | | |
|---|---|---|
| 4,184,449 A | 1/1980 | Louderback |
| 4,184,802 A | 1/1980 | Cook |
| 4,194,979 A | 3/1980 | Gottschall |
| 4,197,913 A | 4/1980 | Korenowski |
| 4,198,328 A | 4/1980 | Bertelli |
| 4,209,561 A | 6/1980 | Sawko |
| 4,226,727 A | 10/1980 | Tarpley, Jr. |
| 4,228,202 A | 10/1980 | Tjannberg |
| 4,234,044 A | 11/1980 | Hollan |
| 4,237,182 A | 12/1980 | Fulmer |
| 4,248,976 A | 2/1981 | Clubley |
| 4,251,579 A | 2/1981 | Lee |
| 4,254,177 A | 3/1981 | Fulmer |
| 4,265,963 A | 5/1981 | Matalon |
| 4,266,384 A | 5/1981 | Orals |
| 4,272,414 A | 6/1981 | Vandersall |
| 4,285,842 A | 8/1981 | Herr |
| 4,344,489 A | 8/1982 | Bonaparte |
| 4,346,012 A | 8/1982 | Umaba |
| 4,364,987 A | 12/1982 | Goodwin |
| 4,382,884 A | 5/1983 | Rohringer |
| 4,392,994 A | 7/1983 | Wagener |
| 4,394,108 A | 7/1983 | Cook |
| 4,419,256 A | 12/1983 | Loomis |
| 4,419,401 A | 12/1983 | Pearson |
| 4,514,327 A | 4/1985 | Rock |
| 4,530,877 A | 7/1985 | Hadley |
| 4,560,485 A | 12/1985 | Szekely |
| 4,563,287 A | 1/1986 | Hisamoto |
| 4,572,862 A | 2/1986 | Ellis |
| 4,578,913 A | 4/1986 | Eich |
| 4,595,414 A | 6/1986 | Shutt |
| 4,652,383 A | 3/1987 | Tarpley, Jr. |
| 4,659,381 A | 4/1987 | Walters |
| 4,661,398 A | 4/1987 | Ellis |
| 4,663,226 A | 5/1987 | Vajs |
| 4,666,960 A | 5/1987 | Spain |
| 4,688,643 A | 8/1987 | Carter |
| 4,690,859 A | 9/1987 | Porter |
| 4,714,652 A | 12/1987 | Poletto |
| 4,720,414 A | 1/1988 | Burga |
| 4,724,250 A | 2/1988 | Schubert |
| 4,737,406 A | 4/1988 | Bumpus |
| 4,740,527 A | 4/1988 | von Bonin |
| 4,743,625 A | 5/1988 | Vajs |
| 4,755,397 A | 7/1988 | Eden |
| 4,756,839 A | 7/1988 | Curzon |
| 4,770,794 A | 9/1988 | Cundasawmy |
| 4,776,403 A | 10/1988 | Lejosne |
| 4,810,741 A | 3/1989 | Kim |
| 4,822,524 A | 4/1989 | Strickland |
| 4,824,483 A | 4/1989 | Bumpus |
| 4,824,484 A | 4/1989 | Metzner |
| 4,852,656 A | 8/1989 | Banahan |
| 4,861,397 A | 8/1989 | Hillstrom |
| 4,871,477 A | 10/1989 | Dimanshteyn |
| 4,879,320 A | 11/1989 | Hastings |
| 4,888,136 A | 12/1989 | Chellapa |
| 4,895,878 A | 1/1990 | Jourquin |
| 4,901,763 A | 2/1990 | Scott |
| 4,909,328 A | 3/1990 | DeChant |
| 4,965,296 A | 10/1990 | Hastings |
| 4,986,363 A | 1/1991 | Nahmiaj |
| 4,986,805 A | 1/1991 | Laramore |
| 4,993,495 A | 2/1991 | Burchert |
| 5,021,484 A | 6/1991 | Schreiber |
| 5,023,019 A | 6/1991 | Bumpus |
| 5,032,446 A | 7/1991 | Sayles |
| 5,039,454 A | 8/1991 | Policastro |
| 5,053,147 A | 10/1991 | Kaylor |
| 5,055,208 A | 10/1991 | Stewart |
| 5,070,945 A | 12/1991 | Nahmias |
| 5,091,097 A | 2/1992 | Pennartz |
| 5,105,493 A | 4/1992 | Lugtenaar |
| 5,130,184 A | 7/1992 | Ellis |
| 5,156,775 A | 10/1992 | Blount |
| 5,162,394 A | 11/1992 | Trocino |
| 5,182,049 A | 1/1993 | von Bonin |
| 5,185,214 A | 2/1993 | Levan |
| 5,214,867 A | 6/1993 | Weatherly |
| 5,214,894 A | 6/1993 | Glesser-Lott |
| 5,250,200 A | 10/1993 | Sallet |
| 5,283,998 A | 2/1994 | Jong |
| 5,284,700 A | 2/1994 | Strauss |
| 5,333,426 A | 8/1994 | Varoglu |
| 5,356,568 A | 10/1994 | Levine |
| 5,371,986 A | 12/1994 | Guditis |
| 5,383,749 A | 1/1995 | Reisdorff |
| 5,391,246 A | 2/1995 | Stephens |
| 5,393,437 A | 2/1995 | Bower |
| 5,405,661 A | 4/1995 | Kim |
| 5,422,484 A | 6/1995 | Brogi |
| 5,491,022 A | 2/1996 | Smith |
| 5,507,350 A | 4/1996 | Primlani |
| 5,509,485 A | 4/1996 | Almagro |
| 5,518,638 A | 5/1996 | Buil |
| 5,534,164 A | 7/1996 | Guglielmi |
| 5,534,301 A | 7/1996 | Shutt |
| 5,560,429 A | 10/1996 | Needham |
| 5,590,717 A | 1/1997 | McBay |
| 5,605,767 A | 2/1997 | Fuller |
| 5,609,915 A | 3/1997 | Fuller |
| 5,626,787 A | 5/1997 | Porter |
| 5,631,047 A | 5/1997 | Friloux |
| 5,709,821 A | 1/1998 | von Bonin |
| 5,729,936 A | 3/1998 | Maxwell |
| 5,734,335 A | 3/1998 | Brogi |
| 5,738,924 A | 4/1998 | Sing |
| 5,746,031 A | 5/1998 | Burns |
| 5,765,333 A | 6/1998 | Cunningham |
| 5,778,984 A | 7/1998 | Suwa |
| 5,815,994 A | 10/1998 | Knight |
| 5,817,369 A | 10/1998 | Conradie |
| 5,833,874 A | 11/1998 | Stewart |
| 5,834,535 A | 11/1998 | Abu-Isa |
| 5,840,413 A | 11/1998 | Kajander |
| 5,849,210 A | 12/1998 | Pascente |
| 5,857,623 A | 1/1999 | Miller |
| 5,894,891 A | 4/1999 | Rosenstock |
| 5,918,680 A | 7/1999 | Sheinson |
| 5,929,276 A | 7/1999 | Kirkovits |
| 5,934,347 A | 8/1999 | Phelps |
| 5,945,025 A | 8/1999 | Cunningham |
| 5,968,669 A | 10/1999 | Liu |
| 6,000,189 A | 12/1999 | Breuer |
| 6,024,889 A | 2/2000 | Holland |
| 6,029,751 A | 2/2000 | Ford |
| 6,042,639 A | 3/2000 | Valsoe |
| 6,073,410 A | 6/2000 | Schimpf |
| 6,090,877 A | 7/2000 | Bheda |
| 6,142,238 A | 11/2000 | Holt |
| 6,146,544 A | 11/2000 | Guglielmi |
| 6,146,557 A | 11/2000 | Inata |
| 6,150,449 A | 11/2000 | Valkanas |
| 6,153,682 A | 11/2000 | Bannat |
| 6,164,382 A | 12/2000 | Schutte |
| 6,167,971 B1 | 1/2001 | Van Lingen |
| 6,173,791 B1 | 1/2001 | Yen |
| 6,189,623 B1 | 2/2001 | Zhegrov et al. |
| 6,202,755 B1 | 3/2001 | Hardge |
| 6,209,655 B1 | 4/2001 | Valkanas |
| 6,245,842 B1 | 6/2001 | Buxton |
| 6,271,156 B1 | 8/2001 | Gleason |
| 6,289,540 B1 | 9/2001 | Emonds |
| 6,296,781 B1 | 10/2001 | Amiran |
| 6,309,746 B1 | 10/2001 | Broutier |
| 6,311,781 B1 | 11/2001 | Jerke |
| 6,318,473 B1 | 11/2001 | Bartley |
| 6,364,026 B1 | 4/2002 | Doshay |
| 6,385,931 B1 | 5/2002 | Risser |
| 6,398,136 B1 | 6/2002 | Smith |
| 6,401,487 B1 | 6/2002 | Kotliar |
| 6,401,830 B1 | 6/2002 | Romanoff |
| 6,415,571 B2 | 7/2002 | Risser |

(56) References Cited

U.S. PATENT DOCUMENTS

| | | |
|---|---|---|
| 6,418,752 B2 | 7/2002 | Kotliar |
| 6,423,129 B1 | 7/2002 | Fitzgibbons, Jr. |
| 6,423,251 B1 | 7/2002 | Blount |
| 6,427,779 B1 | 8/2002 | Richman |
| 6,436,306 B1 | 8/2002 | Jennings |
| 6,442,912 B1 | 9/2002 | Phillips |
| 6,444,718 B1 | 9/2002 | Blount |
| 6,453,636 B1 | 9/2002 | Ritz |
| 6,464,903 B1 | 10/2002 | Blount |
| 6,470,805 B1 | 10/2002 | Woodall |
| 6,491,254 B1 | 12/2002 | Walkinshaw |
| 6,502,421 B2 | 1/2003 | Kotliar |
| 6,517,748 B2 | 2/2003 | Richards |
| 6,557,374 B2 | 5/2003 | Kotliar |
| 6,558,684 B1 | 5/2003 | Sutherland |
| 6,560,991 B1 | 5/2003 | Kotliar |
| 6,581,878 B1 | 6/2003 | Bennett |
| 6,608,123 B2 | 8/2003 | Galli |
| 6,613,391 B1 | 9/2003 | Gang |
| 6,620,348 B1 | 9/2003 | Vandersall |
| 6,622,966 B1 | 9/2003 | McConnell, Sr. |
| 6,629,392 B1 | 10/2003 | Harrel |
| 6,702,032 B1 | 3/2004 | Torras, Sr. |
| 6,706,774 B2 | 3/2004 | Muenzenberger |
| 6,713,411 B2 | 3/2004 | Cox |
| 6,725,941 B2 | 4/2004 | Edwards |
| 6,736,989 B2 | 5/2004 | Stewart |
| 6,772,562 B1 | 8/2004 | Dadamo |
| 6,777,469 B2 | 8/2004 | Blount |
| 6,780,991 B2 | 8/2004 | Vandersall |
| 6,796,382 B2 | 9/2004 | Kaimart |
| 6,800,352 B1 | 10/2004 | Hejna |
| 6,802,994 B1 | 10/2004 | Kegeler |
| 6,810,964 B1 | 11/2004 | Arnot |
| 6,810,965 B2 | 11/2004 | Matsukawa |
| 6,828,437 B2 | 12/2004 | Vandersall |
| 6,846,437 B2 | 1/2005 | Vandersall |
| 6,852,853 B2 | 2/2005 | Vandersall |
| 6,869,669 B2 | 3/2005 | Jensen |
| 6,881,247 B2 | 4/2005 | Batdorf |
| 6,881,367 B1 | 4/2005 | Baker |
| 6,889,776 B2 | 5/2005 | Cheung |
| 6,897,173 B2 | 5/2005 | Bernard |
| 6,905,639 B2 | 6/2005 | Vandersall |
| 6,930,138 B2 | 8/2005 | Schell |
| 6,982,049 B1 | 1/2006 | Mabey |
| 7,018,571 B1 | 3/2006 | Camarota |
| 7,028,783 B2 | 4/2006 | Celorio-Villasenor |
| 7,036,449 B2 | 5/2006 | Sutter |
| 7,070,704 B2 | 7/2006 | Kang |
| 7,082,999 B2 | 8/2006 | Arnot |
| 7,083,000 B2 | 8/2006 | Edwards |
| 7,089,862 B1 | 8/2006 | Vasquez |
| 7,140,449 B1 | 11/2006 | Ebner |
| 7,147,061 B2 | 12/2006 | Tsutaoka |
| 7,164,468 B2 | 1/2007 | Correia Da Silva Vilar |
| 7,210,537 B1 | 5/2007 | McNeil |
| 7,261,165 B1 | 8/2007 | Black |
| 7,273,634 B2 | 9/2007 | Fitzgibbons, Jr. |
| 7,323,248 B2 | 1/2008 | Ramsey |
| 7,331,399 B2 | 2/2008 | Multer |
| 7,337,156 B2 | 2/2008 | Wippich |
| 7,341,113 B2 | 3/2008 | Fallis |
| 7,413,145 B2 | 8/2008 | Hale |
| 7,478,680 B2 | 1/2009 | Sridharan |
| 7,479,513 B2 | 1/2009 | Reinheimer |
| 7,482,395 B2 | 1/2009 | Mabey |
| 7,487,841 B1 | 2/2009 | Gonci |
| 7,504,449 B2 | 3/2009 | Mazor |
| 7,560,041 B2 | 7/2009 | Yoon |
| 7,587,875 B2 | 9/2009 | Kish |
| 7,588,087 B2 | 9/2009 | Cafferata |
| 7,614,456 B2 | 11/2009 | Twum |
| 7,626,076 B2 | 12/2009 | Shin |
| 7,670,513 B2 | 3/2010 | Erdner |
| 7,673,696 B1 | 3/2010 | Gunn |
| 7,686,093 B2 | 3/2010 | Reilly |
| 7,744,687 B2 | 6/2010 | Moreno G. |
| 7,748,662 B2 | 7/2010 | Hale |
| 7,754,808 B2 | 7/2010 | Goossens |
| 7,766,090 B2 | 8/2010 | Mohr |
| 7,767,010 B2 | 8/2010 | Curzon |
| 7,785,712 B2 | 8/2010 | Miller |
| 7,789,165 B1 | 9/2010 | Yen |
| 7,810,724 B2 | 10/2010 | Skaaksrud |
| 7,815,157 B2 | 10/2010 | Knight |
| 7,820,736 B2 | 10/2010 | Reinheimer |
| 7,824,583 B2 | 11/2010 | Gang |
| 7,828,069 B2 | 11/2010 | Lee |
| 7,832,492 B1 | 11/2010 | Eldridge |
| 7,837,009 B2 | 11/2010 | Gross |
| 7,849,542 B2 | 12/2010 | DeFranks |
| 7,863,355 B2 | 1/2011 | Futterer |
| 7,886,836 B2 | 2/2011 | Haaland |
| 7,886,837 B1 | 2/2011 | Helfgott |
| 7,897,070 B2 | 3/2011 | Knocke |
| 7,897,673 B2 | 3/2011 | Flat |
| 7,900,709 B2 | 3/2011 | Kotliar |
| 7,934,564 B1 | 5/2011 | Stell |
| 7,975,774 B2 | 7/2011 | Akcasu |
| 8,006,447 B2 | 8/2011 | Beele |
| 8,080,186 B1 | 12/2011 | Pennartz |
| 8,088,310 B2 | 1/2012 | Orr |
| 8,141,649 B2 | 3/2012 | Kotliar |
| 8,148,315 B2 | 4/2012 | Baker |
| 8,171,677 B2 | 5/2012 | Flint |
| 8,206,620 B1 | 6/2012 | Bolton |
| 8,217,093 B2 | 7/2012 | Reinheimer |
| 8,226,017 B2 | 7/2012 | Cohen |
| 8,263,231 B2 | 9/2012 | Mesa |
| 8,273,813 B2 | 9/2012 | Beck |
| 8,276,679 B2 | 10/2012 | Bui |
| 8,281,550 B1 | 10/2012 | Bolton |
| 8,286,405 B1 | 10/2012 | Bolton |
| 8,291,990 B1 | 10/2012 | Mohr |
| 8,344,055 B1 | 1/2013 | Mabey |
| 8,366,955 B2 | 2/2013 | Thomas |
| 8,403,070 B1 | 3/2013 | Lowe |
| 8,409,479 B2 | 4/2013 | Alexander |
| 8,453,752 B2 | 6/2013 | Katsuraku |
| 8,457,013 B2 | 6/2013 | Essinger |
| 8,458,971 B2 | 6/2013 | Winterowd |
| 8,465,833 B2 | 6/2013 | Lee |
| 8,534,370 B1 | 9/2013 | Al Azemi |
| 8,586,657 B2 | 11/2013 | Lopez |
| 8,603,231 B2 | 12/2013 | Wagh |
| 8,607,272 B2 | 12/2013 | Walter |
| 8,646,540 B2 | 2/2014 | Eckholm |
| 8,647,524 B2 | 2/2014 | Rueda-Nunez |
| 8,662,192 B2 | 3/2014 | Dunster |
| 8,663,427 B2 | 3/2014 | Sealey |
| 8,663,774 B2 | 3/2014 | Fernando |
| 8,663,788 B2 | 3/2014 | Oh |
| 8,668,988 B2 | 3/2014 | Schoots |
| 8,685,206 B2 | 4/2014 | Sealey |
| 8,698,634 B2 | 4/2014 | Guedes Lopes Da Fonseca et al. |
| 8,746,355 B2 | 6/2014 | Demmitt |
| 8,746,357 B2 | 6/2014 | Butz |
| 8,778,213 B2 | 7/2014 | Guo |
| 8,789,769 B2 | 7/2014 | Fenton |
| 8,801,536 B2 | 8/2014 | O'Shea, III |
| 8,808,850 B2 | 8/2014 | Dion |
| 8,820,421 B2 | 9/2014 | Rahgozar |
| 8,871,053 B2 | 10/2014 | Sealey |
| 8,871,058 B2 | 10/2014 | Sealey |
| 8,871,110 B2 | 10/2014 | Guo |
| 8,893,814 B2 | 11/2014 | Bui |
| 8,944,174 B2 | 2/2015 | Thomas |
| 8,973,669 B2 | 3/2015 | Connery |
| 8,980,145 B2 | 3/2015 | Baroux |
| 9,005,396 B2 | 4/2015 | Baroux |
| 9,005,642 B2 | 4/2015 | Mabey |
| 9,027,303 B2 | 5/2015 | Lichtinger |
| 9,089,730 B2 | 7/2015 | Shalev |

(56) References Cited

U.S. PATENT DOCUMENTS

| | | |
|---|---|---|
| 9,109,390 B1 | 8/2015 | Cavuoti |
| 9,109,649 B2 | 8/2015 | Bohle |
| 9,120,570 B2 | 9/2015 | Hoisington |
| 9,174,074 B2 | 11/2015 | Medina |
| 9,187,674 B2 | 11/2015 | Ulcar |
| 9,199,108 B2 | 12/2015 | Guo |
| 9,248,325 B2 | 2/2016 | Lewis |
| 9,249,021 B2 | 2/2016 | Mundheim |
| 9,265,978 B2 | 2/2016 | Klaffmo |
| 9,302,749 B1 | 4/2016 | D'Offay |
| 9,321,808 B2 | 4/2016 | Seneci |
| 9,323,116 B2 | 4/2016 | You |
| 9,328,317 B2 | 5/2016 | Peng |
| 9,339,671 B1 | 5/2016 | Raj |
| 9,382,153 B2 | 7/2016 | Fisher |
| 9,409,045 B2 | 8/2016 | Berezovsky |
| 9,420,169 B2 | 8/2016 | Uemura |
| 9,425,111 B2 | 8/2016 | Park |
| 9,458,366 B2 | 10/2016 | Blomgreen |
| 9,498,787 B2 | 11/2016 | Mayhall |
| 9,597,538 B2 | 3/2017 | Langselius |
| 9,604,960 B2 | 3/2017 | Liu |
| 9,605,888 B2 | 3/2017 | Shin |
| 9,616,590 B2 | 4/2017 | Birkeland |
| 9,618,434 B2 | 4/2017 | Mizuta |
| 9,663,943 B2 | 5/2017 | Dimakis |
| 9,706,858 B2 | 7/2017 | Johnson |
| 9,715,352 B2 | 7/2017 | Craddock |
| 9,776,029 B2 | 10/2017 | Izumida |
| 9,777,500 B1 | 10/2017 | Reisdorff |
| 9,782,944 B2 | 10/2017 | Martin |
| 9,792,500 B2 | 10/2017 | Pennypacker |
| 9,803,228 B2 | 10/2017 | Wu |
| 9,809,685 B2 | 11/2017 | Erbes |
| 9,818,524 B2 | 11/2017 | Vaesen |
| 9,822,532 B2 | 11/2017 | Sherry |
| 9,851,718 B2 | 12/2017 | Booher |
| 9,852,993 B2 | 12/2017 | Park |
| 9,856,197 B2 | 1/2018 | Zubrin |
| 9,920,250 B1 | 3/2018 | Vuozzo |
| 9,931,648 B2 | 4/2018 | Fenton |
| 9,956,446 B2 | 5/2018 | Connery |
| 9,986,313 B2 | 5/2018 | Schwarzkopf |
| 10,016,643 B2 | 7/2018 | Smith |
| 10,131,119 B2 | 11/2018 | Freres |
| 10,166,419 B2 | 1/2019 | Springell |
| 10,260,232 B1 | 4/2019 | Conboy |
| 10,464,294 B2 | 11/2019 | Freres |
| 10,472,169 B1 | 11/2019 | Parker, Jr. |
| 10,550,483 B2 | 2/2020 | Khosla |
| 10,653,904 B2 | 5/2020 | Conboy |
| 10,695,597 B2 | 6/2020 | Conboy |
| 10,814,150 B2 | 10/2020 | Conboy |
| 11,025,560 B2 | 6/2021 | Singleton, IV |
| 11,247,087 B2 | 2/2022 | Mcdonald |
| 11,395,931 B2 | 7/2022 | Conboy |
| 11,400,324 B2 | 8/2022 | Conboy |
| 2001/0000911 A1 | 5/2001 | Stewart |
| 2001/0025712 A1 | 10/2001 | Pagan |
| 2001/0029706 A1 | 10/2001 | Risser |
| 2001/0029750 A1 | 10/2001 | Kotliar |
| 2002/0005288 A1 | 1/2002 | Haase |
| 2002/0011593 A1 | 1/2002 | Richards |
| 2002/0023762 A1 | 2/2002 | Kotliar |
| 2002/0045688 A1 | 4/2002 | Galli |
| 2002/0079379 A1 | 6/2002 | Cheung |
| 2002/0096668 A1 | 7/2002 | Vandersall |
| 2002/0110696 A1 | 8/2002 | Slimak |
| 2002/0111508 A1 | 8/2002 | Bergrath |
| 2002/0125016 A1 | 9/2002 | Cofield |
| 2002/0130294 A1 | 9/2002 | Almagro |
| 2002/0139056 A1 | 10/2002 | Finnell |
| 2002/0157558 A1 | 10/2002 | Woodall |
| 2002/0168476 A1 | 11/2002 | Pasek |
| 2003/0018695 A1 | 1/2003 | Kagaya |
| 2003/0022959 A1 | 1/2003 | Blount |
| 2003/0029622 A1 | 2/2003 | Clauss |
| 2003/0047723 A1 | 3/2003 | Santoro |
| 2003/0051886 A1 | 3/2003 | Adiga |
| 2003/0064779 A1 | 4/2003 | Suda |
| 2003/0066990 A1 | 4/2003 | Vandersall |
| 2003/0132425 A1 | 7/2003 | Curzon |
| 2003/0136879 A1 | 7/2003 | Grabow |
| 2003/0146843 A1 | 8/2003 | Dittmer |
| 2003/0155133 A1 | 8/2003 | Matsukawa |
| 2003/0159836 A1 | 8/2003 | Kashiki |
| 2003/0160111 A1 | 8/2003 | Multer |
| 2003/0168225 A1 | 9/2003 | Denne |
| 2003/0170317 A1 | 9/2003 | Curzon |
| 2003/0212177 A1 | 11/2003 | Vandersall |
| 2003/0213005 A1 | 11/2003 | Alphey |
| 2004/0003569 A1 | 1/2004 | Frederickson |
| 2004/0038730 A1 | 2/2004 | Suda |
| 2004/0051086 A1 | 3/2004 | Pasek |
| 2004/0055765 A1 | 3/2004 | Dillman |
| 2004/0089458 A1 | 5/2004 | Jones |
| 2004/0099178 A1 | 5/2004 | Jones |
| 2004/0109853 A1 | 6/2004 | McDaniel |
| 2004/0134378 A1 | 7/2004 | Batdorf |
| 2004/0163825 A1 | 8/2004 | Dunster |
| 2004/0173783 A1 | 9/2004 | Curzon |
| 2004/0175407 A1 | 9/2004 | McDaniel |
| 2004/0194657 A1 | 10/2004 | Lally |
| 2004/0209982 A1 | 10/2004 | Horacek |
| 2004/0231252 A1 | 11/2004 | Benjamin |
| 2004/0239912 A1 | 12/2004 | Correia Da Silva Vilar |
| 2004/0256117 A1 | 12/2004 | Cheung |
| 2005/0009965 A1 | 1/2005 | Schell |
| 2005/0009966 A1 | 1/2005 | Rowen |
| 2005/0011652 A1 | 1/2005 | Hua |
| 2005/0017131 A1 | 1/2005 | Hale |
| 2005/0022466 A1 | 2/2005 | Kish |
| 2005/0045739 A1 | 3/2005 | Multer |
| 2005/0058689 A1 | 3/2005 | McDaniel |
| 2005/0066619 A1 | 3/2005 | McDonald |
| 2005/0090201 A1 | 4/2005 | Lengies |
| 2005/0103506 A1 | 5/2005 | Warrack |
| 2005/0103507 A1 | 5/2005 | Brown |
| 2005/0126794 A1* | 6/2005 | Palmer ............... A62C 3/0214 169/45 |
| 2005/0139363 A1 | 6/2005 | Thomas |
| 2005/0161235 A1 | 7/2005 | Chuprin |
| 2005/0167920 A1 | 8/2005 | Rose |
| 2005/0229809 A1 | 10/2005 | Lally |
| 2005/0235598 A1 | 10/2005 | Liggins |
| 2005/0241731 A1 | 11/2005 | Duchesne |
| 2005/0263298 A1 | 12/2005 | Kotliar |
| 2005/0269109 A1 | 12/2005 | Maguire |
| 2005/0274312 A1 | 12/2005 | Sutter |
| 2005/0279972 A1 | 12/2005 | Santoro |
| 2006/0037277 A1 | 2/2006 | Fitzgibbons |
| 2006/0039753 A1 | 2/2006 | Leonberg |
| 2006/0048466 A1 | 3/2006 | Darnell |
| 2006/0056379 A1 | 3/2006 | Battin |
| 2006/0060668 A1 | 3/2006 | Gunter |
| 2006/0083920 A1 | 4/2006 | Schnabel |
| 2006/0113513 A1 | 6/2006 | Nilsson |
| 2006/0124322 A1 | 6/2006 | Goldburt |
| 2006/0131035 A1 | 6/2006 | French |
| 2006/0134265 A1 | 6/2006 | Beukes |
| 2006/0157668 A1 | 7/2006 | Erdner |
| 2006/0162941 A1 | 7/2006 | Sridharan |
| 2006/0167131 A1 | 7/2006 | Mabey |
| 2006/0168906 A1 | 8/2006 | Tonyan |
| 2006/0174968 A1 | 8/2006 | De Luna |
| 2006/0175067 A1 | 8/2006 | Cover |
| 2006/0196681 A1 | 9/2006 | Adiga |
| 2006/0208236 A1 | 9/2006 | Gang |
| 2006/0213672 A1 | 9/2006 | Mohr |
| 2006/0260824 A1 | 11/2006 | Dillman |
| 2007/0007021 A1 | 1/2007 | Regan |
| 2007/0034823 A1 | 2/2007 | Hagquist |
| 2007/0084554 A1 | 4/2007 | Miller |
| 2007/0089431 A1 | 4/2007 | DuBrucq |

(56) References Cited

U.S. PATENT DOCUMENTS

| | | |
|---|---|---|
| 2007/0090322 A1 | 4/2007 | Yoon |
| 2007/0119334 A1 | 5/2007 | Atkinson |
| 2007/0125880 A1 | 6/2007 | Palle |
| 2007/0176156 A1 | 8/2007 | Mabey |
| 2007/0193753 A1 | 8/2007 | Adiga |
| 2007/0194289 A1 | 8/2007 | Anglin |
| 2007/0197112 A1 | 8/2007 | Mazor |
| 2007/0227085 A1 | 10/2007 | Mader |
| 2007/0232731 A1 | 10/2007 | Knocke |
| 2007/0246609 A1 | 10/2007 | Smetannikov |
| 2007/0256842 A1 | 11/2007 | Mohr |
| 2007/0289709 A1 | 12/2007 | Chong |
| 2007/0289752 A1 | 12/2007 | Beck |
| 2007/0295046 A1 | 12/2007 | Cassan |
| 2008/0000649 A1 | 1/2008 | Guirguis |
| 2008/0012229 A1 | 1/2008 | Rose |
| 2008/0030074 A1 | 2/2008 | Duong |
| 2008/0050578 A1 | 2/2008 | Sinclair |
| 2008/0054230 A1 | 3/2008 | Mabey |
| 2008/0099580 A1 | 5/2008 | Gunter |
| 2008/0115949 A1 | 5/2008 | Li |
| 2008/0128145 A1 | 6/2008 | Butz |
| 2008/0168798 A1 | 7/2008 | Kotliar |
| 2008/0176141 A1 | 7/2008 | Pan |
| 2008/0179067 A1 | 7/2008 | Ho |
| 2008/0184642 A1 | 8/2008 | Sebastian |
| 2008/0201787 A1 | 8/2008 | Shin |
| 2008/0202772 A1 | 8/2008 | Twum |
| 2008/0202775 A1 | 8/2008 | Bordallo Alvarez |
| 2008/0217086 A1 | 9/2008 | Ferreira Neves |
| 2008/0236846 A1 | 10/2008 | Gamble |
| 2008/0276556 A1 | 11/2008 | Flint |
| 2008/0289831 A1 | 11/2008 | Kaimart |
| 2008/0314601 A1 | 12/2008 | Cafferata |
| 2009/0039660 A1 | 2/2009 | Gonzalez |
| 2009/0044484 A1 | 2/2009 | Berger |
| 2009/0065646 A1 | 3/2009 | Hale |
| 2009/0075539 A1 | 3/2009 | Dimanshteyn |
| 2009/0090520 A1 | 4/2009 | Lee |
| 2009/0107064 A1 | 4/2009 | Bowman |
| 2009/0120653 A1 | 5/2009 | Thomas |
| 2009/0126948 A1 | 5/2009 | DeSanto |
| 2009/0126951 A1 | 5/2009 | Baek |
| 2009/0145075 A1 | 6/2009 | Oakley |
| 2009/0188567 A1 | 7/2009 | Mchugh |
| 2009/0194605 A1 | 8/2009 | Lepeshinsky |
| 2009/0212251 A1 | 8/2009 | Taylor |
| 2009/0215926 A1 | 8/2009 | Kozlowski |
| 2009/0249556 A1 | 10/2009 | Dermeik |
| 2009/0255605 A1 | 10/2009 | Filion |
| 2009/0266025 A1 | 10/2009 | Toas |
| 2009/0280345 A1 | 11/2009 | Maynard |
| 2009/0301001 A1 | 12/2009 | Kish |
| 2009/0313748 A1 | 12/2009 | Guedes Lopes Da Fonseca |
| 2009/0313931 A1 | 12/2009 | Porter |
| 2009/0314500 A1 | 12/2009 | Fenton |
| 2009/0326117 A1 | 12/2009 | Benussi |
| 2010/0000743 A1 | 1/2010 | Cohen |
| 2010/0018725 A1 | 1/2010 | Ramos Rodriguez |
| 2010/0032175 A1 | 2/2010 | Boyd |
| 2010/0062153 A1 | 3/2010 | Curzon |
| 2010/0069488 A1 | 3/2010 | Mabey |
| 2010/0175897 A1 | 7/2010 | Crump |
| 2010/0176353 A1 | 7/2010 | Hanna |
| 2010/0181084 A1 | 7/2010 | Carmo |
| 2010/0200819 A1 | 8/2010 | Mans Fibla |
| 2010/0218959 A1 | 9/2010 | Adiga |
| 2010/0252648 A1 | 10/2010 | Robinson |
| 2010/0263886 A1 | 10/2010 | Rahgozar |
| 2010/0267853 A1 | 10/2010 | Edry |
| 2010/0281784 A1 | 11/2010 | Leo |
| 2010/0314138 A1 | 12/2010 | Weatherspoon |
| 2010/0326677 A1 | 12/2010 | Jepsen |
| 2011/0000142 A1 | 1/2011 | Bui |
| 2011/0005780 A1 | 1/2011 | Rennie |
| 2011/0015411 A1 | 1/2011 | Goto |
| 2011/0061336 A1 | 3/2011 | Thomas |
| 2011/0073331 A1 | 3/2011 | Xu |
| 2011/0089386 A1 | 4/2011 | Berry |
| 2011/0091713 A1 | 4/2011 | Miller |
| 2011/0146173 A1 | 6/2011 | Visser |
| 2011/0203813 A1 | 8/2011 | Fenton |
| 2011/0224317 A1 | 9/2011 | O'Leary |
| 2011/0266486 A1 | 11/2011 | Orr |
| 2011/0284250 A1 | 11/2011 | Thomas |
| 2011/0315406 A1 | 12/2011 | Connery |
| 2012/0045584 A1 | 2/2012 | Dettbarn |
| 2012/0067600 A1 | 3/2012 | Bourakov |
| 2012/0073228 A1 | 3/2012 | Fork |
| 2012/0121809 A1 | 5/2012 | Vuozzo |
| 2012/0138319 A1 | 6/2012 | Demmitt |
| 2012/0145418 A1 | 6/2012 | Su |
| 2012/0168185 A1 | 7/2012 | Yount |
| 2012/0199781 A1 | 8/2012 | Luis |
| 2012/0241535 A1 | 9/2012 | Carriere |
| 2012/0256143 A1 | 10/2012 | Ulcar |
| 2012/0258327 A1 | 10/2012 | Mcarthur |
| 2012/0279731 A1 | 11/2012 | Howard, Sr. |
| 2012/0295996 A1 | 11/2012 | Wang |
| 2012/0308631 A1 | 12/2012 | Shirley |
| 2012/0312562 A1 | 12/2012 | Woehrle |
| 2013/0000239 A1 | 1/2013 | Winterowd |
| 2013/0001331 A1 | 1/2013 | Palle |
| 2013/0101839 A1 | 4/2013 | Dion |
| 2013/0111839 A1 | 5/2013 | Efros |
| 2013/0149548 A1 | 6/2013 | Williams |
| 2013/0181158 A1 | 7/2013 | Guo |
| 2013/0239848 A1 | 9/2013 | Fisher |
| 2013/0264076 A1 | 10/2013 | Medina |
| 2013/0288031 A1 | 10/2013 | Labock |
| 2013/0312985 A1 | 11/2013 | Collins |
| 2013/0328322 A1 | 12/2013 | Julian |
| 2014/0027131 A1* | 1/2014 | Kawiecki ............... A62C 37/00 169/45 |
| 2014/0079942 A1 | 3/2014 | Lally |
| 2014/0123572 A1 | 5/2014 | Segall |
| 2014/0130435 A1 | 5/2014 | Paradis |
| 2014/0193201 A1 | 7/2014 | Stauffer |
| 2014/0202716 A1 | 7/2014 | Klaffmo |
| 2014/0202717 A1 | 7/2014 | Klaffmo |
| 2014/0206767 A1 | 7/2014 | Klaffmo |
| 2014/0209330 A1 | 7/2014 | Statter |
| 2014/0216770 A1 | 8/2014 | Gibson |
| 2014/0231106 A1 | 8/2014 | Lewis |
| 2014/0239123 A1 | 8/2014 | Hoisington |
| 2014/0245693 A1 | 9/2014 | Efros |
| 2014/0245696 A1 | 9/2014 | Anderson |
| 2014/0246509 A1 | 9/2014 | Fenton |
| 2014/0284067 A1 | 9/2014 | Klaffmo |
| 2014/0284511 A1 | 9/2014 | Klaffmo |
| 2014/0284512 A1 | 9/2014 | Klaffmo |
| 2014/0290970 A1 | 10/2014 | Izumida |
| 2014/0295164 A1 | 10/2014 | Parker |
| 2014/0299339 A1 | 10/2014 | Klaffmo |
| 2014/0322548 A1 | 10/2014 | Boldizsar |
| 2014/0338930 A1 | 11/2014 | Smith |
| 2014/0366598 A1 | 12/2014 | Carmo |
| 2015/0020476 A1 | 1/2015 | Winterowd |
| 2015/0021053 A1 | 1/2015 | Klaffmo |
| 2015/0021055 A1 | 1/2015 | Klaffmo |
| 2015/0052838 A1 | 2/2015 | Ritchie |
| 2015/0071978 A1 | 3/2015 | Chang |
| 2015/0076842 A1 | 3/2015 | Bendel |
| 2015/0129245 A1 | 5/2015 | Weber |
| 2015/0147478 A1 | 5/2015 | Shutt |
| 2015/0167291 A1 | 6/2015 | Bundy |
| 2015/0175841 A1 | 6/2015 | Parker |
| 2015/0224352 A1 | 8/2015 | Klaffmo |
| 2015/0314564 A1 | 11/2015 | Mancini |
| 2015/0321033 A1 | 11/2015 | Statter |
| 2015/0322668 A1 | 11/2015 | Quinn |
| 2015/0335926 A1 | 11/2015 | Klaffmo |
| 2015/0335928 A1 | 11/2015 | Klaffmo |
| 2015/0352385 A1 | 12/2015 | Fenton |

(56) References Cited

U.S. PATENT DOCUMENTS

| | | |
|---|---|---|
| 2015/0354199 A1 | 12/2015 | Segall |
| 2015/0368560 A1 | 12/2015 | Pascal |
| 2016/0024779 A1 | 1/2016 | Clus |
| 2016/0051850 A1 | 2/2016 | Menard |
| 2016/0059960 A1 | 3/2016 | Fearn |
| 2016/0082298 A1 | 3/2016 | Dagenhart |
| 2016/0096053 A1 | 4/2016 | Beechy |
| 2016/0107014 A1 | 4/2016 | Klaffmo |
| 2016/0132714 A1 | 5/2016 | Pennypacker |
| 2016/0137853 A1 | 5/2016 | Lopez |
| 2016/0216091 A1 | 7/2016 | Erickson |
| 2016/0243789 A1 | 8/2016 | Baroux |
| 2016/0280827 A1 | 9/2016 | Anderson |
| 2016/0313120 A1 | 10/2016 | Shishalov |
| 2016/0329114 A1 | 11/2016 | Lin-Hendel |
| 2017/0007865 A1 | 1/2017 | Dor-El |
| 2017/0008764 A1 | 1/2017 | Labuto |
| 2017/0029632 A1 | 2/2017 | Couturier |
| 2017/0056698 A1 | 3/2017 | Pai |
| 2017/0059343 A1 | 3/2017 | Spinelli |
| 2017/0072236 A1 | 3/2017 | Cordani |
| 2017/0081844 A1 | 3/2017 | Dimakis |
| 2017/0121965 A1 | 5/2017 | Dettbarn |
| 2017/0138049 A1 | 5/2017 | King |
| 2017/0157441 A1* | 6/2017 | Smith .................. G08B 17/005 |
| 2017/0180829 A1 | 6/2017 | Schwarzkopf |
| 2017/0182341 A1 | 6/2017 | Libal |
| 2017/0210098 A1 | 7/2017 | Moore |
| 2017/0321418 A1 | 11/2017 | Tremblay |
| 2018/0023283 A1 | 1/2018 | Dunster |
| 2018/0086896 A1 | 3/2018 | Appel |
| 2018/0087270 A1 | 3/2018 | Miller |
| 2018/0089988 A1 | 3/2018 | Schwarzkopf |
| 2018/0119421 A1 | 5/2018 | Pospisil |
| 2018/0331386 A1 | 11/2018 | Koh |
| 2019/0083835 A1 | 3/2019 | Mariampillai |
| 2019/0168033 A1 | 6/2019 | Conboy |
| 2019/0262637 A1* | 8/2019 | Statter .................. A62C 3/0214 |
| 2019/0382661 A1 | 12/2019 | Kim |
| 2020/0109253 A1 | 4/2020 | Appel |
| 2020/0181328 A1 | 6/2020 | Clark |
| 2020/0254290 A1 | 8/2020 | Robles |
| 2020/0406075 A1 | 12/2020 | Conboy |
| 2021/0052928 A1 | 2/2021 | Kim |
| 2021/0154502 A1 | 5/2021 | Conboy |
| 2022/0008773 A1 | 1/2022 | Conboy |
| 2022/0134151 A1 | 5/2022 | Conboy |

FOREIGN PATENT DOCUMENTS

| | | |
|---|---|---|
| AU | 2005220194 | 4/2007 |
| AU | 2005220196 | 4/2007 |
| AU | 2002240521 | 12/2007 |
| AU | 2002241169 | 7/2008 |
| AU | 2011244837 | 5/2012 |
| AU | 2011280137 | 1/2013 |
| AU | 2019240416 | 10/2020 |
| CA | 2212076 | 7/1997 |
| CA | 2294254 | 1/1999 |
| CA | 2406118 | 10/2001 |
| CA | 2408944 | 11/2001 |
| CA | 2442148 | 10/2002 |
| CA | 2409879 | 4/2003 |
| CA | 2593435 | 8/2006 |
| CA | 2653817 | 12/2007 |
| CA | 2705140 | 5/2009 |
| CA | 2974796 | 7/2010 |
| CA | 2811358 | 1/2013 |
| CA | 2792793 | 4/2013 |
| CA | 2846076 | 9/2014 |
| CA | 2862380 | 4/2015 |
| CA | 2868719 | 6/2015 |
| CA | 2933553 | 6/2015 |
| CA | 3094694 A1 | 9/2019 |
| CN | 1397613 | 2/2003 |
| CN | 101293752 | 10/2008 |
| CN | 101434760 | 5/2009 |
| CN | 202045944 | 11/2011 |
| CN | 102300610 | 12/2011 |
| CN | 102337770 | 2/2012 |
| CN | 103562079 | 2/2014 |
| CN | 103813835 | 5/2014 |
| CN | 104540556 | 4/2015 |
| EP | 0059178 A1 | 9/1982 |
| EP | 0059178 B1 | 5/1985 |
| EP | 173446 A1 | 3/1986 |
| EP | 173446 B1 | 3/1986 |
| EP | 0199131 A2 | 10/1986 |
| EP | 2898925 | 7/2015 |
| EP | 2902077 | 8/2015 |
| EP | 19167771 | 10/2019 |
| GB | 429207 A | 5/1935 |
| GB | 831720 A | 3/1960 |
| GB | 832691 | 4/1960 |
| GB | 2301122 | 11/1996 |
| GB | 2370766 | 7/2002 |
| GB | 2370769 A | 7/2002 |
| GB | 2375047 | 11/2002 |
| GB | 2386835 | 10/2003 |
| GB | 2486959 A | 7/2012 |
| GB | 2533262 | 6/2016 |
| GB | 2549980 | 11/2017 |
| GB | 2555067 | 4/2018 |
| KR | 101675486 | 5/2012 |
| TW | I471153 | 2/2015 |
| TW | 201714639 | 5/2017 |
| WO | 8607272 A1 | 12/1986 |
| WO | 8704145 | 7/1987 |
| WO | 8801536 A1 | 3/1988 |
| WO | 9010668 | 9/1990 |
| WO | 9100327 | 1/1991 |
| WO | 9105585 | 5/1991 |
| WO | 9109390 A1 | 6/1991 |
| WO | 9109649 A1 | 7/1991 |
| WO | 9300963 | 1/1993 |
| WO | 9302749 A1 | 2/1993 |
| WO | 9321808 A1 | 11/1993 |
| WO | 9323116 A1 | 11/1993 |
| WO | 9420169 A1 | 9/1994 |
| WO | 9425111 A1 | 11/1994 |
| WO | 9604960 A1 | 2/1996 |
| WO | 9605888 A1 | 2/1996 |
| WO | 9618434 A1 | 6/1996 |
| WO | 9706858 A2 | 2/1997 |
| WO | 9706858 A3 | 4/1997 |
| WO | 9715352 A1 | 5/1997 |
| WO | 9803228 A1 | 1/1998 |
| WO | 9809685 A1 | 3/1998 |
| WO | 9818524 A1 | 5/1998 |
| WO | 9852993 A1 | 11/1998 |
| WO | 9856197 A1 | 12/1998 |
| WO | 0006667 A2 | 2/2000 |
| WO | 0022255 | 4/2000 |
| WO | 0029067 A1 | 5/2000 |
| WO | 0006667 A3 | 8/2000 |
| WO | 0107116 A1 | 2/2001 |
| WO | 0139599 A2 | 6/2001 |
| WO | 0145932 | 6/2001 |
| WO | 0166669 | 9/2001 |
| WO | 0208015 A1 | 1/2002 |
| WO | 0228484 A1 | 4/2002 |
| WO | 0228708 A2 | 4/2002 |
| WO | 0139599 A3 | 5/2002 |
| WO | 0243812 A2 | 6/2002 |
| WO | 0244305 A2 | 6/2002 |
| WO | 0244305 A3 | 8/2002 |
| WO | 0228708 A3 | 1/2003 |
| WO | 03015873 A2 | 2/2003 |
| WO | 0243812 A3 | 3/2003 |
| WO | 03024618 A1 | 3/2003 |
| WO | 2003018695 A1 | 3/2003 |
| WO | 03015873 A3 | 5/2003 |
| WO | 03057317 A1 | 7/2003 |
| WO | 03072201 A1 | 9/2003 |

(56) References Cited

FOREIGN PATENT DOCUMENTS

| | | |
|---|---|---|
| WO | 03073128 A1 | 9/2003 |
| WO | 6620348 B1 | 9/2003 |
| WO | 2004000422 A1 | 12/2003 |
| WO | 6780991 B2 | 8/2004 |
| WO | 6828437 B2 | 12/2004 |
| WO | 2004108528 A2 | 12/2004 |
| WO | 2005014115 A1 | 2/2005 |
| WO | 2005046800 A1 | 5/2005 |
| WO | 2004108528 A3 | 6/2005 |
| WO | 2005049144 A2 | 6/2005 |
| WO | 2005054407 A1 | 6/2005 |
| WO | 2005058423 A1 | 6/2005 |
| WO | 2005119868 | 12/2005 |
| WO | 2006006829 | 1/2006 |
| WO | 2006010667 | 2/2006 |
| WO | 2006013180 | 2/2006 |
| WO | 2006017566 A2 | 2/2006 |
| WO | 2006032130 A1 | 3/2006 |
| WO | 2006036084 A1 | 4/2006 |
| WO | 2006045167 A1 | 5/2006 |
| WO | 2006053514 A1 | 5/2006 |
| WO | 2006017566 A3 | 6/2006 |
| WO | 2006056379 A2 | 6/2006 |
| WO | 2006072672 | 7/2006 |
| WO | 2006079899 A2 | 8/2006 |
| WO | 2006081156 | 8/2006 |
| WO | 2006081596 | 8/2006 |
| WO | 2006097962 | 9/2006 |
| WO | 2006056379 A3 | 10/2006 |
| WO | 2006126181 | 11/2006 |
| WO | 2007001403 | 1/2007 |
| WO | 2007008098 A1 | 1/2007 |
| WO | 2007027170 A1 | 3/2007 |
| WO | 2007030982 | 3/2007 |
| WO | 2007033450 A1 | 3/2007 |
| WO | 2007048149 | 5/2007 |
| WO | 2007065112 | 6/2007 |
| WO | 2007092985 A1 | 8/2007 |
| WO | 2007138132 A1 | 12/2007 |
| WO | 2007140676 | 12/2007 |
| WO | 2008031559 | 3/2008 |
| WO | 2008045460 A2 | 4/2008 |
| WO | 2008071825 A2 | 6/2008 |
| WO | 2008071825 A3 | 7/2008 |
| WO | 2008100348 | 8/2008 |
| WO | 2008104617 A1 | 9/2008 |
| WO | 2008111864 A1 | 9/2008 |
| WO | 08118408 | 10/2008 |
| WO | 2008150157 | 12/2008 |
| WO | 2008150265 | 12/2008 |
| WO | 2008155187 | 12/2008 |
| WO | 2009004105 A1 | 1/2009 |
| WO | 2009012546 A1 | 1/2009 |
| WO | 2009020251 | 2/2009 |
| WO | 2009022995 A2 | 2/2009 |
| WO | 2005049144 A3 | 3/2009 |
| WO | 2009022995 A3 | 4/2009 |
| WO | 2009042847 | 4/2009 |
| WO | 2009057104 | 5/2009 |
| WO | 2009061471 | 5/2009 |
| WO | 2009086826 | 7/2009 |
| WO | 2009097112 | 8/2009 |
| WO | 2009121682 A1 | 10/2009 |
| WO | 2009139668 A1 | 11/2009 |
| WO | 2009150478 A1 | 12/2009 |
| WO | 2009150478 A4 | 3/2010 |
| WO | 2010028416 | 3/2010 |
| WO | 2010028538 A1 | 3/2010 |
| WO | 2010041228 | 4/2010 |
| WO | 2010046696 | 4/2010 |
| WO | 2010061059 | 6/2010 |
| WO | 2010078559 | 7/2010 |
| WO | 2010082073 | 7/2010 |
| WO | 2010083890 A1 | 7/2010 |
| WO | 2010089604 | 8/2010 |
| WO | 2010104286 | 9/2010 |
| WO | 2010123401 A1 | 10/2010 |
| WO | 2010139124 | 12/2010 |
| WO | 2011015411 A1 | 2/2011 |
| WO | 2011016773 | 2/2011 |
| WO | 2011025310 A2 | 3/2011 |
| WO | 2011034334 A2 | 3/2011 |
| WO | 2011042609 | 4/2011 |
| WO | 2011042761 A1 | 4/2011 |
| WO | 2011049424 A2 | 4/2011 |
| WO | 2011034334 A9 | 5/2011 |
| WO | 2011054345 | 5/2011 |
| WO | 2011078727 A1 | 6/2011 |
| WO | 2011078728 A1 | 6/2011 |
| WO | 2011025310 A9 | 7/2011 |
| WO | 2011025310 A3 | 9/2011 |
| WO | 2011116450 | 9/2011 |
| WO | 2011049424 A3 | 11/2011 |
| WO | 2011148206 A1 | 12/2011 |
| WO | 2012002777 A2 | 1/2012 |
| WO | 2012021146 A1 | 2/2012 |
| WO | 2012028155 A1 | 3/2012 |
| WO | 2012031762 | 3/2012 |
| WO | 2012002777 A3 | 5/2012 |
| WO | 2012060491 | 5/2012 |
| WO | 2012071577 A2 | 5/2012 |
| WO | 2012076905 | 6/2012 |
| WO | 2012078916 | 6/2012 |
| WO | 2012071577 A3 | 8/2012 |
| WO | 2012147677 | 11/2012 |
| WO | 2012164478 | 12/2012 |
| WO | 2013003097 | 1/2013 |
| WO | 2013030497 A1 | 3/2013 |
| WO | 2013060848 A1 | 5/2013 |
| WO | 2013062295 | 5/2013 |
| WO | 2013068260 | 5/2013 |
| WO | 2013098859 | 7/2013 |
| WO | 2013140671 A1 | 9/2013 |
| WO | 2013145207 | 10/2013 |
| WO | 2013179218 | 12/2013 |
| WO | 2014001417 | 1/2014 |
| WO | 2014025929 | 2/2014 |
| WO | 2014084749 A1 | 6/2014 |
| WO | 2014115036 | 7/2014 |
| WO | 2014115038 A2 | 7/2014 |
| WO | 2014127604 A1 | 8/2014 |
| WO | 2014152528 | 9/2014 |
| WO | 2014115038 A3 | 10/2014 |
| WO | 2014155208 A1 | 10/2014 |
| WO | 2014179482 | 11/2014 |
| WO | 2015020388 | 2/2015 |
| WO | 2015051917 | 4/2015 |
| WO | 2015055862 | 4/2015 |
| WO | 2015061905 | 5/2015 |
| WO | 2015076842 A1 | 5/2015 |
| WO | 2015089467 | 6/2015 |
| WO | 2015094014 | 6/2015 |
| WO | 2015104006 | 7/2015 |
| WO | 2015126854 | 8/2015 |
| WO | 2015131631 | 9/2015 |
| WO | 2015134810 A1 | 9/2015 |
| WO | 2015153843 | 10/2015 |
| WO | 2015168456 | 11/2015 |
| WO | 2015172619 | 11/2015 |
| WO | 2016004801 | 1/2016 |
| WO | 2016005650 | 1/2016 |
| WO | 2016071715 | 5/2016 |
| WO | 2016075480 | 5/2016 |
| WO | 2016088026 | 6/2016 |
| WO | 2016131060 | 8/2016 |
| WO | 2016159897 A1 | 10/2016 |
| WO | 2016175379 A1 | 11/2016 |
| WO | 2016186450 | 11/2016 |
| WO | 2017014782 | 1/2017 |
| WO | 2017015585 | 1/2017 |
| WO | 17019566 | 2/2017 |
| WO | 2017016142 A1 | 2/2017 |
| WO | 2017016143 A1 | 2/2017 |
| WO | 2017031520 A1 | 3/2017 |

(56) References Cited

FOREIGN PATENT DOCUMENTS

| | | |
|---|---|---|
| WO | 2017070375 A1 | 4/2017 |
| WO | 2017070375 A8 | 6/2017 |
| WO | 2017090040 A1 | 6/2017 |
| WO | 2017094918 | 6/2017 |
| WO | 2017103321 A1 | 6/2017 |
| WO | 2017116148 A1 | 7/2017 |
| WO | 2017157406 A1 | 9/2017 |
| WO | 2017179953 A1 | 10/2017 |
| WO | 2017208272 A1 | 12/2017 |
| WO | 2018006000 | 1/2018 |
| WO | 2018134704 | 7/2018 |
| WO | 2020163788 | 8/2020 |

OTHER PUBLICATIONS

"Colorless Long Term Fire Retardant—Successful Applications", Phos-Chek® Home Defese Long Term Fire Retardant, ICL Performance Products LP, 2014, (1Page).
"Mulch—Fire in California", University of California Cooperative Extension (UCCE)—Fire in California, published at https://ucanr.edu/sites/fire/Prepare/Landscaping/Mulch/, captured on Jun. 20, 2021, (3 Pages).
"What is Foliar Spray: Learn About Different Types of Foliar Spraying", http://www.gardeningknowhow.com, Aug. 6, 2020 (2 Pages).
2 Technical Data Sheet for Lankem BioLoop 84L, Lankem Ltd, Feb. 2018 (12 Pages).
2012 CLT Handbook, Christian Dagenais, Robert H. White, Kuma Sumathipala, "Chapters—Fire", Nov. 2012, (pp. 1-55).
2017 Model 3 Emergency Response Guide for Tesla 400 Volt Lithium-ion Battery, Tesla Inc., Aug. 2018 (37 Pages).
2017 Product Brochure of Agricultural Solutions from Sierra Natural Science, Inc., Sierra Natural Science, Inc., Salina CA, 2017, (9 Pages).
2021 Model S Emergency Response Guide for Tesla Model S Electric Vehicles with Lithium Ion Battery, Version 001, Tesla Inc., 2021 (32 Pages).
3M, "From Our Labs to Your Life", Jan. 2016, (pp. 1-12).
3M, "Novec 1230 : Specification", Jan. 2018, (pp. 1-10).
3M, "Novec 1230 Fire Protection Fluid," Jan. 2018, (pp. 1-11).
3M, "Novec 1230 Fire Protection Fluid: Helping Protect Critical Military Assets Through Sustainable Fire Protection Technology", Aug. 2014, (pp. 1-2).
3M, "Novec 1230 Fire Protection Fluid", Jan. 2017, (pp. 1-4).
3M, Building and Commerical Services Division, "Brochure for 3M FireDam™ Spray 200 Sealing Agent", 2009,(2 Pages).
60 Data Sheet for Hydro Blanket BFM, Profile Products, Feb. 2017 (1 Pages).
A. Poshadri, Aparna Kuna, "Microencapsulation Technology: A Review" Jan. 2010 (17 Pages).
A.M. Kaja, K. Schollbach, S. Melzer, S.R. Van Der Laan, H.J.H. Brouwers, Qingliang Yu, Hydration of potassium citrate-activated BOF slag, Nov. 13, 2020 (11 Pages).
Agacad, "Wood Framing", Jan. 2016 (pp. 1-4).
Aida Adlimoghaddam, Mohammad G. Sabbir, Bendeict C. Albensi, Frontiers in Molecular Neuroscience, "Ammonia as a Potential Neurotoxic Factor in Alzheimer's Disease" Aug. 2016 (11 Pages).
AIG, "AIG Global Property Construction Risk Engineering", Nov. 2017, (pp. 1-6).
Alagapparammohan, James A. Kaduk, Crystallographic Communications, "Crystal structure of anhydrous tripotassium citrate from laboratory X-ray powder diffraction data and DFT comparison" Jul. 14, 2016 (9 Pages).
AMEREX, "Safety Data Sheet: Deionized Water, Pressurized Water Extinguisher", Mar. 2018, (pp. 1-8).
American Chemical Society, "Seeing Red: Controversy smolders over federal use of aerially applied fire retardants", Aug. 2011, (p. 1-6).

American Wood Council, "2015 NDS Changes", Jul. 2015, (pp. 1-66).
American Wood Council, "Design for Code Acceptance: Flame Spread Performance of Wood Products Used for Interior Finish", Apr. 2014, (pp. 1-5).
American Wood Preservers' Association, "Standard Method of Determining Corrosion of Metal in Contact With Treated Wood", Jan. 2015, (pp. 1-4).
Andrew Buchanan, Birgit Ostman, Andrea Frangi, "Fire Resistance of Timber Structures", Mar. 2014, (pp. 1-20).
Andrew Crampton, "Cross Laminated Timber: The Future of Mid-Rise Construction, "Jun. 2016, (pp. 1-5).
Andrzej Jankowski, Radosław Balwiariz, Dominik Marciniak, Dariusz Łukowiec, Janusz Pluta, "Influence of Spray Drying Manufacturing Parameters on Quality of Losartan Potassium Microspheres", Acta Poloniae Pharmaceutica and Drug Research, vol. 71, No. 5, 2014 , (9 Pages).
Angus Fire Ltd., "TankMaster: Which Foam to Use for Hydrocarbon Tank Fires" Jan. 2004 (23 Pages ) 17.
Anna Wiegand, Gioia Fischer, Harald Seeger, Daniel Fuster, Nasser Dhayat, Oliver Bonny, Thomas Ernandez, Min-Jeong Kim, Carsten A. Wagner, Nilufar Mohebbi, Clinical Kidney Journal, "Impact of potassium citrate on urinary risk profile, glucose and lipid metabolism of kidney stone formers in Switzerland" Aug. 19, 2019 (12 Pages).
Anthony C. Yu, Hector Lopez Hernandez, Andrew H. Kim, Lyndsay M. Stapleton, Reuben J. Brand, Eric T. Mellor, Cameron P. Bauer, Gregory D. McCurdy, Albert J. Wolff III, Doreen Chan, Craig S. Criddle, Jesse D. Acosta, and Eric A. Appel, "Wildfire prevention through prophylactic treatment of high-risk landscapes using viscoelastic retardant fluids," Proceedings of The National Academy of Science (PNAS), published Sep. 30, 2019, https://www.pnas.org/content/117/2/1233, (10 Pages).
Anthony E. Finnerty, "Water-Based Fire Extinguishing Agents", US Army Research Laboratory, Aberdeen Proving Ground, Maryland, 1995 (12 Pages).
Arch Wood Protection Inc., "Dricon: Application Guide", Jan. 2016, (pp. 1-28).
Archpaper Antonio Pacheco, "Katerra's Approach Could Make Factory Construction a Model for the Future", Apr. 2018, (pp. 1-4).
Article on Carboxylic Acid, Britannica Online Encyclopedia, captured Jan. 24, 2021 at https://www.britannica.com/print/article/95261 (41 Pages)9.
Asia Pacific Fire, "Approaching the Flame Fire Fighting", Jun. 2017, (pp. 1-2).
ASTM International, "Standard Practice for Calculating Design Value Treatment Adjustment Factors for Fire-Retardant-Treated Lumber", Apr. 2016, (pp. 1-7).
ASTM International, "Standard Practice for Calculating Bending Strength Design Adjustment Factors for Fire-Retardant-Treated Plywood Roof Sheathing", Oct. 2015, (pp. 1-6).
ASTM International, "Standard Test Method for Evaluating the Effects of Fire-Retardant Treatments and Elevated Temperatures on Strength Properies of Fire-Retardant treated Lumber", Jul. 2010, (pp. 1-6).
ASTM International, "Standard Test Method for Evaluating the Flexural Properties of Fire-retardant Treated Softwood Plywood Exposed to Elevated Temperatures", May 2001, (pp. 1-7).
ASTM International, "Standard Test Method for Extended Duration Surface Burning Characteristics of Building Materials (30 min Tunnel Test)," Aug. 2011, (pp. 1-4).
ASTM International, "Standard Test Method for Hygroscopic Properties of Fire-Retardant Wood and Wood-Based Products", Jul. 2013, (pp. 1-3).
ASTM International, "Standard Test Methods for Fire Tests of Building Construction and Materials", Oct. 2000, (pp. 1-24).
Bank Insurance, Michael D. White, "How Benjamin Franklin Became the 'Father of Insurance'", Dec. 1998, (pp. 1-3).
Benzinga, "Megola Inc. Files Application to Underwriter Laboratories for Certification", May 2010, (pp. 1-3).
Bete, "PJ: Fine Atomization", Nov. 2017, (p. 1).
Bete, "BETE Announces High-Performance Nozzles for Fire Protection Systems", Nov. 2017, (pp. 1-2).

(56) References Cited

OTHER PUBLICATIONS

Bete, "Low Flow", Nov. 2017, (p. 1).
Bete, "MicroWhirl: Fine Atomization", Nov. 2017, (p. 1).
Bete, "P: Fine Atomization", Nov. 2017, (p. 1).
Bete, "UltiMist", Nov. 2017, (p. 1).
Binu Kundukad, Gayathri Udayakumar, Erin Grela, Dhamanpreet Kaur, Scott A. Rice, Staffan Kjelleberg, Patrick S. Doyle, Elsevier, "Biofilm: Weak acids as an alternative anti-microbial therapy" Jan. 15, 2020 (8 Pages).
Blog Article titled, "Cleaning and Killing Black Mold with Common, Non-Toxic, Household Products" captured on Feb. 1, 2021 at https://www.lifemaideasy.com/cleaning-and-killing-black-mold-w (pp. 1-9).
Boss Products, "EcoMAXX Brochure", Apr. 2016, (pp. 1-2).
Brian R. Donner, "Dry Chemical Suppression for Lithium Compounds" Jan. 2012 (32 Pages).
Brief Profile on Tripotassium Citrate, by European Chemicals Agency (ECHA), Official Journal of the European Union, Jun. 13, 2022 (18 Pages).
Brochure for AkroFoam Master Stream Nozzle with Pickup Tube Style 4475, Akron Brass Company, Apr. 2021 (2 Pages).
Brochure for Chemguard NFF 3x3 UL201 Non-Fluorinated Alcohol Resistant Firefighting Foam Concentrate, Johnson Controls, Jan. 14, 2021 (4 Pages).
Brochure for Jungbunzlauer Range of Products, Jungbunzlauer Suisse AG, May 7, 2020 (20 Pages).
Brochure for SKUM Firefighting Foam Concentrates and Hardware, Johnson Controls, Oct. 2019 (8 Pages).
Bruker, "S1 Titan Brochure", Nov. 2017, (pp. 1-8).
C. I. Onwulata, R. P. Konstance, P. M. Tomasula, American Dairy Science Association, "Minimizing Variation in Functionality of Whey Protien Concentrates from Different Sources" Sep. 25, 2003 (8 Pages).
Calgary Herald, Andrea Cox, "Homebuilder Wants Buyers to be in the Pink", Oct. 2011, (pp. 1-6).
Callisonrtkl, "Seattle Mass Timber Tower, Feasibility Study: Design and Construction Analysis " Aug. 2016, (pp. 1-34).
Canada Department of Forestand Rural Development, Ottawa, Canada, "The Sprayer-Duster as a Tool For Forest Fire Control", D. G. Fraser, Forestry Branch Departmental Publication No. 1167, 1967 (19 Pages).
Carol Walker, Executive Director of RMIIA, "Wildfire & Insurance: Insurance Communications Challenges a& Opportunities", https://www.iii.org/sites/default/files/docs/pdf/cc_presentation_carole_walker_111416.pdf, Oct. 2016, (8 Pages).
Carole Walker, Director Rmiia, Presentation—"Wildfire & Insurance: Insurance Communications Challenges & Opportunities", Sep. 2018 (8 Pages).
Cease Fire, "CFCA 900 Clean Agent Fire Supression System Unit Specifications", Nov. 2017, (p. 1).
Cease Fire, "Why Choose Waterless Fire Suppression", Sep. 2018, (pp. 1-2).
Charlotte Pipe and Foundry Company, "Technincal Bulletin: Understanding Flame Spread Index (FSI) and Smoke Developed Index (SDI) Ratings", Jan. 2016, (pp. 1-2).
Chemical Online, "Mse Enviro-Tech Corp. Introduces Dectan", May 2007, (p. 1).
Chemical Specialties Inc., "D-Blaze Fire Retardant Treated Wood, The New Generation Building Material", Mar. 2004, (pp. 1-2).
Cheryl Hogue, "Seeing Red: Controversy Smolders over Federal Use of Aerially Applied Fire Retardants", Aug. 29, 2021, ACS vol. 89, No. 35, pp. 11-15, published at http://pubsapp.acs.org/cen/coverstory/89/8935cover.html, (6 PAges).
Chip Tuson, Ohio State News, "World's First "Intelligent" Sprayer", Aug. 2, 2018, https://news.osu.edu/the-worlds-first-intelligent-sprayer/, (4 Pages).
Christopher E. Chwedyk, Burnham, "Re-examining Residential high-Rise Sprinklers: Where Does Chicago Stand?", Aug. 2017, (pp. 1-4).
Clean Production Action, "GreenScreen Certified: Standard for Firefighting Foam" Apr. 1, 2021 (28 Pages).
Clean Production Action, "GreenScreen Certified: Standard for Firefighting Foam" Feb. 25, 2020 (48 Pages).
Clive Buckley and David Rush, Ministry of Defence, "Water Mist Developments for the Royal Navy", Apr. 1996, (pp. 1-14).
CMA Robotics, "GR 650", Nov. 2017, (pp. 1-2).
CMA Robotics, "GR 6100-HW-S", Nov. 2017, (pp. 1-2).
CMA Robotics, "GR 6100-HW", Nov. 2017, (pp. 1-2).
CMA Robotics, "GR 630", Nov. 2017, (p. 2).
Coastal Forest Products, "CP-LAM 2.0E Design Properties & Floor Beams", Nov. 2017, (pp. 1-5).
Coastal Forest Products, "Multi-Ply CP-LAM Beam Assembly", Nov. 2017, (pp. 1-5).
Col Michael Receniello, "Fire Suppression Systems (FSS) Enhance Tactical Wheeled Vehicle (TWV) Survivability", Jul. 2010, (pp. 1-3).
Conception R.P. Inc., "The Cutting Edge of Finger Jointing", Feb. 2005, (pp. 1-16).
Conrad Forest Products, "BLUWOOD: The Color of Protection", http://www.conradfp.com/building-products-bluwood.php, Nov. 2017, (pp. 1-8).
Corrected Notice of Allowability dated Dec. 21, 2020 for U.S. Appl. No. 15/829,943 (pp. 1-2).
Corrected Notice of Allowability dated Jan. 7, 2021 for U.S. Appl. No. 15/829,944 (pp. 1-2).
Cosmetics Info, "Citric Acid and its Salts and Esters" Jan. 15, 2021 (3 Pages).
CSE Inc, "AC479: Proposed AC for Wood Structural Panels with Factory-Applied Fire-Retardant Coating", Feb. 2017, (pp. 1-101).
CSIRO, "Certificate for Conformity: Fike Micromist, Pre-engineered Water Mist Fire Suppression System", Jan. 2012, (pp. 1-5).
Cyril N. Hinshelwood, "Chemical Kinetics in the Past Few Decades", Nobel Lecture, Dec. 1956, (pp. 1-11).
D. Roosendams, K. Van Wingerden, M.N. Holme and P. Hoorelbeke, "Experimental Investigation of Explosion Mitigating Properties of Aqueous Potassium Carbonate Solutions", Journal of Loss Prevention in the Process Industries, vol. 46, Feb. 20, 2017 (19 Pages).
D. Roosendans, K. Van Wingerden, M. H. Holme, and P. Hoorelbeke, "Experimental Investigation of Explosion Mitigating Properties of Aqueous Potassium Carbonate Solutions," Journal of Loss Prevention in the Process Industries, vol. 46, 2017 (19 Pages).
D. Roosendans, K. Van Wingerden, M. N. Holme, P. Hoorelbeke, Elsevier, "Experimental investigation of explosion mitigating properties of aqueous potassium carbonate solutions" Feb. 14, 2017 (19 Pages).
D. Roosendans, K. Van Wingerden, M.N. Holme, P. Hoorelbeke, "Experimental investigation of explosion mitigating properties of aqueous potassium carbonate solutions" Feb. 20, 2017 (19 Pages).
D.G. Fraser, "Break the Flame Chain Reaction", Jun. 1962, (pp. 1-3).
D.J. Spring, D.N. Ball, "Alkali Metal Salt Aerosols As Fire Extinguishants", Jan. 1998 (7 Pages).
DANFOSS SEMCO Fire Protection, "Deck Foam Fire Fighting System", Aug. 2016, (pp. 1-4).
DANFOSS SEMCO Fire Protection, "Dry Powder Fire Fighting System", Aug. 2016, (pp. 1-4).
DANFOSS SEMCO Fire Protection, "High Pressure CO2 Fire Fighting System", Aug. 2016, (pp. 1-4).
DANFOSS SEMCO Fire Protection, "Sem-Safe: High-Pressure Water Mist System", Feb. 2014, (pp. 1-8).
Daniel Madrzykowski, National Institute of Standards and Technology, "Water Addititves for Increased Efficiency of Fire Protection and Suppression", Jan. 1998, (pp. 1-6).
Data Sheet for 36 Chemguard 36 Gallon 2 Foam Station, Tyco Fire Protection Products, Jan. 2018 (4 Pages).
Data Sheet for ANSUL AFP6B 6% Fluoroprotein Foam Concentrate, Johnson Controls, Jan. 2019 (2 Pages).
Data Sheet for ANSUL AFP6B 6% Fluoroprotein Foam Concentrate, Tyco Fire Protection Products, Jan. 2019 (2 Pages).
Data Sheet for ANSUL Foam Testing/ Foam Test Kit, Johnson Controls, Jan. 2020 (1 Page).

(56) References Cited

OTHER PUBLICATIONS

Data Sheet for Chemguard 3% Fluoroprotein Foam Concetrate, Chemguard, Sep. 2005 (2 Pages).
Data Sheet for Chemguard CFP3B 3% Fluoroprotein Foam Concentrate, Tyco Fire Protection Products, Jan. 2019 (2 Pages).
Data Sheet for Chemguard S-550 High Performance Nonionic Fluorosurfactant, Tyco Fire Protection Products, (1 Page), 2018.
Data Sheet for Chemguard S-760P High Performance Anionic Fluorosurfactant, Tyco Fire Protection Products, Jan. 2018 (1 Page).
Data Sheet for Chemguard S-761 P High Performance Anionic Fluorosurfactant, Tyco Fire Protection Products, Jan. 2018 (1 Page).
Data Sheet for Chemguard S-764P High Performance Anionic Fluorosurfactant, Tyco Fire Protection Products Jan. 2018 (2 Pages)2.
Data Sheet for Chemguard S-764P-12A High Performance Anionic Fluorosurfactant, Tyco Fire Protection Products, Jan. 2018 (2 Pages).
Data Sheet for FLOWmix, Leader Group, Jun. 2018 (2 Pages).
Data Sheet for Leader Mix, Leader Group, Jun. 2018 (2 Pages).
Data Sheet for Purple K Dry Suppressing Agent, Tyco Fire Protection Products, Jan. 2018 (1 Page).
Data Sheet for SNS-D2 C Alltural Disease and Fungal Control Application & Use Guide, Sierra Natural Science, Jan. 2020 (pp. 1-7).
Data Sheet for Towalex FFFP ARC 3x6, Incendium Fire Solutions, Nov. 2014 (2 Pages).
Data Sheet for Williams Fire & Hazard Control Inline Foam Eductors, Williams Fire & Hazard Control, Jan. 2019 (1 Page).
Datasheet for Tearra-Blend® withg Tacking Agent 3® Hydraulic Mulch, Oct. 2017, Profile Products, LLC, Buffalo Grove, Illinois, (1 Pages).
DCI Engineers, "Cross-Laminate Timber", May 2016, (pp. 1-5).
Dealer News, "SiteOne Introduces New LESCO Smart Guided Precision Spray System", Nov. 5, 2018, https://www.rurallifestyledealer.com/articles/7715-siteone-introduc , (4 Pages).
Defence Research and Development Canada, John A. Hiltz, "Additives for Water Mist Fire Suppression Systems—A Review", Nov. 2012, (pp. 1-40).
Department of Financial Services, "Certification of Insurance Fire Protection System Contractor, State of Florida," Aug. 2007, (p. 1).
Department of Homeland Security, "Class A Foam for Structural Firefighting", Dec. 1996, (pp. 1-62).
Department of the Navy, "Military Specification: Lumber and Plywood", Jun. 1984, (pp. 1-16).
Diversified Protection Systems Inc., "Fire Protection Protection Presentation", Jan. 2004, (pp. 1-35).
Dr. Anthony E. Finnerty, U.S. Army Research Laboratory, "Water-Based Fire-Extinguishing Agents", Jan. 1995, (pp. 1-12).
Dr. Inge Krämer, BASF, "Acronal PRO & Joncryl: Water based Resins for Metal Protection" Oct. 3, 2011, (21 Pages).
DRJ, "AAF21 Fire Treated Wood Protection Coating Applied to Lumber", Sep. 2017, (pp. 1-8).
DRJ, "Technical Evaluation Report: Eco Red Shield Fire Treated Wood Protection Coating", Apr. 2016, (pp. 1-8).
DrJohnson Lumber Company, "Cross Laminated Timbers: Mass Timber Construction", Jan. 2016, (p. 1).
Dupont, "Some facts you should know about NOVEC 1230 and ECARO-25 . . . ", Oct. 2004, (pp. 1-2).
Dupont, Mark L. Robin, "DuPont Fire Extinguishants: Comparison Testing of FE-25 and Automatic Sprinklers in a Simulated Data Processing/Telecommunications Facility", Jul. 2008, (pp. 1-20).
Eco Building Products Inc, "Eco Red Shield Material Safety Data Sheet: Wood Dust", Jun. 2005, (pp. 1-2).
Eco Building Products, "Affiliate Program Screenshots", Apr. 2013, (pp. 1-3).
Eco Building Products, "Eco Disaster Break: Class A Fire Rated, UV Resistant, High Performance, Non-Toxic, Acrylic Coating", Feb. 2013, (p. 1).
Eco Building Products, "Safety Data Sheet: Eco Red Shield", May 2016, (pp. 1-6).
Eco Building Products, "Technical Bulletin: Corrosive Effects From Eco Red Shield Coatings", Jan. 2011, (p. 1).

Elsevier, Chao Man, Zhu Shunbing, Jia Litao, Wu Xiaoli, "Surfactant-containing Water Mist Suppression Pool Fire Experiemental Analysis", Oct. 2010, (pp. 1-7).
Elsevier, Qiang Chen, Jun-Cheng Jiang, Fan Wu, Meng-Yazou, "Performance Evaluation of Water Mist with Mixed Surfactant Additives Based on Absorption Property", Dec. 2017, (pp. 1-9).
Elsevier, Zhang Tianwei, Liu Hao, Han Zhiyue, Du Zhiming, Wang Yong, "Research Paper: Active Substances Study in Fire Extinguishing by Water Mist with Potassium Salt Additives Based on Thermoanalysis and Thermodynamics", May 2017, (pp. 1-10).
Erdal Ozkan, Ohio State University Professor and Extension Agriculture Engineer, "One-of-a-kind Intelligent Sprayer Being Developed in Ohio", Jun. 20, 2018, https://www.michfb.com/MI/Farm-News/One-of-a-kind-Intelligent-sprayer-being-developed-in-Ohio/, (6 Pages).
Ester Inglis-Arkell, "The Deadliest Ways to Try to Put Out a Fire," GIZMODO published at https://gizmodo.com/the-deadliest-ways-to-try-to-put-out-a-fire , Aug. 20, 2018, (3 Pages).
Exova Warringtonfire, "Ad-hoc tests on watermist systems utilising the principles of the procedure defined in Draft BS 8458: 2014: Annex B", Sep. 2015, (pp. 1-19).
Exova Warringtonfire, "BS 8458:2015: Annex C" Jan. 2016, (pp. 1-22).
Exova Warringtonfire, Test on a watermist system utilising the principles of the procedure defined in BS 9252: 2011: Annex S (21 pages).
Fact Sheet for PFOA & PFOS, EPA, Nov. 2016 (5 Pages).
Fike, "Cheetah Xi: Intelligent Suppression Control System", Sep. 2012, (pp. 1-6).
Fike, "DuraQuench: A New Era in Water-Based Fire Protection", Sep. 2015, (pp. 1-2).
Fike, "DuraQuench: Pumped Water Mist System", Sep. 2015, (pp. 1-8).
Fike, "Even in the Age of Cloud Computing, Data Center Downtime Can Spell Disaster", Aug. 2016. (pp. 1-2).
Fike, "Fire Alarm Solutions: Ready for the Future Fike Fire Panels", May 2007, (pp. 1-2).
Fike, "Intelligent Graphic Annunciators", Mar. 2009, (pp. 1-2).
Fike, "Intelligent Ionization Detector", Mar. 2014, (pp. 1-2).
Fike, "Intelligent Manual Pull Station", Jun. 2014, (pp. 1-2).
Fike, "Intelligent Non-Relay Photoelectric Duct Housing", Jun. 2014, (pp. 1-2).
Fike, "Intelligent Photoelectric Detector", Mar. 2014, (pp. 1-2).
Fike, "Micromist Suppression System Data Sheet", Sep. 2005, (pp. 1-2).
Fike, "Micromist System Package Data Sheet", Sep. 2005, (pp. 1-2).
Fike, "MicroMist: The Self Contained Fire Protection Alternative", Aug. 2012, (pp. 1-2).
Fike, "Mini Monitor Module", Apr. 2014, (pp. 1-2).
Fike, "ProInert: Inert Gas Fire Protection System", May 2012, (pp. 1-6).
Fike, "ProInert®2 Agent Storage Cylinder IG—IG-55" Jan. 2016, (pp. 1-7).
Fike, "Single Hazard Panel Shp Pro", Dec. 2009, (pp. 1-2).
Fike, "Specification—Micromist Fire Suppression System with Cheetah Xi 50 Control Panel", Dec. 2012, (pp. 1-10).
Fike, "Specification—Micromist Fire Suppression System with Cheetah Xi Control Panel", Dec. 2012, (pp. 1-10).
Fike, "Specification—Micromist Fire Suppression System with SHP-Pro Control Panel", Dec. 2009, (pp. 1-9).
Fire Engineeering, Len Garis, Karin Mark, "Tall Wood Buildings: Maximizing Their Safety Potential", Jan. 2018, (pp. 1-12).
Fire Engineering, "Charred Wood and Fire Resistance", Oct. 2016, (pp. 1-6).
Fire Engineering, Phillip Paff, "Mass Timber Construction in High-Rise Residential Structures: How Safe is it?", Jan. 2018, (pp. 1-9).
Fire Fighting Foam Coalition, "Best Practice Guidance for Use of Class B Firefighting Foams" May 2016 (8 Pages).
Fire Protection Research Foundation, Robert Gerard, David Barber, "Fire Safety Challenges of Tall Wood Buildings", Dec. 2013, (pp. 1-162).

(56) References Cited

OTHER PUBLICATIONS

Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
Fire Retardant Coatings of Texas, "FX Lumber Guard Screenshot", (pp. 1).
Fire Retardant Coatings of Texas, "FX Lumber Guard XT: Technical Data Submittal Sheet", Aug. 2018, (pp. 1).
Fire Retardant Coatings of Texas, "FX Lumber Guard: Technical Data Submittal Sheet", Aug. 2018, (pp. 1).
Fire Retardant Coatings of Texas, "FX Lumber Guard", Nov. 2015, (pp. 1).
Fire Retardant Coatings of Texas, "FX Lumber Guard", Sep. 2016, (pp. 1).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet (SDS)" Mar. 2016, (pp. 1-7).
Fire Retardant Coatings of Texas, "Safety Data Sheet Screenshot", Nov. 2017, (pp. 1).
Fire Retardant Coatings of Texas, M. Mueller, "Architects", Oct. 2016, (pp. 1-5).
Fire Retardant Coatings of Texas, M. Mueller, "Residential Home Builders", Oct. 2016, (pp. 1-5).
Fire Safe Council, "Get Ready For Fire Season—Fire Safe Your Home", Nov. 2017, (pp. 1).
Fire Terminology, Glossary Containing Fire Terms, by National Park Service, USDA Forest Service, captured at https://www.fs.fed.us/nwacfire/home/terminology.html on Mar. 28, 2021, (14 Pages).
Firefly AB, "Firefly EXIMO Brochure", Nov. 2017, (pp. 1-8).
Firefly AB, "Firefly Spark Detection: Higher Safety with Patented Technology", Jan. 2018, (pp. 1-12).
Firefly AB, "Firefly Training Brochure", Nov. 2017, (pp. 1-4).
Firefy AB, "Firefly Conveyer Guard: Fire Protection Solution for Conveyers", Nov. 2017, (pp. 1-4).
Firesafe, "History of Fire Extinguishers" Dec. 18, 2019 (12 Pages).
Firetect, "Safe-T-Guard Product Data Sheet", Apr. 2008, (pp. 1-6).
Flamestop, "Flamestop I-DS: Fire Retardant for Foam, Thatch, and Porous Materials", Jan. 2017, (pp. 1-3).
Flamestop, "Flamestop II: Fire Retardant Spray for Wood", Jan. 2017, (pp. 1-3).
Flamestop, "Learn About Flamestop Inc.", Jan. 2017, (pp. 1-3).
Flexterra Brochure "Profile Flexterra® HP-FGM High Performance Erosion Control Medium", HP-02-02/18, Feb. 2018, Profile Products, LLC, (4 Pages).
FLIR, "A65/A35/A15/A5 Brochure", Sep. 2014, (pp. 1-2).
FLIR, "Application Story: FLIR Arms Intelligent Power Inspection Robot with 'Hot Eye'", Nov. 2017, (pp. 1-2).
FLIR, "Application Story: Impact Thermal Imaging Camera From FLIR Continuously Monitors Packaging Quality", Nov. 2017, (pp. 1-2).
FLIR, "FC-Series R: Fixed Network thermal Cameras", Nov. 2017, (pp. 1-2).
FLIR, "FLIR A315/A615", Jan. 2018, (pp. 1-8).
FLIR, "FLIR A65", Jan. 2018, (pp. 1-7).
FLIR, "FLIR AA315 f", Jan. 2018, (pp. 1-4).
FLIR, "FLIR C3 Brochure", Dec. 2016, (pp. 1-2).
FLIR, "FLIR FC-Series R (Automation)", Jan. 2018, (pp. 1-5).
FLIR, "FLIR K2 Brochure", May 2015, (pp. 1-2).
FLIR, "FLIR KF6 Datasheet", Jan. 2016, (pp. 1-2).
FLIR, "FLIR ONE Pro Series Datasheet", Jun. 2018, (pp. 1-2).
FLIR, "FLIR ONE Pro Series: Professional-Level Thermal Imaging for Your Smartphone", Jun. 2018, (pp. 1-2).
FLIR, "FLIR Saros: Multi-Spectral Intrusion Solution", Jan. 2018, (pp. 1-3).
FLIR, "Integration AX8 & A-B Overview", Oct. 2017, (pp. 1-9).
FLIR, "IR Automation Guidebook: Temperature Monitoring and Control with IR Cameras", Jan. 2018, (pp. 1-68).
FLIR, "M100/M200 Series: Installation & Operation Instructions", Oct. 2017, (pp. 1-112).
FLIR, "M100/M200 Series: Quick Start Guide", Oct. 2017, (pp. 1-5).
FLIR, "Thermal Imaging for Machine Vision and Industrial Safety Applications", Aug. 2014, (pp. 1-12).
FLIR, "User's Manual: FLIR A3xx Series", May 2016, (pp. 1-126).
FLIR, "VUE Pro: Thermal Camera forsUAS", Jul. 2009, (pp. 1-2).
FLIR, FLIR "AX8 Brochure", Nov. 2017, (pp. 1-2).
FM Appovals, "Approval Standard for Heavy Duty Mobile Equipment Protection Systems", Aug. 2015, (pp. 1-79).
FM Approvals, "American National Standard for Water Mist Systems", Nov. 2017, (pp. 1-191).
FM Approvals, "Approval Standard for Automatic Sprinklers for Fire Protection", Feb. 2018, (pp. 1-119).
FM Approvals, "Approval Standard for Clean Agent Extinguishing Systems", Apr. 2013, (pp. 1-74).
FM Approvals, "Approval Standard for Combustible Gas Detectors", Jan. 2018, (pp. 1-21).
FM Approvals, "Approval Standard for Explosion Suppression Systems", Feb. 2018, (pp. 1-57).
FM Approvals, "Approval Standard for Heat Detectors for Automatic Fire Alarm Signaling", Jan. 2018, (pp. 1-29).
FM Approvals, "Approval Standard for Hybrid (Water and Inert Gas) Fire Extinguishing Systems", Nov. 2011, (pp. 1-196).
FM Approvals, "Approval Standard for Hydrocarbon Leak Detectors", Oct. 2012, (pp. 1-18).
FM Approvals, "Approval Standard for Pressure Actuated Waterflow Switches", Aug. 1970, (pp. 1-6).
FM Approvals, "Approval Standard for Quick Response Storage Sprinklers for Fire Protection", Feb. 2018, (pp. 1-87).
FM Approvals, "Approval Standard for Radiant Energy-Sensing Fire Detectors for Automatic Fire Alarm Signaling", Jan. 2018, (pp. 1-17).
FM Approvals, "Approval Standard for Residential Automatic Sprinklers for Fire Protection", Aug. 2009, (pp. 1-68).
FM Approvals, "Approval Standard for Smoke Actuated Detectors for Automatic Alarm Signaling", Jan. 2012, (pp. 1-25).
FM Approvals, "Approval Standard for Spark Detection and Extingushing Systems", Nov. 2015, (pp. 1-32).
FM Approvals, "Approval Standard for Sprinkler Valve Supervisory Devices—Standard Security and Enhanced Security", Dec. 2017, (pp. 1-17).
FM Approvals, "Approval Standard for Video Image Fire Detectors for Automatic Fire Alarm Signaling", Dec. 2011, (pp. 1-22).
FM Approvals, "Approval Standard for Water Mist Systems", Apr. 2016, (pp. 1-314).
FM Approvals, "FM Approvals: History", Jan. 2018, (pp. 1-7).
FM Approvals, ANSI, "American National Standard for Radiant Energy-Sensing Fire Detectors for Automatic Fire Alarm Signaling", Feb. 2014, (pp. 1-16).
FM Approvals, Approval Standard for Automatic and Open Water-Spray Nozzles for Installation in Permanently Piped Systems, Feb. 2010, (pp. 1-23).
FM Approvals, Approval Standard for Public Mode Visible Signaling Appliances for Automatic Fire Alarm Signaling, Nov. 2016, (pp. 1-18).
FM Approvals "Approval Standard for Audible Notification Appliances for Automatic Fire Alarm Signaling", Nov. 2003, (pp. 1-16).
Forest Products Laboratory, Robert H. White, Mark A. Dietenberger, "Chapter 17: Fire Safety", Feb. 1999, (pp. 1-17).
FP Innovations, M. Mohammad, "Connections in CLT Assemblies", Sep. 2011, (pp. 1-59).
FPInnovations, "CLT Handbook: Cross-Laminated Timber", Jan. 2013, (pp. 1-572).
Frank Rustincovitch, US Environmental Protection AuaryENCY, "Environmental Impact Guidelines: For New Source Phosphate Fertilizer Manufacturing Facilities" Oct. 1981 (227 Pages).
G. S. Grigoryan, Z. G. Grigorya, A. Ts. Malkhasyan, Yerevan State University, "Obtaining Esters of Citric Acid with High Aliphatic Alcohols" Jan. 2017 (4 Pages).

(56) References Cited

OTHER PUBLICATIONS

Gabrielle Kassel, What is Soy Protein Isolate and Is It Bad For You? Jan. 24, 2020 (4 Pages).
General Information Sheet for Chemguard Class "A" Foam, Chemguard, Sep. 2005 (2 Pages).
General Information Sheet for Chemguard Foam Products, Chemguard, Sep. 2005 (6 Pages).
General Information Sheet for Chemguard Foam System Solutions, Johnson Controls, Jan. 2020 (12 Pages).
General Information Sheet for WD881 Class A Foam Concentrate, Perimeter Solutions Jan. 2019 (5 Pages).
General Information Sheet for Wildland Fire Chemical Products: Toxicity and Enviro nmental Concerns, Wildland Fire Chemical Systems, USDA WFS, Jan. 17, 2007 (2 Pages).
Gerhard Schickhofer, Andreas Ringhofer, "The Seismic Behaviour of Buildings Erected in Solid Timber", Aug. 2012, (pp. 1-124).
Gerry Parlevliet and Steven McCoy, "Organic Grapes and Wine: A Guide to Production", Department of Primary Industries and Regional Development, Govt. of Australia, Bullentins 4000—Research Publications, Jul. 2001, (41 Pages).
Gizmodo, Esther Inglis-Arkell, "The Deadliest Ways to Try to Put Out a Fire", May 2015, (pp. 1-3).
Glenalmond Timber Company, "IWS FR Fire Retardant Treated Wood: Corrosion Information", Nov. 2017, (pp. 1).
Globe Advisors, "Study of Insurance Costs for Mid-Rise Wood Frame and Conrete Residential Buildings", Jan. 2016, (pp. 1-61).
GlobeNewsWire, "Shazamstocks.com Announces Profile Launch of MSE Enviro-Tech Corp.", Feb. 2008, (pp. 1-3).
Gokhan Balik, "The Use of Air Atomizing Nozzles to Produce Sprays with Fine Droplets", Apr. 2014, (pp. 1-7).
Green Building Advisor, Martin Holladay, "Is OSB Airtight?", Aug. 2015, (pp. 1-4).
GS Environment, "Stat-X Condensed Aerosol Fire Suppression Systems", Nov. 2017, (pp. 1-6).
Guomin Zhao, Guanghji Xu, Shuang Jin, Qingsong Zhang and Zhongxian Liu, Fire-Entinguishing Efficiency of Superfine Powders under Different Injection Pressures, Hindawi International Journal of Chemical Engineering, vol. 2019, Article ID 2474370, May 19, 2019, (8 Pages).
Guomin Zhao, Guangji Xu, Shuang Jin, Qinsong Zhang, Zhongxian Liu, International Journal of Mechanical Engineering, "Fire-Extinguishing Efficiency of Superfine Powders Under Different Injection Temperatures" May 2, 2019 (8 Pages).
H. A. Krebs, W. A. Johnson, "36 The role of citric acid in intermediate metabolism in animal tissues" Aug. 25, 1980 (9 Pages).
H. Wang, L. A. Johnson, T. Wang, "Preparation of Soy Protein Concentrate amd Isolate from Extruded-Expelled Soybean Meals" Jul. 2004 (6 Pages).
Hansentek, Model 120 Spark Detector Brochure, Nov. 2017, (pp. 1-2).
Hardwood Plywood & Veneer Association, "Report on Surface Burning Characteristics Determined by ASTM E 84 Twenty-Five Foot Tunnel Furnace Test Method", Jan. 2008, (pp. 1-7).
Hartindo, "AF31 Air Bombing Screenshots", Nov. 2017, (pp. 1-4).
Hartindo; Clean Anti Fire Chemicals—Dectan; as published Nov. 9, 2016 retrieved from https://web.archive.org/web/20161109011047/ http://hartindo.co.id/products/dectan/ (2 pages).
Holzforschung Austria, "Construction with Cross-Laminated Timber in Multi-Storey Buildings: Focus on Building Physics", Apr. 2013, (pp. 1-160).
Holzforshung Austria, "Short Report: Renewal of the abridged report on the fire resistance REI 60 according to EN 13501-2 of Stora Enso CLT as load-carying cross-laminated timber wall elements > 80 mm unplanked and planked with plaster boards", Dec. 2012, (pp. 1-5).
Honeywell, "Viewguard PIR", Jan. 2007, (pp. 1-2).
Hoover Inc., "Code References: Fire-Retardant-Treated Wood", Mar. 2014, (pp. 1-2).
Hoover Inc., "Exterior Fire-X Treated Wood: Material Safety Data Sheet", Oct. 2005, (pp. 1-9).
Hoover Inc., "Exterior-Fire X", Nov. 2017, (pp. 1).
Hoover Inc., "Fasteners for Pyro-Guard: Interior Fire Retardant Treated Wood Products", Oct. 2013, (pp. 1).
Hoover Inc., "Guidelines For Finishing and Use of Adhesives with Pyro-Guard Fire Retardant Treated Wood", Jan. 2014, (pp. 1).
Hoover Inc., "LEED and FSC Chain of Custody Information", Feb. 2016, (pp. 1).
Hoover Inc., "Pyro-Guard Storage, Handling, and Installation Recommendations", Jan. 2014, (pp. 1).
Hoover Inc., "Pyro-Guard, Exterior Fire-X", Dec. 2017, (pp. 1-12).
Hoover Inc., "Pyro-Guard", Nov. 2017, (pp. 1).
Hoover Inc., "Specification for Pyro-Guard: Interior Fire Retardant Treated Wood", Apr. 2014, (pp. 1).
Hoover Wood Products, "Exterior Fire-X Material Safety Data Sheet", Oct. 2005, (pp. 1-5).
Hoover, "2hr Fire Resistant Load Bearing Wall", Nov. 2017, (pp. 1).
https://www.youtube.com/watch?v=YMgd5sAxG1o—wood finger joint production line, published Jun. 27, 2016.
Huang Yingsheng, Zhang Wencheng, Dai Xiaojing, Zhao Yu, "2012 International Symposium on Safety Science and Technology: Study on water-based fire extinguishing agent formulations and properties", Elsevier Procedia Engineeering, vol. 45 (6 Pages).
Hughes Associates Europe, "The Water Mist Technology Future; How the Test and Approval Process May Affect the next Developments", Jan. 2015, (pp. 1-23).
Hui Zhang, Rice University, "Effect of Oils, Soap and Hardness on the Stability of Foams" Sep. 2003, (221 Pages).
Hy-Tech, "Insulating Ceramic Microspheres", Nov. 2017, (pp. 1-3).
Hy-Tech, "ThermaCels: Insulating Ceramic Additive for Paint", Nov. 2017, (pp. 1-2).
Hyeon Kim, Young Seok Ji, Shaheed Ur Rehman, Min Sun Choi, Myung Chan Gye, Hye Hyun Yoo, "Pharmacokinetics and Metabolism of Acetyl Triethyl Citrate, a Water-Soluble Plasticizer for Pharmaceutical Polymers in Rats" Apr. 3, 2019 (13 Pages).
ICC Evaluation Service Inc., "FirePro", Nov. 2005, (pp. 1-4).
ICC Evaluation Service Inc., "ICC-ES Listing Report: FX Lumber Guard / FX Lumber Guard XT Fire-Retardant Coatings", Oct. 2016, (pp. 1-3).
ICC Evaluation Service Inc., "ICC-ES Report: Pyro-Guard Fire Retardant-Treated Wood", Dec. 2016, (pp. 1-8).
ICL Performance Products LP, "Material Safety Data Sheet", Jul. 2014, (pp. 1-6).
Industrial Fire Journal, "Rising to the Challenge", Sep. 2017, (pp. 1-2).
Inland Marine Underwriters Association, "CLT and Builder's Risk", May 2017, (pp. 1-26).
Installation & Quick Start Guide for SoprayLogger E3B, Sheridan, Wyoming, Mar. 21, 2019, AgTerra Technologies, Inc., (17 Pages).
Installation and Quick Start Guide for the SprayLogger BackPack Lite, by AgTerra Technologies, Inc., Sheridan, Wyoming, Mar. 2019 (11 Pages).
Insurance Institute for Business & Home Safety (IBHS), Oct. 22, 2018, "Colorado Property & Insurance WildfirePreparedness Guide", 2018 (2 Pages).
Insurance Institute for Business & Home Safety, "Protect Your Property from Wildfire", Jan. 2011, (pp. 1-40).
Intelligent Wood Systems, "IWS FR Fire Retardant Treated Wood Corrosion Information", Jan. 2016, (pp. 1).
Intelligent Wood Systems, "Treated Timber—Consumer Information", Nov. 2016, (pp. 1-15).
Intelligent Wood Systems, "Treated Timber—Customer Information", Nov. 2016, (pp. 1-8).
International Fire Chiefs Association, "Guidelines for Managing Private Resources on Wildland Fire Incidents", Jan. 2016, (pp. 1-2).
International Search Report (ISR) and Written Opinion of The International Searching Authority (WO) dated Jun. 8, 2022 issued in PCT International Patent Application No. PCT/US22/15004 filed Feb. 2, 2022 by Applicant, M-Fire Holdings LLC, Assigned to Mighty Fire Breaker LLC, (37 Pages).
INTERTEK, "Building & Construction Information Bulletin: Introduction to ASTM E84 & Frequently Asked Questions", Jun. 2017, (pp. 1-2).

(56) References Cited

OTHER PUBLICATIONS

INTERTEK, "Report of Testing 7'X7' Floor/Ceiling Assembly", Aug. 2013, (pp. 1-6).
INTERTEK, "Report of Testing FX Lumber Guard (Dimensional Lumber)", Apr. 2015, (pp. 1-10).
INTERTEK, "Report of Testing FX Lumber guard Fire Retardant Coating Applied to I-Joists in a Floor Celing Assembly", Aug. 2014, (pp. 1-6).
INTERTEK, "Report of Testing FX Lumber Guard Fire Retardant for I-Joist, Truss Joist (TJI), FLoor Joist, Ceiling Joist, amd OSB", Mar. 2013, (pp. 1-9).
INTERTEK, "Report of Testing FX Lumber Guard on SPF Lumber", Jun. 2012, (pp. 1-6).
INTERTEK, "Report of Testing FX Lumber Guard", Aug. 2015, (pp. 1-6).
INTERTEK, "Report of Testing FX Lumber Guard", Nov. 2014, (pp. 1-9).
J. Craig Voelkert, "Fire and Fire Extinguishment: A Brief Guide to Fire Chemistry and Extinguishment Theory for Fire Equipment Service Technicians", Jan. 2015, (28 Pages).
J. G. Quintiere, QDOT LLC, "Literature Review: Packaging Technique to to Defeat Fires and Explosions due to Lithium-ion and Related High-Energy-Density Batteries" Mar. 2020 (64 Pages).
J. W. Hastie, "Molecular Basis of Flame Inhibition" Jul. 19, 1973 (22 Pages).
J28 . W. Hastie, "Molecular Basis of Flame Inhibitition", Journal of Research of the National Bureau of Standards—A Physics and Chemistry, vol. 77A, No. 6, Nov.-Dec. 1973, (22 Pages).
James Hardie Technology, "HardieBacker: With Moldblock Technology", Jan. 2012, (pp. 1-10).
James Hardie Technology, "30-Year Limited Warranty", Oct. 2011, (pp. 1-8).
James R. Butz, Technologies Inc, Richard Carey, David Taylor Research Center, "Application of Fine Water Mists to Fire Suppression", Nov. 2017, (pp. 1-11).
Jerrold E. Winandy, Qingwen Wang, Robert E. White, "Fire-Retardant-Treated Strandboard: Properties and Fire Performance", May 2007, (pp. 1-10).
Jesse Roman, "Build. Burn. Repeat?", NFPA Journal, NFPA.org, Jan./Feb. 2018 , (9 Pages).
John Packer, NZ Institute of Chemistry, "Chemistry in Fire Fighting" , Oct. 2017, (6 Pages).
Johnson Controls , "Aqueous Film-Forming Foam (AFFF) Concentrates: Aspirated Versus Nonaspirated AFFF" Jan. 2020 (4 Pages)6.
Johnson Controls, "SaboFoam: Firefighting Foam Suppression Technology" Jan. 2019 (6 Pages).
Josef Hainzl, "High Pressure Water Mist for Protection of High Rise Buildings", Nov. 2016, (pp. 1-3).
Joseph W. Mitchell and Oren Patashnik, "Firebrand Protection as the Key Design Element for Structure Survival during Catastrophic Wildland Fires", M-bar Technologies & Consulting, published at https://www.slideserve.com/mari/firebrand-protection-as-the-key-design-element-for-structure-survival-during-catastrophic-wildland-fires , uploaded on Aug. 22, 2013, (15 Pages).
Joseph W. Mitchell, M-Bar Technologies and Consulting, "Wind-Enabled Ember Dousing: A Comparison of Wildland Fire Protection Strategies", Aug. 2008, (pp. 1-53).
Joseph W. Mitchell, Oren Patashnik, "Firebrand Protection as the Key Design Element for Structure Survival During Catastrophic Wildland Fires", Aug. 2006, (pp. 1-15).
Joseph W. Mitchell, PhD, "Wind-Enabled Ember Dousing: A Comparison of Wildland Fire Protection Strategeies" Prepared for Ramona Fire Recovery Center, M-bar Technologies and Consulting, LLC, Aug. 12, 2008, (53 Pages).
Josephine Christina, Youngsoo Lee, Jounral of Food Science, "Modification of Sodium Release Using Porous Corn Starch and Lipoproteic Matrix" Jan. 22, 2016 (9 Pages).

Journal of Civil & Environmental Engineering, Mohamed Fayek Abdrabbo et al., "The Effect of Water Mist Droplet Size and Nozzle Flow Rate on Fire Extinction in Hanger by Using FDS", Oct. 2010, (pp. 1-12).
Jungbunzlauer Products That Comply with California Proposition 65, by Jungbunzlauer Suisse AG, Basel Switzerland, Jan. 3, 2020 (1 Page).
Jungbunzlauer Suisse AG, "Trisodium Citrate Anhydrous" Feb. 2021 (4 Pages ).
Jungbunzlauer White Paper "Jungbunzlauer Tripotassium Citrate: Environmental and health friendly flame retardant in wood application", Product Group Special Salts, Tripotassium Citrate, Protection TPC Fire Retardant Wood, published on Jungbunzlauer Website 2019 (2 Pages).
Jungbunzlauer, "Facts: Citrofol as coalescent agent" Jan. 2019 (12 Pages).
Jungbunzlauer, "Wood treatment—TPC as fire retardant" Jan. 2019 (11 Pages).
Kallesoe Machinery A/S, "System Solutions for Laminated Wood Products", Nov. 2017, (pp. 1-3).
Kallesoe Machinery, "CLT Production Line", Nov. 2017, (pp. 1-5).
Keith Klassen, "Aspirating Foam Nozzles", Oct. 20, 2011 (6 Pages).
Khrystyna Regata, Christoph Bannwarth, Stehan Grimme and Michael Allan, "Free electrons and ionic liquids: study of excited states by means of electron-energy loss spectroscopy and the density functional theory multireference configuration interaction method", Phys. Chem. Chem Phys. 2015, 17 15771, (10 Pages).
Khrystyna Regeta, Christoph Bannwarth, Stefan Grimme, Michael Allan, Royal Society of Chemistry, "Free Electrons and Ionic Liquids: study of excited states by means of electron-energy loss spectroscopy and the density functional theory multireference configuration interaction method", May 2015, (pp. 1-10).
Kjayyani C. Adiga, Researchgate, "Ultra-fine Water Mist as a Total Flooding Agent: A Feasibility Study", Jan. 2014, (pp. 1-13).
Kostas D. Kalabokidis, "Effects of Wildfire Suppression Chemicals on People and the Environment—A Review", Sep. 2000, (pp. 1-9).
La Times, Sam Byker, "Fire Retardants That Protect the Home", Nov. 25, 2007, (pp. 1-4).
Labat Environmental, "Ecological Risk Assessment of Wildland Fire-Fighting Chemicals: Long-Term Fire Retardants" Prepared for Fire and Aviation Management US Forest Service, Boise, ID, Dec. 2013 (110 Pages).
Leader Group S.A.S, "Foam Proportioning: Multi-Flow Inductors" Oct. 2020 (15 Pages).
Ledinek, "X-Press", Nov. 2017, (pp. 1-5).
Legal Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.
Lendlease, Jeff Morrow, "More with Less: An Overview of the 1st CLT Hotel in the U.S.", Apr. 2016, (pp. 1-45).
Leyla-Cann Sögütoglu, Michael Steiger, Jelle Houben, Daan Biemans, Hartmut R. Fischer, Pim Dinkers, Henk Huinink, Olaf C. G. Adan, Crystal Growth & Design, "Understanding the Hydration Process of Salts: The Impact of a Nucleation Barrier" Feb. 14, 2019 (10 Pages).
Lon H. Ferguson and Christopher A. Janicak, "Fundamentals of Fire Protection for the Safety Professional", Governmenta Institutes, The Rowman & Littlefield Publishing Group, Inc., 2005 (341 Pages).
Louisiana-Pacific, "FlameBlock: Assemblies and Applications", Aug. 2017, (pp. 1-8).
Lousiana-Pacific, "LP Solutions Software", Mar. 2012, (pp. 1-8).
LP Building Products, "Material Safety Data Sheet", May 2014, (pp. 1-4).
LSU Agcenter Wood Durability Laboratory, Eco Building Products, "Eco Red Shield: Technical Specifications—Strength Testing", Aug. 2011, (pp. 1-21).
M. F. M. Ibrahim, H. G. Abd El-Gawad and A. M. Bondok, "Physiological Impacts of Potassium Citrate and Folic Acid on Growth, Yield, and Some Viral Diseases of Potato Plants", Middle East Journal of Agriculture, col. 4, Issue 3, Jul.-Sep. 2015 (13 Pages).

(56) References Cited

OTHER PUBLICATIONS

M.L Vitosh, J.W. Johnson, D.B. Mengel, Michigan State University, Ohio State University, Purdue University, "Tri-state Fertilizer Recommendation for Corn, Soybeans, Wheat, and Alfalfa" Jul. 1995 (24 Pages).
Magtech, "MagTech OSB", Nov. 2017, (pp. 1-2).
Marioff, "Fire Fighting Excellence: HI-FOG Water Mist Fire Protection", Jan. 2017, (pp. 1-8).
Marioff, "HI-FOG for Buildings", Jan. 2014, (pp. 1-16).
Marioff, "HI-FOG System Components", Nov. 2017, (pp. 1-2).
Marioff, "HI-FOG Water Mist Fire Protection: Fire Protection for Buildings", Jan. 2017, (pp. 1-12).
Marioff, "HI-FOG Electric Pump Unit", Jan. 2016, (pp. 1-2).
Mark L. Robin, FS World, "Fire Detection & Suppression", Apr. 2011, (pp. 1-10).
Marketwire, "Megola Inc. Signs 'Hartindo AF21' Licensing Agreement with Eco Blu Products, Inc.", Nov. 2009, (pp. 1-2).
Marketwire, "Megola Updates on Hartindo AF21, a Total Fire Inhibitor", Aug. 4, 2010, (pp. 1-3).
Marketwired, "Megola Announces AF21 Test Results", Aug. 2007, (pp. 1-2).
Marketwired, "Megola Continues Sales of Hartindo AF21 to EcoBlu Products, Inc.", Dec. 2010, (pp. 1-2).
Marketwired, "Megola Obtains Class A Rating for Hartindo AF31", Nov. 2007, (pp. 1-2).
Marketwired, "Megola Sells Hartindo AF21, a Total Fire Inhibitor, to One of the World's Largest Textile and Chemical Manufactures", Aug. 2010, (pp. 1-3).
Marketwired, Megola Updates on Hartindo AF21, a Total Fire Inhibitor, Aug. 2010, (pp. 1-3).
Marketwired, "Mse Enviro-Tech Corp.'s AF31 Fire Extinguishing Agent Addresses Need for More Effective Forest Fire Fighting Technology", Jul. 2007, (pp. 1-2).
Marketwired, "WoodSmart Solutions, Inc. Tests Hartindo AF21 in BluWood Solution", Nov. 2007, (pp. 1-2).
Marleyeternit, "JB FireSafe Scaffold Boards", Jan. 2016, (pp. 1-2).
Material Safety Data Sheet (MSDS) for FIRE-TROL® 934 Fire Retardant Used in Wildfire Control, by ICL France—ICL Biogemea S.A.S, Revision 09, updated Mar. 29, 2013, (4 Pages).
Material Safety Data Sheet (MSDS) for FIRE-TROL® 936 Fire Retardant Used in Wildfire Control, by ICL France—ICL Biogemea S.A.S, Revision 09, updated Mar. 29, 2013, (4 Pages).
Material Safety Data Sheet (MSDS) for Purple K Dry Chemical Fire Extinguishant, AMEREX Corporation, Trussville, AL, Sep. 2003 (7 Pages).
Material Safety Data Sheet for Ansul 3% Fluorprotein Foam Concentrate, Tyco Fire Protection Products, Oct. 7, 2011 (4 Pages).
Material Safety Data Sheet for Hartindo AF31 Eco Fire Break, Eco Building Products, Inc., Feb. 4, 2013, (4 Pages).
Material Safety Data Sheet for Knockdown Class A Foam, National Foam Inc., Oct. 1, 2007 (8 Pages).
Material Safety Data Sheet for Purple K Dry Chemical Fire Extinguishant, Amerex Corporation, Sep. 2003 (7 Pages).
Matthew E. Benfer, Joseph L. Ffey, "valuation of Water Additives for Fire Control and Vapor Mitigation—Two and Three Dimensional Class B Fire Tests" Mar. 15, 2015 (34 Pages).
Maureen Puettmann, Woodlife Environmental Consultants, LLC, Dominik Kaestner, Adam Taylor, University of Tennessee, "Corrim Report—Module E Life Cycle assessment of Oriented Strandboard (OSB) Production", Oct. 2016, (pp. 1-71).
Megola, "Re: File No. 0-49815—Response to Comments—Form 10K for Fiscal Year Ended Jul. 31, 2009", Sep. 2010, (pp. 1-4).
Metroscape, "Building the Future: New Technology and the Changing Workforce", Jan. 2017, (pp. 1-32).
Metsawood, "Kerto LVL Screenshot", Nov. 2017, (p. 1).
MGB Achitecture & Design, "The Case for Tall Wood Buildings: How Mass Timber Offers a Safe, Economical, and Environmentally Friendly Alternative for Tall Building Structures", Feb. 2012, (pp. 1-240).

Michelle D. King, Jiann C. Yang, Wnedy S. Chien and William L. Grosshandler, "Evaporation of a Small Water Droplet Containing An Additive" Proceedings of the ASME National Heat Transfer Conference, Baltimore, Aug. 1997 (6 Pages).
Mike H. Freeman, Paul Kovacs, "Metal and Fastener Corrosion in Treated Wood from an Electrochemical—Thermodynamic Standpoint", Jan. 2011, (pp. 1-22).
Mike Kirby, Fire Rescue, "Nozzles Types, Pros and Cons", Jun. 2012, (pp. 1-7).
Minimax Fire Products White Paper The Cost-benefit Advantages of Replacing Halon with 725 PSI MX 1230 Clean Agent Fire Suppression Systems, MiniMax Fire Products, 2014, (7 Pages).
Minimax, "The Cost-Benefit Advantages of Replacing Halon with 725 PSI MX 1230 Clean Agent Fire Suppression Systems", Mar. 2014, (pp. 1-7).
Mitsui Home America," Mitsui Homes Inc. Website and Screenshots", Dec. 2012, (pp. 1-38).
Mohamed Fayek Abdrabbo, Ayoub Mostafa Ayoub,Mohamed Aly Ibrahim and Abdelsalam M. Shara Feldin, "The Effect of Water Mist Droplet Size and Nozzle Flow Rate on Fire Extinction in Hanger by Using FDS", Journal of Civil & Environmental Eng. 2016, vol. 6, Issue 2, (12 Pages).
Mohammadmahdi Ghiji, Vasily Novozhilov,Khalid Moinuddin, Paul Joseph, Ian Burch, Brigitta Suendermann, Grant Gamble, MDPI, "A Review of Lithium-Ion Battery Fire Suppression" Oct. 1, 2020 (30 Pages).
Moince M. Fiume et al., "Safety Assesment of Citric Acid, Inorganic Citrate Salts, and Alkyl Citrate Esters as Used in Cosmetics" Jan. 2014 (31 Pages).
Morflex Inc., "Pharmaceutical Coatings Bulletin 102-4: Influence of Triethyl Citrate on the Properties of Tablets Containing Coated Pellets" Jan. 1996 (10 Pages).
MSDS for Potassium Citrate published at https://hazard.com//msds/mf/baker/baker/files/p5675.htm , Nov. 6, 1997, (4 Pages).
MSDS for Potassium Citrate, MSDS No. P5675 prepared on Nov. 6, 1997 by J. T. Baker of Strategic Services Division of Mallinckrodt Baker, Inc. (4 Pages).
Mylene Merlo, "San Diego Wildfires, Parts 1, 2, 3 and 4: Myths and Reality", Jun. 2, 2014,http://www.mylenemerlo.com/blog/san-diego-wildfires-myths-reality/, (42 Pages).
N. M. Kovalchuk, A. Tybala, V. Starov, O. Matar, N. Ivanova, "Fluoro—vs hydrocarbon surfactants: Why do they differ in wetting performance?" Advances in Colloid and Interface Science, vol. 210, Aug. 2014, (7 Pages).
National Academy Press, "Fire Suppression Substitutes and Alternatives to Halon for U.S. Navy Applications", Jan. 1997, (pp. 1-111).
National Fire Protection Association, "Standard for Fire Retardant-Treated Wood and Fire-Retardant Coatings for Building Materials", Jan. 2015, (pp. 1-16).
National Fire Protection Inc., "FM-200 / HFC-227ea: Clean Agent Fire Suppression", Jan. 2016, (pp. 1-5).
National Instruments, "IMAQ Vision Concepts Manual", Oct. 2000, (pp. 1-313).
National Refrigerants Inc., "R123 Safety Data Sheet", May 2015, (pp. 1-8).
National Research Council of Canada, Zhigang Liu, Andrew K. Kim, Don Carpenter, Fountain Fire Protection Inc., Ping-Li Yen, "Portable Water Mist Fire Extinguishers as an Alternative for Halon 1211", Apr. 2001, (pp. 1-5).
National Wildfire Coordinating Group, "Foam vs Fire: Class A Foam for Wildland Fires" Oct. 1993 (36 Pages)6.
Natural Fire Solutions, "Website Screenshots", Nov. 2017, (pp. 1-4).
Navair, "NATOPS U.S. Navy Aircraft Emergency Rescue Information Manual", Jan. 2009, (pp. 1-288).
Navair, "NATOPS U.S. Navy Aircraft Firefighting Manual", Oct. 2003, (pp. 1-200).
Nelson Pine, "How LVL is Made", Nov. 2017, (p. 1).
Newstar Chemicals, Hartindo Anti Fire Products, Nov. 2017, (p. 1).
Newszak, "Hfc-227Ea Fire Extinguishers Market Outlook 2023: Top Companies, Trends and Future Prospects Details for Business Development", Sep. 2018, 5 pages.

(56) References Cited

OTHER PUBLICATIONS

NFPA, "Certified Fire Protection Specialist: Candidate Handbook", Apr. 2018, (pp. 1-34).
NFPA, "Standard on Water Mist Fire Protection Systems", Feb. 2006, (pp. 1-135).
Nordson Corporation, "Airless Spray Systems: The Efficient Choice for Many Liquid Painting Applications", Jan. 2004 (pp. 1-8).
North American Green, Inc., Installation Guide for HydroMax™ Hydraulic Erosion Control Products, Dec. 2017, http://www.nagreen.com, (2 Pages).
Notice of Allowance dated Dec. 1, 2020 for U.S. Appl. No. 15/829,943 (pp. 1-7).
Notice of Allowance dated Dec. 8, 2020 for U.S. Appl. No. 15/829,944 (pp. 1-9).
NRC CNRC, "Fire Performance of Houses. Phase I. Study of Unprotected Floor Assemblies in Basement Fire Scenarios. Summary Report", Dec. 2008, (pp. 1-55).
NRCC, Zhigang Liu, Andrew K. Kim, "A Review of Water Mist Fire Suppression Technology: Part II—Application Studies", Feb. 2001, (pp. 1-29).
Nutrient Source Specifics Sheet for Monoammonium Phoshate (MAP), International Plant Nutrition Institute (IPNI), Norcross, Georgia, Ref#10069, 2019, (1 Page).
NY Times, "Building with Engineered Timber", Jun. 2012, (pp. 1-3).
OCV Control Valves, "Engineering / Technical Section", Jun. 2013, (pp. 1-12).
OCV Control Valves, "Engineering/Technical Section", Jun. 2013, (pp. 12).
OCV Control Valves, "Solenoid Control Valve Series 115", May 2017, (pp. 1-6).
Office Action (Non-Final Rejection) dated Oct. 6, 2022 for U.S. Appl. No. 17/497,945 (pp. 1-6).
Office Action (Non-Final Rejection) dated Oct. 6, 2022 for U.S. Appl. No. 17/497,946 (pp. 1-6).
Office Action (Non-Final Rejection) dated Oct. 6, 2022 for U.S. Appl. No. 17/497,962 (pp. 1-5).
Office Action (Non-Final Rejection) dated Oct. 11, 2022 for U.S. Appl. No. 17/497,948 (pp. 1-5).
Office Action (Notice of Allowance and Fees Due (PTOL-85)) dated Mar. 25, 2022 for U.S. Appl. No. 16/805,811 (10 Pages).
Office Action (Notice of Allowance and Fees Due (PTOL-85)) dated Oct. 11, 2022 for U.S. Appl. No. 17/497,941 (10 Pages).
Office Action (Notice of Allowance and Fees Due (PTOL-85)) dated Oct. 12, 2022 for U.S. Appl. No. 17/497,955 (pp. 1-9).
Office Action dated Apr. 2, 2020 for U.S. Appl. No. 15/829,940 (pp. 1-8).
Office Action dated Apr. 2, 2020 for U.S. Appl. No. 15/829,941 (pp. 1-8).
Office Action dated Dec. 9, 2020 for U.S. Appl. No. 16/805,811 (pp. 1-9).
Office Action dated Feb. 6, 2020, for U.S. Appl. No. 15/866,451 (pp. 1-9).
Office Action dated Jan. 25, 2019 for U.S. Appl. No. 15/829,945 (pp. 1-7).
Office Action dated Jun. 1, 2018 for U.S. Appl. No. 15/829,914 (pp. 1-7).
Office Action dated Jun. 1, 2018 for U.S. Appl. No. 15/829,948 (pp. 1-13).
Office Action dated Mar. 26, 2020 for U.S. Appl. No. 15/829,943 (pp. 1-8).
Office Action dated Mar. 27, 2020 for U.S. Appl. No. 15/829,944 (pp. 1-8).
Office Action dated May 31, 2019 for U.S. Appl. No. 15/866,451 (pp. 1-6).
Office Action dated Nov. 24, 2021 for U.S. Appl. No. 16/914,067 (10 Pages).
Office Action dated Nov. 9, 2018 for U.S. Appl. No. 15/866,456 (pp. 1-11).
Office Action dated Oct. 10, 2019 for U.S. Appl. No. 16/055,001 (pp. 1-9).
Office Action dated Oct. 11, 2018 for U.S. Appl. No. 15/866,454 (pp. 1-12).
Office Action dated Oct. 12, 2018 for U.S. Appl. No. 15/874,874 (pp. 1-15).
Office Action dated Oct. 5, 2021 for U.S. Appl. No. 16/805,811 (10 Pages).
Office Action dated Sep. 19, 2019 for U.S. Appl. No. 15/911,172 (pp. 1-8).
Online Product Advertisement titled "What is K-Rich™? A High analysis pH-buffered liquid potassium complexed with citric acid", Agricultural Solutions Inc., https://www.agsolcanada.com/individual-product-info/nts-k-rich, Aug. 5, 2020, (7 Pages).
OSB, "Trust Joist 2JI 210 Screenshot", Jan. 2012, (pp. 1).
Paint & Coatings Industry, "Making the Transition: Coalescing for Latex Paint" Feb. 29, 2000 (8 Pages).
Panasonic Corporation, "PIR Motion Sensor 'PaPIRs'", Jul. 2017, (pp. 1-9).
Patol, "500 Series: Model 5410 Infra-Red Transit Heat Sensor Infosheet", Nov. 2017, (pp. 1-2).
Patrick Mackary, UK Journal of Pharmaceutal and Biosciences, "Principles of Salt Formation", Aug. 2, 2014, (4 Pages).
Pau Loke Show, Kehinde Opeyemi Oladele, Qi Yan Siew, Fitri Abdulaziz Zakry, John Chi-Wei Lan, Tau Chuan Ling, Frontiers in Life Science, "Overiview of citric acid production from aspergillus niger" Apr. 20, 2015 (14 Pages).
Pendu Manufacturing, Inc., North Holland, PA, Slide Show of Youtube Video of a Pendu Automated Wood Board Dip Tank System in Operation, Feb. 8, 2012, (30 Pages).
Pentair, "Hypro—SHURflo: Agriculture Products Catalog", Mar. 2013, (pp. 1-28).
PHOS-CHEK, "Protect Your Home From Wildfire", Nov. 2017, (pp. 1-4).
PHOS-CHEK® LC95W Safety Data Sheet, Version 1.1, Issue Date Mar. 18, 2019, Published by Perimeter Solutions, LP, (5 Sheets).
Pillar Technologies Inc., "Pillar Technologies Presentation", Jul. 2018, (pp. 1-16).
PLabat-Anderson Incorporated, "Human Health Risk Assessment: Wildland Fire-Fighting Chemical" Prepared for Missoula Technology and Development Center USDA Forest Service, Missoula, MT, Mar. 17, 2003 (37 Pages).
Plumis, "Austomist Tap Mount: The discreet watermist sprinkler alternative ideal for kitchen fire protection", Jan. 2017, (pp. 1-2).
Plumis, "Autmist Smartscan: The smarter, modern alternative to a fire sprinkler system", Jan. 2017, (pp. 1-2).
Plumis, "Automist Fixed Wall Head Handbook", Jan. 2017, (pp. 1-30).
Plumis, "Automist Personal Protection System Handbook", Jan. 2016, (pp. 1-18).
Plumis, "Automist Personal Protection System: The plug & play mobile watermist fire sprinkler", Jan. 2016, (pp. 1-2).
Plumis, "Automist Smartscan Handbook" Jan. 2017, (pp. 1-66).
Plumis, "Automist vs. Alternatives", Jan. 2016, (pp. 1-4).
Plumis, Plumis Declaration of Testing and Conformity with Applicable Standards (Automist Smartscan), Jan. 2017, (pp. 1-3).
Plumis, "Registered Details Fact Sheet: Automist Fixed Wall Head", Jan. 2017, (p. 1).
Pongsathron Issarayungyuen, Wiwat Pichayakorn, Thawatchai Phaechamud, "Cast Natural Rubber Films Comprising Triethyl Citrate" Nov. 15, 2013 (5 Pages).
Preeti Singh, R. Kumar, S. N. Sabapathy, A. S. Bawa, Comprehensive Reviews in Food Science and Food Safety, Functional and Edible Uses of Soy Protein Products Aug. 2, 2007 (15 Pages).
Press Release "Perimeter Solutions Acquires LaderaTech and FORTIFY-Brand Fire Retardant Technology", Perimeter Solutions, St. Louis Missouri, May 7, 2020 (2 Pages).
Press Release by Perimeter Solutions, Inc,. published Oct. 8, 2020, "Perimeter Solutions and CCSAA Group Partner to Provide Wildfire Defense", Perimeter Solutions, LP, (2 Sheets).
Produce Brochure for PCC-2020064 PHOS-CHEK® Preventive Wildfire Solutions Using PHOS-CHEK® Long-Term Retardants—

(56) References Cited

OTHER PUBLICATIONS

PHOS-CHEK® Fortify Fire Retardant and PHOS-CHEK® LC95/259-FX Fire Retardant Technology, Perimeter Solutions, LP, 2020, (2 Sheets).
Product Application Information about Jungbunzlauer brand Tripotassium Citrate, captured at https://www.jungbunzlauer.com/en/products/special-salts/tripotass, Jungbunzlauer Suisse AG, Basel, Switzerland, (3 Pages), 2020.
Product Brochure "Facts—Formulating Better Tasting Infant Formula—Jungbunzlauer—from Nature to Ingredients®", Jungbunzlauer Suisse AG, Basel, Switzerland, (8 Pages), 2015.
Product Brochure "Product Range Bio-Based Ingredients—Jungbunzlauer—from Nature to Ingredients®", Jungbunzlauer Suisse AG, Basel, Switzerland, (16 Pages), 2017.
Product Brochure "Special Salts—Functional Minerals—Jungbunzlauer—from Nature to Ingredients®", Jungbunzlauer Suisse AG, Basel, Switzerland, (8 10 Pages), 2017.
Product Brochure PCC-2019057-0 for PHOS-CHECK® Airbase and Mobile Services Guide, by Perimeter Solutions, LP, 2020, (12 Sheets).
Product Brochure "Hi-Fog Water Mist Fire Protection—Fire Protection for Buildings—HI-FOG® High-Presure Water Mist", Marioff Corporation Oy, 2017, (12 Pages).
Product Brochure for Citrofol, Jungbunzlauer Suisse AG, Jan. 9, 2020 (6 Pages).
Product Brochure for FIRE-TROL® 934 and FIRE-TROL 936 Long-Term Fire Retardants Used in Wildfire Control Ground Applications, by ICL France—ICL BIOGMEA S.A.S, Revision 12, updated Mar. 29, 2013 , (1 Page).
Product Brochure for Komodo®-Pro 0-0-16 Plus Micronutrients, by Solutions 4Earth, LLC, Anderson NV, Apr. 2017 (1 Page).
Product Brochure for Komodo®—Pro Premium Potassium Chloride-Free Fertilizer, by Solutions 4Earth, LLC, Anderson NV, Apr. 2017 (2 Pages).
Product Brochure for LONGRAY Model: TS-18 Truck-Mounted ULV Cold Fogger, Shenzhen Longray Technology Co., Ltd., Shenzhen, China, 2013, (1 Page Total).
Product Brochure for LONGRAY Model: TS-50 Truck-Mounted/Wheeled Battery-Powered ULV Cold Fogger, Shenzhen Longray Technology Co., Ltd., Shenzhen, China, 2013, (1 Page Total).
Product Brochure for LONGRAY Model: TS-95 Truck-Mounted Thermal Fogging Machine, Shenzhen Longray Technology Co., Ltd., Shenzhen, China, 2013, (1 Page Total).
Product Brochure for LONGRAY Model:TS 35A[E} Hand-Held Thermal Foggier Machine, Shenzhen Longray Technology Co., Ltd., Shenzhen, China, 2013, p. 1 of Fogger Brochure, (16 Page Total).
Product Brochure for MICRO-BLAZE OUT® Class A/B Fire Fighting Agent (i.e. Microbial Wettinig Agent) Concentrated Water Additive (1-3%), Containing Foaming Agents and Emulsifiers, Verde Environmental, Inc. Houston Texas, 2021, (2 Pages).
Product Brochure for PHOS-CHEK® Wildfire Home Defense Authorizd Service Provider Program, Perimeter Solutions, LP, 2020, (1 Sheet).
Product Brochure for Surfactant-Loaded-Citrate, Jungbunzlauer Suisse AG, Jan. 2018 (8 Pages).
Product Brochure PCC-2019014-0 for PHOS-CHEK® CODE—Combined on Demand Equipment (CODE)—Mobile Multi-Chemical System, by Perimeter Solutions, LP, 2020, (4 Sheets).
Product Brochure PCC-2019019-0 for PHOS-CHEK® Ground Applied Long-Term Fire Retardant Groun Application, by Perimeter Solutions, LP, 2020, (6 Sheets).
Product Brochure PCE-2019052-0 for PHOS-CHEK® PC Avenger All-Terrain Mobile Unit, Published by Perimeter Solutions, LP, 2019, (12 Sheets).
Product Brochure PCE-2019058-0 for PHOS-CHECK® Fabricated Equipment Solutions, by Perimeter Solutions, LP., 2019, (4 Sheets).
Product Catalogue for Foam Tech Brand of Anti-Fire Chemicals, FoamTech Antifire Company, Kundli, India, Aug. 2021 (9 Pages).
Product Information about Jungbunzlauer brand Tripotassium Citrate, captured at https://www.jungbunzlauer.com/en/products/special-salts/tripotass, Jungbunzlauer Suisse AG, Basel, Switzerland, (3 Pages), 2020.
Product Information for BIO FOR, BIOEX SAS, Mar. 12, 2019, (2 Pages).
Product Information for Phos-Chek 1% Fluorine Free Class A/B Foam Concentrate, Perimeter Solutions, Jan. 2019 (2 Pages).
Product Information for Phos-Chek MVP-F (0.95 lb/Gal) Dry Concentrate Gum-Thickened, Medium Viscocity, Fugitive Color, USDA Forest Service, May 2016 (1 Page).
Product Label for PHOS-CHEK® Wildfire Home Defense Long-Term Fire Retardant Concentrated Formula (0.75 Makes 5 Gallons) and Easy Mixing and Spraying Instructions, Perimeter Solutions, LP, 2020, (2 Sheets).
Product Overview of Phos-Chek Wildfire Home Defense, Mfg. Number LC-95W, ICL Performance Products, St Louis Missouri, 2020, (1 Page).
Product Properties Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.
Product Selection Guide for BASF Resins, BASF, Feb. 2019 (77 Pages).
Product Specification Information about Jungbunzlauer brand Tripotassium Citrate, captured at https://www.jungbunzlauer.com/en/products/special-salts/tripotass, Jungbunzlauer Suisse AG, Basel, Switzerland, (3 Pages), 2020.
Profile Products LLC, "GHS Safety Data Sheet: ConTack", Jan. 2017, (pp. 1-6).
Profile Products LLC, "Certificate of Compliance, Terra-Blend with Tacking Agent 3", Jan. 2016, (pp. 1).
Profile Products LLC, "Earth-Friendly Solutions for Sustainable Results", Feb. 2014, (pp. 1-2).
Profile Products LLC, "Flexterra HP-FGM", Feb. 2018, (pp. 1-4).
Profile Products LLC, "Hydraulically-Applied Erosion Control Bonded Fiber Matrix" Mar. 2017 (5 Pages).
Profile Products LLC, "Profile Products Base Hydrualic Mulch Loading Chart and Application Guide", Oct. 2011, (pp. 1).
Profile Products LLC, "Profile Soil Solutions Software: Getting Started", Nov. 2017, (pp. 1-21).
Profile Products LLC, "Terra-Blend with Tacking Agent 3", Oct. 2017, (pp. 1).
Profile, "Product Screenshots", Nov. 2017, (pp. 1-5).
Profile® Products Base Hydraulic Mulch Loading Chart and Application Guide (ESP-02), Oct. 2011, Profile Products, LLC, Buffalo Grove, Illinois, (1 Page).
Qai Laboratories, "Test Report #T1003-1: FX Lumber Guard", Apr. 2015, (pp. 1-10).
Quick Start Guide for the SnapMapper, by AgTerra Technologies, Inc, Sheridan, Wyoming, Mar. 29, 2019 (8 Pages).
R. W.. Walker, "Free Radicals in Combustion Chemistry", Science Progress Oxford, 1990, vol. 74, No. 2, pp. 163-188, (22 Pages).
Ramage et al.; The Wood from the Trees: The Use of Timber in Construction; Renewable and Sustainable Energy Reviews 68 (2017) 333-359; published Oct. 2016.
Raute, "LVL Technology Screenshot on Web", (pp. 1).
RDR Technologies, "BanFire Screenshot", Nov. 2017, (pp. 1).
RDR Technologies, "Fire Retardant Spray for Artificial Tree and Decorations", Nov. 2017, (pp. 1).
RDR Technologies, Fire Retardant Coatings of Texas, "FX Lumber Guard Screenshots", Nov. 2017, (pp. 1-2).
REALFIRE® Realtors Promoting Community Wildfire Awareness, Eagle County, Colorado, "Wildfire Reference Guide: A Guide For Realtors® to Assist Home Sellers & Buyers With Understanding Wildfire", http: www.REALFire.net, Mar. 2017 (8 Pages).
Reed Construction Data, "Osmose Inc., FirePro Fire Retardant", Jan. 2004, (pp. 1-3).
Researchgate, Kayyani C. Adiga, "Ultra-fine Water Mist as a Total Flooding Agent: A Feasibility Study", Jan. 2014, (pp. 1-13).
Rethink Wood, "Designing for Fire Protection: Expanding the Possibilities of Wood Design", Aug. 2015, (pp. 1-8).

(56) References Cited

OTHER PUBLICATIONS

Rethink Wood, "Mid-Rise Wood Construction", Apr. 2015, (pp. 1-12).
Robert H. White, Erik V. Nordheim, "Charring Rate of Wood for ASTM E 119 Exposure", Feb. 1992, (pp. 1-2).
Robert L. Darwin, Hughes Associates Inc., "Aircraft Carrier Flight and Hangar Deck Fire Protection: History and Current Status", Jan. 2001, (pp. 1-102).
Robert L. Darwin, Hughes Associates Inc., Frederick W. Williams, Navy Technology Center for Safety and Survivability, "Overview of the Development of Water-Mist Systems for U.S. Navy Ships", Apr. 1999, (pp. 1-8).
Robert Zalosh, Gregory Gallagher, "Water Mist Sprinkler Requirements for Shipboard Fire Protection", May 1996, (pp. 1-97).
Roseburg Forest Products, "Roseburg EWP Commerical Design and Installation Guide", Mar. 2017, http://www.roseburg.com., (pp. 1-48).
Roseburg Forest Products, "Wood I-Joists", Jan. 2016, (pp. 1-6).
Rossi Jean-Louis, Marcelli Thierry, Chatelon François Joseph, Université de Corse, Systèmes Physiques pour l'Environnement UMR-CNRS 6134, Corte, France Morvan Dominique, Simeoni Albert, Rossi Jean-Louis, Marcelli Thierry, and Chatelon François Joseph, "Fuelbreaks: a Part of Wildfire Prevention", published in Global Assessment Report on Disaster Risk Reduction 2019, as a Contributing Paper, United Nations Office for Disaster Risk Reduction, Jul. 2019, (25 Pages).
Rossroof Group, "Tilcor: High Performance Roofing Systems", Nov. 2017, (pp. 1-2)).
Rubner Holzbau, "Timber Engineering in the 21st Century", Jan. 2017, (pp. 1-21).
Rubner Holzbau, "Wood Culture 21: Construction Expertise for Architects, Designers and Building Owners", Jul. 2017, (pp. 1-23).
Ryan S. McMullen, "Research of Alkali Metal-Ammonia Microjets Published in Journal Science" Jun. 4, 2020 (9 Pages).
S.T Lebow, J. E. Winandy, "Effect of fire-retardant treatment on plywood pH and the relationship of pH to strength properties" Jan. 8, 1997 (14 Pages).
Safety Data Sheet for Chemguard DirectAttack Foam Concentrate, Tyco Fire Protection Products, Jan. 2018 (2 Pages).
Safety Data Sheet fo KV-Lite Forming Fluoro Pr10 otein (FFFP) Foam Concentrate 3 & 6%, M/S K.V. Fire Chemicals PVT. LTD, Dec. 2009 (3 Pages).
Safety Data Sheet for Angus Fire FP 70 Foam, Angus Fire Ltd, Decembers, 2014 (9 Pages).
Safety Data Sheet for Bio Fluopro 3E, BIOEX SAS, Nov. 11, 2005 (2 Pages).
Safety Data Sheet for Chemguard: Direct Attack Class A Foam, Tyco Fire Protection Products, Feb. 22, 2016 (8 Pages).
Safety Data Sheet for Citroflex 4, Vertellus Performance Materials Inc., Jul. 12, 2012 (9 Pages).
Safety Data Sheet for Citroflex A-2, Vertellus LLC, Nov. 30, 2010 (9 Pages).
Safety Data Sheet for Citroflex A-4, Vertellus LLC, Jun. 29, 2018 (8 Pages).
Safety Data Sheet for Komodo Pro Fertilizer (No. R30528) Prepared on Feb. 9, 2017 by Solutions 4 Earth LLC, Henderson NV, Feb. 2017 (4 Pages).
Safety Data Sheet for Lankem BioLoop 68L, Lankem Ltd, May 3, 2020 (7 Pages).
Safety Data Sheet for Lankem BioLoop 84L, Lankem Ltd, Feb. 18, 2018 (7 Pages).
Safety Data Sheet for M-Fire AAF31 Job Site Spray, M-Fire Holdings LLC., Jan. 2018 (7 Pages).
Safety Data Sheet for Phos-Chek 1% AFF—[Aquafilm AF-1U], Auxquimia, Jul. 7, 2014 (13 Pages).
Safety Data Sheet for Phos-Chek 1 % Fluorine Free, Perimeter Solutions, Sep. 13, 2019 (6 Pages).
Safety Data Sheet for PHOS-CHEK WD-881's Fish Toxicity Values, Perimeter Solutions, May 2019 (2 Pages).
Safety Data Sheet for Phos-Chek® LC95W Solution (AST10150. 173), Perimeter Solutions, St. Louis, Missouri, Jun. 10, 2015 (5 Pages).
Safety Data Sheet for Polyphase PW40, Troy Corporation, Aug. 23, 2018 (14 Pages).
Safety Data Sheet for The Amazing Doctor Zymes Eliminator, The Amazing Doctor Zymes, Jul. 10, 2017 (2 Pages).
Safety Report titled "Safety Risks to Emergency Responders from Lithium-ion Battery Fires in Electric Vehicles", National Transportation Safety Board, Nov. 13, 2020 (80 Pages).
Sam Baker, "Fire Retardants That Protect The Home", LA Times, Nov. 25, 2007, https://www.latimes.com/business/realestate/la-re-fire25nov25-story.html, (4 Pages).
Scott T. Handy, "Applications of Ionic Liquids in Science and Technology" ,Published by InTech, Rijeka, Croatia, 2011, (528 Pages).
Scott T. Hardy, "Applications of Ionic Liquids in Science and Technology", Sep. 2011, (pp. 1-528).
Screenshot of webpage for Lankem Bioloop Surfactants, Lankem Ltd, captured on Feb. 7, 2021 at https://www.lankem.com/bioloop-surfactants (1 Pag 1).
Screenshot of webpage for Lankem Products, Lankem Ltd, captured on Feb. 7, 2021 at https://www.lankem.com/products (1 Page).
Sellsheet for Green Design Engineering (GDE)—Earth-Friendly Solutions for Sustainable Results™—by Profile Products LLC, Mar. 2014, Profile Products, LLC, Buffalo Grove, Illinois, (2 Pages).
SIEMENS, "Transforming Timbers into Houses", Jan. 2013, (pp. 1-3).
Simplex Aerospace, "Spray Systems Overview", Jan. 2016, (pp. 1-3).
Specification Data Sheet for Instant & Non Instant Whey Protein Concentrate 80%, The Milky Whey Inc., Jan. 2021 (1 Page).
Specification Document for Fire Suppressant Foam for Wildland Firefighting (Class A Foam), U. S. Department of Agriculture Forest Service, Jun. 1, 2007 (31 Pages).
Specification Document for Water Enhancers for Wildland Firefighting, U.S. Department of Agriculture Forest Service, Jun. 1, 2007 (24 Pages).
Specification for Fire Suppressant Foam for Wildland Firefighting (Class A Foam), 5100-307b, Jun. 1, 2007, (Amendments Inserted into the Text, May 17, 2010) U.S. Department of Agriculture Forest Service (31 Pages).
Specification for Water Enhancers for Wildland Firefighting, 5100-306b, Sep. 2018 Superseding Specification 5100-306a, Jun. 1, 2007, U.S. Department of Agriculture Forest Service (24 Pages).
Spiritos Properties, "Mass Timber—101 and Beyond", Apr. 2017, (pp. 1-17).
Spraying Systems Co., "Industrial Hydraulic Spray Products", Jan. 2015, (pp. 1-220).
Status of REACH Registration for Jungbunzlauer Products before the European Chemicals Agency (ECHA), No. 12.19, by Jungbunzlauer Suisse AG, Basel Switzerland, Aug. 10, 2020 (2 Pages).
Stephen Preece, Paul Mackay, Adam Chattaway, "The Cup Burner Method—Parametric Analysis of the Factors Influencing the Reported Extinguishing Concentrations of Inert Gases", Jan. 2001, (pp. 1-13).
Stephen Quarles and Ed Smith, "The Combustibility of Landscape Mulches" (SP-11-04), Universitiy of Nevada Cooperative Extension, 2011 (8 Pages).
Stora Enso, "CLT—Cross Laminated Timber: Fire Protection", Jan. 2016, (pp. 1-51).
Stora Enso, "CLT Engineer: The Stora Enso CLT Design Software User Manual, "Jan. 2016, (pp. 1-118).
Stora Enso, "Stora Enso CLT Technical Brochure", Feb. 2017, (pp. 1-32).
Structural Building Components Association, "Fire Retardants and Truss Design", Jan. 2015, (pp. 1-48).
Structural Building Components Association, "Research Report: Lumber Use in Type III-A Buildings", Jul. 2016, (pp. 1-8).
Studiengemeinschaft Holzleimbau, "Building with Cross Laminated Timber", Jan. 2011, (pp. 1-36).
Surfire Services Limited, "UltraGuard: The personal protection system from Surefire", Nov. 2017, (pp. 1-3).

(56) References Cited

OTHER PUBLICATIONS

Swiss Krono, "Swiss Krono OSB: Prefabricated Construction" Nov. 2017, (pp. 1-6).
Tarek Alshaal and Hassan Ragab El-Ramady, "Foliar Application: From Plant to Biofortification", The Environment, Biodiversity and Soil Security, vol. 1, pp. 71-83, Jul. 2017 (14 Pages).
Technical Brief "Jungbunzlauer Tripotassium Citrate: Environmental and Health Friendlky Flame Retardant in Wood Application", Jungbunzlauer Suisse AG, Basel, Switzerland, (2 Pages).
Technical Brochure titled "FACTS: Formulating Better Tasting Infant Formula", No. 150, by Jungbunzlauer Suisse AG, Basel Switzerland, 2015 (8 Pages).
Technical Brochure titled "Lactics", No. 130, by Jungbunzlauer Suisse AG, Basel Switzerland, 2016 (8 Pages).
Technical Brochure titled "Product Range: Bio-Based Ingredients", No. 217, by Jungbunzlauer Suisse AG, Basel Switzerland, 2017 (16 Pages).
Technical Brochure titled "Specialty Salts: Functional Minerals", No. 038, by Jungbunzlauer Suisse AG, Basel Switzerland, 2017 (16 Pages).
Technical Data Sheet for Lankem BioLoop 68L, Lankem Ltd, May 2020 (2 Pages).
Technical Evaluation Report for Citric Acid, OMRI for the USDA, Feb. 17, 2015 (31 Pages).
Technical Evaluation Report for Citroflex 2 (Triethyl Citrate), OMRI for the USDA, Nov. 5, 2014 (15 Pages).
Technical Paper titled "Jungbunzlauer Tripotassium Citrate: Environmental and Health Friendly Flame Retardant in Wood Application", Product Group Special Salts, by Jungbunzlauer Suisse AG, Basel Switzerland, Aug. 10, 2020 (2 Pages).
Technical Product Information Sheet for Tripotassium Citrate Monohydyrate, Cargill Acidulants, Eddyville, IA, USA, Nov. 30, 2010 (1 Page).
Technical Specification Sheet for Mono-Ammonium Phosphate (12-61-0) Fertilizer, by Haifa Chemicals Ltd., Haifa Bay, Isreal, May 7, 2020 (2 Pages).
Technical Specifications for Diammonium Phosphate (DAP), Nutrient Source Specifics No. 17, International Plant Nutrition Institute (IPNI), Norcross, Georgia, Ref# 11040, May 2020 (1 Page).
Technical Specifications for Monoammonium Phosphate (MAP,) Nutrient Source Specifics No. 9, International Plant Nutrition Institute (IPNI), Norcross, Georgia, Ref# 10069, May 2020 (1 Page).
Technical Specifications of MonoAmmonium Phosphate (MAP), published at Mosaic Crop Nutrition Resource Library, https://www.cropnutrition.com/resource-library/monoammonium- . . . May 5, 2020 (2 Pages).
TECO, "Wood-Based Structural-Use Panels and Formaldehyde Emissions", May 2009, (pp. 1-3).
Ted A. Moore, Joseph L. Lifke, Robert E. Tapscott, "In Search of an Agent for the Portable Fire Extinguisher", Jan. 1996, (pp. 1-12).
Teresa Dobbins, "Electrostatic Spray Heads Convert Knapsack Mistblowers to Electrostatic Operation", International Pest Control, Sep./Oct. 1995, vol. 37, No. 5, (4 Pages).
Tersa Berninger, Natalie Dietz, and Oscar Gonzalez Lopez of Jungbunzlauer Ladenburg GmbH , "Water-Soluble Polymers in Agriculture: Xanthan Gum as Eco-Friendly Aternative to Synthetics", Microbial Biotechnology, published by Society for Applied Microbiology and John Wiley & Sons Ltd., Jun. 2021 (16 Pages).
Tesla Battery Emergency Response Guide for Lithium Ion, TS-00040027 Revision 1.8, Tesla Inc., 2020 (14 Pages).
The University of Chicago, Salen Churi, Harrison Hawkes, Noah Driggs, "Internet of Things: Risk Manager Checklist, U.S.", Dec. 2016, (pp. 1-23).
Thierry Carriere, Jim Butz, Sayangdev Naha and Angel Abbud-Madrid, "Fire Suppression Tests Using a Hand-Held Water Mist Extinguisher Designed for Space-Craft Applications", SUPDET 2012 Conference Proceedings, Mar. 5-8, 2012, Phoenix, AZ, (3 Pages).
Thierry Carriere, Jim Butz, Sayangdev Naha, Angel Abbud-Madrid, "Fire Supression Tests Using a Handheld Water Mist Extinguisher Designed for Spacecraft Application", Mar. 2012, (pp. 1-3).
Thomas Schroeder, Klaus Kruger, Felix Kuemmerlen, "Fast Detection of Deflagrations Using Image Processing", Jan. 2012, (pp. 1-113).
Tom Toulouse, Lucile Rossi, Turgay Celik, Moulay Akhloufi, "Automatic Fire Pixel Detection Using Image Processing: A Comparative Analysis of Rule-Based and Machine Learning-Based Methods", Jun. 2016, (pp. 1-8).
Training Manual for Thermo-Gel® POK Nozzle Backpack System, Thermo Technologies, LLC, Bismarck, North Dakota, 2020, (55 Pages).
Treated Wood "D-Blaze Fire Retardant Treated Wood: The New Generation Building Material", Mar. 2004, (pp. 1-2).
Treated Wood, "D-Blaze: Fire Retardant Treated Wood", Jan. 2015, (pp. 1-13).
Treated Wood, "Fire Retardant Treated Wood For Commercial and Residential Structures", Jan. 2012, (pp. 1-73).
Treated Wood, "TimberSaver", Nov. 2017, (pp. 1-6).
Treehugger, Lloyd Alter, "Katerra to Build Giant New CLT Factory in Spokane, Washington", Sep. 2017, (pp. 1-16).
Treehugger, Lloyd Alter, "Wood Frame Construction is Safe, Really", Dec. 2014, (pp. 1-5).
Trusjoist, Weyerhauser, "Fire-Rated Assemblies and Sprinkler Systems", May 2017, (pp. 1-24).
Turbo Technologies, Inc. "Specifications for Turbo Turf's HY-750-HE Hybrid Hydroseeder", https://turboturf.com/hy-750-he/, Jan. 2018, (4 Pages).
TYCO Fire Products, "AquaMist: Watermist Fire Protection", Jan. 2013, (pp. 1-7).
TYCO Fire Products, "AquaMist", Jan. 2016, (pp. 1-5).
TYCO Fire Products, "Ultra Low Flow AQUAMIST Solution for Protecting Office Spaces, False Ceilings and False Floors—VdS Approval Criteria", May 2016, (pp. 1-6).
TYCO Fire Protection Products, "Alcohol Resistant—Aqueous Film-Forming Foam (AR-AFFF) Concentrates" Jan. 19, 2016 (2 Pages).
TYCO Fire Protection Products, "Chemguard: Foam Concentrates and Hardware" Jan. 2019 (7 Pages).
TYCO Fire Protection Products, "Foam Systems—Acceptable Materials of Construction" Jan. 2018 (2 Pages).
TYCO Fire Protection Products, "Storage of Foam Concentrates: Recommended4 Storage, Handling and Inspection of Foam Concentrates" Jan. 2018 (3 Pages).
TYCO, "AquaMist Introduction" by Steve Burton, Certfied Fire Engineer, Tyco Fire Protection Products, Nov. 2015, (pp. 1-108).
TYCO, "Gaseous Fire Suppression Systems", Sep. 2013, (pp. 1-16).
TYCO, "Novec 1230: Gaseous Fire Suppression Solution", Feb. 2013, (pp. 1).
U.S. Department of Agriculture, "Aerial Application of Fire Retardant", May 2011, (pp. 1-370).
UL Greenguard Certification Test Report for AF21 Clean Fire Inhibitor, M-Fire Suppression Inc., May 29, 2018 (23 Pages).
Underwriters Laboratories Inc.," BPVV R7002 Lumber, Treated", Jan. 2011, (pp. 1-5).
Underwriters Laboratories Inc., BUGV R7003 Treated Plywood, Oct. 2011, (pp. 1-4).
Underwriters Laboratories Inc., "Greenguard Certification Test for Eco Building Products, Inc.: Eco Red Shield—01", Mar. 2015, (pp. 1-21).
Underwriters Laboratories, "Project 90419—GREENGUARD and GREENGUARD Gold Annual Certification Test Results", Mar. 2015, (pp. 1-21).
Underwriters Laboratories, "Report on Structural Stability of Engineered Lumber in Fire Conditions", Sep. 2008, (pp. 1-178).
US International Trademark Commission, "Citric Acid and Certain Citrate Salts from Canada and China (Investigation Nos. 701-TA-456 and 731-TA-1152 (Final)", ITC Publication No. 4076, Washington, DC, May 2009 (184 Pages).
USDA Forest Service, "Mass Laminated Timber in the United States: Past, Present, and Future", Nov. 2017, (pp. 1-13).

(56) References Cited

OTHER PUBLICATIONS

USDA, "Hygrothermal Performance of Mass Timber Construction", Nov. 2015, (pp. 1-21).
USDA, Natural Resources Conservation Service, Denver Colorado, "2012 Fact Sheet on HydroMulching", 2012, (2 Pages).
Victaulic, "Victaulie Vortex 1000 Fire Supression System", Feb. 2011, (pp. 1-2).
Victaulic, "Victaulie Vortex 1500 Fire Suppression System", Jun. 2016, (pp. 1-3).
Victualic, William, Reilly, "Dual Agent Extinguishing System: Victualic Vortex", Apr. 2008, (pp. 1-6).
W. Gill Giese, Slide Show on "Potassium in the Vineyard and Winery", New Mexico State University, Viticulture Extension, Nov. 2016, (25 Pages).
Web Pages Showing a BUCKEYE™ Wet Chemical Fire Extinguisher containing Potassium Citrate, Buckeye Fire Equipment Company, Kings Mountain, North Carolina, published at http://buckeyefire.com/products/liquid-agent-fire-systems/ captured on Jun. 16, 2021, (3 Pages).
Web Pages Showing Invatech Italia 868 Backpack Duster Mister Fogger Unit, Invatech Italia, Sumas, Washington, published at https://invatechitalia.com/?gclid=EAIalQobChMIxKuVyu6c8-QIVGYbICh12ggwOEAAYASAAEglkefD_BwE captured onJun. 16, 2016, (11 Pages).
Webpage for TriFone BRAVO 600 Line of Sprayers, hhspray.com, H&H Farm Machine Company, Jan. 2020 (4 Pages).
Website Pages from Fire Break Protection Systems Inc., captured from https://www.dnb.com/business-directory/company-profiles.fire_break_protection_systems.04a9c4cc966d5ffce0e52d19515a79a7.html on Mar. 8, 2021, Fire Break Protection Systems, Simi Valley, California, (6 Pages).
Website Pages from Frontline Wildfire Defense Systems, System Brochure, captured from https://www.frontlinewildfire.com/ on Mar. 8, 2021, Frontline Wildfire Defense Systems, Wildomar, California, (5 Pages).
Website Pages from Perimeter Solutions Inc. regarding Phoschek® Fortify® Fire Retardant, Perimeter Solutions Inc., captured at https://www.perimeter-solutions.com/fire-safety-fire-retardants/phoschek-fortify/ on Jun. 15, 2021, (5 Pages).
Wei-Tao Luo, Shun-Bing Zhu, Jun-Hui Gong, Zheng Zhao, "Research and Development of Fire Extinguishing Technology for Power Lithium Batteries", 2017 8th International Conference on Fire Science and Fire Protection Engineering (on the Development of Performance-based Fire Code), Elsevier, Procedia Engineering, Dec. 2017 (7 Pages).
Western Wood Preservers Institute, "Fire Retardant Wood and the 2015 International Building Code", Jan. 2015, (pp. 1-2).
Western Wood Products Association, "Flame-spread Ratings & Smoke-Developed Indices; Conformance with Model Building codes", Nov. 2017, (pp. 1-2).
Weyerhauser, Renee Strand, "Mid-Rise, Wood-Framed, Type III Construction—How to Frame the Floor to Wall Intersection at Exterior Walls", Apr. 2016, (pp. 1-8).
White Paper for Johnson Controls, "Types of firefighting foam agents: Properties and applications", Jan. 2020 (4 Pages).
Wikipedia Article on Fluorocarbon, Wikipedia.org, captured Apr. 11, 2021 at https://en.wikipedia.org/wiki/Fluorocarbon (11 Pages).
Wikipedia Article on Greek Fire, Wikipedia.org, captured Jan. 28, 2021 at https://en.wikipedia.org/wiki/Greek_fire (14 Pages).
Wikipedia article on Potassium Citrate, Wikipedia .org captured May, 6, 2020 at https://en.wikipedia.org/wiki/Potassium_citrate (2 Pages).
Wikipedia Entry for Diammoniun Phosphate, published at https://en.wikipedia.org/wiki/Diammonium_phosphate, Retrieved May 7, 2022 (3 Pages).
Wikipedia Entry for Potassium Citrate, published at https://en.wikipedia.org/wiki/Potassium_citrate, Last Edited Jul. 19, 201, Retrieved May 6, 2022 (3 Pages).
Wikipedia for Potassium Citrate, published on https://en.wikipedia.org/wiki/Potassium_citrate, Jun. 17, 2021, Wikipedia.org, (3 Pages).
Wikipedia, "Phos-Chek Screenshots", Nov. 2017, (pp. 1-3).
Wikpedia Article on Per- and Polyfluoroalkyl Substances, Wikipedia.org, captured Apr. 11, 2021 at https://en.wikipedia.org/wiki/Per-_and_polyfluoroalkyl_substances, (26 Pages).
Wildfire Defense Systems, Inc., Web Brochure on WDSFire Wildfire Reporting Dashboard Service For Wildfire Risk During an Active Wildfire, 2017, (2 Pages).
Wildfire Defense Systems, Inc., Web Brochure on WDSPRo Mobile Application For Wildfire Hazard Property Assessment, 2017, (3 Pages).
William R. Smythe, "The Spectrum of Fluorine", Apr. 1921 (7 Pages).
Wood Environment & Infrastructure Solutions UK Ltd., "The use of P15 FAS and fluorine-free alternatives in fire-fighting foams" Jun. 2020 (534 Pages).
Wood Works, "The Case for Cross Laminated Timber", Jan. 2016, (pp. 1-212).
Woodworking Network, "Megola to Buy Wood-Protecting Hartindo AF21 Fire Inhibitor", Aug. 2011, (pp. 1-2).
Woodworks, "Case Study: UW West Campus Student Housing", Jan. 2013, (pp. 1-8).
Woodworks, "Design Example: Five-Story Wood-Frame structure Over Podium Slab", Sep. 2016, (pp. 1-79).
Woodworks, "Wood Brings the Savings Home", Jan. 2013, (pp. 1-8).
XLAM, "Technical: XLam Panel Specifications", Jan. 2018, (p. 11).
Yang Xuebing, "Change in the Chinese Timber Structure Building Code", Jan. 2006, (pp. 1-11).
Yavuz HK, Ozcan MM, Lemiasheuski VK, "The Effect of Some Chemical Additives on the Foaming Performance of the Pasteurized Liquid Egg White" Jan. 31, 2018 (4 Pages).
Yi-Yuan Shao, Kuan-Hung Lin, Yu-Ju Kao, Journal of Food Quality, "Modification of Foaming Properties of Commercial Soy Protein Isolates and Concentrates by Heat Treatments" Aug. 10, 2016 (12 Pages).
Yong-Liang Xu, Lan-Yun Wang, Don-Lin Liang, Ming-Gao Yu, Ting-Xiang Chu, "Experimental and Mechanism Study of Electrically Charged Water Mist for Controlling Kerosene Fire in a Controlled Space", Apr. 2014, (pp. 1-7).
Yuri B. Vysotsky, Elena Kartashynska, Dieter Vollhardt, Valentin B. Fainerman, "Surface pKa of Saturated Carboxylic Acids at the Air/Water Interface" A Quantum Chemical Approach Jun. 5, 2020 (10 Pages).
Zhen Wang, "Optimization of Water Mist Droplet size in Fire Supression by Using CFD Modeling", Dec. 2015, (pp. 1-68).
Zhen Wang, "Optimization of Water Mist Droplet Size in Fire Suppression by Using CFD Modeling", Masters of Science Degree Thesis, Graduate College of the Oklahoma State University, Oklahome, Dec. 2015, (68 Pages).

* cited by examiner

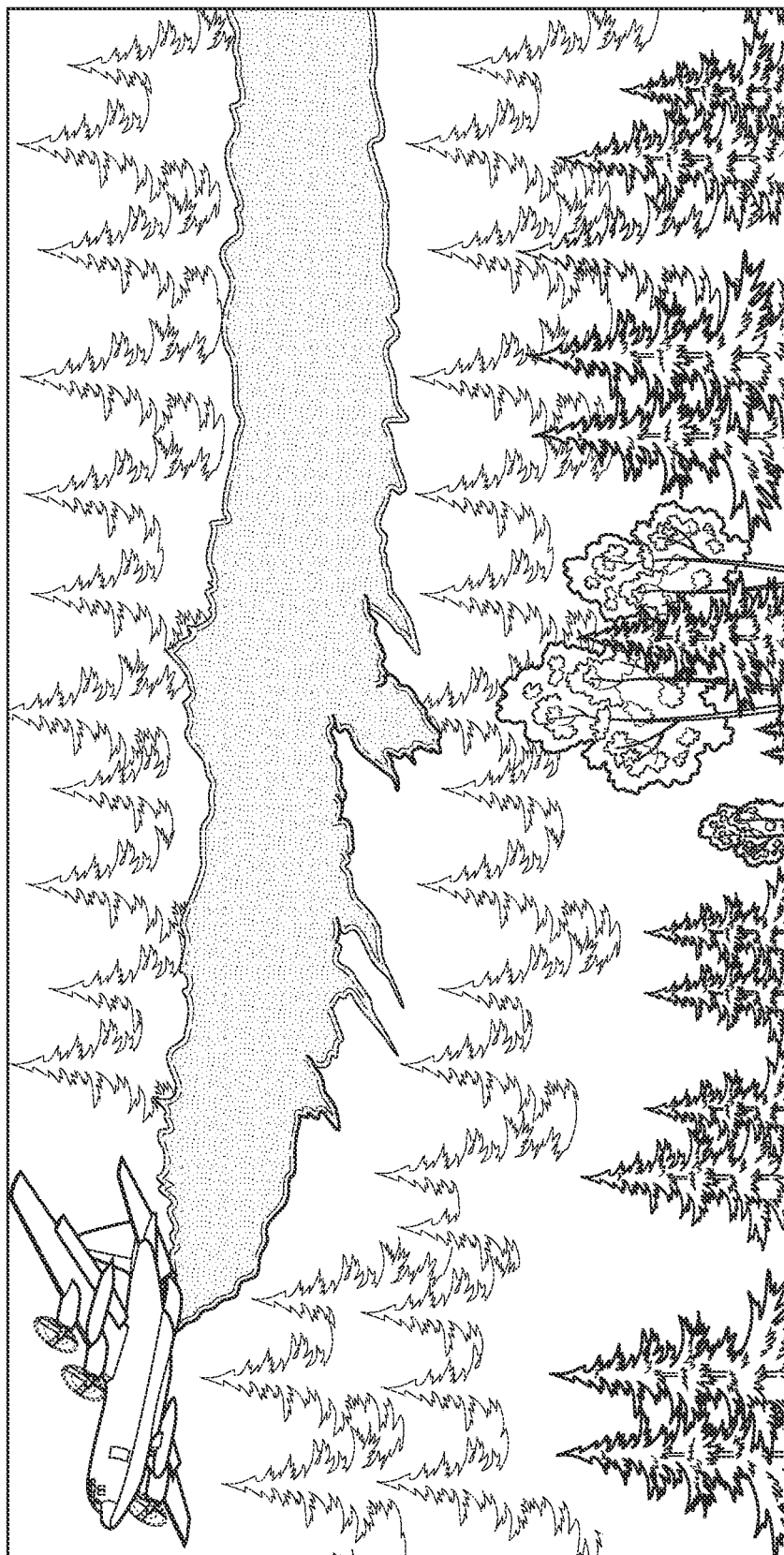
FIG. 2B1 (PRIOR ART)

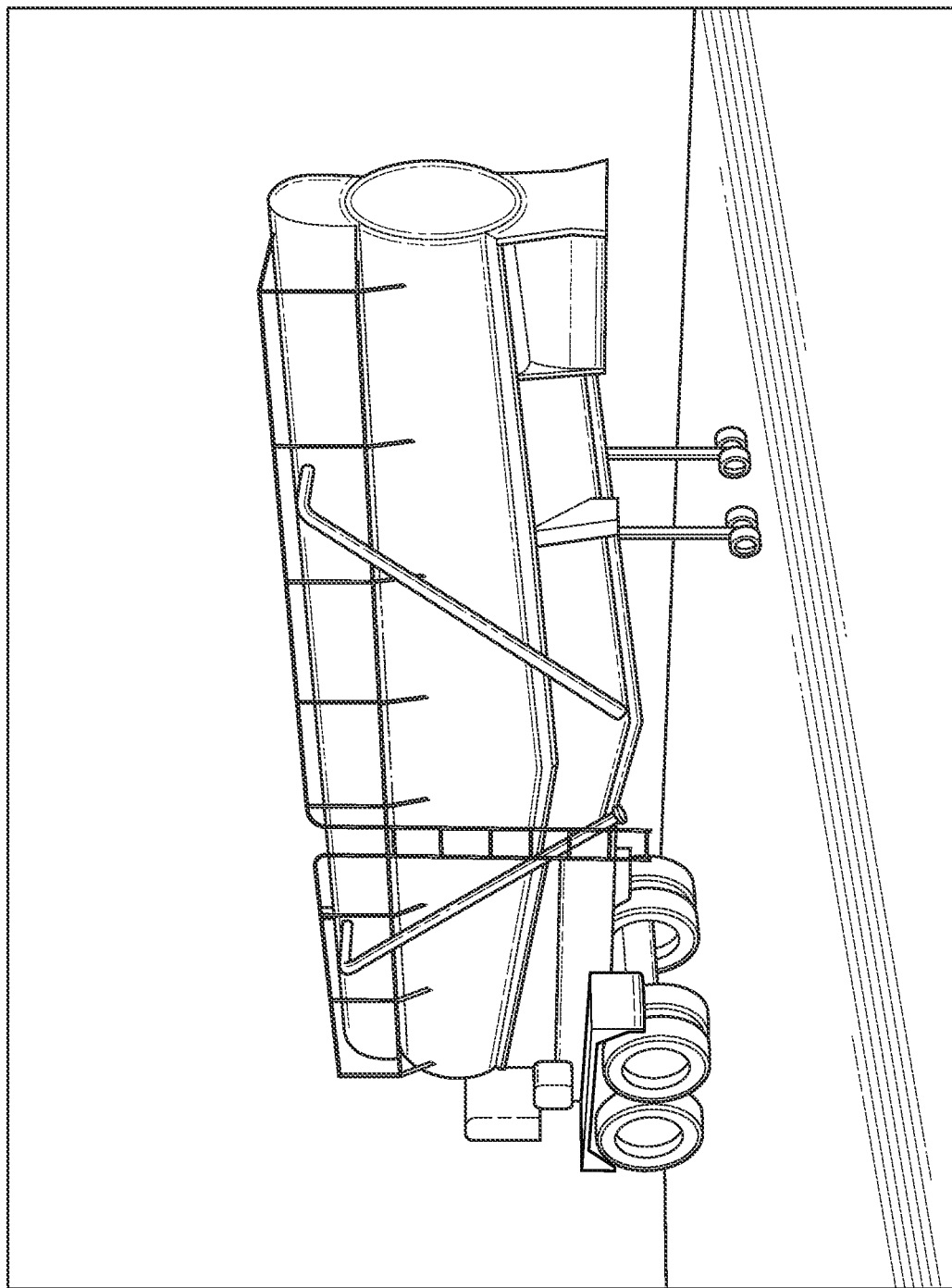
FIG. 2B2
(PRIOR ART)

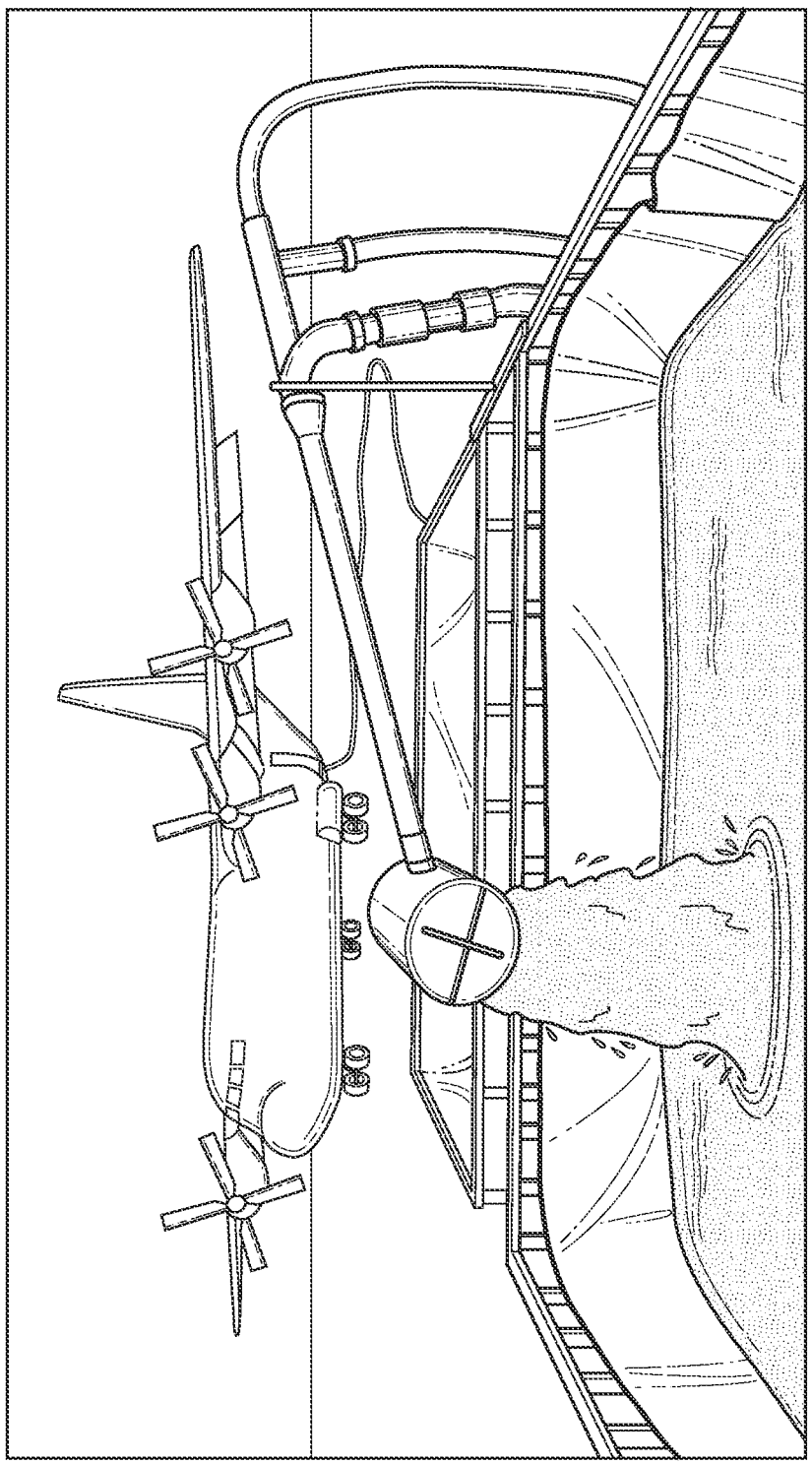
FIG. 2B3
(PRIOR ART)

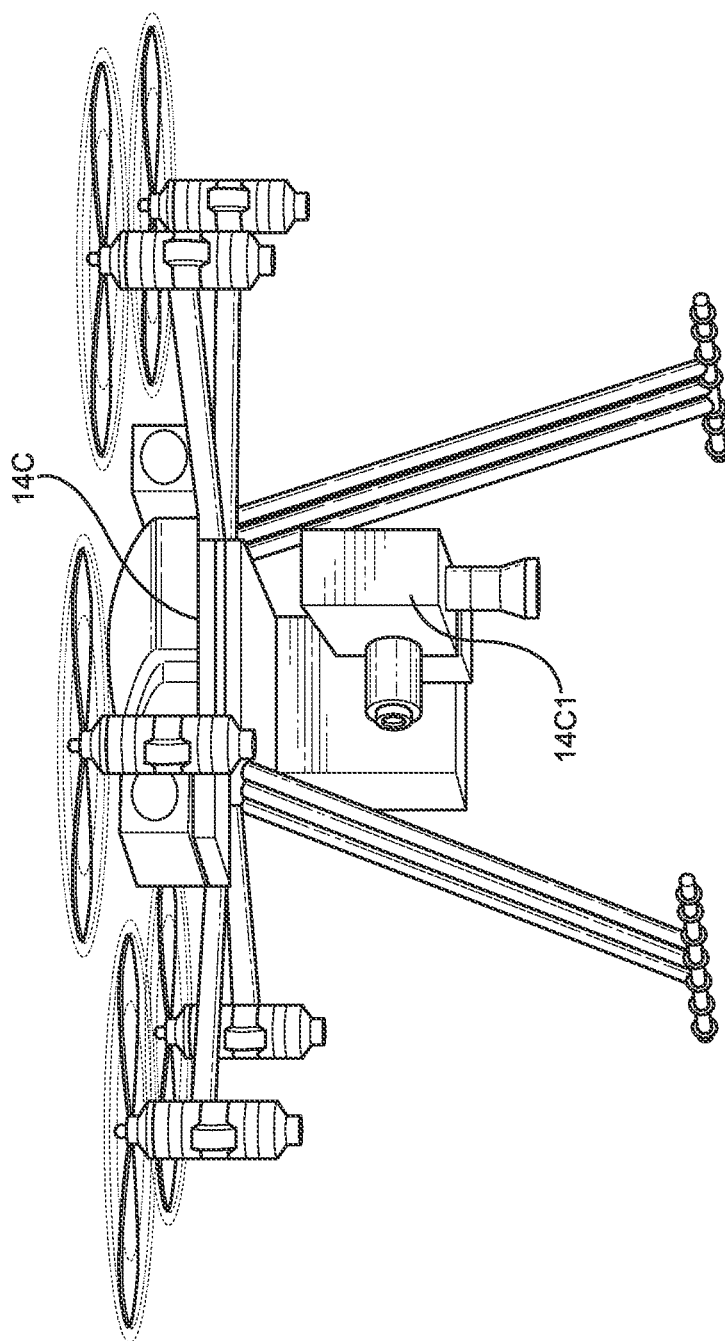

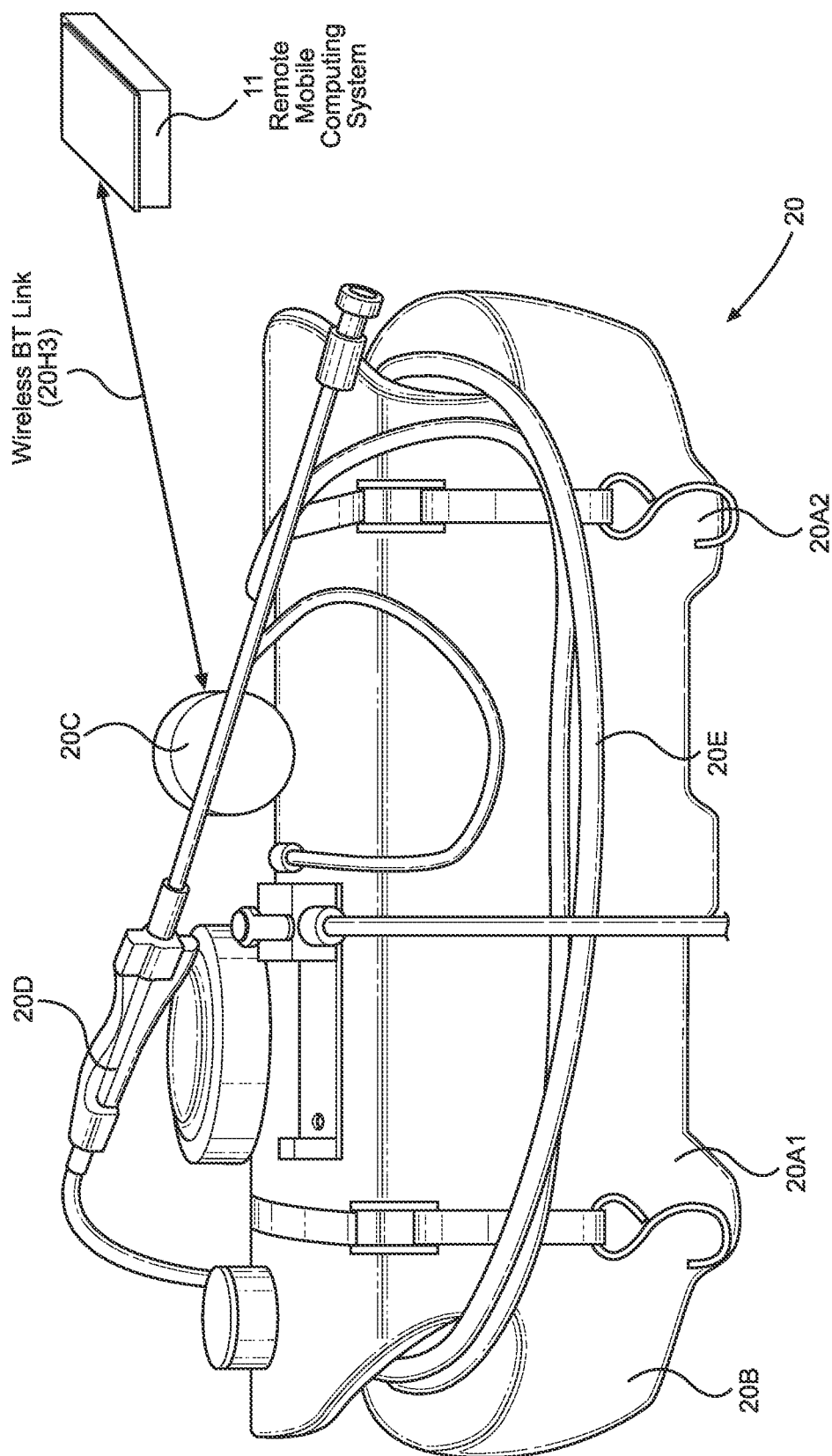

GRAPHICAL USER INTERFACE SUPPORTED BY MOBILE APPLICATION FOR USE BY REGISTERED USERS (E.G. PROPERTY PARCEL OWNERS, CONTRACTORS AND/OR AGENTS, RESIDENTS, OFFICES, ET AL)

GRAPHICAL INTERFACE SUPPORTED BY THE MOBILE APPLICATION SHOWING A
USER UPDATING THE REGISTRATION PROFILE AS A TASK ON THE SYSTEM NETWORK

GRAPHICAL USER INTERFACE OF THE MOBILE APPLICATION SHOWING A USER RECEIVING A MESSAGE REQUEST FROM THE COMMAND CENTER TO SPRAY GPS-SPECIFIED PRIVATE PROPERTY PARCEL(S) WITH CLEAN ANTI-FIRE (AF) CHEMICAL LIQUID

GRAPHICAL USER INTERFACE SUPPORTED BY THE MOBILE APPLICATION SHOWING A USER RECEIVING A REQUEST / NOTICE OF ORDER TO WILD-FIRE SPRAY-PROTECT GPS-SPECIFIED PUBLIC PROPERTY PARCEL(S) WITH CLEAN AF LIQUID TO CREATE GPS-SPECIFIED PUBLIC FIREBREAK

GRAPHICAL USER INTERFACE SUPPORTED BY THE MOBILE APPLICATION SHOWING A USER REQUESTING A REFILL OF CLEAN ANTI-FIRE (AF) CHEMICAL LIQUID FOR SUPPLY TO GPS-SPECIFIED SPRAY EQUIPMENT

GRAPHICAL USER INTERFACE SUPPORTED BY MOBILE APPLICATION FOR USE BY COMMAND CENTER ADMINISTRATORS TO ISSUE WILD-FIRE PROTECTION ORDERS, PLAN WILD-FIRE PROTECTION TASKS, GENERATEREPORTS, AND SEND AND RECEIVE MESSAGES

GRAPHICAL USER INTERFACE SUPPORTED BY THE MOBILE APPLICATION FOR USE BY COMMAND CENTER ADMINISTRATORS TO ISSUE WILD-FIRE PROTECTION ORDERS

GRAPHICAL USER INTERFACE SUPPORTED BY MOBILE APPLICATION FOR USE BY COMMAND CENTER ADMINISTRATORS TO ISSUE WILD-FIRE PROTECTION ORDERS INVOLVING THE CREATION AND MAINTENANCE OFCLEAN AF-BASED CHEMICAL FIREBREAK

GRAPHICAL USER INTERFACE SUPPORTED BY MOBILE APPLICATION FOR USE BY COMMAND CENTER ADMINISTRATORS TO ORDER THE CREATION OF GPS-SPECIFIED CLEAN AF-BASEDCHEMICAL FIREBREAKS ON ONE OR MORE PUBLIC / PRIVATE PROPERTY PARCELS

GRAPHICAL USER INTERFACE FOR MOBILE APPLICATION USED BY COMMAND CENTER ADMINISTRATORS TO RECEIVE MESSAGES FROM USERS INCLUDING PROPERTY OWNERS AND CONTRACTORS REQUESTINGREFILLS FOR CLEAN ANTI-FIRE (AF) CHEMICAL LIQUID

EXEMPLARY ANTI-FIRE (AF) SPRAY PROTECTION TASK REPORT GENERATED BY THE SYSTEM FOR COUNTY, STATE ON 15 DECEMBER 2017

| AF Liquid Spray Order # | GPS Addresses | Street Addresses, Town, County | Building Structure (Y/N) | Last Appln. Date | Spray Equip. | SMS | Supervisor ID |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |

METHOD OF SUPPRESSING A WILD FIRE RAGING TOWARDS A TARGET REGION OF LAND IN A DIRECTION DETERMINED BY PREVAILING WINDS AND OTHER ENVIRONMENTAL AND WEATHER FACTORS

A: PRIOR TO THE WILD FIRE REACHING THE SPECIFIED TARGET REGION OF LAND, APPLYING A LOW-DENSITY ANTI-FIRE (AF) LIQUID MIST IN ADVANCE OF THE WILD FIRE SO AS TO FORM A FIRE STALL REGION WHILE PROVIDING A NON-TREATED REGION OF SUFFICIENT SIZE BETWEEN THE FRONT OF THE WILD FIRE APPROACHING THE TARGET REGION OF LAND AND THE FIRE STALL REGION, WHEREIN SAID NON-TREATED REGION IS DEFINED BY A FIRST SET OF GPS COORDINATES {GPS1(X,Y)} MAPPED OUT USING GLOBAL POSITIONING SYSTEM (GPS) METHODS, WHEREIN SAID FIRE STALL REGION IS DEFINED BY A SECOND SET OF GPS COORDINATES {GPS2(X,Y)} MAPPED OUT USING GLOBAL POSITIONING SYSTEM (GPS) METHODS, AND WHEREIN SAID FIRE STALL REGION IS FORMED BY A FIRST GPS-GUIDED AIRCRAFT FLYING OVER SAID FIRE STALL REGION DURING MULTIPLE PASSES AND APPLYING SAID LOW-DENSITY AF LIQUID MIST OVER SAID FIRE STALL REGION;

B: APPLYING A HIGH-DENSITY ANTI-FIRE (AF) LIQUID SPRAY IN ADVANCE OF THE WILD FIRE TO FORM A FIRE BREAK REGION BEYOND AND CONTIGUOUS WITH SAID FIRE STALL REGION, WHEREIN SAID FIRE BREAK REGION IS DEFINED BY A THIRD SET OF GPS COORDINATES {GPS3(X,Y)} MAPPED OUT USING GLOBAL POSITIONING SYSTEM (GPS) METHODS, AND WHEREIN SAID FIRE BREAK REGION IS FORMED BY A SECOND GPS-GUIDED AIRCRAFT FLYING OVER SAID FIRE BREAK REGION DURING MULTIPLE PASSES AND APPLYING SAID HIGH-DENSITY AF LIQUID SPRAY OVER SAID FIRE BREAK REGION; AND (A)

FIG. 19A

METHOD OF REDUCING THE RISKS OF DAMAGE TO PRIVATE PROPERTY DUE TO WILD FIRES BY REMOTELY MANAGED GPS-CONTROLLED APPLICATION OF ANTI-FIRE (AF) LIQUID SPRAY

A: REGISTERING IN A NETWORK DATABASE, EACH GPS-SPECIFIED PARCEL OF PRIVATE REAL PROPERTY IN A SPECIFIED COUNTY AND STATE, WHICH MAY OR MAY NOT HAVE BUILDINGS CONSTRUCTED THEREON, AND IDENTIFYING THE OWNER AND TENANTS, AS WELL AS ALL PETS, VEHICLES AND WATER CRAFTS ASSOCIATED WITH THE REGISTERED PARCEL OF PRIVATE PROPERTY.

B: COLLECTING INTELLIGENCE RELATING TO THE COUNTY, RISKS OF WILD FIRES IN THE SURROUNDING REGION, AND HISTORICAL DATA MAINTAINED IN THE NETWORK DATABASE, AND GENERATING GPS-SPECIFIED ANTI-FIRE (AF) SPRAY PROTECTION MAPS AND TASK REPORTS.

C: PROVIDING AN AF LIQUID SPRAY SYSTEM TO A GPS-SPECIFIED LOCATION FOR SPRAYING ONE OR MORE GPS-SPECIFIED PARCELS OF PRIVATE PROPERTY WITH AF CHEMICAL LIQUID SPRAY.

D: PROVIDING A SUPPLY OF AF CHEMICAL LIQUID SPRAY TO THE REGISTERED GPS-SPECIFIED LOCATION OF THE AF LIQUID SPRAY SYSTEM

E: FILLING THE AF LIQUID SPRAY SYSTEM WITH THE PROVIDED SUPPLY OF AF CHEMICAL LIQUID

FIG. 21A

F: BASED ON THE GPS-SPECIFIED ANTI-FIRE (AF) SPRAY PROTECTION MAPS AND TASK REPORTS THE SYSTEM ISSUING ORDERS TO THE PRIVATE PROPERTY OWNER OVER AN ELECTRONIC MESSAGING SYSTEM, TO APPLY AF CHEMICAL LIQUID SPRAY ON THE PRIVATE PROPERTY USING THE AF LIQUID SPRAY SYSTEM PRIOR TO THE PRESENCE OF WILD FIRE IN THE REGION.

G: THE PRIVATE PROPERTY OWNER EXECUTING THE ORDER AND APPLYING AF CHEMICAL LIQUID SPRAY ON THE PRIVATE PROPERTY USING THE AF LIQUID SPRAY SYSTEM, AND THE SYSTEM REMOTELY MONITORING THE CONSUMPTION AND APPLICATION OF AF CHEMICAL LIQUID AT THE PRIVATE PROPERTY ON A GIVEN DATE AND DATE AND AUTOMATICALLY RECORDING THE TRANSACTION IN THE NETWORK DATABASE.

H: THE SYSTEM UPDATING RECORDS IN THE NETWORK DATABASE ASSOCIATED WITH EACH APPLICATION OF AF CHEMICAL LIQUID SPRAY ON A REGISTERED PARCEL OF PRIVATE PROPERTY.

I: THE SYSTEM SCHEDULING THE NEXT APPLICATION OF AF CHEMICAL LIQUID SPRAY ON THE PARCELS OF PRIVATE PROPERTY, FACTORING WEATHER CONDITIONS, WEAR AND TIME.

J: THE SYSTEM ISSUING ANOTHER ORDER TO THE GPS-SPECIFIED PARCELS OF PRIVATE PROPERTY TO RE-APPLY AF CHEMICAL LIQUID SPRAY THEREON TO MAINTAIN ACTIVE FIRE PROTECTION.

FIG. 21B

K: THE PROPERTY OWNER EXECUTING THE ORDER TO REAPPLY AF CHEMICAL LIQUID SPRAY ON THE PARCELS OF PRIVATE PROPERTY USING THE AF LIQUID SPRAY SYSTEM, AND THE SYSTEM REMOTELY MONITORING THE APPLICATION OF AF CHEMICAL LIQUID AT THE PRIVATE PROPERTY ON A GIVEN TIME AND DATE, AND RECORDING THIS TRANSACTION IN THE NETWORK DATABASE.

L: THE SYSTEM UPDATING RECORDS ON AF CHEMICAL LIQUID SPRAY APPLICATION IN THE NETWORK DATABASE, CONCERNING REAPPLICATION OF AF CHEMICAL LIQUID ON THE PARCELS OF PRIVATE PROPERTY.

M: THE SYSTEM SCHEDULING THE NEXT APPLICATION OF AF LIQUID SPRAY ON THE PARCELS OF PRIVATE PROPERTY, FACTORING WEATHER CONDITIONS AND THE PASSAGE OF TIME, AND UPDATING THE NETWORK DATABASE.

FIG. 21C

METHOD OF REDUCING THE RISKS OF DAMAGE TO PUBLIC PROPERTY DUE TO WILD FIRES BY GPS-CONTROLLED APPLICATION OF ANTI-FIRE (AF) LIQUID SPRAY

A: REGISTERING WITH A NETWORK DATABASE, EACH GPS-SPECIFIED PARCEL OF PUBLIC REAL PROPERTY IN A SPECIFIED COUNTY AND STATE, WHICH MAY OR MAY NOT HAVE BUILDINGS CONSTRUCTED THEREON, AND IDENTIFYING THE OWNER AND TENANTS, ALL PETS, VEHICLES AND WATERCRAFTS ASSOCIATED WITH THE REGISTERED PARCEL OF PUBLIC PROPERTY.

B: COLLECTING INTELLIGENCE RELATING TO THE COUNTY, RISKS OF WILD FIRES IN THE SURROUNDING REGION, AND HISTORICAL DATA MAINTAINED IN THE NETWORK DATABASE, AND GENERATING ANTI-FIRE (AF) SPRAY PROTECTION MAPS AND TASK REPORTS FOR EXECUTION

C: PROVIDING AN AF LIQUID SPRAY SYSTEM TO A GPS-SPECIFIED LOCATION FOR SPRAYING ONE OR MORE GPS-SPECIFIED PARCELS OF PUBLIC PROPERTY WITH AF CHEMICAL LIQUID SPRAY.

D: PROVIDING A SUPPLY OF AF LIQUID SPRAY TO THE GPS-SPECIFIED LOCATION OF THE AF LIQUID SPRAY SYSTEM

E: FILLING THE AF LIQUID SPRAY SYSTEM WITH THE PROVIDED SUPPLY OF AF LIQUID

FIG. 23A

F: BASED ON GPS-SPECIFIED ANTI-FIRE (AF) SPRAY PROTECTION MAPS AND TASK REPORTS, THE SYSTEM ISSUING ORDERS TO THE PUBLIC PROPERTY OWNER, OR ITS CONTRACTOR, TO APPLY AF LIQUID SPRAY ON THE PROPERTY PARCELS USING THE AF LIQUID SPRAY SYSTEM.

G: THE PUBLIC PROPERTY OWNER EXECUTING THE ORDER AND APPLYING AF CHEMICAL LIQUID SPRAY ON THE PUBLIC PROPERTY USING THE AF LIQUID SPRAY SYSTEM, AND THE SYSTEM REMOTELY MONITORING THE CONSUMPTION AND APPLICATION OF AF CHEMICAL LIQUID AT THE PUBLIC PROPERTY ON A GIVEN DATE AND TIME, AND AUTOMATICALLY RECORDING THE TRANSACTION IN THE NETWORK DATABASE.

H: THE SYSTEM UPDATING RECORDS IN THE NETWORK DATABASE ASSOCIATED WITH EACH APPLICATION OF AF CHEMICAL LIQUID SPRAY ON GPS-SPECIFIED PARCELS OF PUBLIC PROPERTY.

I: THE SYSTEM SCHEDULING THE NEXT APPLICATION OF AF LIQUID SPRAY ON THE PARCELS OF PUBLIC PROPERTY, FACTORING WEATHER CONDITIONS AND THE PASSAGE OF TIME.

J: THE SYSTEM ISSUING ANOTHER ORDER TO THE GPS-SPECIFIED PARCELS OF PUBLIC PROPERTY TO RE-APPLY AF LIQUID SPRAY THEREON TO MAINTAIN ACTIVE FIRE PROTECTION.

FIG. 23B

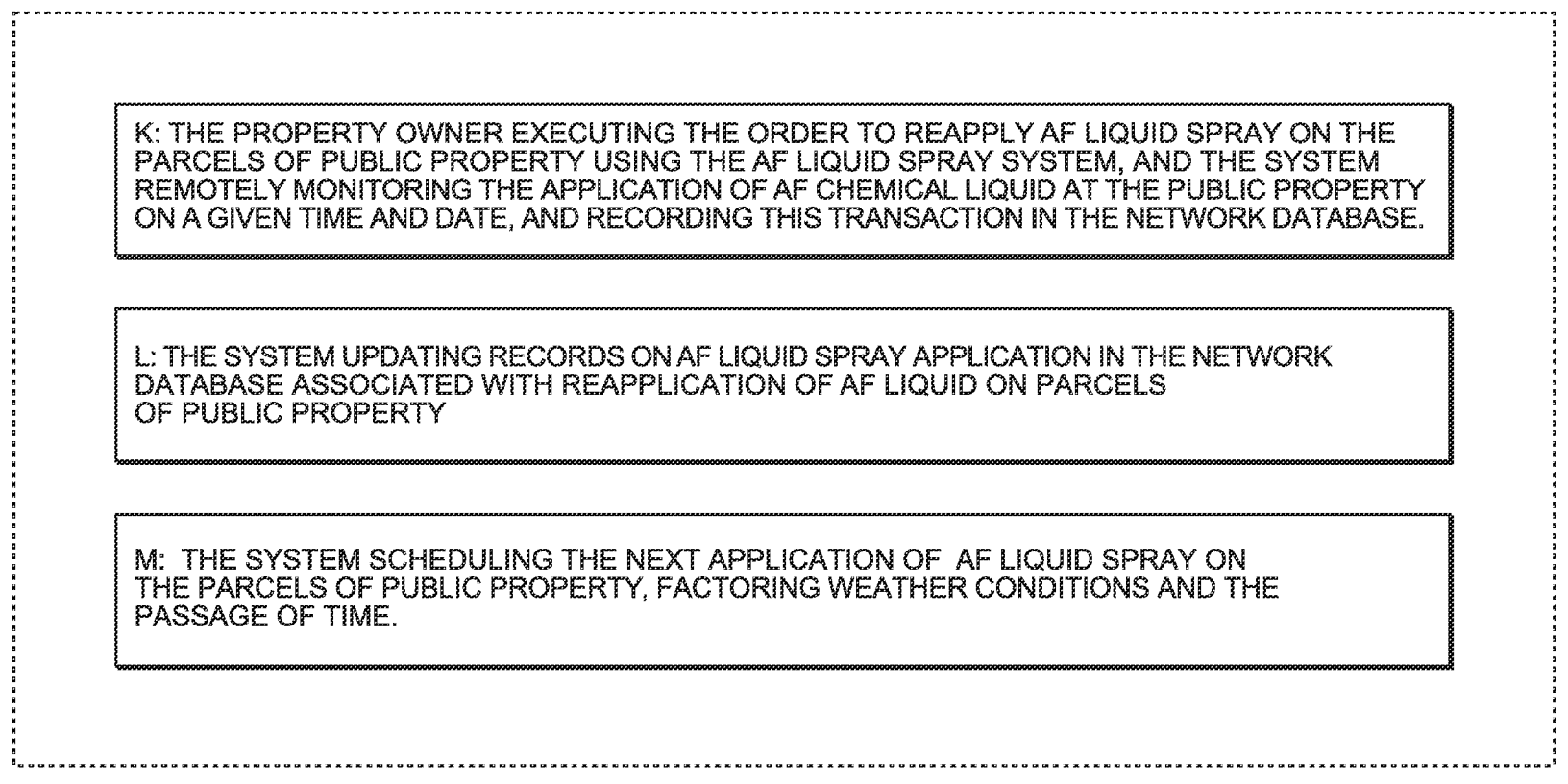

K: THE PROPERTY OWNER EXECUTING THE ORDER TO REAPPLY AF LIQUID SPRAY ON THE PARCELS OF PUBLIC PROPERTY USING THE A

METHOD OF REMOTELY MANAGING THE GPS-CONTROLLED APPLICATION OF ANTI-FIRE (AF) LIQUID SPRAY TO GROUND COVER AND BUILDINGS SO AS TO REDUCE THE RISKS OF DAMAGE DUE TO WILD FIRES

A: REGISTERING WITH A NETWORK DATABASE, EACH GPS-SPECIFIED PARCEL OF REAL PROPERTY IN A SPECIFIED COUNTY AND STATE, WHICH MAY OR MAY NOT HAVE BUILDINGS CONSTRUCTED THEREON, AND IDENTIFYING THE OWNER AND TENANTS, AS WELL AS ALL PETS, VEHICLES AND WATERCRAFTS ASSOCIATED WITH THE GPS-SPECIFIED PARCELS OF REAL PROPERTY.

B: COLLECTING INTELLIGENCE RELATING TO THE COUNTY, RISKS OF WILD FIRES IN THE SURROUNDING REGION, AND HISTORICAL DATA MAINTAINED IN THE NETWORK DATABASE, AND GENERATING GPS-SPECIFIED ANTI-FIRE (AF) SPRAY PROTECTION MAPS AND TASK REPORTS.

C: PROVIDING AN AF LIQUID SPRAY SYSTEM TO A GPS-SPECIFIED LOCATION FOR SPRAYING GPS-SPECIFIED PARCELS OF REAL PROPERTY WITH AF LIQUID SPRAY.

D: PROVIDING A SUPPLY OF AF CHEMICAL LIQUID SPRAY TO THE GPS-SPECIFIED LOCATION OF THE AF LIQUID SPRAY SYSTEM

E: FILLING THE AF LIQUID SPRAY SYSTEM WITH THE PROVIDED SUPPLY OF AF LIQUID

FIG. 25A

F: PRIOR TO THE ARRIVAL OF A WILD FIRE TO THE REGION, AND BASED ON THE GPS-SPECIFIED ANTI-FIRE (AF) SPRAY PROTECTION MAPS AND TASK REPORTS, THE SYSTEM ISSUING A REQUEST TO THE PROPERTY OWNER, OR REGISTERED CONTRACTOR, TO APPLY AF CHEMICAL LIQUID SPRAY ON THE GPS-SPECIFIED PARCELS OF PROPERTY USING THE AF LIQUID SPRAY SYSTEM.

G: IN RESPONSE TO THE ISSUED REQUEST, THE PROPERTY OWNER OR CONTRACTOR THEREOF APPLYING AF LIQUID SPRAY ON THE REAL PROPERTY USING THE AF LIQUID SPRAY SYSTEM, AND THE SYSTEM REMOTELY MONITORING THE CONSUMPTION AND APPLICATION OF THE AF CHEMICAL LIQUID ON THE PROPERTY ON A GIVEN DATE AND TIME, AND AUTOMATICALLY RECORDING THE TRANSACTION IN THE NETWORK DATABASE.

H: THE SYSTEM UPDATING RECORDS IN THE NETWORK DATABASE ASSOCIATED WITH EACH APPLICATION OF AF CHEMICAL LIQUID SPRAY ON A GPS-SPECIFIED PARCEL OF REAL PROPERTY.

FIG. 25B

METHOD OF QUALIFYING REAL PROPERTY FOR REDUCED CAUSALITY INSURANCE BASED ON VERIFIED SPRAY-BASED CLEAN ANTI-FIRE (AF) CHEMICAL LIQUID TREATMENT PRIOR TO PRESENCE OF WILD FIRES

A: PERIODICALLY SPRAYING A CLEAN ANTI-FIRE (AF) CHEMICAL LIQUID OVER THE EXTERIOR SURFACES OF A WOOD-FRAMED BUILDING AND ITS SURROUNDING REAL PROPERTY TO PROVIDE CLASS-A FIRE-PROTECTION

B: VERIFYING AND DOCUMENTING THE SPRAY-BASED CLASS-A FIRE PROTECTION TREATMENT USING SPRAY FIRE-PROTECTION TREATMENT DATA, INCLUDING GPS-COORDINATES AND TIME/DATE STAMPING DATA GENERATED BY THE GPS-TRACKED AF-LIQUID SPRAY SYSTEM DEPLOYED ON THE SYSTEM NETWORK.

C: WIRELESSLY TRANSMITTING THE SPRAY FIRE-PROTECTION TREATMENT DATA TO A CENTRAL NETWORK DATABASE ON THE SYSTEM NETWORK TO UPDATE THE CENTRAL NETWORK DATABASE ON THE SYSTEM NETWORK.

D: A COMPANY UNDERWRITING CAUSALITY INSURANCE FOR THE WOOD-FRAMED BUILDING ACCESSING THE CENTRAL NETWORK DATABASE ON THE SYSTEM NETWORK, TO VERIFY THE DATABASE RECORDS MAINTAINED FOR EACH SPRAY-BASED CLASS-A FIRE PROTECTION TREATMENT RELATING TO THE WOOD-FRAMED BUILDING, TO QUALIFY THE PROPERTY/BUILDING OWNER FOR LOWER CAUSALITY INSURANCE PREMIUMS, BASED ON THE VERIFIED CLASS-A FIRE-PROTECTION STATUS OF THE SPRAYED PROPERTY/BUILDING.

E: UPON THE OUTBREAK OF A WILD FIRE ABOUT THE INSURED WOOD-FRAMED BUILDING/PROPERTY, THE LOCAL FIRE DEPARTMENTS INSTANTLY AND REMOTELY ASSESSING THE CENTRAL NETWORK DATABASE, SO AS TO DETERMINE CLASS-A FIRE-PROTECTED STATUS OF THE WOOD-FRAMED BUILDING BY VIRTUE OF TIMELY CLEAN ANTI-FIRE (AF) CHEMICAL LIQUID APPLICATION ON THE PROPERTY, AND ADVISE FIREMAN FIGHTING AND MANAGING WILD FIRES THAT THE PROPERTY HAS BEEN PROPERLY DEFENDED AGAINST WILD FIRE.

FIG. 26

METHOD OF MANAGING THE PROACTIVE SPRAYING OF ENVIRONMENT ALLY-CLEAN ANTI-FIRE CHEMICAL LIQUID ON GPS-SPECIFIED PROPERTY SURFACES SO AS TO INHIBIT FIRE IGNITION AND FLAME SPREAD IN THE PRESENCE OF WILD FIRE

RELATED CASES

The present patent application is a Continuation of application Ser. No. 16/805,811 filed Mar. 1, 2020, which is a Continuation of U.S. patent application Ser. No. 15/866,451 filed Jan. 9, 2018, now U.S. Pat. No. 10,653,904, which is a Continuation-in-Part (CIP) of application Ser. No. 15/829,914 filed Dec. 2, 2017, now U.S. Pat. No. 10,260,232, incorporated herein by reference as if fully set forth herein.

BACKGROUND OF INVENTION

Field of Invention

The present invention is directed towards improvements in science and technology applied in the defense of private and public property, and human and animal life, against the ravaging and destructive forces of wild fires caused by lightning, accident, arson and terrorism.

Brief Description of the State of Knowledge in the Art

The US federal government spent more than 3 billion US dollars on wild fire defense this year only to lose record numbers of acreage and homes. These figures relate solely to the US Forest Service costs and do not include figures from federal, state or local firefighting agencies. Over 8 million acres were scorched in 2017, a 50% increase in what is normally burned. Some estimates of the property damage in Northern California fires alone is $3 billion. The fires also killed more than 40 people and destroyed 8000 structures. Governor Brown of California is now asking President Trump for $7.5 billion dollars to rebuild Santa Rosa. However, the real problem is that the conventional fire suppression methods are not working as needed to protect neighborhoods, homes, business and human life from the raging forces of wild fire. More money is being spent and more people are being deployed, but the benefits are not being realized. There is a great need for better methods and apparatus for suppressing wild fires FIG. 1 provides a table listing the primary conventional methods used for fighting and defending against wild fires and forest fires, alike: aerial water dropping illustrated in FIG. 2A; aerial fire retardant chemical (e.g. Phos-Chek® Fire Retardant) dropping illustrated in FIGS. 2B1, 2B2 and 2B3; physical fire break by bulldozing, to stall the advance of wild fire; physical fire break by pre-burning, to stall the advance of wild fire; and chemical fire break by dropping fire retardant chemical such as Phos-Chek® chemical over land, to stall the advance of wild fire. While these methods are used, the results have not been adequate in most instances where wild fires are raging across land under strong winds.

Recently, the State of California deployed its CAL FIRE™ mobile application for smartphones and other mobile computing devices, to provide users with notifications on where wild fires are burning at a given moment in time, the risks of wild fire in certain regions, ways of preparing for wild fires, and other useful information to help people stay out of harm's way during a wild fire. However, this notification system in its current state does little to help home and business owners to proactively defend their homes and business against raging forces of wild fires in any meaningful way.

Clearly, there is a great need and growing demand for new and improved methods of and apparatus for providing improved defense and protection against wild fires, while overcoming the shortcomings and drawbacks of prior art methods and apparatus.

OBJECTS AND SUMMARY OF THE PRESENT INVENTION

Accordingly, a primary object of the present is to provide new and improved method of and system and network for managing the supply, delivery and spray-application of environmentally-clean anti-fire (AF) liquid material on private and public properties to reduce the risks of damage and/or destruction to property and life caused by wild fires, while overcoming the shortcomings and drawbacks of prior art methods and apparatus.

Another object of the present is to provide method of reducing the risks of damage to private property due to wild fires by centrally managed application of AF chemical liquid spray to ground cover and building surfaces prior to arrival of the wild fires.

Another object of the present is to provide method of reducing the risks of damage to private property due to wild fires using a global positioning satellite (GPS) system and mobile communication messaging techniques, to help direct the application of AF chemical liquid prior to the arrival of wild wires.

Another object of the present invention is to provide a new and improved system for wild fire suppression and neighborhood and home defense comprising a platoon of small planes, all-terrain vehicles (ATVs) and other mobile systems adapted for spraying an environmentally-clean anti-fire (AF) chemical liquid that clings to the ground cover, and buildings, where applied in regions of high wild fire risk, that operates in both wet and dry states of application.

Another object of the present invention is to provide a new and improved system for wild fire suppression and home defense system comprising (i) a plurality of home wild-fire defense systems assigned to each home or building in the strategic area, for spraying the outside of their homes and surrounding ground cover with the environmentally-clean anti-fire (AF) spray liquid, (ii) a command center for managing wild fire pre-defense operations in the region, involving the application of the environmentally-clean anti-fire (AF) spray liquid to create and maintain strategic fire breaks in the region in advance of the outbreak of wild fires, and protection of homes and property in the region against wild fires breaking out in the region, and sending messages and instructions to home owners in the region as well as operators of the small planes and ATVs deployed in the system, and (iii) a mobile application installed on the mobile phone of each home owner in the strategic region, and configured for receiving email and/or SMS messages from a command center managing the system, and instructing home owners to pre-defend their homes using the environmentally-clean anti-fire spray liquid.

Another object of the present invention is to provide a new and improved system for wild fire suppression and home defense system, wherein each home defense spray system includes a GPS-tracking and radio-controlled circuit board to remotely monitor the location of each location-deployed home defense spray system and automatically monitor the anti-fire chemical liquid level in its storage tank, and automatically generate electronic refill orders sent to the command center, so that a third-party service can automatically replenish the tanks of such home-based systems with anti-fire liquid when the fluid level falls below a certain level in the GPS-tracked tank.

Another object of the present invention is to provide a new and improved system for wild fire suppression and home defense system, wherein the mobile application supporting the following functions: (i) sends automatic notifications from the command center to home owners with the mobile application, instructing them to spray their property and home at certain times with anti-fire chemical liquid in their tanks; (ii) the system will automatically monitor consumption of sprayed AF chemical liquid and generate auto-replenish order via its onboard GSM-circuits so as to achieve compliance with the home spray-based wild-fire-defense program, and report anti-fire liquid levels in each home-owner tank; and (iii) show status of wild fire risk in the region, and actions to the taken before wild fire outbreak.

Another object of the present invention is to provide a GPS-guided method of suppressing a wild fire raging towards a target region of land in a direction determined by currently blowing winds and other environmental and weather factors.

Another object of the present invention is to provide a method of reducing the risks of damage to public property due to wild fires by managed application of AF chemical liquid spray to ground cover and building surfaces prior to arrival of the wild fires.

Another object of the present invention is to provide a wireless system for managing the supply, delivery and spray-application of environmentally-clean anti-fire (AF) liquid on private and public property to reduce the risks of damage and/or destruction caused by wild fires.

Another object of the present invention is to provide a new and improved system for spraying a defensive path around vulnerable neighborhoods out in front of wild fires to make sure that an environmentally-safe fire break, created by the spray application of anti-fire (AF) liquid, defends homes from the destructive forces of raging wild fires.

Another object of the present invention is to provide a new and improved system and method of mitigating the damaging effects of wild fires by spraying environmentally-clean anti-fire (AF) chemical liquid in advance of wild fires, that do not depend on water to extinguish fire, such that, even after a month or two after spray application on dry brush around the neighborhood, the anti-fire chemical continues to work by stalling the ability of a fire to advance and consume homes.

Another object of the present invention is to provide new and improved methods of and apparatus for protecting wood-framed buildings from wild fires by automatically spraying water-based environmentally clean anti-fire chemical liquid over the exterior surfaces of the building, surrounding ground surfaces, shrubs, decking and the like, prior to wild fires reaching such buildings.

Another object of the present invention is to provide new and improved method of suppressing a wild fire raging across a region of land in the direction of the prevailing winds, by forming a multi-stage anti-fire (AF) chemical fire-break system comprising the step of (a) applying, prior to the wild fire reaching the specified target region of land, a low-density anti-fire (AF) liquid mist in advance of the wild fire so as to form a fire stall region, while providing a non-treated region of sufficient size between the front of the wild fire approaching the target region of land and the fire stall region, and (b) also applying a high-density anti-fire (AF) liquid spray in advance of the wild fire to form a fire break region beyond and contiguous with said fire stall region, wherein the fire stall region is formed before the wild fire reaches the fire stall region, and operates to reduce the free-radical chemical reactions raging in the wild fire so as to reduce the destructive energy of the wild fire by the time the wild fire reaches the fire break region, and enabling the fire break region to operate and significantly break the free radical chemical reactions in the wild fire when the wild fire reaches the fire break region, and thereby suppress the wild fire and protect the target region of land.

Another object of the present invention is to provide a new and improved method of and system network qualifying real property for reduced property insurance based on verified spray-based clean anti-fire (AF) chemical liquid treatment prior to presence of wild fires.

These and other benefits and advantages to be gained by using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 2B1 is a second image illustrating a prior art method of wild fire suppression involving an airplane dropping chemical fire retardant (e.g. Phos-Chek®) on a wild fire from the sky;

FIG. 2B2 is third image showing a prior art ground-based tank containing the chemical fire retardant (e.g. Phos-Chek®) fire retardant chemical) that is shown being contained in a storage tank in FIG. 2B2, and dropped from an airplane in FIG. 2B1;

FIG. 2B3 is a fourth image showing a prior art ground-based tank containing a supply of Phos-Chek® fire retardant chemical mixed in the tank shown in FIG. 2B3, and dropped from an airplane in FIG. 2B1;

FIG. 4B is a perspective view of the OnyxStar Hyra-12 heavy lifter drone supporting MSI and HSI camera systems, and providing remove data sensing services that can be used to help carry out the GPS-directed methods of wild fire suppression disclosed herein in accordance with the principles of the present invention;

FIG. 6A is a perspective view of a mobile GPS-tracked anti-fire (AF) liquid spraying system supported on a set of wheels, with integrated supply tank and rechargeable-battery operated electric spray pump, for deployment at private and public properties having building structures, for spraying the same with environmentally-clean anti-fire (AF) liquid in accordance with the principles of the present invention;

FIG. 16 is an exemplary anti-fire spray protection task report generated by the system of the present invention for state/county xxx on 15 Dec. 2017, indicating which properties on what streets, in what town, county, state, requires the reapplication of AF chemical liquid spray treatment in view of factors such as weather (e.g. rainfall, sunlight) and passage of time since last AF chemical liquid spray application;

FIGS. 19A and 19B set forth a flow chart describing the high level steps of the method of suppressing a wild fire raging towards a target region of land in a direction determined by prevailing winds and other environmental and weather factors, as schematically illustrated in FIG. 18;

FIGS. 21A, 21B and 21C, taken together, set forth a flow chart describing the high level steps carried out by the method of reducing the risks of damage to private property due to wild fires by managed application of anti-fire (AF) liquid spray, using the system network and methods of the present invention;

FIGS. 23A, 23B and 23C, taken together, set forth a flow chart describing the high level steps carried out by the method of reducing the risks of damage to public property due to wild fires by GPS-controlled application of anti-fire (AF) liquid spray, using the system network and methods of the present invention;

FIGS. 25A and 25B, taken together, set forth a flow chart describing the high level steps carried out by the method of GPS-controlled application of anti-fire (AF) liquid spray to ground cover and buildings so as to reduce the risks of damage due to wild fires, using the system network and methods of the present invention; and FIG. 26 is a flow chart describing the primary steps of the method of qualifying real property for reduced property insurance, based on verified spray-based clean anti-fire (AF) chemical liquid treatment prior to presence of wild fires, using the system network and methods of the present invention.

DETAILED DESCRIPTION OF THE ILLUSTRATIVE EMBODIMENTS OF THE PRESENT INVENTION

Figure 1:
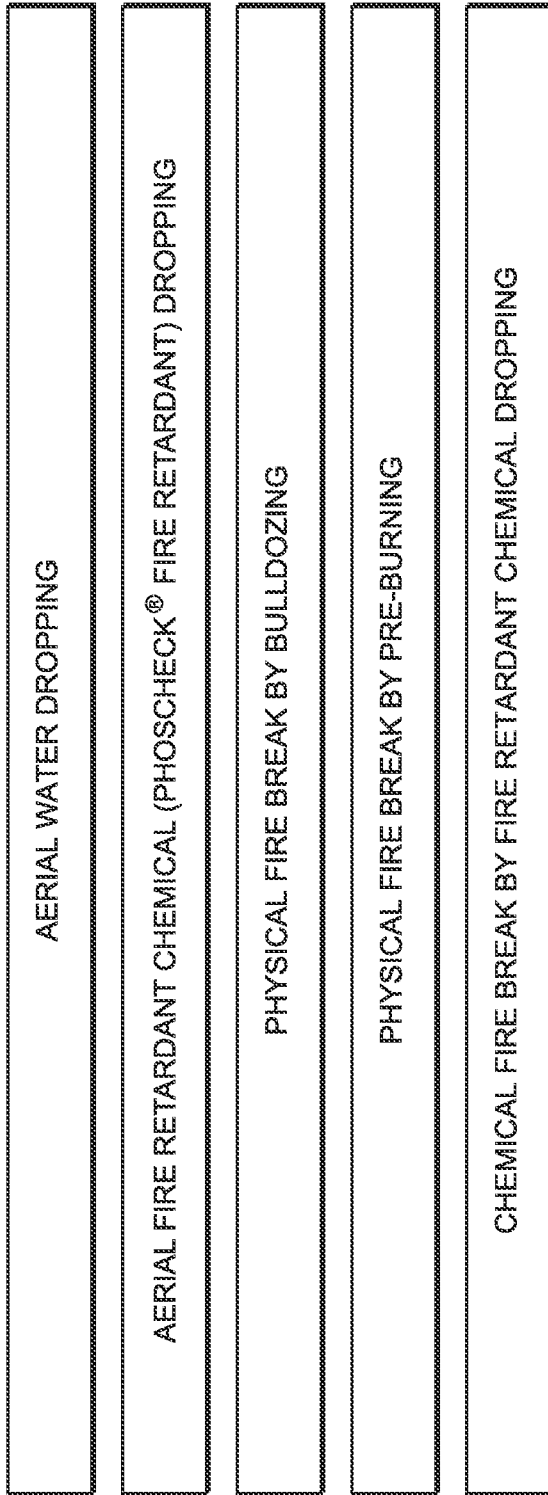
FIG. 1 is a table listing conventional prior art methods for fighting and defending against wild fires including (i) aerial water drop methods using airplanes and helicopters, (ii) aerial fire retardant chemical (e.g. Phos-Chek® Fire Retardant) drop using airplanes and helicopters, (iii) physical fire breaks formed by bulldozing land and other landscaping methods to remove combustible vegetation from the land, (iv) physical fire breaks by pre-burning combustible material on the land, and (v) chemical fire break by fire retardant chemical drop.
Figure 2A:
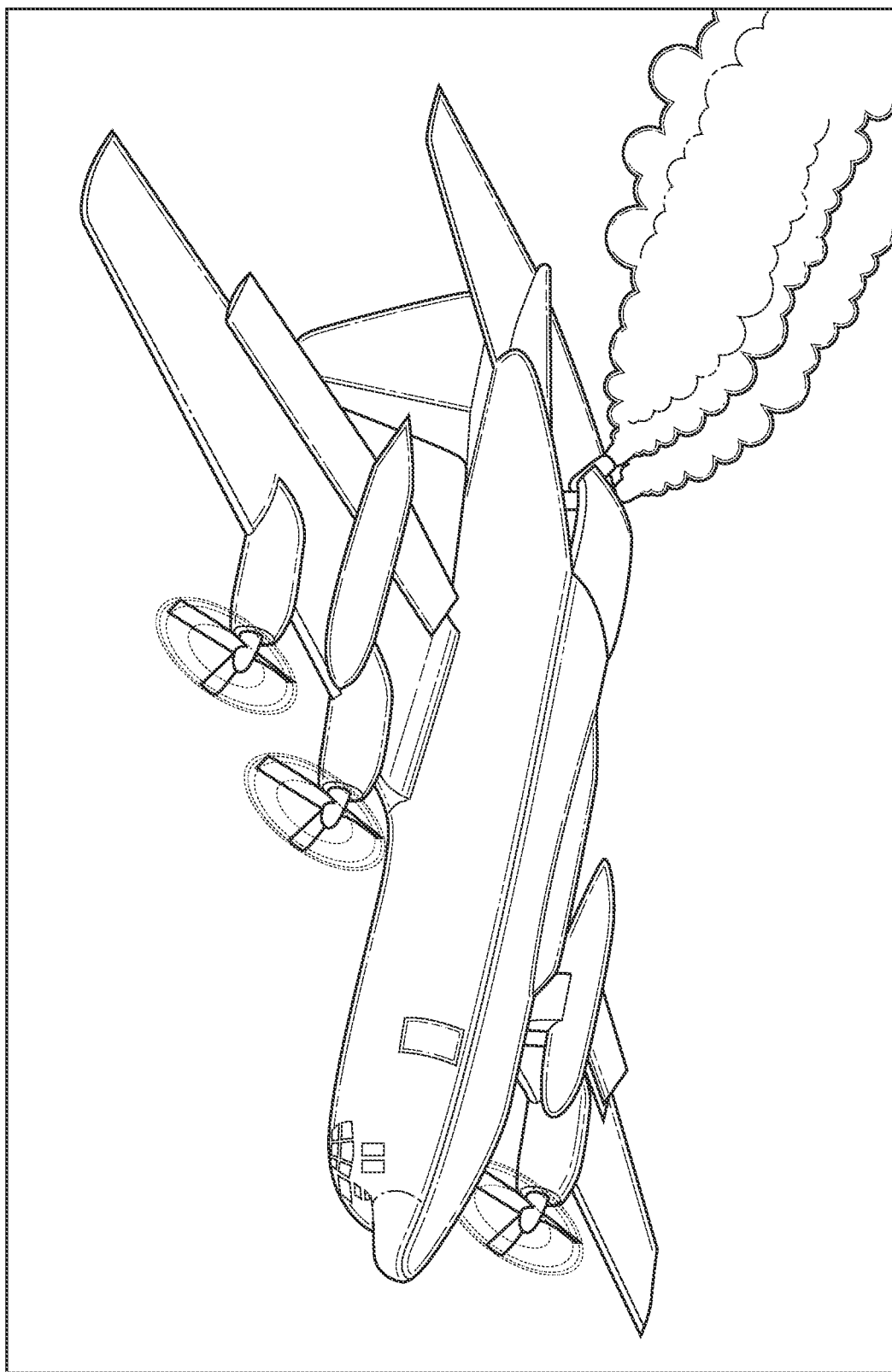
FIG. 2A is a first image illustrating a prior art method of wild fire suppression involving an airplane dropping water on a wild fire from the sky.
Figure 3B:
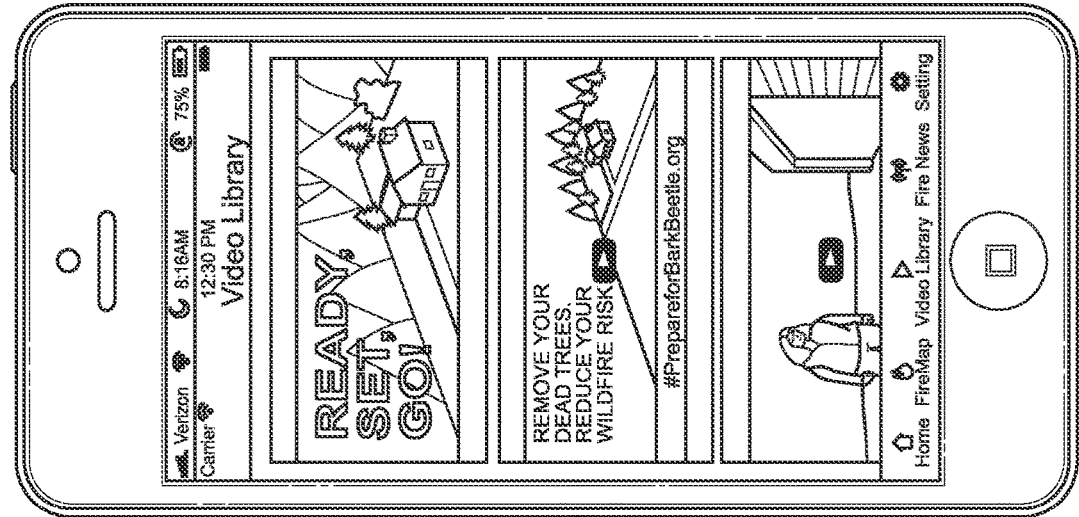
FIGS. 3A, 3B, 3C, 3D and 3E show some exemplary graphical user interfaces (GUI) screens supported by the prior art CAL FIRE™ mobile application running on an Apple iPhone™ device, or other mobile computing device, designed to help members of the public to prepare for wild fires.
Figure 3A:
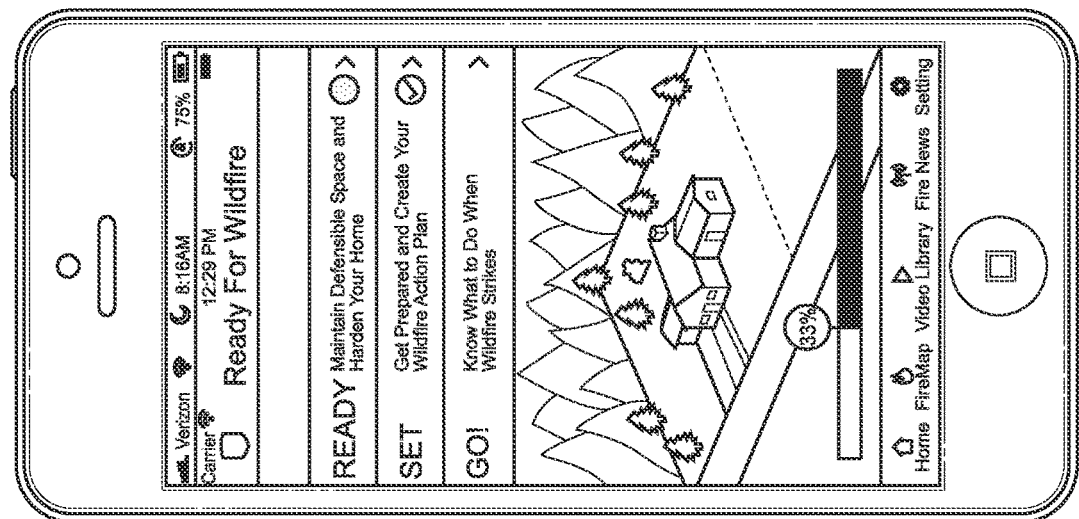
Figure 3E:
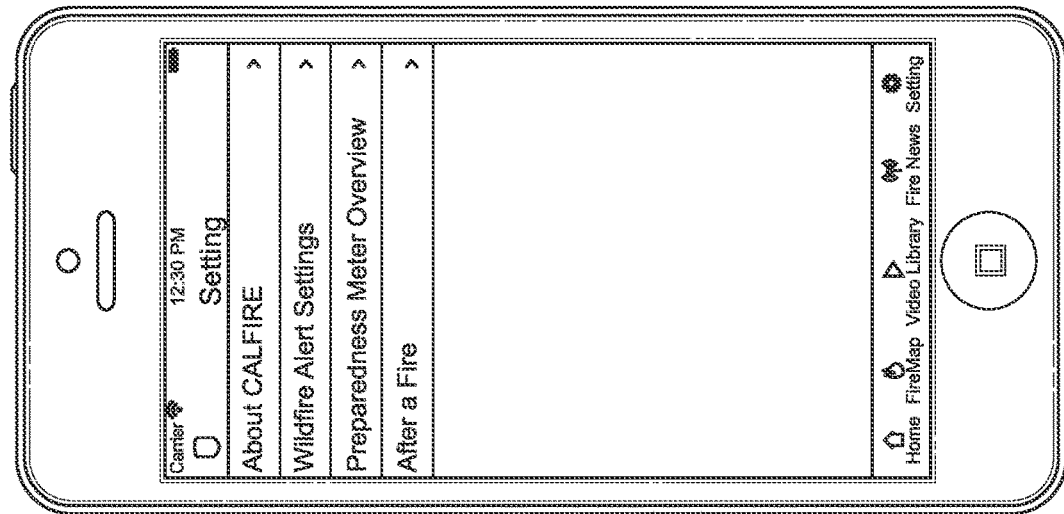
Figure 3D:
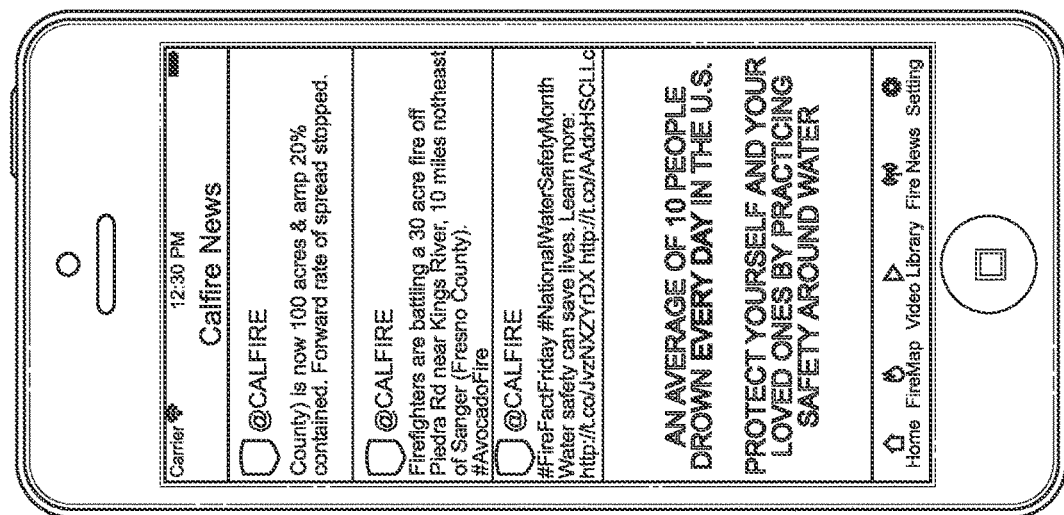
Figure 3C:
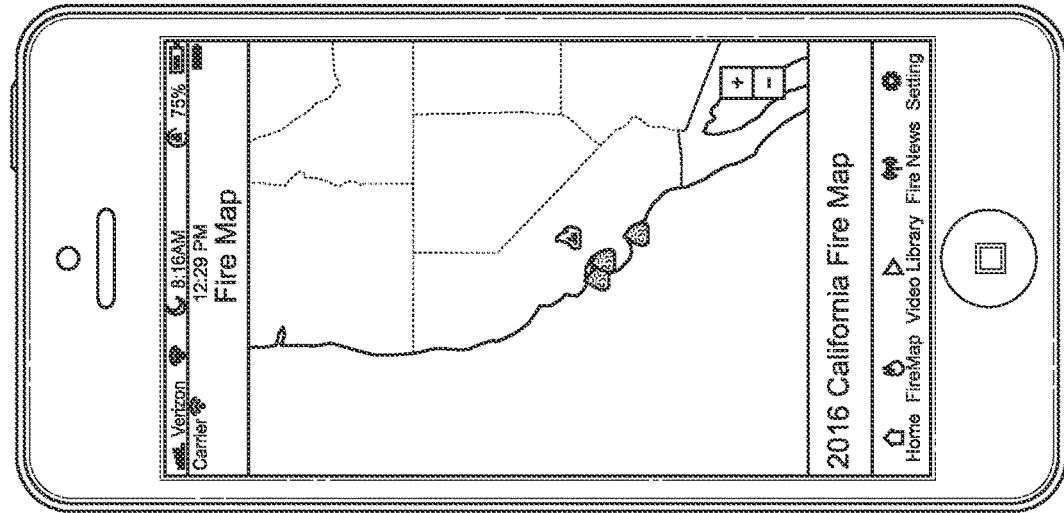
Figure 4:
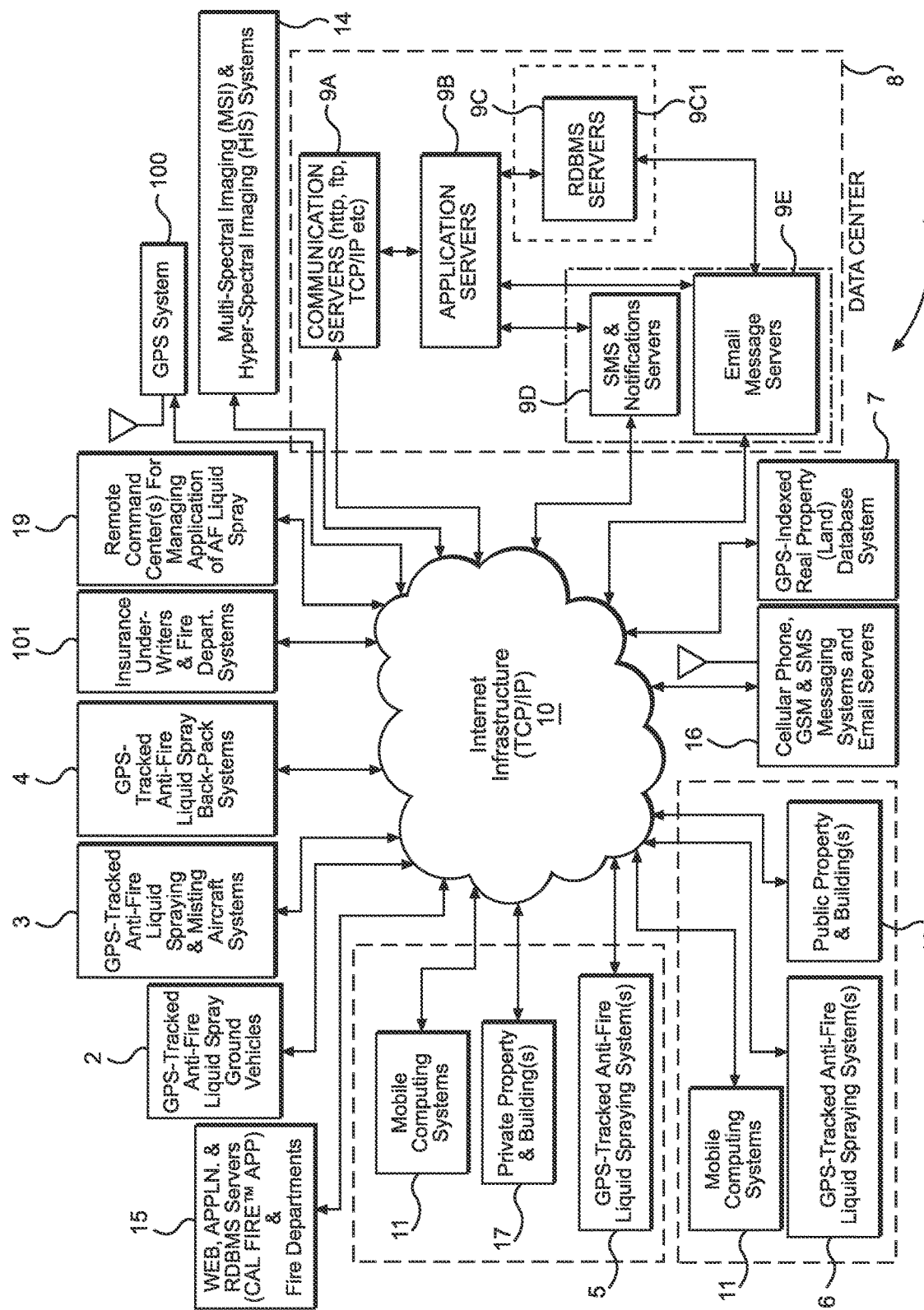
FIG. 4 is schematic representation of the wireless system network of the present invention designed for managing the supply, delivery and spray-application of environmentally-clean anti-fire (AF) liquid on private and public property to reduce the risks of property damage and/or destruction and harm to life caused by wild fires, and shown comprising GPS-tracked anti-fire (AF) liquid spray ground vehicles, GPS-tracked anti-fire liquid spray air vehicles, GPS-tracked anti-fire liquid spray backpack systems for spraying houses and surrounding properties, GPS-tracked anti-fire liquid spraying systems for spraying private real property and buildings, GPS-tracked liquid spraying systems for spraying public real property and buildings, mobile computing systems running the mobile application of the present invention and used by property owners, residents, fire departments, insurance underwriters, government officials, medical personal and others, remote data sensing and capturing systems for remotely monitoring land and wild fires wherever they may break out, a GPS system for providing GPS-location services to each and every system components in the system network, and one or more data center containing clusters of web, application and database servers for supporting wire wild alert and notification systems, and microservices configured for monitoring and managing the system and network of GPS-tracking anti-fire liquid spraying systems and mobile computing and communication devices configured in accordance with the principles of the present invention.
Figure 6B:
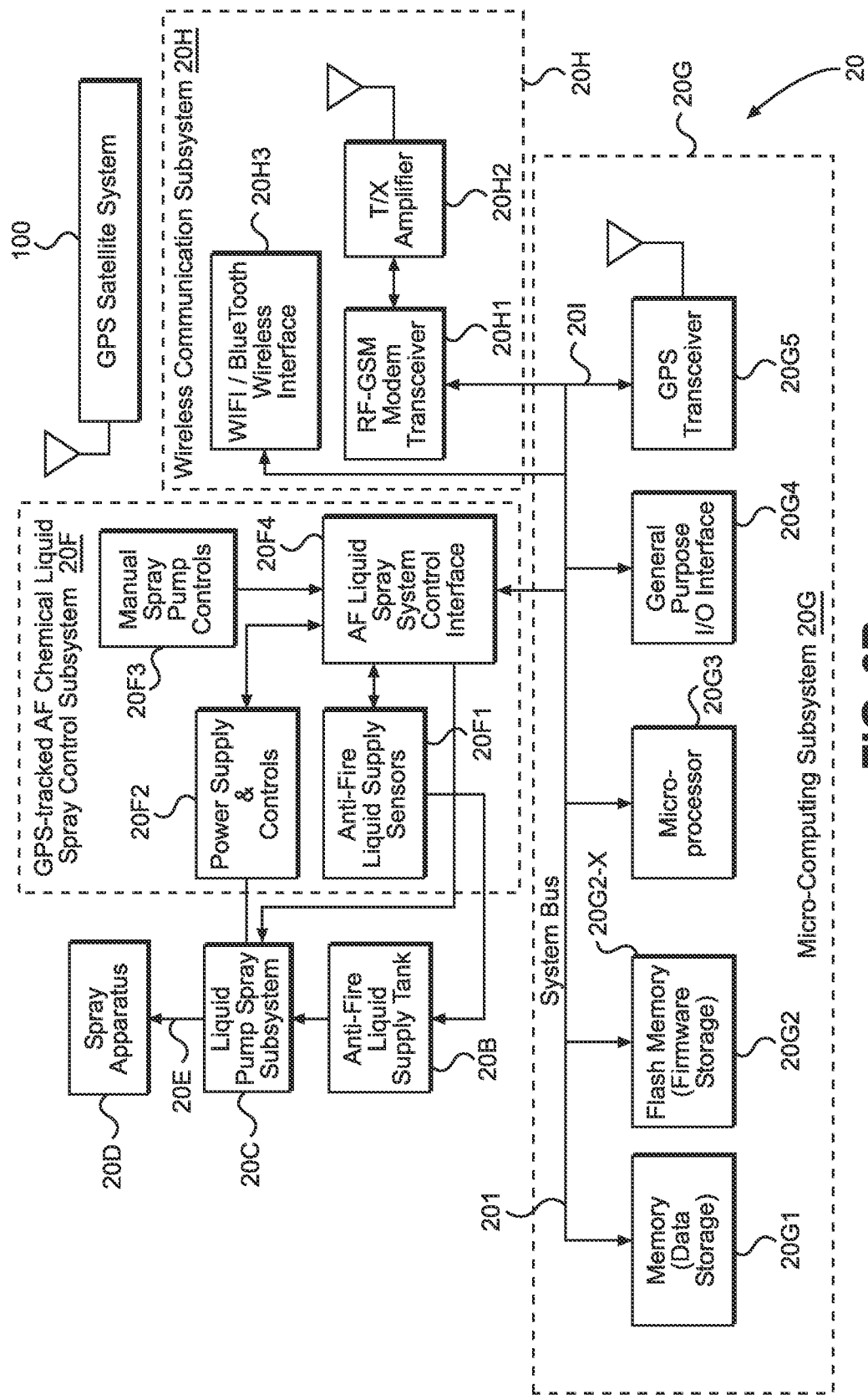
FIG. 6B is a schematic representation of the GPS-tracked mobile anti-fire (AF) chemical liquid spraying system shown in FIG. 6A, comprising a GPS-tracked and remotely-monitored AF chemical liquid spray control subsystem interfaced with a micro-computing platform for monitoring the spraying of AF chemical liquid from the system when located at specific GPS-indexed location coordinates, and automatically logging and recording such AF spray application operations within the network database system.

Referring to the accompanying Drawings, like structures and elements shown throughout the figures thereof shall be indicated with like reference numerals.
Wireless System Network for Managing the Supply, Delivery and Spray-Application of Environmentally-Clean Anti-Fire (AF) Liquid on Private and Public Property to Reduce the Risks of Damage and/or Destruction Caused by Wild Fires FIG. 4 shows the wireless system network of the present invention 1 designed for managing the supply, delivery and spray-application of environmentally-clean anti-fire (AF) liquid on private and public property to reduce the risks of damage and/or destruction caused by wild fires. As shown, the wireless system network 1 comprises a distribution of system components, namely: GPS-tracked anti-fire (AF) liquid spray ground vehicles 2 (e.g. all-terrain vehicles or ATVs) as shown in FIGS. 7A and 7B, and 10A and 10B, for applying AF chemical liquid spray (e.g. Hartindo AF31 fire inhibitor chemical from Hartindo Chemical, Indonesia) from the ground to ground surfaces, brush, and other forms of organic material; GPS-tracked anti-fire liquid spray air-based vehicles 3 as shown in FIGS. 9A, 9B, and 8A, 8B for applying AF chemical liquid spray (e.g. Hartindo AF31 fire inhibitor chemical liquid) from the air to ground surfaces, brush, bushes and other forms of organic material; GPS-tracked mobile anti-fire liquid spraying systems 4 (e.g. including wheel supported, and backpack-carried systems) as shown in FIGS. 6A and 6B for applying AF chemical liquid spray (e.g. Hartindo AF31 fire inhibitor chemical liquid) to ground surfaces, brush, bushes, decks, houses, buildings, and other forms of organic material and property surrounding houses; GPS-tracked/GSM-linked anti-fire liquid spraying systems 5 as shown in FIGS. 10A, 10B, 8A, 8B, and 7A, 7B for applying AF chemical liquid spray (e.g. Hartindo AF31 fire inhibitor chemical liquid) to private real property, buildings and surrounding areas; GPS-tracked/GSM-linked liquid spraying systems 6 as shown in FIGS. 10A, 10B, 8A, 8B, and 7A, 7B for applying AF chemical liquid spray (e.g. Hartindo AF31 fire inhibitor chemical liquid) to public real property and buildings and surrounding properties; a GPS-indexed real-property (land) database system 7 for storing the GPS coordinates of the vertices and maps of all land parcels, including private property and building 17 and public property and building 18, situated in every town, county and state in the region over which the system network 1 is used to manage wild fires as they may occur; a cellular phone, GSM, and SMS messaging systems and email servers, collectively 16; and one or more data centers 8 for monitoring and managing GPS-tracking/GSM-linked anti-fire (AF) liquid supply and spray systems, including web servers 9A, application servers 9B and database servers 9C (e.g. RDBMS) operably connected to the TCP/IP infrastructure of the Internet 10, and including a network database 9C1, for monitoring and managing the system and network of GPS-tracking anti-fire liquid spraying systems and various functions supported by the command center 19, including the management of wild fire suppression and the GPS-guided application of anti-fire (AF) chemical liquid over public and private property, as will be described in greater technical detail hereinafter. As shown, each data center 8 also includes an SMS server 9D and an email message server 9E for communicating with registered users on the system network 1 who use a mobile computing device (e.g. an Apple® iPhone or iPad tablet) 11 with the mobile application 12 installed thereon and configured for the purposes described herein. Such communication services will include SMS/text, email and push-notification services known in the mobile communications arts.

As shown in FIG. 4, the GPS-indexed real-property (land) database system 7 will store the GPS coordinates of the vertices and maps of all land parcels contained in every town, county and state of the region over which the system network is deployed and used to manage wild fires as they may occur. Typically, databases and data processing methods, equipment and services known in the GPS mapping art, will be used to construct and maintain such GPS-indexed databases 7 for use by the system network of the present invention, when managing GPS-controlled application of clean anti-fire (AF) chemical liquid spray and mist over GPS-specified parcels of land, at any given time and date, under the management of the system network of the present invention. Examples of such GPS-indexed maps of land parcels are reflected by the task report shown in FIG. 16, and examples of GPS-indexed maps are shown in the schematic illustrations depicted in FIGS. 18, 20, 22 and 24.

As shown in FIG. 4, the system network 1 also includes a GPS system 100 for transmitting GPS reference signals transmitted from a constellation of GPS satellites deployed in orbit around the Earth, to GPS transceivers installed aboard each GPS-tracking ground-based or air-based anti-fire (AF) liquid misting/spraying system of the present invention, shown in FIGS. 6A through 10B, as part of the illustrative embodiments. From the GPS signals it receives, each GPS transceiver aboard such AF liquid spraying/misting systems is capable of computing in real-time the GPS location of its host system, in terms of longitude and latitude. In the case of the Empire State Building in NYC, N.Y., its GPS location is specified as: N40° 44.9064', W073° 59.0735'; and in number only format, as: 40.748440, −73.984559, with the first number indicating latitude, and the second number representing longitude (the minus sign indicates "west").

As shown in FIG. 4, the system network 1 further includes multi-spectral imaging (MSI) systems and/or hyper-spectral-imaging (HSI) systems 14 for remotely data sensing and gathering data about wild fires and their progress. Such MSI and HSI systems may be space/satellite-based and/or drone-based (supported on an unmanned airborne vehicle or UAV). Drone-based systems can be remotely-controlled by a human operator, or guided under an artificial intelligence (AI) navigation system. Such AI-based navigation systems may be deployed anywhere, provided access is given to such remote navigation system the system network and its various systems. Typically, the flight time will be limited to under 1 hour using currently available battery technology, so there will be a need to provide provisions for recharging the batteries of such drones/UASs in the field, necessitating the presence of human field personnel to support the flight and remote data sensing and mapping missions of each such deployed drone, flying about raging wild fires, in connection with the system network of the present invention.

During each wild fire data sensing and mapping mission, carried out by such UAS, a series of MSI images and HSI images can be captured during a wild fire, and mapped to GPS-specific coordinates, and this mapped data can be transmitted back to the system network for storage, analysis and generation of GPS-specified flight plans for anti-fire (AF) chemical liquid spray and misting operations carried out using the methods illustrated in FIGS. 17, 18, 19A and 19B seeking to stall and suppress such wild fires, and mitigate risk of damage to property and harm to human and animal life.

Figure 4A:
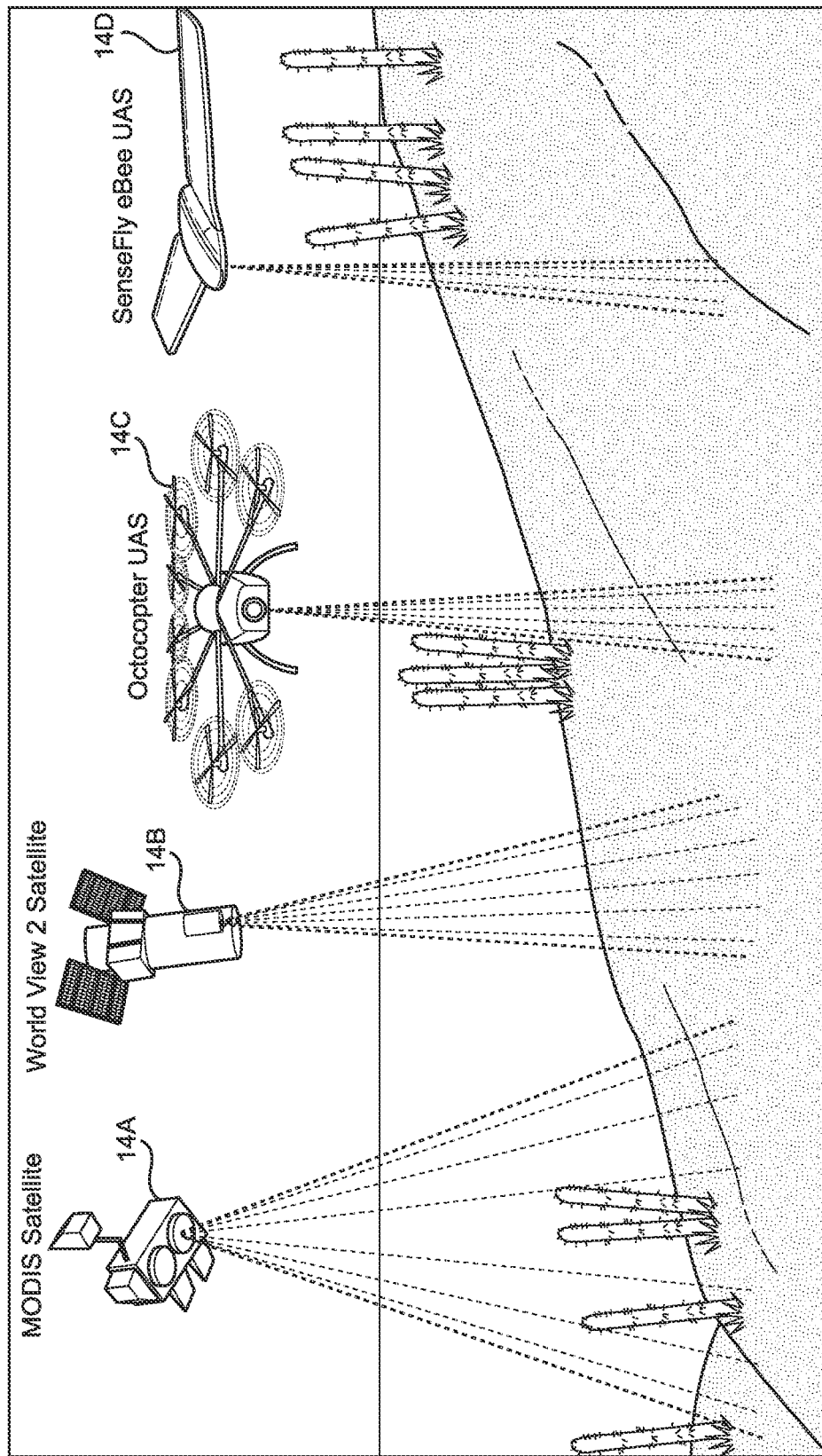
FIG. 4A is a schematic representation illustrating exemplary multispectral imaging (MSI) and hyperspectral imaging (HSI) based remote sensing technology platforms supported by the US Geological Survey (USGS) Agency including, for example, the MODIS (Moderate Resolution Imaging Spectroradiometer) satellite system, the World View 2 Satellite System, the Octocopter unmanned airborne system (UAS) (e.g. OnyxStar Hyra-12 heavy lifting drone), and the SenseFly eBee SQ UAS, for use in supporting and practicing the system network of the present invention.

FIG. 4A shows a suite of MSI and HSI remote sensing and mapping instruments and technology 14 that is currently being used by the US Geological Survey (USGS) Agency to collect, monitor, analyze, and provide science about natural resource conditions, issues, and problems on Earth. It is an object of the present invention to exploit such instruments and technology when carrying out and practicing the various methods of the present invention disclosed herein. As shown in FIG. 4A, these MSI/HSI remote sensing technologies 14 include: MODIS (Moderate Resolution Imaging Spectroradiometer) satellite system 14A for generating MODIS imagery subsets from MODIS direct readout data acquired by the USDA Forest Service Remote Sensing Applications Center, to produce satellite fire detection data maps and the like https://fsapps.nwcg.gov/afm/activefiremaps.php; the World View 2 Satellite System 14B manufacture from the Ball Aerospace & Technologies and operated by DigitalGlobe, for providing commercially available panchromatic (B/W) imagery of 0.46 meter resolution, and eight-band multi-spectral imagery with 1.84 meter resolution; Octocopter UAS (e.g. OnyxStar Hyra-12 heavy lifting drone) 14C as shown in FIG. 4B supporting MSI and HSI camera systems for spectral imaging applications, http://www.onyxstar.net and http://www.genidrone.com; and SenseFly eBee SQ UAS 14D for capturing and mapping high-resolution aerial multi-spectral images https://www.sensefly.com/drones/ebee-sq.html.

Any one or more of these types of remote data sensing and capture instruments, tools and technologies can be integrated into and used by the system network 1 for the purpose of (i) determining GPS-specified flight/navigation plans for GPS-tracked anti-fire (AF) chemical liquid spraying and misting aircraft and ground-based vehicle systems, respectively, shown in FIGS. 9A, 9B, 8A, 8B, 10A, 10B, and 7A, 7B, and (ii) practicing the various GPS-guided methods of wild fire suppression illustrated in FIGS. 17 through 25B, and described in detail herein.

Specification of the Network Architecture of the System Network of the Present Invention FIG. 4 illustrates the network architecture of the system network 1 implemented as a stand-alone platform deployed on the Internet. As shown, the Internet-based system network comprises: cellular phone and SMS messaging systems and email servers 16 operably connected to the TCP/IP infrastructure of the Internet 10; a network of mobile computing systems 11 running enterprise-level mobile application software 12, operably connected to the TCP/IP infrastructure of the Internet 10; an array of mobile GPS-tracked anti-fire (AF) liquid spraying systems (20, 30, 40, 50), each provided with GPS-tracking and having wireless internet connectivity with the TCP/IP infrastructure of the Internet 10, using various communication technologies (e.g. GSM, BlueTooth, WIFI, and other wireless networking protocols well known in the wireless communications arts); and one or more industrial-strength data center(s) 8, preferably mirrored with each other and running Border Gateway Protocol (BGP) between its router gateways, and operably connected to the TCP/IP infrastructure of the Internet 10.

As shown in FIG. 4, each data center 8 comprises: the cluster of communication servers 9A for supporting http and other TCP/IP based communication protocols on the Internet (and hosting Web sites); a cluster of application servers 9B; the cluster of RDBMS servers 9C configured within a distributed file storage and retrieval ecosystem/system, and interfaced around the TCP/IP infrastructure of the Internet well known in the art; the SMS gateway server 9D supporting integrated email and SMS messaging, handling and processing services that enable flexible messaging across the system network, supporting push notifications; and the cluster of email processing servers 9E.

Referring to FIG. 4, the cluster of communication servers 9A is accessed by web-enabled mobile computing clients 11 (e.g. smart phones, wireless tablet computers, desktop computers, computer workstations, etc.) used by many stakeholders accessing services supported by the system network 1. The cluster of application servers 9A implement many core and compositional object-oriented software modules supporting the system network 1. Typically, the cluster of RDBMS servers 9C use SQL to query and manage datasets residing in its distributed data storage environment, although non-relational data storage methods and technologies such as Apache's Hadoop non-relational distributed data storage system may be used as well.

Figure 12:
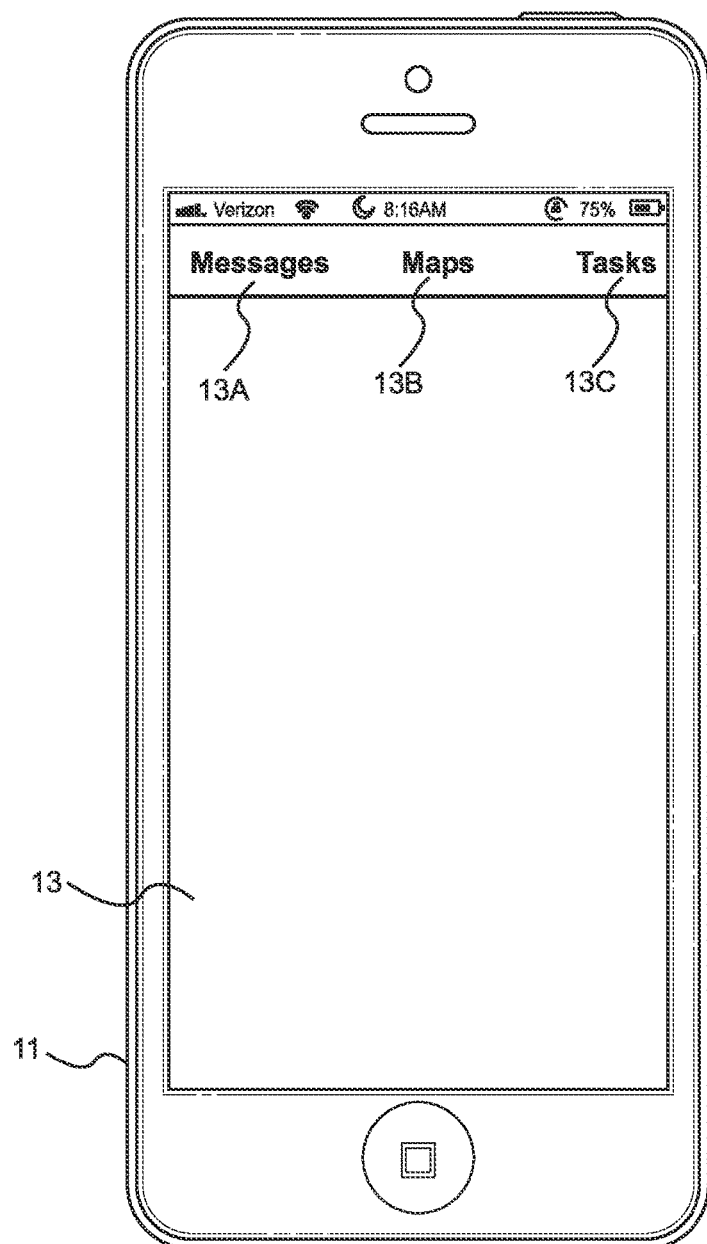
FIG. 12 is an exemplary wire-frame model of a graphical user interface supported by mobile application configured for use by a first specific class of registered users (e.g. property parcel owners, contractors and/or agents, residents, government officials, and others) to request and receive services, including notices and orders, supported by the system network of the present invention.
Figure 13:
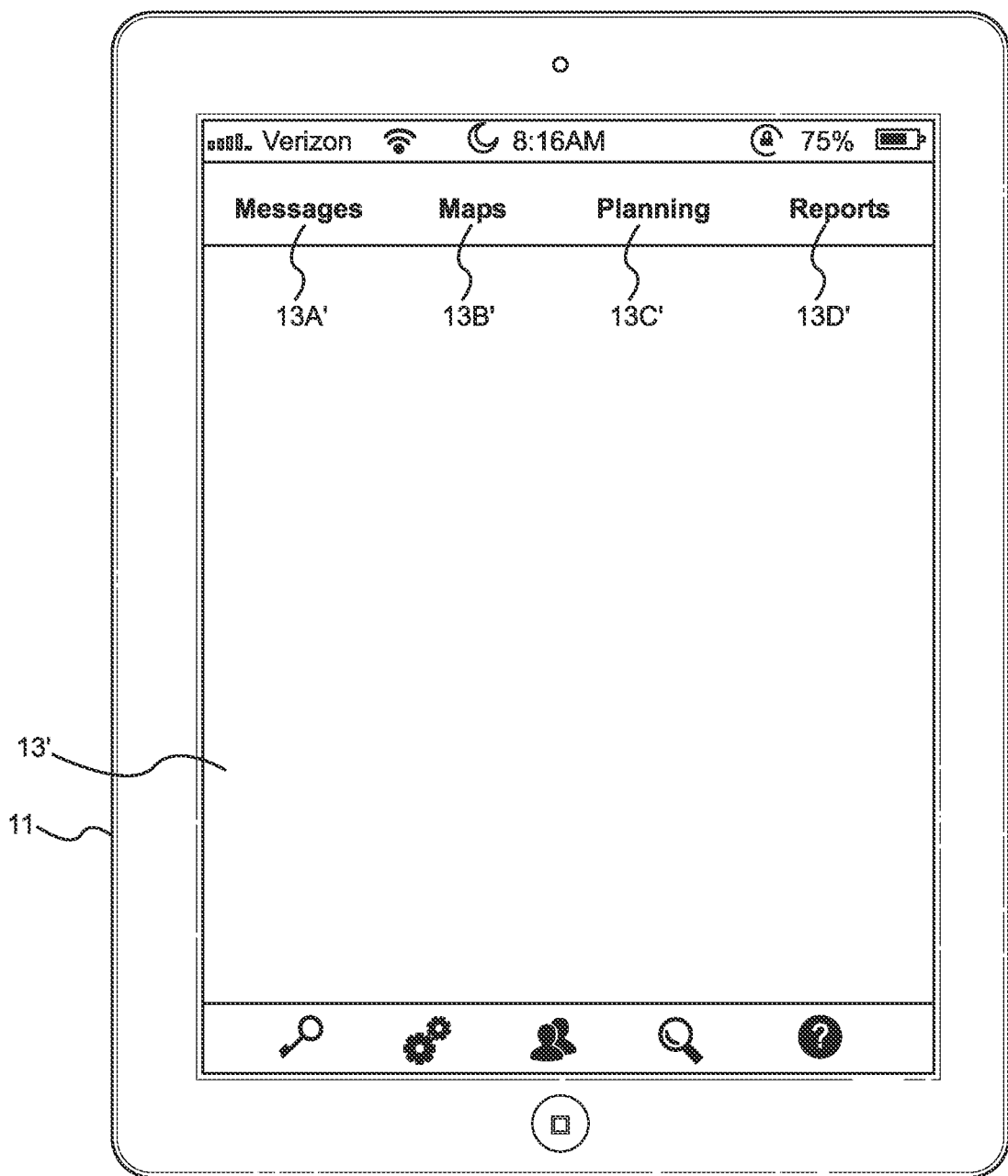
FIG. 13 is an exemplary wire-frame model of a graphical user interface supported by the mobile application configured for second specific class of registered users, namely, command center administrators, enabling such users to issue wild-fire protection orders, plan wild-fire protection tasks, generate wild-fire and protection reports, and send and receive messages to users on the system network.
Figure 13A:
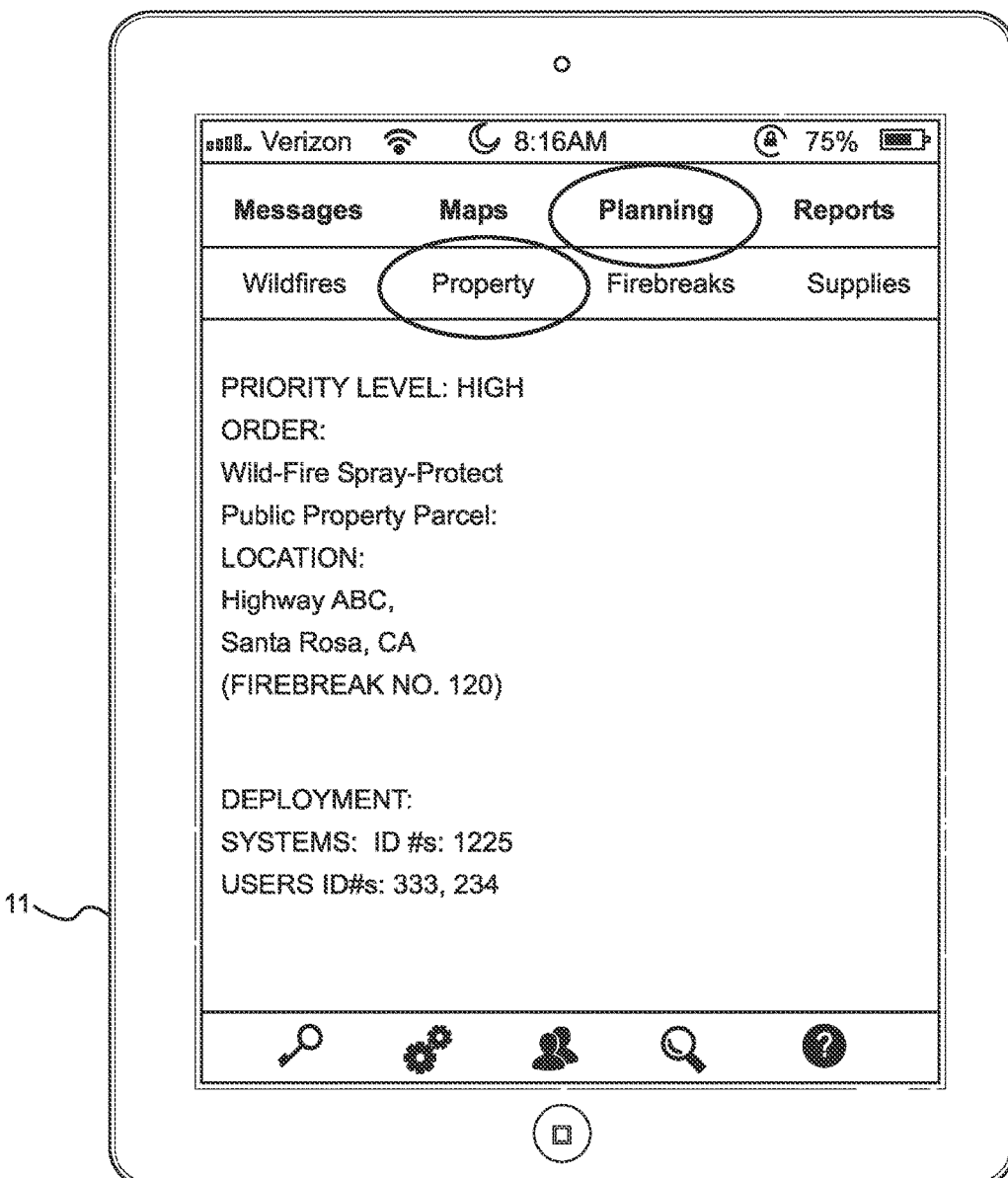
FIG. 13A is an exemplary wire-frame model of a graphical user interface supported by the mobile application for use by command center administrators to issue wild-fire protection orders using the system network of the present invention.
Figure 13B:
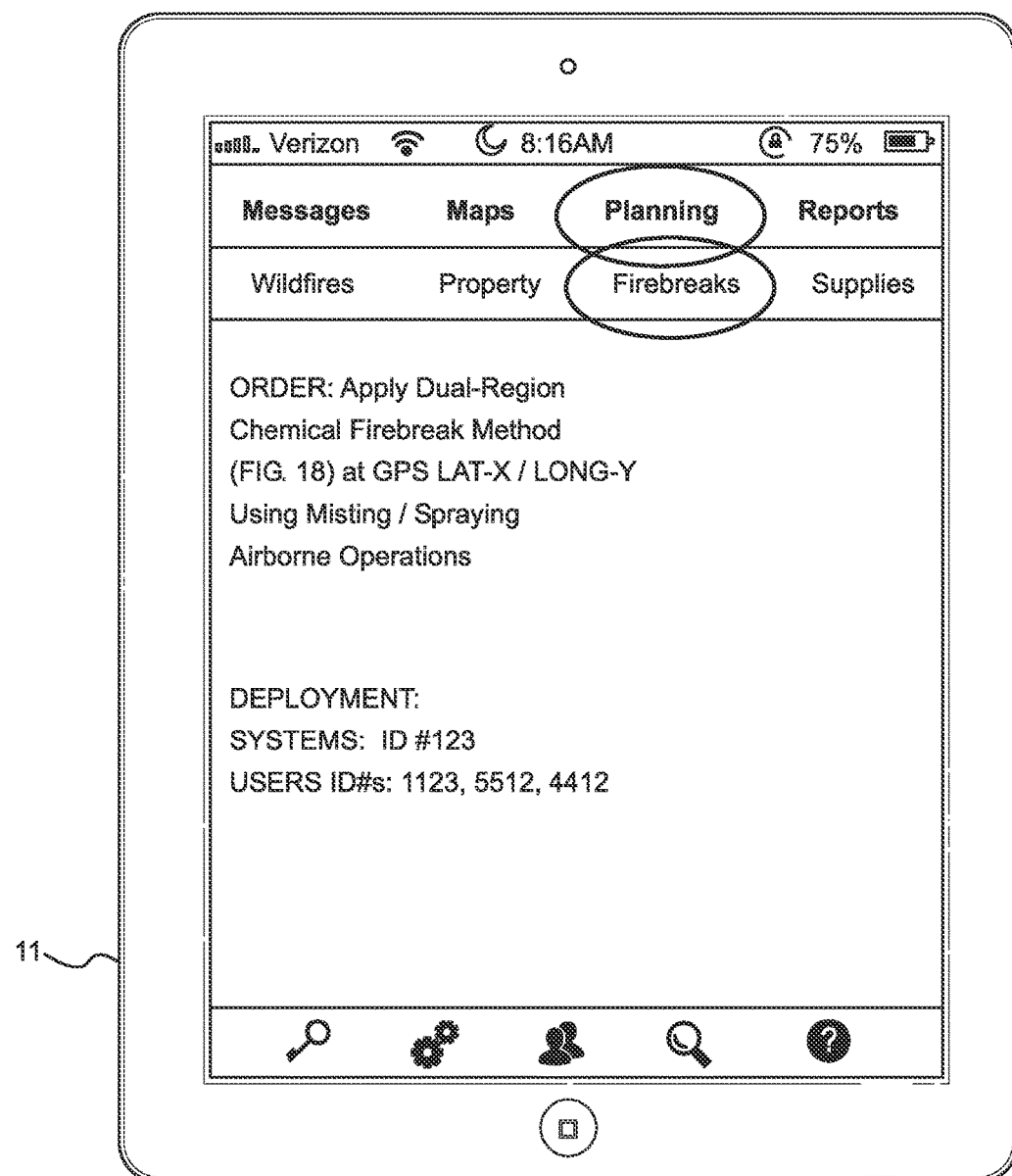
FIG. 13B exemplary wire-frame model of a graphical user interface supported by the mobile application for use by command center administrators to issue wild-fire protection orders involving the creation and maintenance of a clean AF-based chemical firebreak using the methods of the present invention, as illustrated in FIGS. 18 through 25B.
Figure 13C:
FIG. 13C is an exemplary wire-frame models of a graphical user interface supported by the mobile application for use by command center administrators to order the creation and/or maintenance of a GPS-specified clean AF-based chemical firebreak on one or more public/private property parcels, using the methods of the present invention.
Figure 13D:
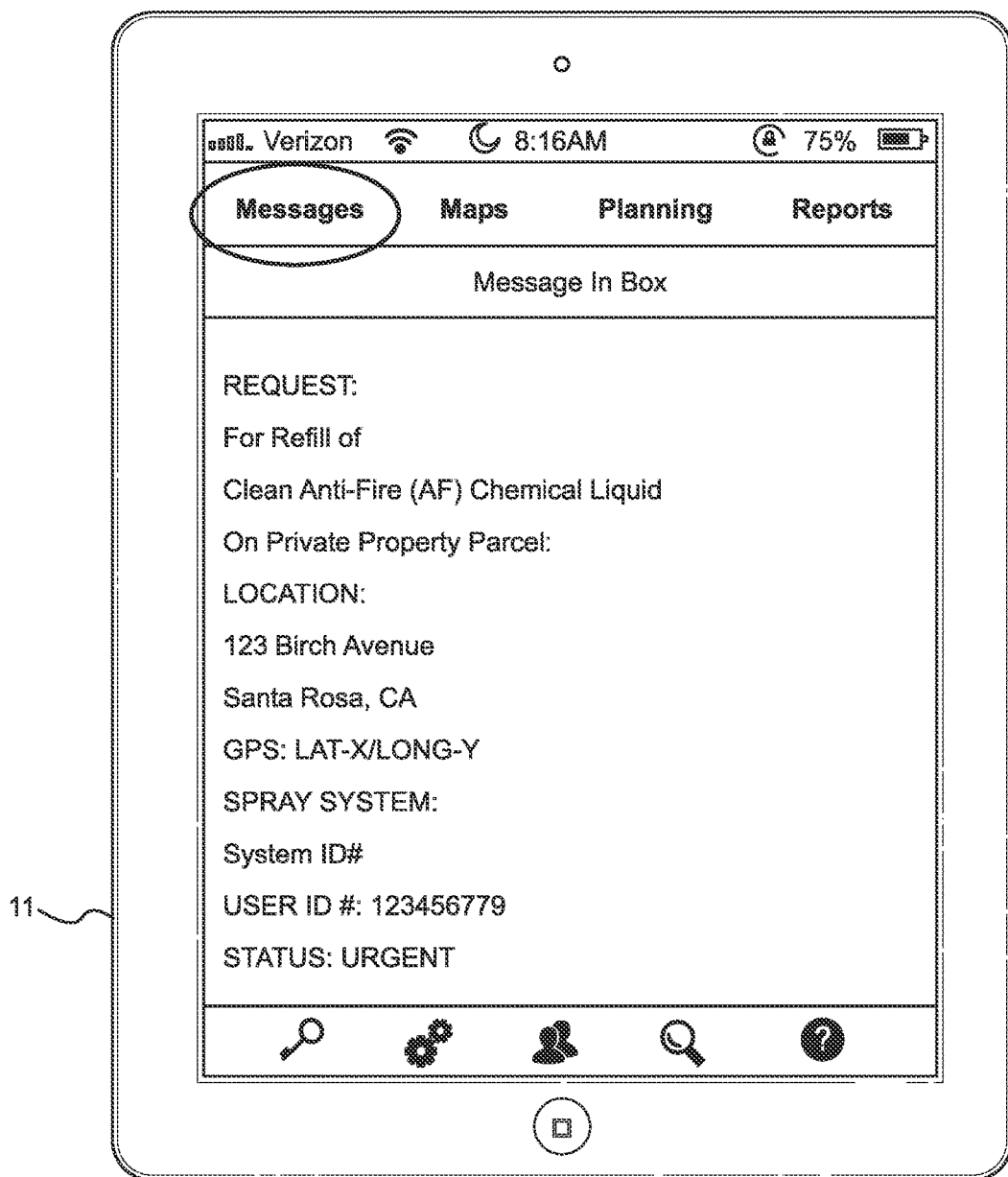
FIG. 13D is an exemplary wire-frame models of a graphical user interface for the mobile application used by command center administrators to receive messages from users including property owners and contractors requesting refills for clean anti-fire (AF) chemical liquid for GPS-specified spray system equipment.

As shown in FIG. 4, the system network architecture shows many different kinds of users supported by mobile computing devices 11 running the mobile application 12 of the present invention, namely: the plurality of mobile computing devices 11 running the mobile application 12, used by fire departments and firemen to access services supported by the system network 1; the plurality of mobile computing systems 11 running mobile application 12, used by insurance underwriters and agents to access services on the system network 1; the plurality of mobile computing systems 11 running mobile application 12, used by building architects and their firms to access the services supported by the system network 1; the plurality of mobile client systems 11 (e.g. mobile computers such as iPad, and other Internet-enabled computing devices with graphics display capabilities, etc.) used by spray-project technicians and administrators, and running a native mobile application 12 supported by server-side modules, and the various illustrative GUIs shown in FIGS. 12 through 13D, supporting client-side and server-side processes on the system network of the present invention; and a GPS-tracked anti-fire (AF) liquid spraying systems 20, 30, 40 and 50 for spraying buildings and ground cover to provide protection and defense against wild-fires.

In general, the system network 1 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 12 of the present invention, described above.

Figure 5A:
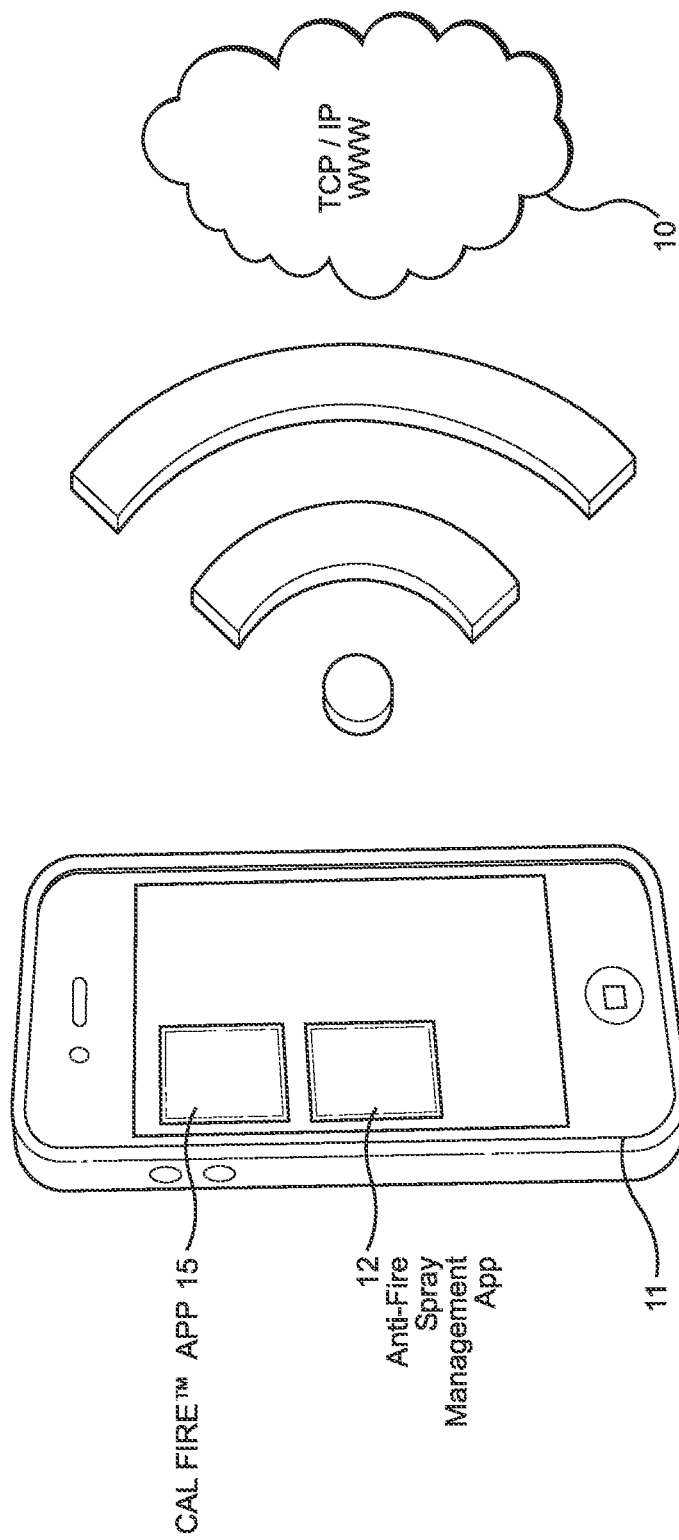
FIG. 5A is a perspective view of an exemplary mobile computing device deployed on the system network of the present invention, supporting (i) the mobile anti-fire spray management application of the present invention deployed as a component of the system network of the present invention as shown in FIGS. 12 through 13D, as well as (ii) conventional wildfire alert and notification systems as shown in FIGS. 3A through 3E.

Specification of System Architecture of an Exemplary Mobile Smartphone System Deployed on the System Network of the Present Invention FIG. 5A shows an exemplary mobile computing device 11 deployed on the system network of the present invention, supporting conventional wildfire alert and notification systems (e.g. CAL FIRE® wild fire notification system 14), as well as the mobile anti-fire spray management application 12 of the present invention, that is deployed as a component of the system network 1.

Figure 5B:
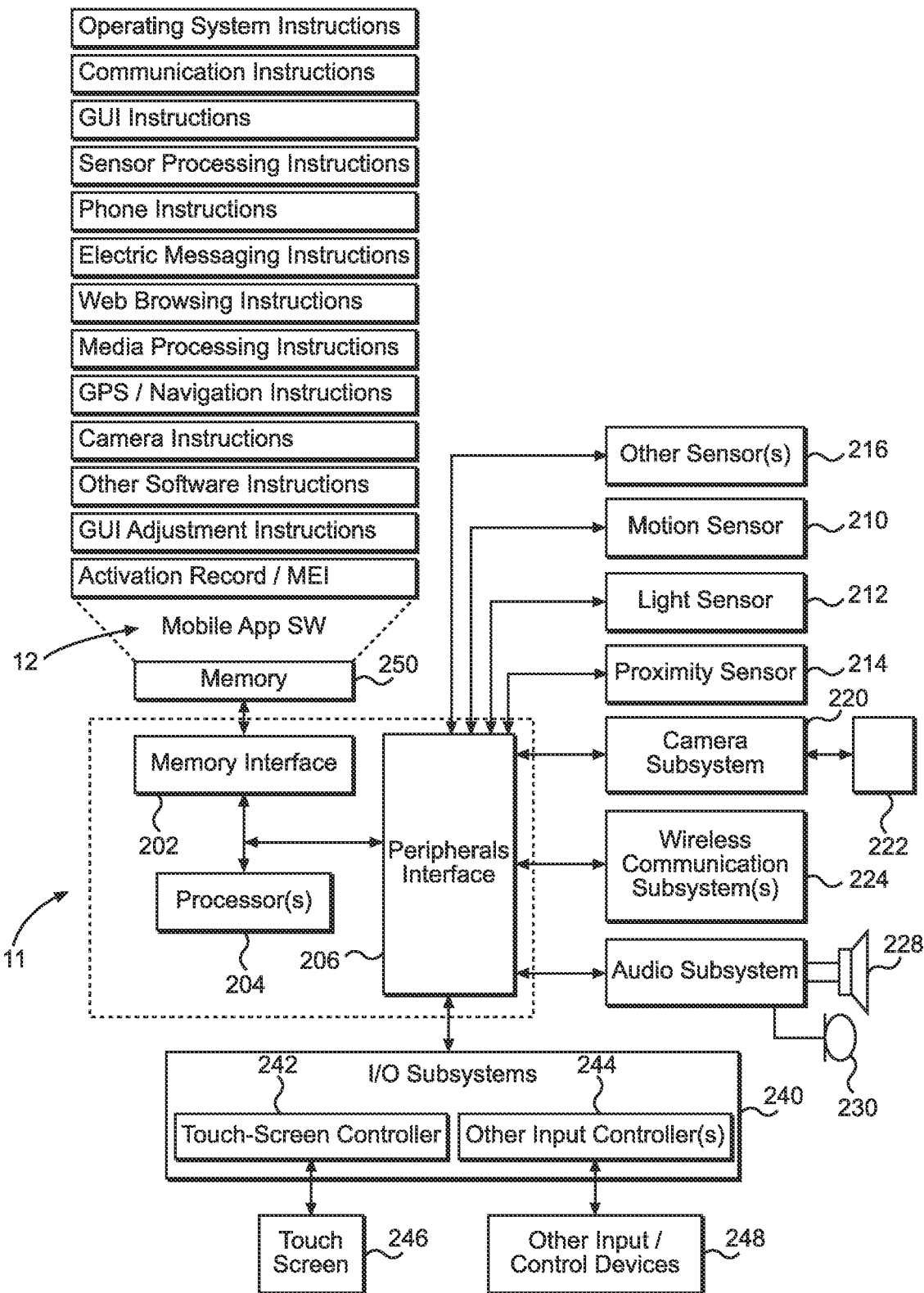
FIG. 5B shows a system diagram for an exemplary mobile client computer system deployed on the system network of the present invention.

FIG. 5B shows the system architecture of an exemplary mobile client computing system 11 that is deployed on the system network 1 and supporting the many services offered by system network servers 9A, 9B, 9C, 9D, 9E. As shown, the mobile smartphone device 11 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 11 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 11 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 11 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network is realized as a robust suite of hosted services delivered to Web-based client subsystems 1 using an application service provider (ASP) model. In this embodiment, the Web-enabled mobile application 12 can be realized using a web-browser application running on the operating system (OS) (e.g. Linux, Application IOS, etc.) of a mobile computing device 11 to support online modes of system operation, only. However, it is understood that some or all of the services provided by the system network 1 can be accessed using Java clients, or a native client application, running on the operating system of a client computing device, to support both online and limited off-line modes of system operation. In such embodiments, the native mobile application 12 would have access to local memory (e.g. a local RDBMS) on the client device 11, accessible during off-line modes of operation to enable consumers to use certain or many of the system functions supported by the system network during off-line/off-network modes of operation. It is also possible to store in the local RDBMS of the mobile computing device 11 most if not all relevant data collected by the mobile application for any particular fire-protection spray project, and to automatically synchronize the dataset for user's projects against the master datasets maintained in the system network database 9C1, within the data center 8 shown in FIG. 4. This way, when using a native application, during off-line modes of operation, the user will be able to access and review relevant information regarding any building spray project, and make necessary decisions, even while off-line (i.e. not having access to the system network).

As shown and described herein, the system network 1 has been designed for several different kinds of user roles including, for example, but not limited to: (i) public and private property owners, residents, fire departments, local, county, state and federal officials; and (ii) wild fire suppression administrators, contractors, technicians et al registered on the system network. Depending on which role, for which the user requests registration, the system network will request different sets of registration information, including name of user, address, contact information, etc. In the case of a web-based responsive application on the mobile computing device 11, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 1 can be realized as mobile web-browser application, or as a native application, each having a "responsive-design" and adapted to run on any client computing device (e.g. iPhone, iPad, Android or other Web-enabled computing device) 11 and designed for use by anyone interested in managing, monitoring and working to defend against the threat of wild fires.

Specification of the Mobile GPS-Tracked Anti-Fire (AF) Liquid Spraying System of the Present Invention FIG. 6A shows a mobile GPS-tracked anti-fire (AF) liquid spraying system 20 supported on a set of wheels 20A, having an integrated supply tank 20B and rechargeable-battery operated electric spray pump 20C, for deployment at private and public properties having building structures, for spraying the same with environmentally-clean anti-fire (AF) liquid using a spray nozzle assembly 20D connected to the spray pump 20C by way of a flexible 20E.

FIG. 6B shows the GPS-tracked mobile anti-fire liquid spraying system 20 of FIG. 6A as comprising a number of subcomponents, namely: a GPS-tracked and remotely-monitored AF chemical liquid spray control subsystem 20F; a micro-computing platform or subsystem 20G interfaced with the GPS-tracked and remotely-monitored AF chemical liquid spray control subsystem 20F by way of a system bus 20I; and a wireless communication subsystem 20H interfaced to the micro-computing platform 20G via the system bus 20I. As configured, the GPS-tracked mobile anti-fire liquid spraying system 20 enables and supports (i) the remote monitoring of the spraying of anti-fire (AF) chemical liquid from the system 20 when located at specific GPS-indexed location coordinates, and (ii) the logging of all such GPS-indexed spray application operations, and recording the data transactions thereof within a local database maintained within the micro-computing platform 20G, as well as in the remote network database 9C1 maintained at the data center 8 of the system network 1.

As shown in FIG. 6B, the micro-computing platform 20G comprises: data storage memory 20G1; flash memory (firmware storage) 20G2; a programmable microprocessor 20G3; a general purpose I/O (GPIO) interface 20G4; a GPS transceiver circuit/chip with matched antenna structure 20G5; and the system bus 20I which interfaces these components together and provides the necessary addressing, data and control signal pathways supported within the system 20.

As shown in FIG. 6B, the wireless communication subsystem 20H comprises: an RF-GSM modem transceiver 20H1; a T/X amplifier 20H2 interfaced with the RF-GSM modem transceiver 20H1; and a WIFI and Bluetooth wireless interfaces 20H3.

As shown in FIG. 6B, the GPS-tracked and remotely-controllable anti-fire (AF) chemical liquid spray control subsystem 20F comprises: anti-fire chemical liquid supply sensor(s) 20F1 installed in or on the anti-fire chemical liquid supply tank 20B to produce an electrical signal indicative of the volume or percentage of the AF liquid supply tank containing AF chemical liquid at any instant in time, and providing such signals to the AF liquid spraying system control interface 20F4; a power supply and controls 20F2 interfaced with the liquid pump spray subsystem 20C, and also the AF liquid spraying system control interface 20F4; manually-operated spray pump controls interface 20F3, interfaced with the AF liquid spraying system control interface 20F4; and the AF liquid spraying system control interface 20F4 interfaced with the micro-computing subsystem 20G, via the system bus 20I. The flash memory storage 20G2 contains microcode that represents a control program that runs on the microprocessor 20G3 and realizes the various GPS-specified AF chemical liquid spray control, monitoring, data logging and management functions supported by the system 20.

In the preferred embodiment, the environmentally-clean anti-fire (AF) chemical liquid is preferably Hartindo AF31 Total Fire Inhibitor, developed by Hartindo Chemicatama Industri of Jakarta, Indonesia, and commercially-available from Newstar Chemicals (M) SDN. BHD of Selangor Darul Ehsan, Malaysia, http://newstarchemicals.com/products.html. When so treated, combustible products will prevent flames from spreading, and confine fire to the ignition source which can be readily extinguished, or go out by itself. In the presence of a flame, the chemical molecules in both dry and wet coatings, formed with Hartindo AF31 liquid, interferes with the free radicals (H+, OH−, O) involved in the free-radical chemical reactions within the combustion phase of a fire, and breaks these free-radical chemical reactions and extinguishes the fire's flames.

Figure 7A:
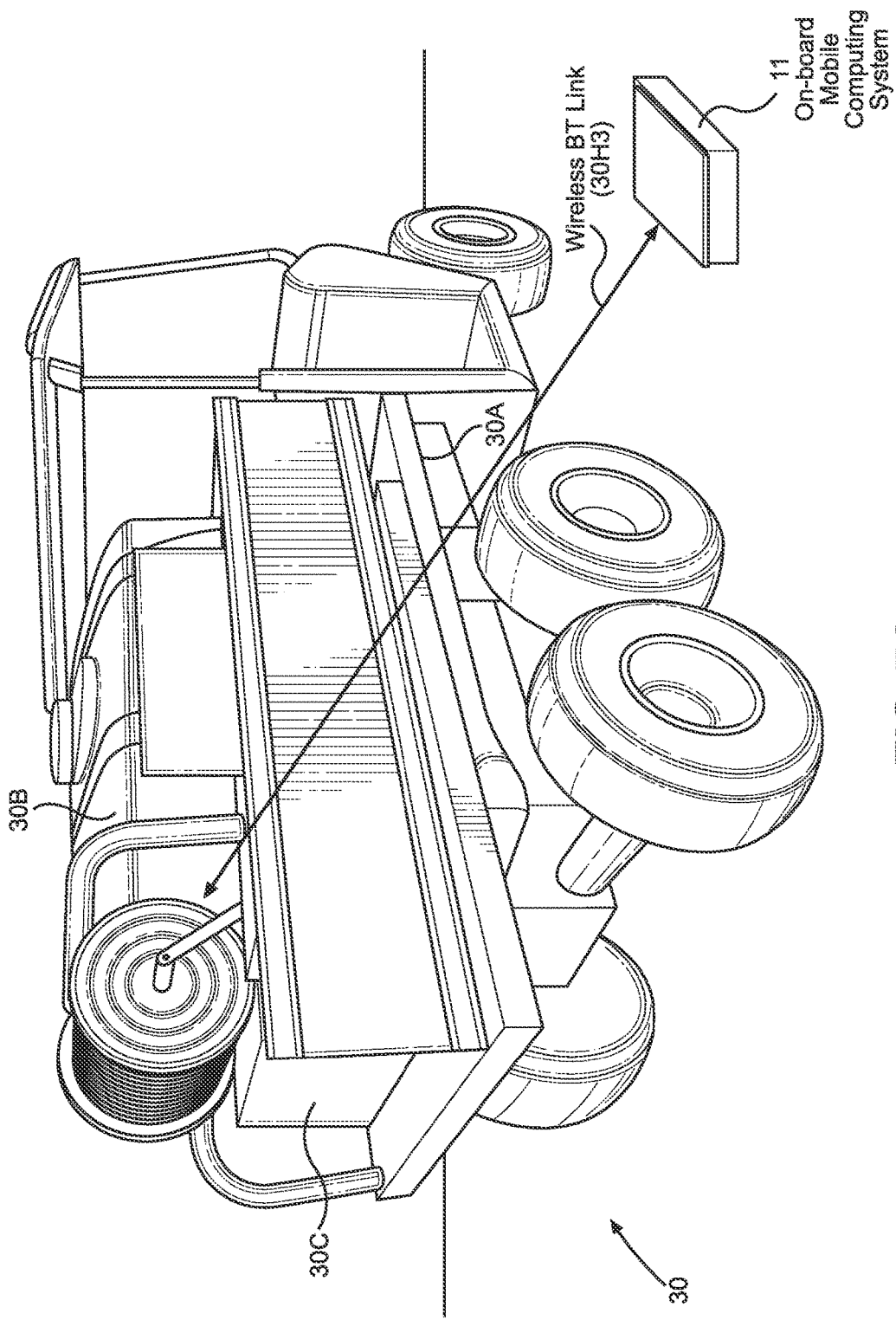
FIG. 7A is a perspective view of a GPS-tracked manned or autonomous vehicle system for spraying AF chemical liquid on building and ground surfaces for spraying the same with environmentally-clean anti-fire (AF) chemical liquid in accordance with the principles of the present invention.

Specification of GPS-Tracked Manned or Autonomous Vehicle for Spraying Anti-Fire (AF) Liquid on Building and Ground Surfaces FIG. 7A shows a mobile GPS-tracked manned or autonomous vehicle anti-fire (AF) liquid spray vehicle system 30 for spraying environmentally-clean anti-fire (AF) chemical liquid on exterior building surfaces and ground surfaces in accordance with the principles of the present invention. As shown, the vehicle system 30 is supported on a set of wheels 30A driven by a propulsion drive subsystem 30 and navigated by GPS-guided navigation subsystem 301, and carrying an integrated supply tank 30B with either rechargeable-battery-operated electric-motor driven spray pump, or gasoline/diesel or propane operated motor-driven spray pump, 30C, for deployment on private and public property parcels having building structures, for spraying the same with environmentally-clean anti-fire (AF) liquid using a spray nozzle assembly 30D connected to the spray pump 30C by way of a flexible hose 30E.

Figure 7B:
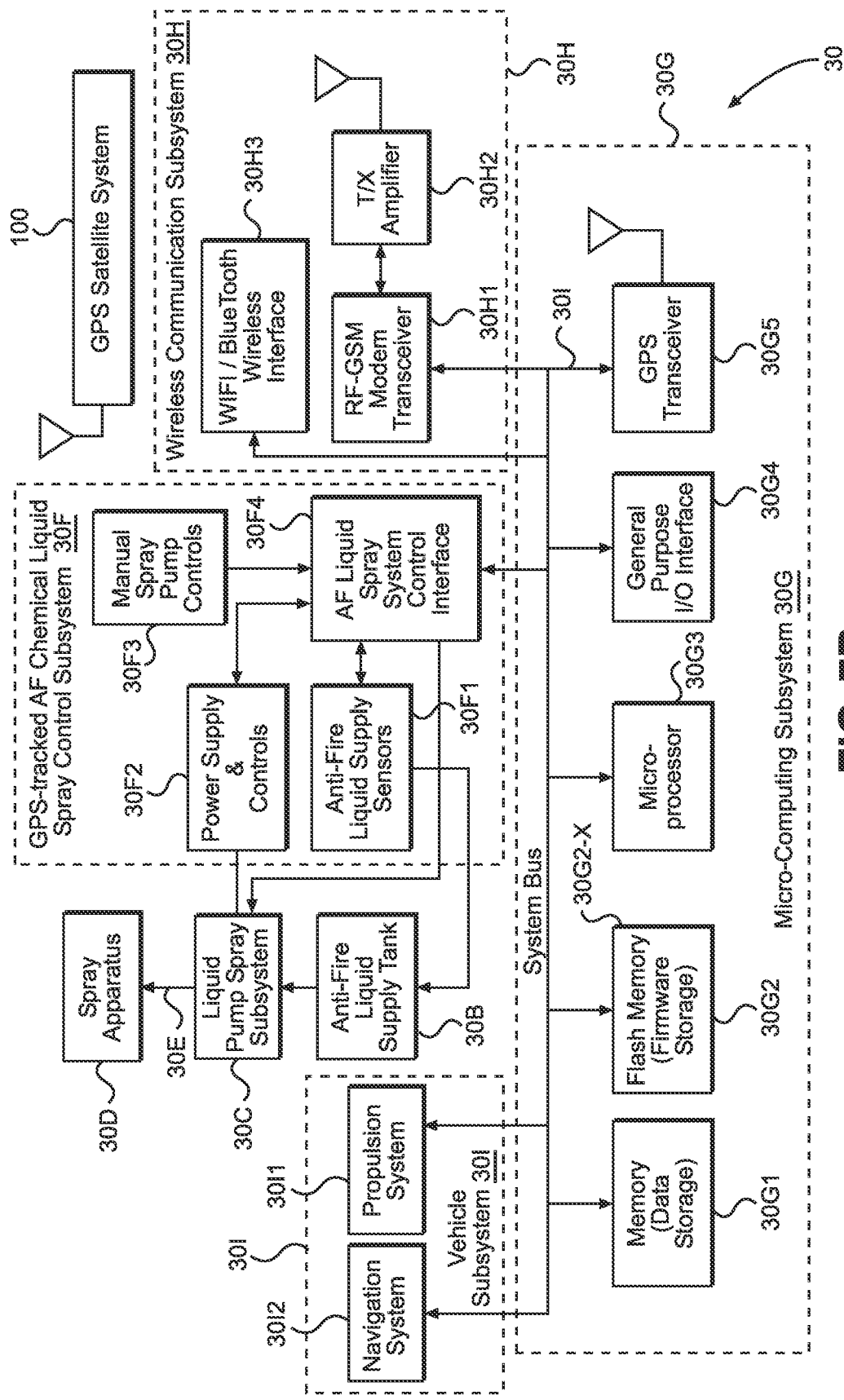
FIG. 7B is a schematic representation of the manned or autonomously-driven vehicle system shown in FIG. 7A, comprising a GPS-tracked and remotely-monitored AF chemical liquid spray control subsystem interfaced with a micro-computing platform for monitoring the spraying of AF chemical liquid from the vehicle when located at any specific GPS-indexed location coordinates, and automatically logging and recording such AF spray application operations within the network database system.

FIG. 7B shows the GPS-tracked mobile anti-fire liquid spraying system 30 of FIG. 7A as comprising a number of subcomponents, namely: a GPS-tracked and remotely-monitored AF chemical liquid spray control subsystem 30F; a micro-computing platform or subsystem 30G interfaced with the GPS-tracked and remotely-monitored AF chemical liquid spray control subsystem 30F by way of a system bus 30I; a wireless communication subsystem 30H interfaced to the micro-computing platform 30G via the system bus 30I;

and a vehicular propulsion and navigation subsystem 30I employing a propulsion subsystem 30I1 and AI-driven or manually-driven navigation subsystem 30I2.

As configured in the illustrative embodiment, the GPS-tracked mobile anti-fire liquid spraying system 30 enables and supports (i) the remote monitoring of the spraying of anti-fire (AF) chemical liquid from the system 30 when located at specific GPS-indexed location coordinates, and (ii) the logging of all such GPS-indexed spray application operations, and recording the data transactions thereof within a local database maintained within the micro-computing platform 30G, as well as in the remote network database 9C1 maintained at the data center 8 of the system network 1.

As shown in FIG. 7B, the micro-computing platform 30G comprises: data storage memory 30G1; flash memory (firmware storage) 30G2; a programmable microprocessor 30G3; a general purpose I/O (GPIO) interface 30G4; a GPS transceiver circuit/chip with matched antenna structure 30G5; and the system bus 30I which interfaces these components together and provides the necessary addressing, data and control signal pathways supported within the system 30. As such, the micro-computing platform 30G is suitably configured to support and run a local control program 30G2-X on microprocessor 30G3 and memory architecture 30G1, 30G2 which is required and supported by the enterprise-level mobile application 12 and the suite of services supported by the system network 1 of the present invention.

As shown in FIG. 7B, the wireless communication subsystem 30H comprises: an RF-GSM modem transceiver 30H1; a T/X amplifier 30H2 interfaced with the RF-GSM modem transceiver 30H1; and a WIFI interface and a Bluetooth wireless interface 30H3 for interfacing with WIFI and Bluetooth data communication networks, respectively, in a manner known in the communication and computer networking art.

As shown in FIG. 7B, the GPS-tracked and remotely-controllable anti-fire (AF) chemical liquid spray control subsystem 30F comprises: anti-fire chemical liquid supply sensor(s) 30F1 installed in or on the anti-fire chemical liquid supply tank 30B to produce an electrical signal indicative of the volume or percentage of the AF liquid supply tank containing AF chemical liquid at any instant in time, and providing such signals to the AF liquid spraying system control interface 30F4; a power supply and controls 30F2 interfaced with the liquid pump spray subsystem 30C, and also the AF liquid spraying system control interface 30F4; manually-operated spray pump controls interface 30F3, interfaced with the AF liquid spraying system control interface 30F4; and the AF liquid spraying system control interface 30F4 interfaced with the micro-computing subsystem 30G, via the system bus 30I. The flash memory storage 30G2 contains microcode for a control program that runs on the microprocessor 20G3 and realizes the various GPS-specified AF chemical liquid spray control, monitoring, data logging and management functions supported by the system 30.

Figure 8A:
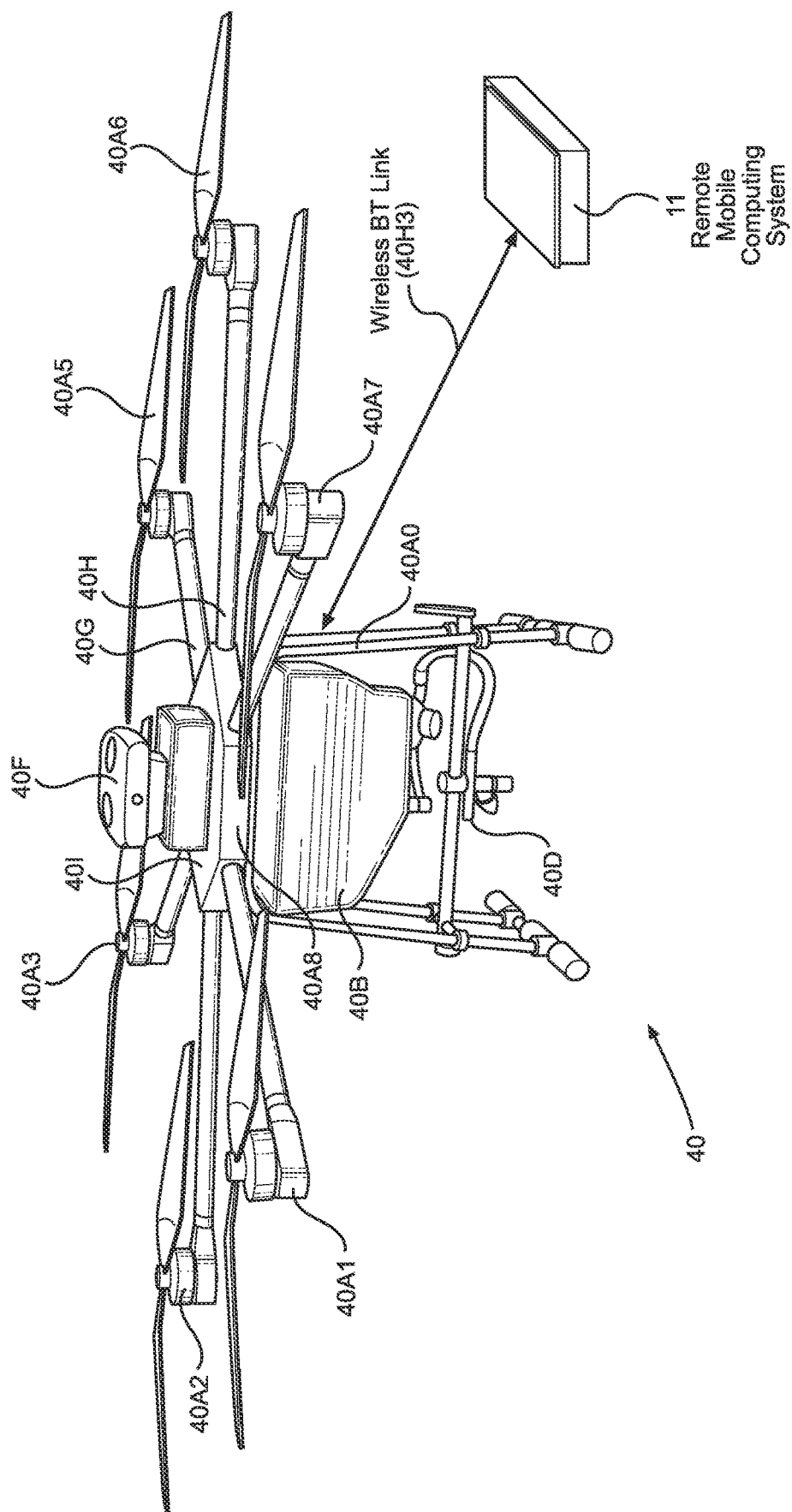
FIG. 8A is a perspective view of an autonomously-driven or remotely-controlled unmanned airborne system (i.e. UAS or "drone") adapted for spraying AF chemical liquid on building and ground surfaces for spraying the same with environmentally-clean anti-fire (AF) liquid in accordance with the principles of the present invention.

Specification of GPS-Tracked Autonomously-Driven Drone System Adapted for Spraying Anti-Fire (AF) Liquid on Buildings and Ground Surfaces FIG. 8A shows a mobile GPS-tracked unmanned airborne system (UAS) or drone 40 adapted for misting and spraying environmentally-clean anti-fire (AF) chemical liquid on exterior building surfaces and ground surfaces in accordance with the principles of the present invention.

As shown, the drone vehicle system 40 comprises: a lightweight airframe 40A0 supporting a propulsion subsystem 40I provided with a set of eight (8) electric-motor driven propellers 40A1-40A8, driven by electrical power supplied by a rechargeable battery module 409, and controlled and navigated by a GPS-guided navigation subsystem 40I2; an integrated supply tank 40B supported on the airframe 40A0, and connected to either rechargeable-battery-operated electric-motor driven spray pump, or gasoline/diesel or propane operated motor-driven spray pump, 40C, for deployment on private and public property parcels having building structures; a spray nozzle assembly 40D connected to the spray pump 40C by way of a flexible hose 40E, for misting and spraying the same with environmentally-clean anti-fire (AF) liquid under the control of GPS-specified coordinates defining its programmed flight path when operating to suppress or otherwise fight wild fires.

Figure 8B:
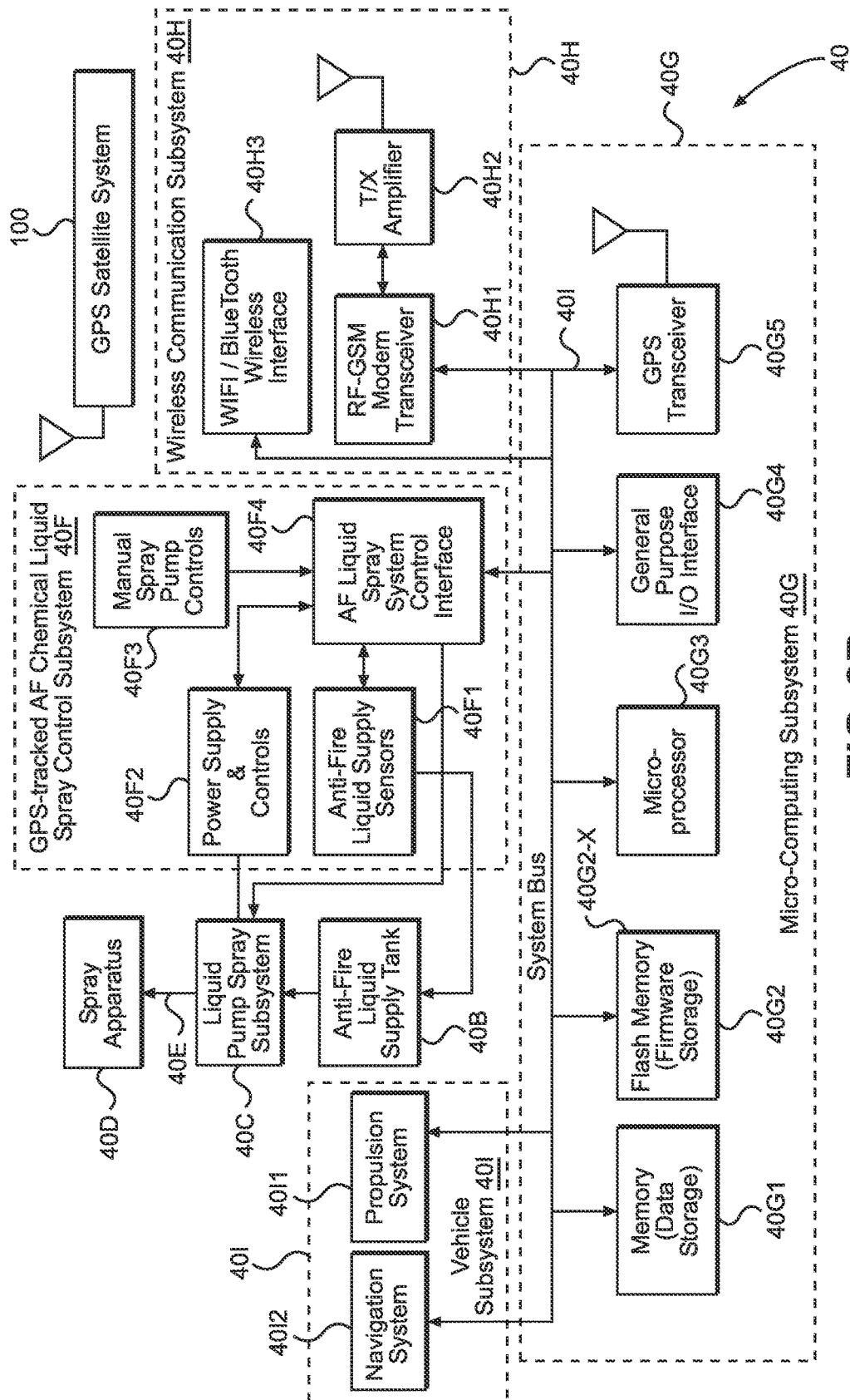
FIG. 8B is a schematic representation of the autonomously-driven or remotely-controlled aircraft system (i.e. drone) shown in FIG. 8A, comprising a GPS-tracked and remotely monitored AF chemical liquid spray control subsystem interfaced with a micro-computing platform for monitoring the spraying of AF chemical liquid from the aircraft when located at specific GPS-indexed location coordinates, and automatically logging and recording such AF spray application operations within the network database system.

FIG. 8B shows the GPS-tracked anti-fire liquid spraying system 40 of FIG. 8A as comprising a number of subcomponents, namely: a GPS-tracked and remotely-monitored AF chemical liquid spray control subsystem 40F; a micro-computing platform or subsystem 40G interfaced with the GPS-tracked and remotely-monitored AF chemical liquid spray control subsystem 40F by way of a system bus 40I; a wireless communication subsystem 40H interfaced to the micro-computing platform 40G via the system bus 40I; and a vehicular propulsion and navigation subsystem 40I employing propulsion subsystem 40I1, and AI-driven or manually-driven navigation subsystem 40I2.

As configured in the illustrative embodiment, the GPS-tracked anti-fire liquid spraying system 40 enables and supports (i) the remote monitoring of the spraying of anti-fire (AF) chemical liquid from the system 40 when located at specific GPS-indexed location coordinates, and (ii) the logging of all such GPS-indexed spray application operations, and recording the data transactions thereof within a local database maintained within the micro-computing platform 40G, as well as in the remote network database 9C1 maintained at the data center 8 of the system network 1.

As shown in FIG. 8B, the micro-computing platform 40G comprises: data storage memory 40G1; flash memory (firmware storage) 40G2; a programmable microprocessor 40G3; a general purpose I/O (GPIO) interface 40G4; a GPS transceiver circuit/chip with matched antenna structure 40G5; and the system bus 40I which interfaces these components together and provides the necessary addressing, data and control signal pathways supported within the system 40. As such, the micro-computing platform 40G is suitably configured to support and run a local control program 40G2-X on microprocessor 40G3 and memory architecture 40G1, 40G2 which is required and supported by the enterprise-level mobile application 12 and the suite of services supported by the system network 1 of the present invention.

As shown in FIG. 8B, the wireless communication subsystem 30H comprises: an RF-GSM modem transceiver 40H1; a T/X amplifier 40H2 interfaced with the RF-GSM modem transceiver 40H1; and a WIFI interface and a Bluetooth wireless interface 40H3 for interfacing with WIFI and Bluetooth data communication networks, respectively, in a manner known in the communication and computer networking art.

As shown in FIG. 8B, the GPS-tracked and remotely-controllable anti-fire (AF) chemical liquid spray control subsystem 40F comprises: anti-fire chemical liquid supply sensor(s) 40F1 installed in or on the anti-fire chemical liquid supply tank 30B to produce an electrical signal indicative of the volume or percentage of the AF liquid supply tank containing AF chemical liquid at any instant in time, and providing such signals to the AF liquid spraying system control interface 40F4; a power supply and controls 40F2 interfaced with the liquid pump spray subsystem 40C, and also the AF liquid spraying system control interface 40F4; manually-operated spray pump controls interface 40F3, interfaced with the AF liquid spraying system control interface 30F4; and the AF liquid spraying system control interface 40F4 interfaced with the micro-computing subsystem 40G, via the system bus 40I. The flash memory storage 40G2 contains microcode for a control program that runs on the microprocessor 40G3 and realizes the various GPS-specified AF chemical liquid spray control, monitoring, data logging and management functions supported by the system 40.

Figure 9A:
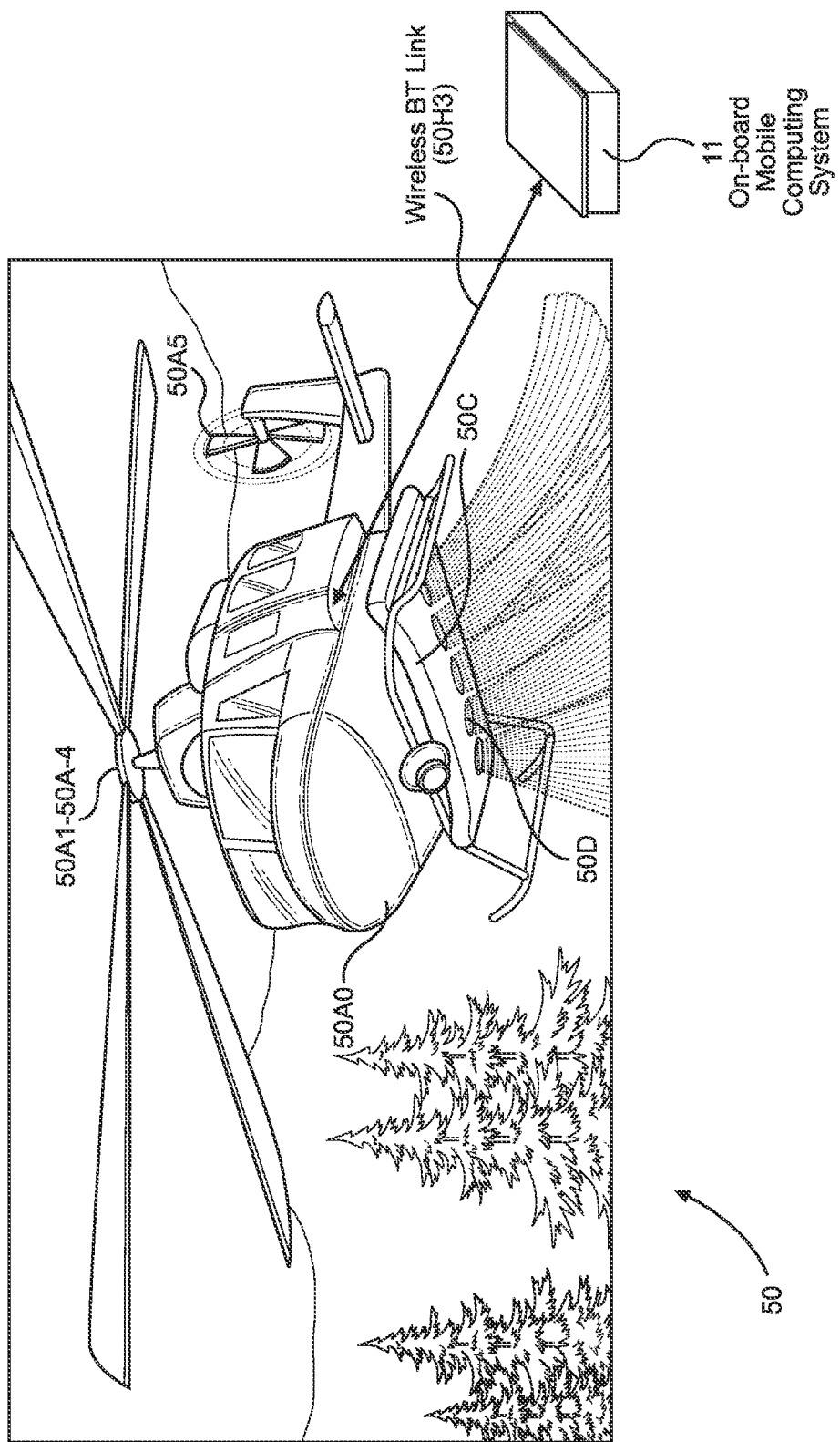
FIG. 9A is a perspective view of a GPS-tracked aircraft system (i.e. helicopter) adapted for spraying an environmentally-clean anti-fire (AF) liquid AF chemical liquid, from the air, onto ground surfaces in accordance with the principles of the present invention.

Specification of GPS-Tracked Aircraft (i.e. Helicopter) for Spraying Anti-Fire (AF) Liquid on Ground Surfaces FIG. 9A shows a mobile GPS-tracked manned aircraft (i.e. helicopter) system 50 adapted for misting and spraying environmentally-clean anti-fire (AF) chemical liquid on ground surfaces and over buildings in accordance with the principles of the present invention.

As shown, the aircraft system 50 comprises: a lightweight airframe 50A0 supporting a propulsion subsystem 50I provided with a set of axially-mounted helicopter blades 50A1-50A2 and 50A5, driven by combustion-engine and controlled and navigated by a GPS-guided navigation subsystem 50I2; an integrated supply tank 50B supported on the airframe 50A0, and connected to a gasoline/diesel operated motor-driven spray pump, 50C, for deployment on private and public property parcels having building structures; a spray nozzle assembly 50D connected to the spray pump 50C by way of a hose 50E, for misting and/or spraying the same with environmentally-clean anti-fire (AF) liquid under the control of GPS-specified coordinates defining its programmed flight path when operating to suppress or otherwise fight wild fires.

Figure 9B:
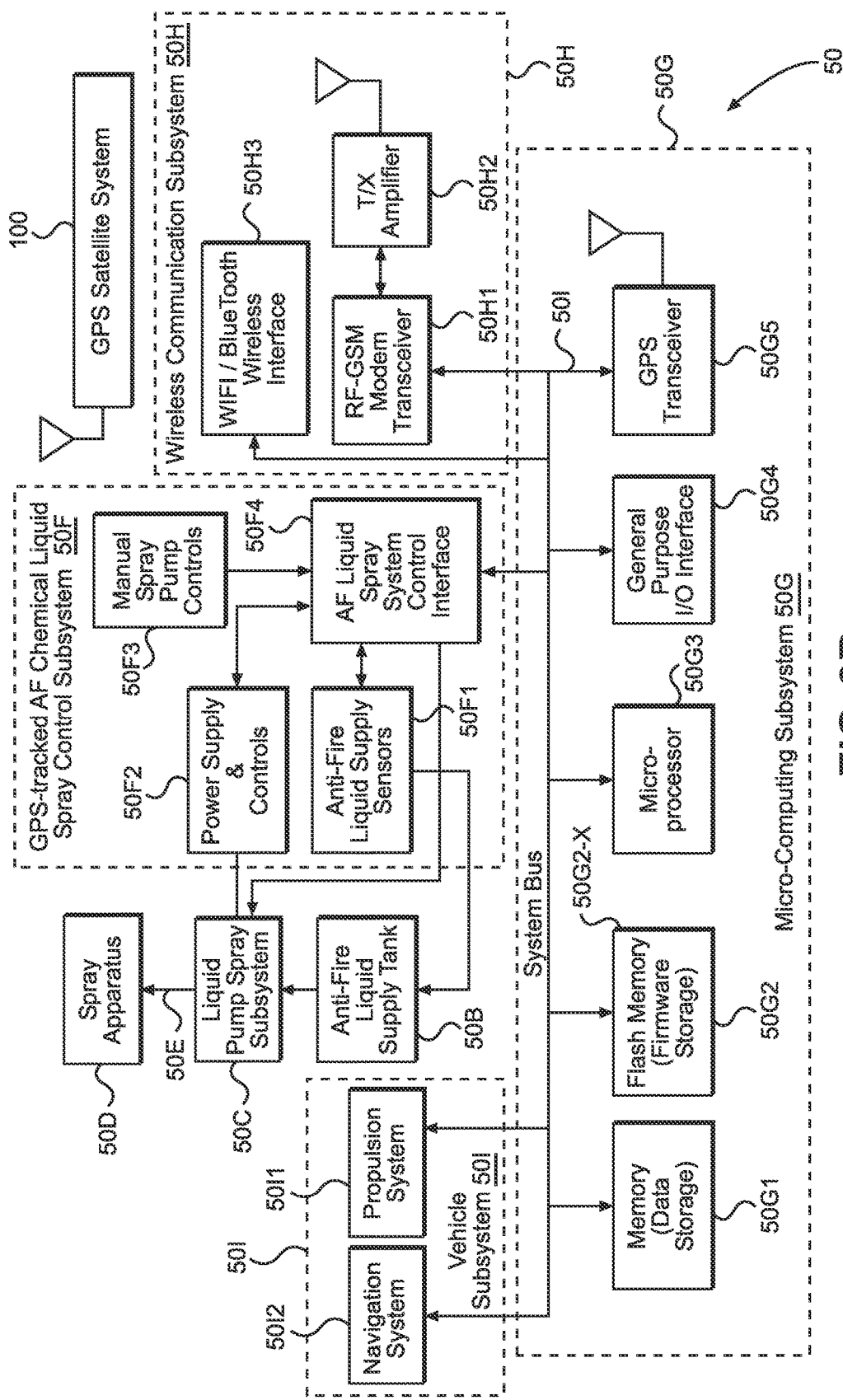
FIG. 9B is a schematic representation of the GPS-tracked aircraft system (i.e. helicopter) shown in FIG. 9A, comprising a GPS-tracked and remotely monitored AF chemical liquid spray control subsystem interfaced with a micro-computing platform for monitoring the spraying of AF chemical liquid from the aircraft when located at specific GPS-indexed location coordinates, and automatically logging and recording such AF spray application operations within the network database system.

FIG. 9B shows the GPS-tracked anti-fire liquid spraying system 50 of FIG. 9A as comprising a number of subcomponents, namely: a GPS-tracked and remotely-monitored AF chemical liquid spray control subsystem 50F; a micro-computing platform or subsystem 50G interfaced with the GPS-tracked and remotely-monitored AF chemical liquid spray control subsystem 50F by way of a system bus 50I; a wireless communication subsystem 50H interfaced to the micro-computing platform 50G via the system bus 50I; and a vehicular propulsion and navigation subsystem 50I employing propulsion subsystem 50I1, and AI-driven or manually-driven navigation subsystem 50I2.

As configured in the illustrative embodiment, the GPS-tracked anti-fire liquid spraying system 50 enables and supports (i) the remote monitoring of the spraying of anti-fire (AF) chemical liquid from the system 50 when located at specific GPS-indexed location coordinates, and (ii) the logging of all such GPS-indexed spray application operations, and recording the data transactions thereof within a local database maintained within the micro-computing platform 50G, as well as in the remote network database 9C1 maintained at the data center 8 of the system network 1.

As shown in FIG. 9B, the micro-computing platform 50G comprises: data storage memory 50G1; flash memory (firmware storage) 50G2; a programmable microprocessor 50G3; a general purpose I/O (GPIO) interface 50G4; a GPS transceiver circuit/chip with matched antenna structure 50G5; and the system bus 40I which interfaces these components together and provides the necessary addressing, data and control signal pathways supported within the system 50. As such, the micro-computing platform 50G is suitably configured to support and run a local control program 50G2-X on microprocessor 50G3 and memory architecture 50G1, 40G2 which is required and supported by the enterprise-level mobile application 12 and the suite of services supported by the system network 1 of the present invention.

As shown in FIG. 9B, the wireless communication subsystem 50H comprises: an RF-GSM modem transceiver 50H1; a T/X amplifier 50H2 interfaced with the RF-GSM modem transceiver 50H1; and a WIFI interface and a Bluetooth wireless interface 50H3 for interfacing with WIFI and Bluetooth data communication networks, respectively, in a manner known in the communication and computer networking art.

As shown in FIG. 9B, the GPS-tracked and remotely-controllable anti-fire (AF) chemical liquid spray control subsystem 50F comprises: anti-fire chemical liquid supply sensor(s) 50F1 installed in or on the anti-fire chemical liquid supply tank 50B to produce an electrical signal indicative of the volume or percentage of the AF liquid supply tank containing AF chemical liquid at any instant in time, and providing such signals to the AF liquid spraying system control interface 50F4; a power supply and controls 50F2 interfaced with the liquid pump spray subsystem 50C, and also the AF liquid spraying system control interface 50F4; manually-operated spray pump controls interface 50F3, interfaced with the AF liquid spraying system control interface 50F4; and the AF liquid spraying system control interface 50F4 interfaced with the micro-computing subsystem 50G, via the system bus 50I. The flash memory storage 50G2 contains microcode for a control program that runs on the microprocessor 50G3 and realizes the various GPS-specified AF chemical liquid spray control, monitoring, data logging and management functions supported by the system 50.

Figure 10A:
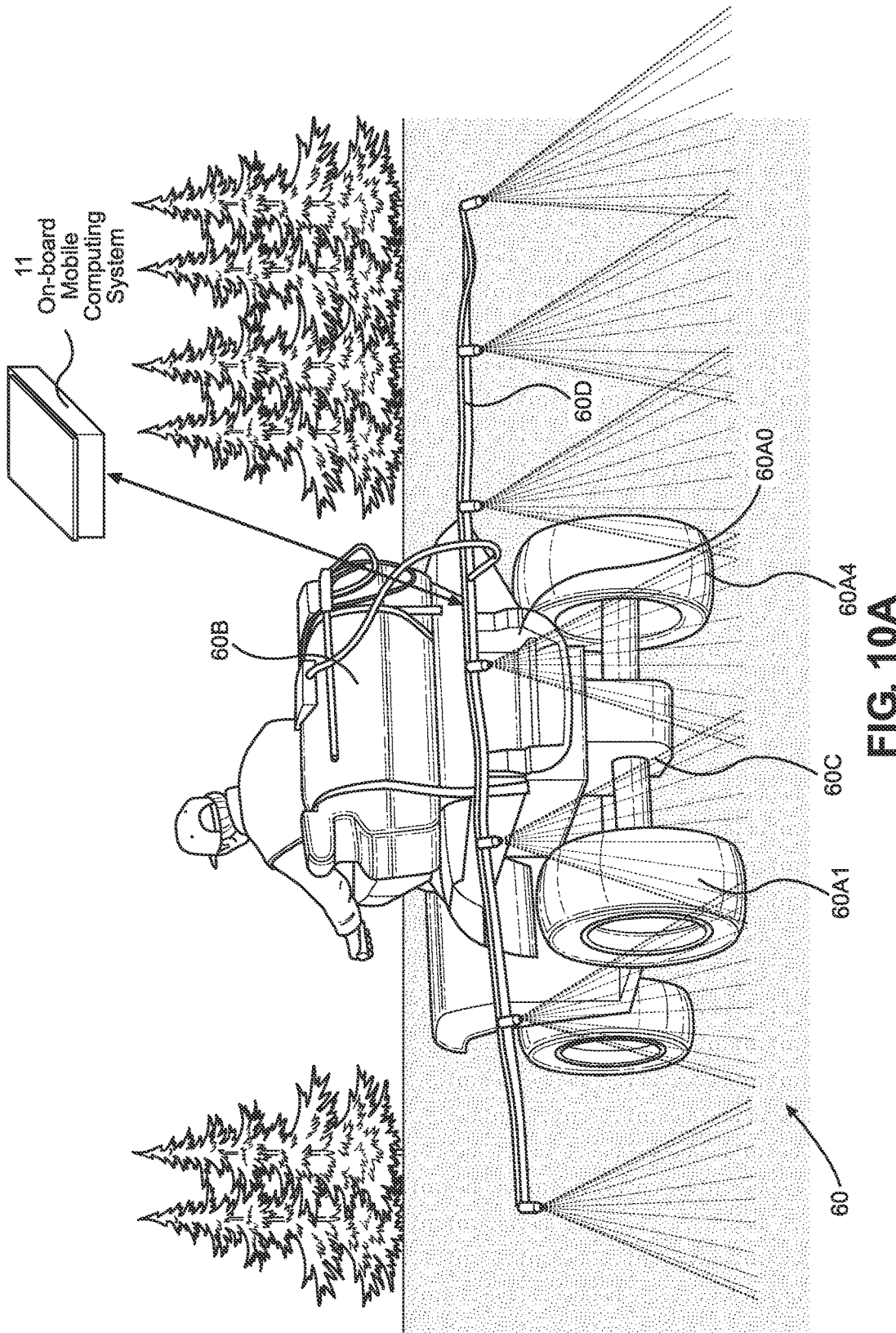
FIG. 10A is a GPS-tracked all-terrain vehicle (ATV) system adapted for spraying ground surfaces with anti-fire (AF) liquid in accordance with the principles of the present invention.

Specification of GPS-Tracked Autonomously-Driven Aircraft for Spraying Anti-Fire (AF) Liquid on Building and Ground Surfaces FIG. 10A shows a mobile GPS-tracked manned all-terrain vehicle (ATV) system 60 adapted for misting and spraying environmentally-clean anti-fire (AF) chemical liquid on ground surfaces in accordance with the principles of the present invention.

As shown, the aircraft system 60 comprises: a lightweight frame/chassis 60A0 supporting a propulsion subsystem 60I provided with a set of wheels 60A1-60A4, driven by combustion-engine, and controlled and navigated by a GPS-guided navigation subsystem 60I2; an integrated supply tank 60B supported on the frame 60A0, and connected to a gasoline/diesel operated motor-driven spray pump, 60C, for deployment on private and public property parcels; a spray nozzle assembly 60D connected to the spray pump 60C by way of a hose 60E, for misting and/or spraying the same with environmentally-clean anti-fire (AF) liquid under the control of GPS-specified coordinates defining its programmed flight path when operating to suppress or otherwise fight wild fires.

Figure 10B:
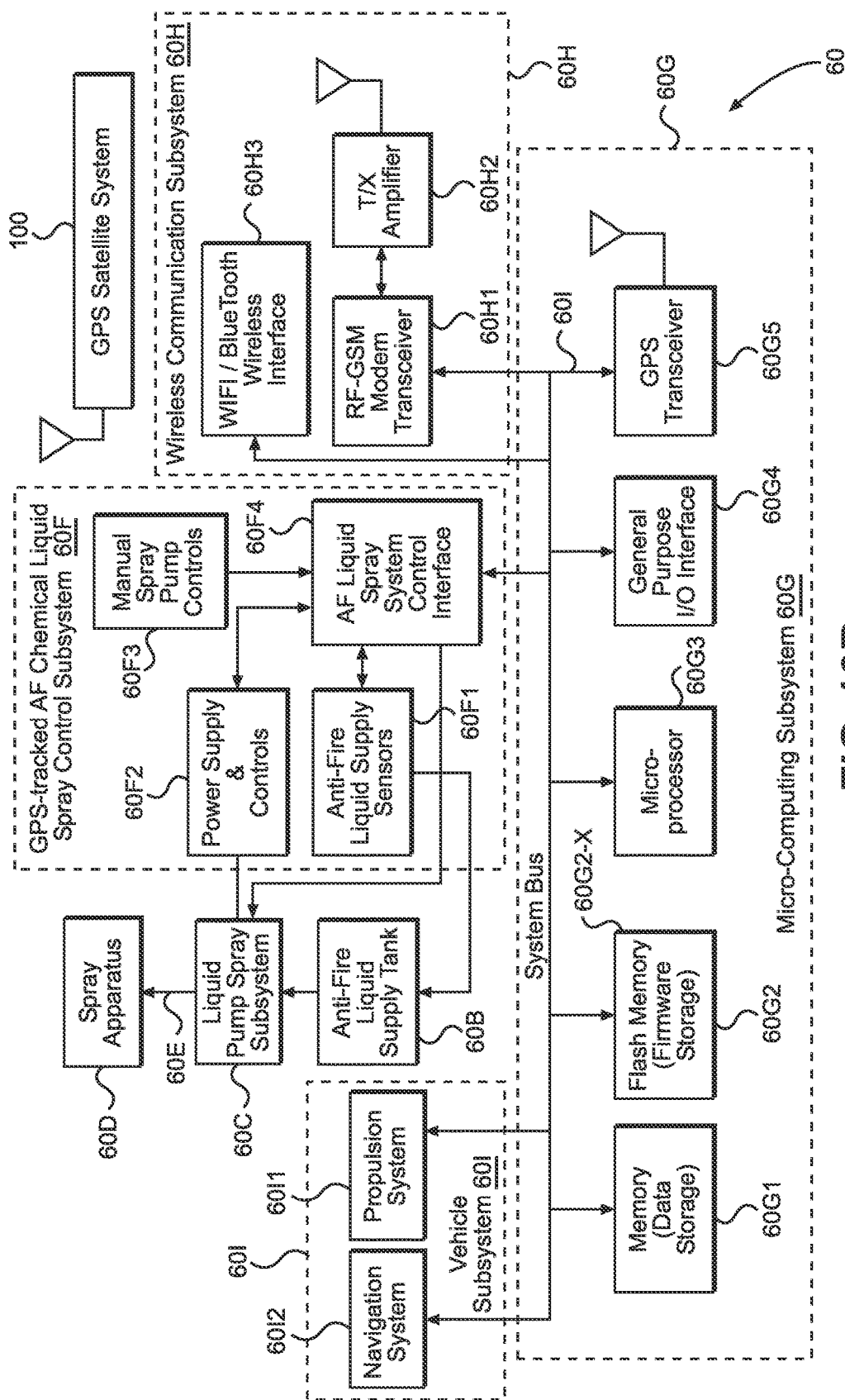
FIG. 10B is the GPS-tracked all-terrain vehicle (ATV) system shown in FIG. 10A, comprising a GPS-tracked and remotely-monitored AF chemical liquid spray control subsystem interfaced with a micro-computing platform for monitoring the spraying of AF chemical liquid from the ATV system when located at specific GPS-indexed location coordinates, and automatically logging and recording such AF spray application operations within the network database system.

FIG. 10B shows the GPS-tracked anti-fire liquid spraying system 60 of FIG. 10A as comprising a number of subcomponents, namely: a GPS-tracked and remotely-monitored AF chemical liquid spray control subsystem 60F; a micro-computing platform or subsystem 60G interfaced with the GPS-tracked and remotely-monitored AF chemical liquid spray control subsystem 60F by way of a system bus 60I; a wireless communication subsystem 60H interfaced to the micro-computing platform 60G via the system bus 50I; and a vehicular propulsion and navigation subsystem 60I employing propulsion subsystem 60I1, and AI-driven or manually-driven navigation subsystem 60I2.

As configured in the illustrative embodiment, the GPS-tracked anti-fire liquid spraying system 60 enables and supports (i) the remote monitoring of the spraying of anti-fire (AF) chemical liquid from the system 60 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 10B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 60I which interfaces these components together and provides the necessary addressing, data and control signal pathways supported within the system 60. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 10B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 10B, the GPS-tracked and remotely-controllable anti-fire (AF) chemical liquid spray control subsystem 60F comprises: anti-fire chemical liquid supply sensor(s) 60F1 installed in or on the anti-fire chemical liquid supply tank 60B to produce an electrical signal indicative of the volume or percentage of the AF liquid supply tank containing AF chemical liquid at any instant in time, and providing such signals to the AF liquid spraying system control interface 60F4; a power supply and controls 60F2 interfaced with the liquid pump spray subsystem 60C, and also the AF liquid spraying system control interface 60F4; manually-operated spray pump controls interface 60F3, interfaced with the AF liquid spraying system control interface 60F4; and the AF liquid spraying system control interface 60F4 interfaced with the micro-computing subsystem 60G, via the system bus 60I. The flash memory storage 60G2 contains microcode for a control program that runs on the microprocessor 60G3 and realizes the various GPS-specified AF chemical liquid spray control, monitoring, data logging and management functions supported by the system 60.

Figure 11:
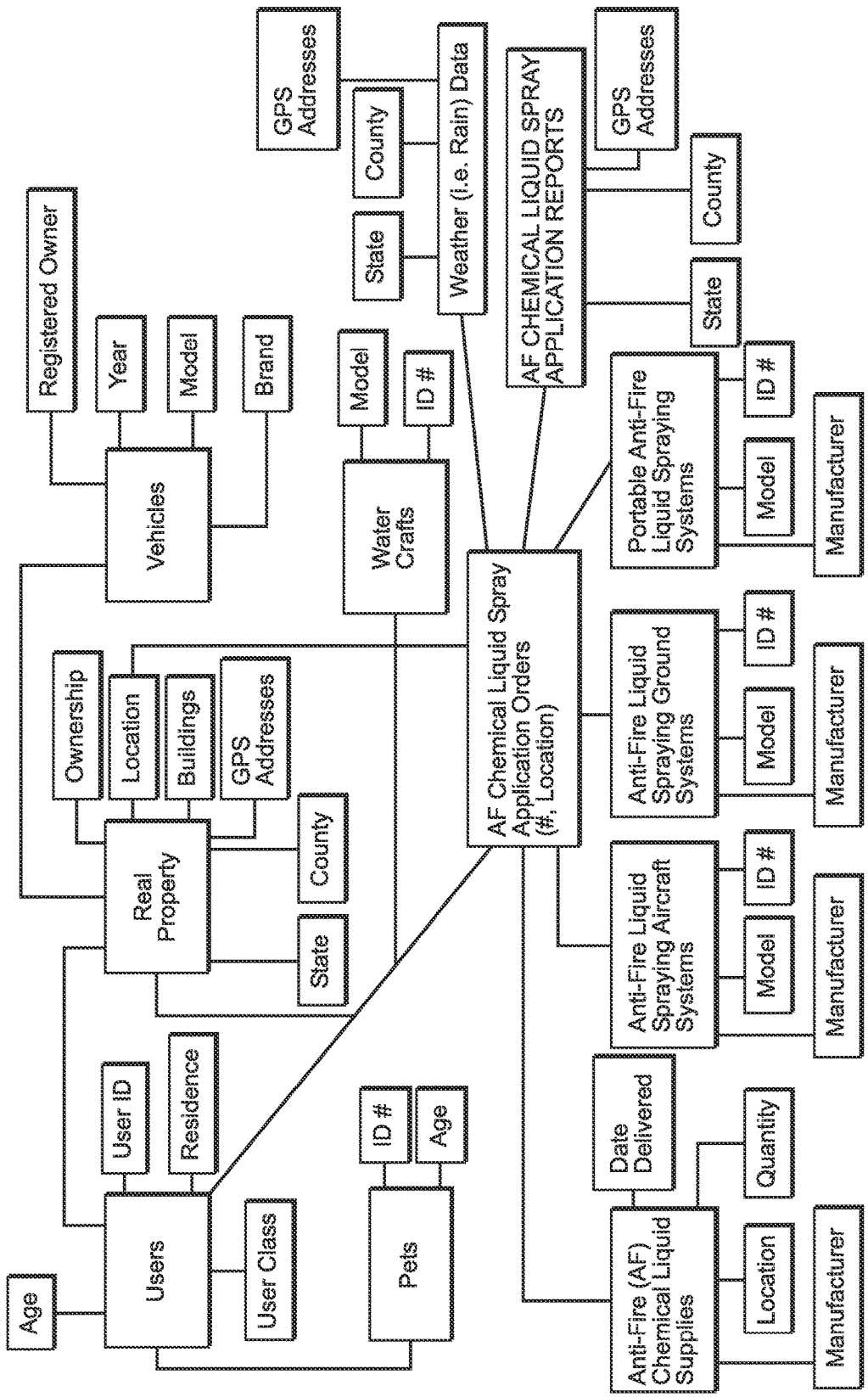
FIG. 11 is a schematic representation of a schema for the network database (RDBMS) supported by the system network of the present invention, showing the primary enterprise level objects supported in the database tables created in the network database using the schema, and the relationships that are specified or indicated.

Specification of an Exemplary Network Database Schema for Supporting the System Network of the Present Invention and GPS-Specified Operations Involving the Spraying of Anti-Fire (AF) Liquid on GPS-Specified Ground, Property and Building Surfaces in Regions at Risk Prior to and During the Outbreak of Wild Fires FIG. 11 shows an exemplary schema for the network database (RDBMS) 9C1 supported by the system network of the present invention, showing the primary enterprise level objects supported in the database tables created in the network database 9C using the schema, and the relationships that are specified or indicated. This exemplary database schema is for supporting the system network of the present invention and GPS-specified operations involving the spraying of anti-fire (AF) liquid on GPS-specified ground, property and building surfaces in regions at risk prior to and during the outbreak of wild fires.

As shown in FIG. 11, the exemplary database schema for the system network 1 includes a number of high-level enterprise objects such as, for example: Users, with properties including User ID, Residence, Age, User Class (e.g. Wild Fire Management Administrator, Wild Fire Spray Applicator, Real Property Owner, Home Owner, Business Owner, Property Owner, Resident, etc.), and Pets; Real Property, with properties including Ownership/Lease, Location, Buildings, GPS Addresses, County, State; Vehicles, with properties such as Model, Year, Brand, Registered Owner; Water Crafts, with properties Model, ID # etc.; Anti-Fire Chemical Liquid Supplies, with properties Manufacturer, Location, Quantity, Date Delivered; Anti-Fire (AF) Liquid Spraying Aircraft Systems, with properties Manufacturer, Model, ID #; Anti-Fire Liquid Spraying Ground Systems, including Manufacturer, Model, ID #; Portable Anti-Fire Liquid Spraying Systems; Anti-Fire (AF) Chemical Liquid Spray Application Orders, including Location, ID #; Anti-Fire Chemical Liquid Spray Application Reports, with properties such as State, County, GPS Addresses; and Weather Data, with properties State, County, and GPS Addresses.

Specification of Exemplary Graphical User Interfaces Supported on the Mobile Application Deployed on System Network of the Present Invention, for the Purpose of Delivering the Various Services Supported on the System Network FIG. 12 illustrates an exemplary wire-frame model of a graphical user interface (GUI) 13 of the mobile application 120 for use by registered users (e.g. property parcel owners, contractors and/or agents, and other stakeholders on the system network) to request and receive services supported by the system network of the present invention. As shown in this exemplary GUI screen 13, supports a number of pull-down menus under the titles: messages 13A, where the user can view messages sent via messaging services supported by the application; maps 13B, where wild fires have been identified and mapped, tracked and ranked in terms of risk to the user and associated property; and tasks 13C, where AF liquid spray tasks have been have been scheduled, have been completed, or are in progress, by the user.

Figure 12A:
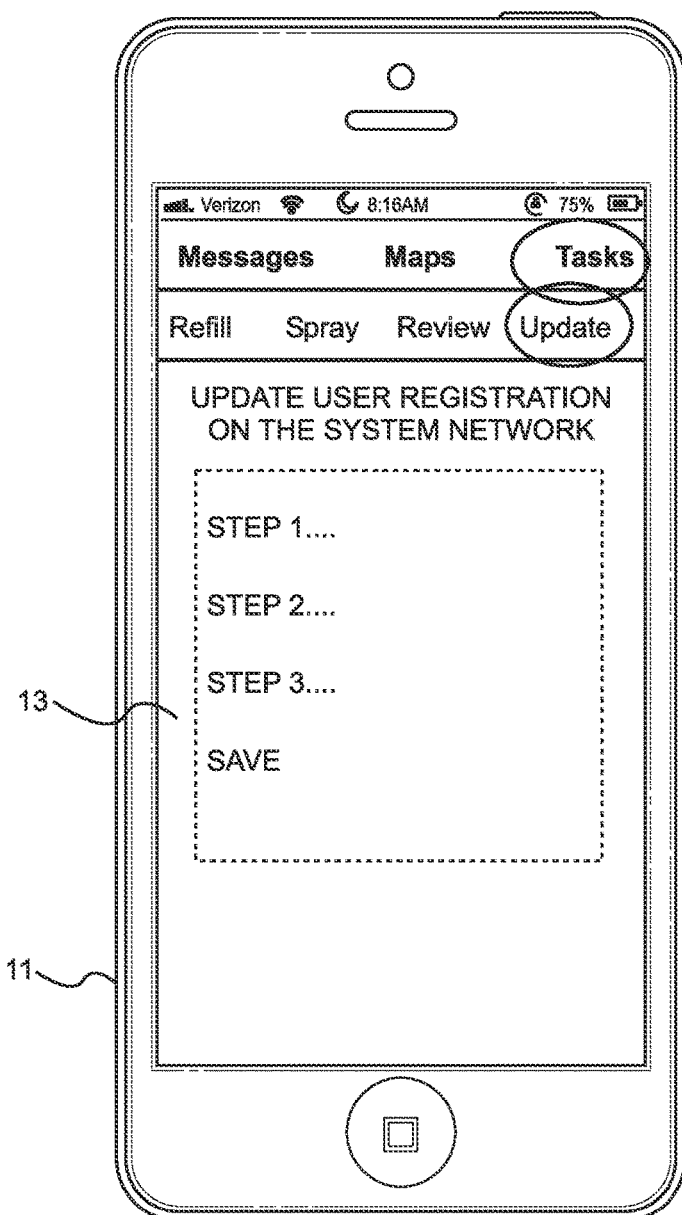
FIG. 12A is an exemplary wire-frame model of a graphical user interface supported by the mobile application showing a user updating the registration profile as a task on the system network.

FIG. 12A shows an exemplary graphical user interface supported by the mobile application 12 showing a user updating the registration profile as a task on the system network. The GUI screen is accessed and delivered to LCD screen of the mobile computing device 11 when the user selects the Tasks menu to display a menu of commands, and then selects the Update command from the command menu. During this service, the user can update various information items relating to the user profile, such as, name and address, contact information (e.g. email and SMS number), property parcel linked to one's profile, and GPS-tracked spray system deployed or assigned to the user and/or property parcel(s).

Figure 12B:
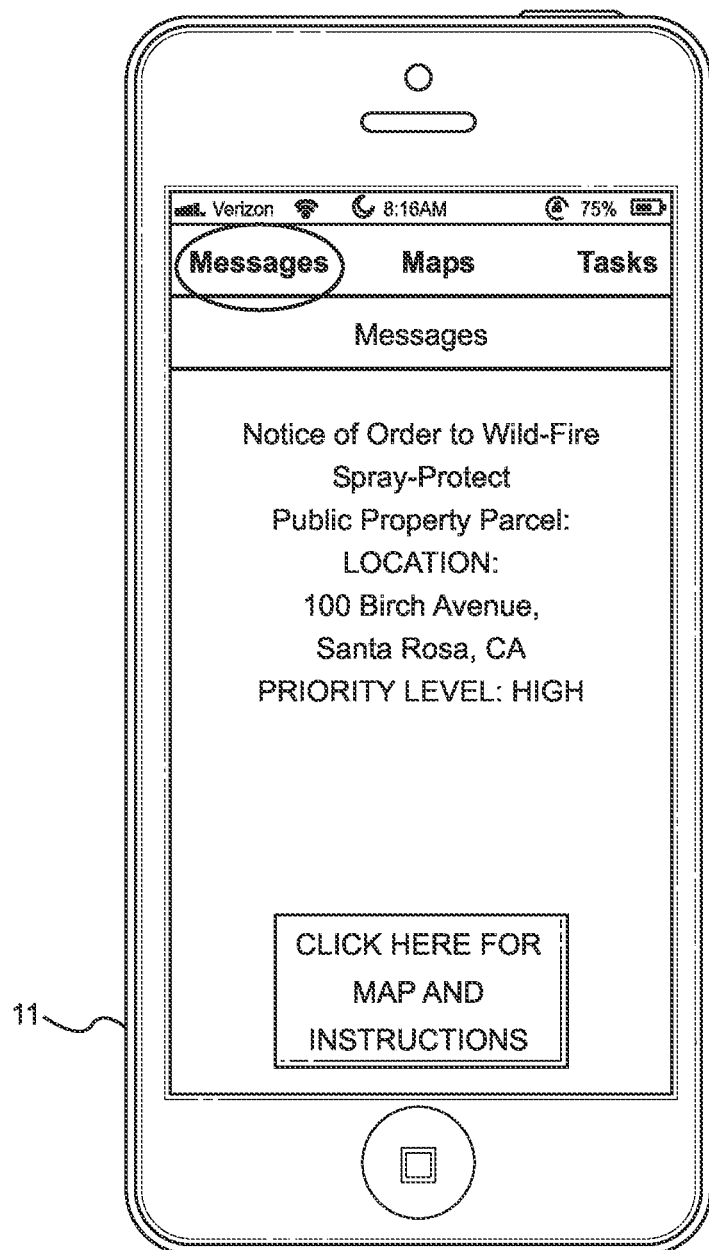
FIG. 12B is an exemplary wire-frame model of a graphical user interface supported by the mobile application showing a user receiving a message request (via email, SMS messaging and/or push-notifications) issued from the command center to spray GPS-specified private property parcel(s) with clean anti-fire (AF) chemical liquid and registered equipment.

FIG. 12B shows an exemplary graphical user interface supported by the mobile application 12 showing a user receiving a message "notice of request to wild-fire spray protect a property parcel" (via email, SMS messaging and/or push-notifications) issued from the command center 19 to spray GPS-specified private property parcel(s) with clean anti-fire (AF) chemical liquid and registered GPS-tracked spray equipment.

Figure 12C:
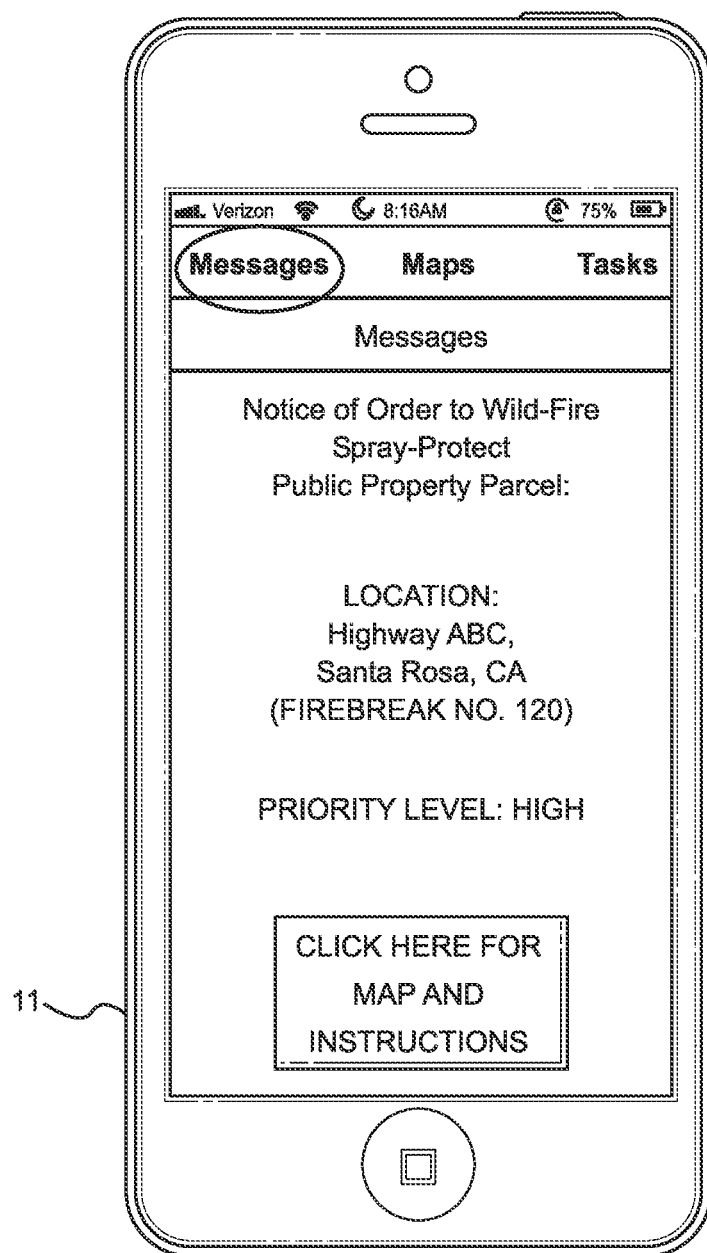
FIG. 12C is an exemplary wire-frame model of a graphical user interface supported by the mobile application showing a user receiving a request/notice of order (via email, SMS messaging and/or push-notifications) to wild-fire spray-protect GPS-specified public property parcel(s) with clean anti-fire (AF) liquid to create and maintain a GPS-specified public firebreak, maintained on public property.

FIG. 12C shows an exemplary graphical user interface supported by the mobile application 12 showing a user receiving a notice of order (via email, SMS messaging and/or push-notifications) to wild-fire spray-protect GPS-specified public property parcel(s) with clean anti-fire (AF) liquid to create and maintain a GPS-specified public firebreak (e.g. Firebreak No. 120).

Figure 12D:
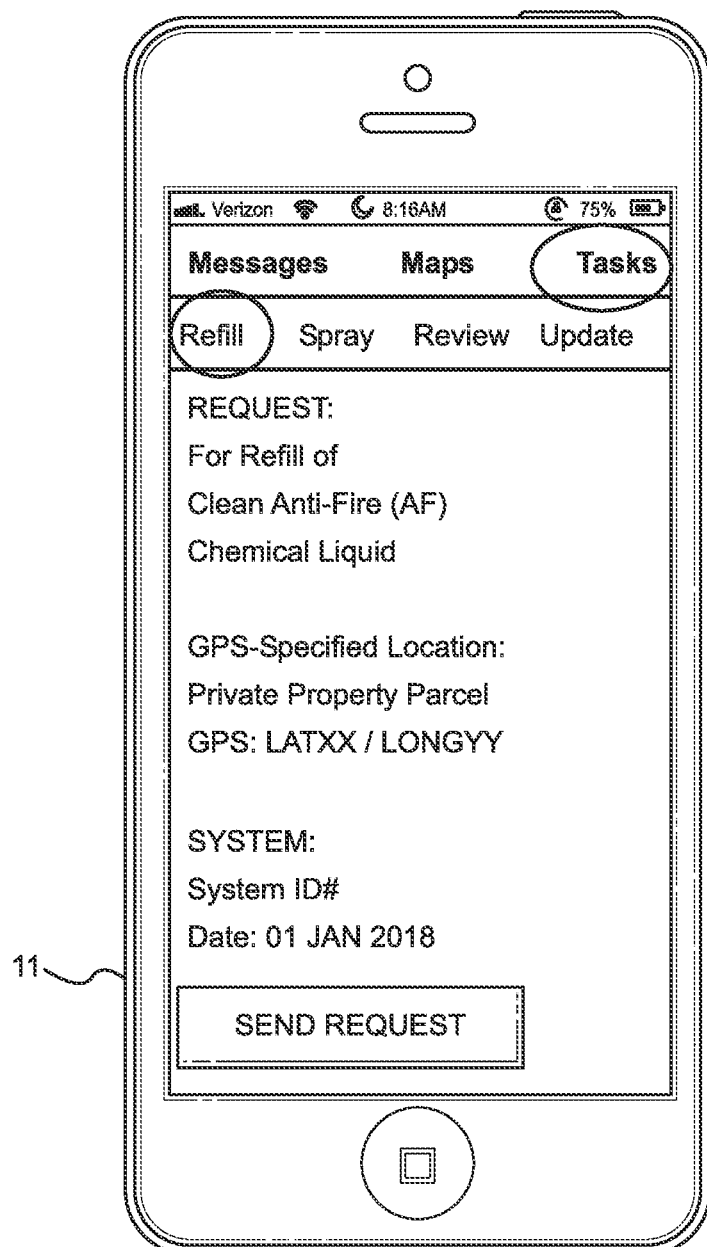
FIG. 12D is an exemplary wire-frame model of a graphical user interface supported by the mobile application showing a user requesting a refill supply of clean anti-fire (AF) chemical liquid for supply to GPS-specified spray equipment registered on the system network.

FIG. 12D shows an exemplary graphical user interface supported by the mobile application showing a user requesting a refill of clean anti-fire (AF) chemical liquid for supply to GPS-specified spray equipment registered on the system network. The user selects the Tasks menu to display a set of commands, and then selects the Refill command from the displayed command menu. The user confirms the refill order and when ready selects the Send Request command from the display screen, sending the command to the command center 19 and related data center 8 for processing and fulfillment. All operations are logged and tracked in the system network database 9C1 shown in FIG. 4.

In the illustrative embodiment, the mobile application 12 on mobile computing device 11 supports many functions to provide many services: (i) sends automatic notifications from the command center 19 to home/business owners with the mobile application 12, instructing them to spray their real property and home/building at certain times with anti-fire (AF) liquid contained in the tanks of GPS-tracked AF liquid spraying systems 20, 30, 40, 50 and 60; (ii) automatically monitors consumption of sprayed AF-liquid and generate auto-replenish order (via its onboard GSM-circuits) so as to achieve compliance with the home/neighborhood spray defense program, and report AF chemical liquid levels in each home-owner tank; and (iii) shows status of wild fire risk in the region, and actions to the taken before wild fire outbreak.

FIG. 13 shows an exemplary graphical user interface 13' supported by the mobile application 12 configured for use by command center administrators to issue wild-fire protection orders, plan wild-fire protection tasks, generate wild-fire and protection reports, and send and receive messages to users on the system network, to carry out a wild fire suppression and management program in the region where the system network is deployed. As shown, GUI screen 13' supports a number of pull-down menus under the titles: Messages 13A', where project administrator and spray technicians can view messages sent via messaging services supported by the application; Maps 13B', where wild fires have been identified, tracked, and ranked in terms of risk to certain regions at a given moment in time; Planning 13C', wherein plans have been have been made to fight wild fires using the methods described in FIGS. 17 through 25B, status of specific plans, which one are in progress; and Reports 13D', where reports are issued to the mobile application 12 running on mobile client systems 11 in operable communication with the web, application and database servers 9A, 9B and 9C at the data center 8, supported by the system network 1.

FIG. 13A shows an exemplary graphical user interface supported by the mobile application configured for use by command center administrators to issue wild-fire protection orders using the system network of the present invention. As shown, the user selects the Planning menu and displays a set of planning commands, and then selects the Property command, where the user is then given the choice to select one or more parcels of property in a given region, and then select an Action (e.g. Wild Fire Spray Protect). The users selects the property parcel(s), and then the required Action (i.e. Wild Fire Spray Protect), and Order is set up for the command center action. When the command center selects execute from the menu, the system network issues the order and sends notice of orders to all property parcel owners or agents to oversee the immediate spraying of the GPS-specified property parcels with clean anti-fire (AF) chemical liquid supply to the property owners or agents as the case may be.

Figure 18:
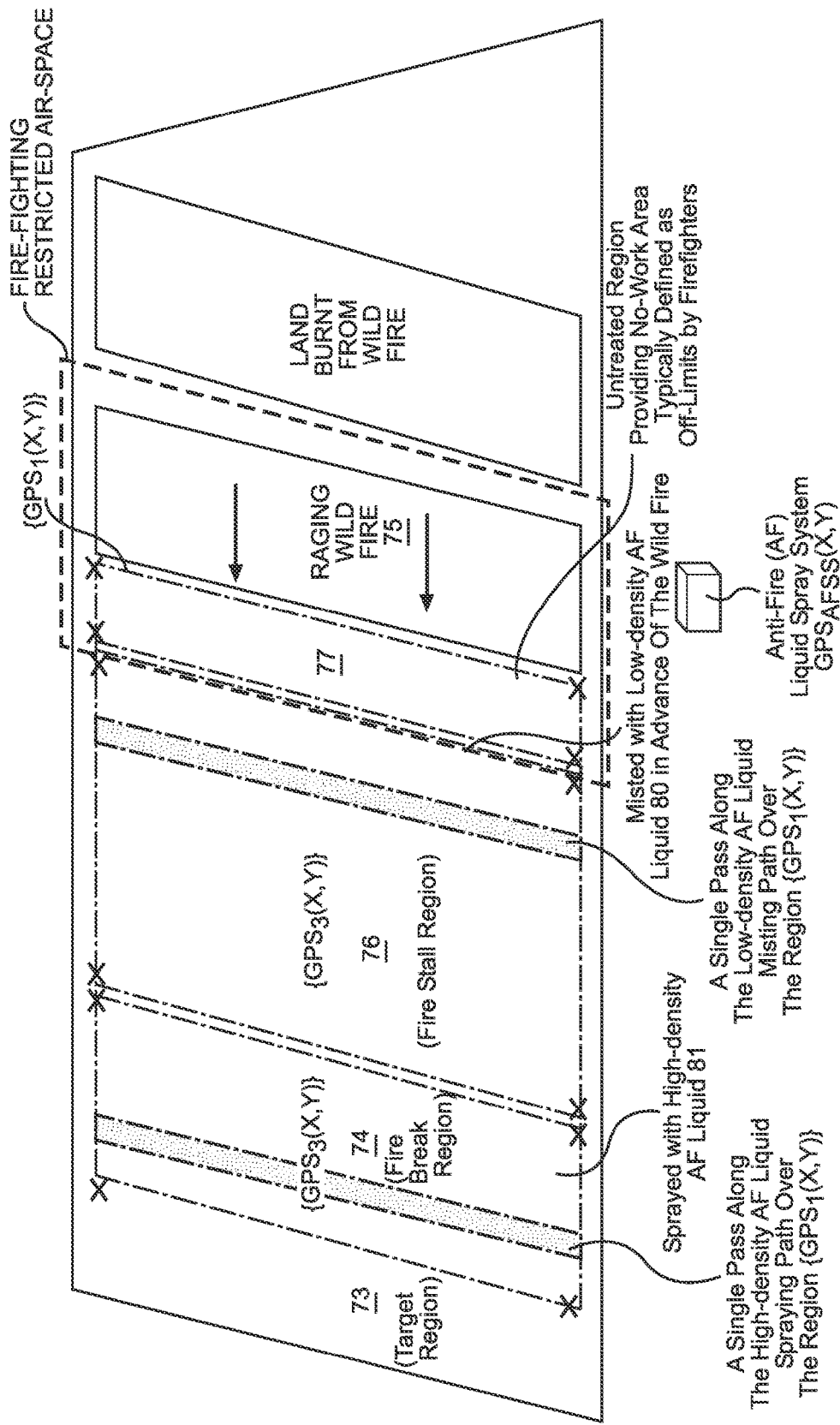
FIG. 18 is a graphical representation illustrating a method of suppressing a wild fire raging across a region of land in the direction of the prevailing winds, by forming a multi-stage anti-fire (AF) chemical fire-break system, by GPS-controlled application of anti-fire (AF) liquid mist and spray streams, wherein the method comprises the step of (a) applying, prior to the wild fire reaching the specified target region of land, a low-density anti-fire (AF) liquid mist in advance of the wild fire so as to form a fire stall region, while providing a non-treated region of sufficient size between the front of the wild fire approaching the target region of land and the fire stall region, and (b) also applying a high-density anti-fire (AF) liquid spray in advance of the wild fire to form a fire break region beyond and contiguous with said fire stall region, wherein the fire stall region is formed before said wild fire reaches the fire stall region, and operates to reduce the free-radical chemical reactions raging in the wild fire so as to reduce the destructive energy of the wild fire by the time the wild fire reaches the fire break region, and enabling the fire break region to operate and significantly break the free radical chemical reactions in the wild fire when the wild fire reaches the fire break region, and thereby suppress the wild fire and protect the target region of land.

FIG. 13B shows an exemplary graphical user interface supported by the mobile application 12 configured for use by command center administrators to issue wild-fire protection orders involving the creation and maintenance of a clean AF-based chemical firebreak, as illustrated in FIG. 18, for example, using the methods of the present invention described herein. As shown, the administrator selects the Planning menu, and displays a menu of Planning commands, from which the user selects Firebreaks. In the case example shown in FIG. 13B, the administrator issues an Order to apply or rather practice the dual-region clean AF chemical firebreak method illustrated in FIG. 18, at GPS-specified coordinates GPS LAT-X/LONG-Y using AF chemical liquid misting and spraying airborne operations. As shown the order will specify the deployment of specific GPS-tracked AF spray vehicle systems, and identify them by system ID #. The order may also identify or request users (e.g. pilots) assigned to the AF chemical firebreak project/task.

FIG. 13C shows an exemplary graphical user interface supported by mobile application 12 configured for use by command center administrators to order the creation and/or maintenance of a GPS-specified clean AF-based chemical firebreak on one or more public/private property parcels. As shown, the administrator selects the Planning menu, and displays a menu of Planning commands, from which the user selects Firebreaks. In the case example shown in FIG. 13C, the administrator issues an Order to practice the Wild Fire Spray Protect Method alongside one or more parcels of public property, which may be a long strip of land/brush alongside or near a highway. The method may be the AF chemical firebreak method as illustrated in the FIG. 22 and described in FIGS. 23A, 23B and 23C, at GPS-specified coordinates GPS LAT-X/LONG-Y using ground-based AF chemical liquid spraying operations. As shown, the order will specify the deployment of specific GPS-tracked AF spray vehicle systems, and identify them by system ID #. The order may also identify or request users (e.g. drivers) assigned to the AF chemical firebreak project/task. Alternatively, other methods disclosed in FIGS. 20 through 21C and FIGS. 24, 25A and 25B.

Figure 14:
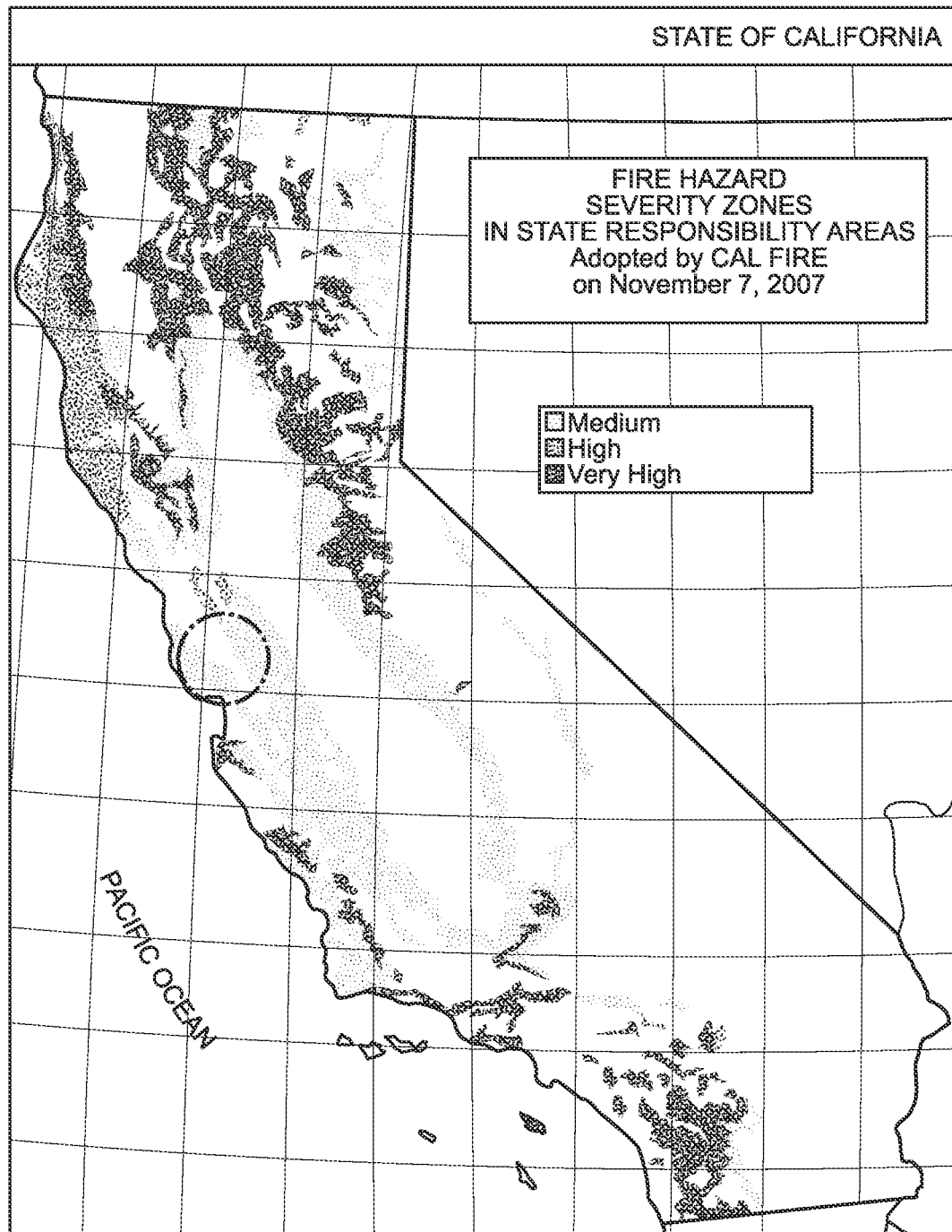
FIG. 14 is a graphical representation of an exemplary fire hazard severity zone (FHSZ) map generated by the CAF FIRE™ System in state responsibility areas of the State of California, and accessible through the mobile application, for use while informing the strategic application of environmentally-clean anti-fire (AF) liquid spray onto specified regions of property prior to the arrival of wild fires, using the system network of the present invention.

FIG. 13D shows an exemplary graphical user interface for mobile application configured used by command center administrators to receive messages from users including property owners and contractors, requesting refills for clean anti-fire (AF) chemical liquid for GPS-specified spray system equipment. While the system network 1 AF chemical liquid refills FIG. 14 shows an exemplary fire hazard severity zone (FHSZ) map generated by the CAF FIRE™ System in state responsibility areas of the State of California. Such maps can be used by the system network 1 to inform the strategic application of environmentally-clean anti-fire (AF) liquid spray using the system network of the present invention. Such maps also can be displayed on the mobile application 12 to provide greater awareness of risks created by wild fires in a specific region, at certain moments in time.

Figure 15:
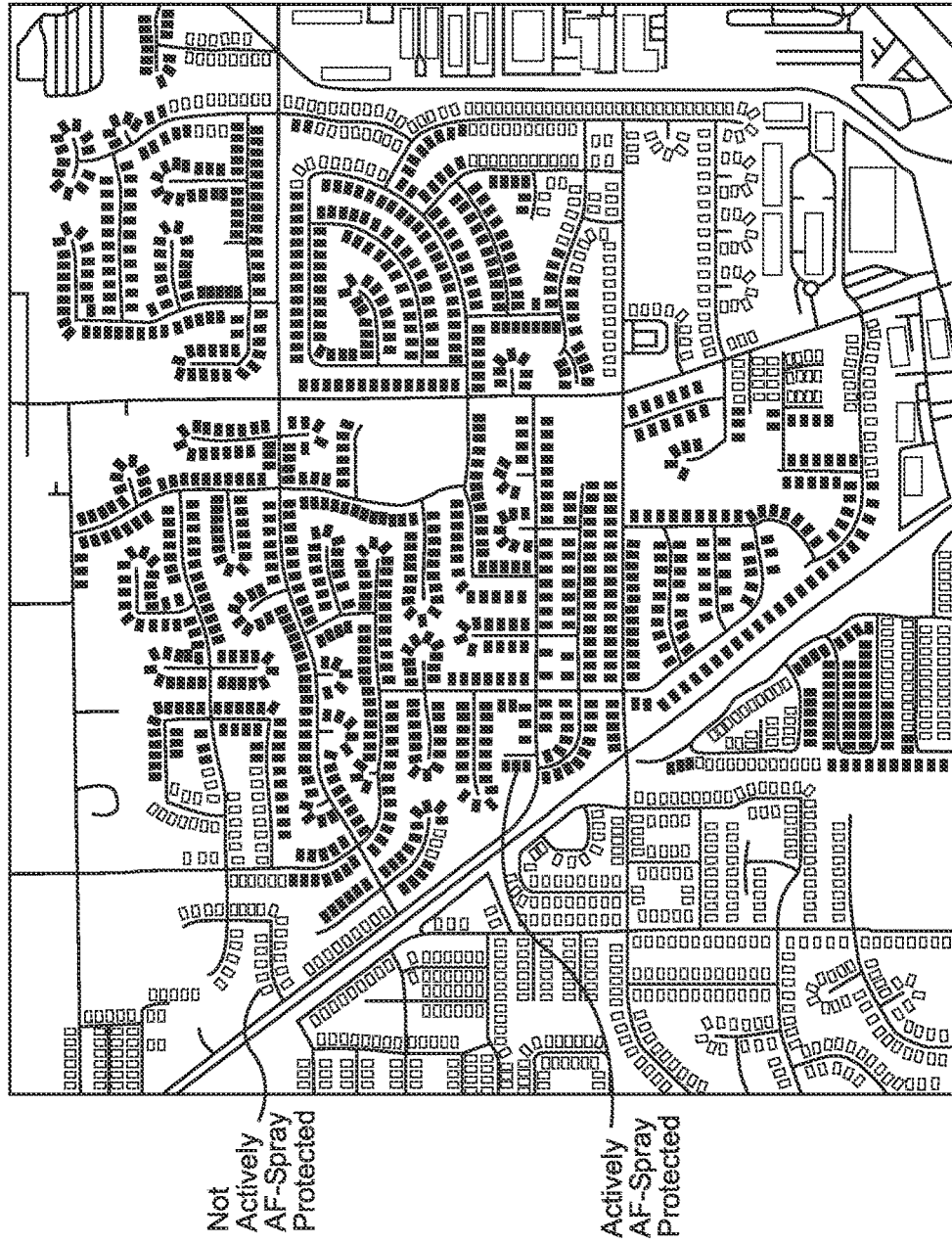
FIG. 15 is an exemplary anti-fire (AF) spray protection map generated by the system network of the present invention, showing houses and buildings that have been sprayed, and not-sprayed, with state/county-issued clean anti-fire (AF) liquid as of the report date 15 Dec. 2017.
Figure 17:
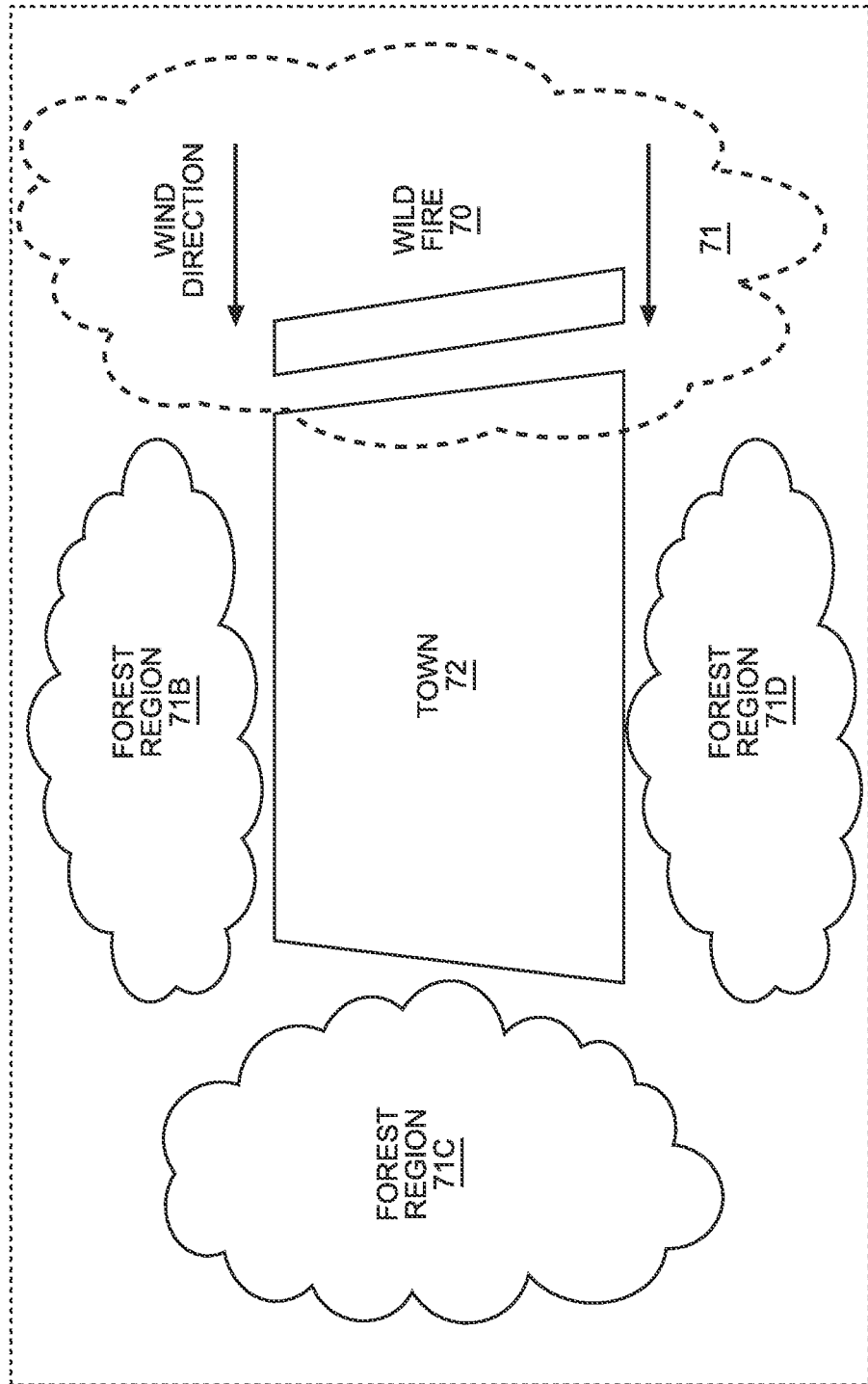
FIG. 17 is a schematic representation showing a plan view of a wild fire emerging from a forest region and approaching a neighboring town moving in the direction of prevailing winds.

Specification of an Exemplary Anti-Fire (AF) Spray Protection Map Generated by the System Network of the Present Invention FIG. 15 shows an exemplary GPS-specified anti-fire (AF) chemical liquid spray protection map generated by the system network 1, showing properties, houses and buildings that were sprayed, and not-sprayed, with state/county-issued anti-fire liquid as of report date, 15 Dec. 2017. The system network will periodically update these AF chemical liquid spray protection maps (e.g. every 5 minutes or less) for display to users and neighbors to see whose property/land parcels and homes/building have been spray protected with anti-fire (AF) chemical liquid (e.g. Hartindo AF31 anti-fire chemical liquid), and whose parcels and home/buildings have not been AF-spray protected against wild fires, so that they can or may volunteer to lend a helping hand in spray protecting their neighbors properties as time and anti-fire chemical supplies allow, to provide a stronger defense against one or more wild fires raging towards their neighborhood.

In accordance with the principles of the present invention, the application servers 9B supported by the system network 1 will automatically generate anti-fire (AF) chemical liquid spray-protection task reports, as illustrated in FIG. 16, based on the analysis of spray-protection maps as shown in FIG. 15, and based on many other kinds of intelligence collected by the system, and analyzed by human analysts, as well as artificial intelligence (AI) expert systems. Based on such automated intelligence efforts, the application servers 9B will generate periodically, and as needed, AF chemical liquid (AFCL) Spray Command Program files containing GPS/Time-Frame-indexed commands and instructions that are wirelessly transmitted to assigned GPS-tracked anti-fire (AF) chemical liquid spraying systems 30, 40, 50 and 60, so that the operators of such GPS-tracked AF liquid spraying systems will know when and where to mist and/or spray AF chemical liquid over and one certain GPS-specified properties, in their effort to defend against the threat of wild fires.

The AFCL Spray Command Program files, containing GPS-indexed commands and instructions, generated by the application servers 9B are transmitted over the system network 1 to the numerous deployed GPS-tracked AF liquid spraying systems 30, 40, 50 and 60, so as to orchestrate and choreograph the spray application of clean anti-fire (AF) chemical liquid over GPS-specified properties, before and during the presence of wild fires, so as to implement an orchestrated strategic and collective defense against wild fires that break out for various reasons, threatening states, counties, towns, neighborhoods homes, business, and human and animal life.

In some embodiments, the application servers 9B will generate and issue AFCL Spray Command Program files that are transmitted to specific GPS-tracked AF liquid spraying systems 30, 40, 50 and 60, and containing automated instructions (i.e. commands) on when and where (i.e. in terms of time frame and GPS-specified coordinates) the GPS-tracked AF liquid spraying systems should automatically apply, via spraying operations, clean AF chemical liquid on GPS-specified property during their course of movement over land. During such spraying operations, the system network 1 will automatically meter, dispense and log how much clean AF chemical liquid has been sprayed over and on certain GPS-specified properties. Real-time wind-speed measurements can be made and used to compensate for spraying operations in real-time, as may be required under certain weather conditions.

In other embodiments, the application servers 9B will generate and issue AFCL Spray Command Program files that are transmitted to other GPS-tracked AF liquid spraying systems 30, 40, 50 and 60, providing automated instructions (i.e. commands) on when and where the GPS-tracked AF liquid spraying systems should spray-apply clean AF chemical liquid on GPS-specified property during course of movement over land, but allowing the human operator to override such spraying instructions, and compensate and ensure greater accuracy, using human operator skill and judgment during spraying operations. While such spraying operations, the system will automatically meter, log and record all dispensed AF chemical liquid sprayed over and over certain GPS-specified properties under the supervision and control of the human operator.

Specification of an Exemplary Anti-Fire Spray Protection Task Report Generated by the System of the Present Invention FIG. 16 shows an exemplary GPS-specified anti-fire spray protection task report generated by the system network 1 for state/county xxx on 15 Dec. 2017, indicating which properties on what streets, in what town, county, state, requires the reapplication of AF chemical liquid spray treatment in view of factors such as weather (e.g. rainfall, sunlight) and passage of time since last spray application. Such task reports will be transmitted by the command center 19 to registered users, along with an SMS and/or email message to attend to the AF spray task, so the requested user will promptly spray protect their land parcels and home with clean AF chemical liquid, as conditions require or suggest, using the mobile/portable GPS-tracked AF liquid spraying system 20 assigned to the property owner, and deployed over the system network 1.

As contracted AF-spray operators, and home owners alike, protect properties and homes using the GPS-tracked AF liquid spraying systems (20, 30, 40, 50 and 60), the system network 1 automatically receives GSM or other RF-based signals transmitted from the GPS-tracked anti-fire (AF) chemical liquid spraying systems, indicating that certain amounts of AF chemical liquid has been dispensed and sprayed from the system onto GPS-specified property. Notably, the amounts of AF chemical liquid dispensed and sprayed from the system over and onto GPS-specified property should closely match the amounts requested in the task report transmitted to the user, to achieve the AF spray protection task directed by AI-driven management processes supported by the wild fire suppression system network of the present invention.

Specification of New and Improved Wild Fire Suppression Methods in Accordance with Principles of the Present Invention Having described the various GPS-tracked anti-fire (AF) chemical liquid spraying systems of the illustrative embodiments 20, 30, 40, 50 and 60, shown in the Figure Drawings, and the various functions supported by the mobile application 12 supported by the data center 8 of the system network 1, it is appropriate at this juncture to now described the various new and improved wild fire suppression methods in accordance with principles of the present invention, each involving GPS-guided spray application of clean anti-fire (AF) chemical liquid having a chemistry that works to break a wild fire by interfering with the free-radicals produced during the combustion phase of a ranging wild fire. The benefits and advantages provided by such new and improved methods will become apparent hereinafter.

Specification of a Method of Suppressing a Wild Fire Raging Across a Region of Land in the Direction of the Prevailing Winds FIG. 17 shows a plan view of a wild fire 70 emerging from a forest region 71A and approaching a neighboring town 72 surrounded by other forest regions 71B, 71B and 71C, and moving in the direction determined by prevailing winds, indicated by a pair of bold arrows. This example closely resembles the pathway of many wild fires recently destroying countless acres of land (i.e. real property) in the State of California in 2017.

FIG. 18 illustrates the various steps involved in carrying out the method of suppressing a wild fire raging across a region of land. Specifically, the method involves forming a multi-stage anti-fire chemical fire-break system illustrated in FIG. 18 using the remotely-managed GPS-controlled application of both anti-fire (AF) liquid mist streams and AF chemical liquid spray streams from ground and air based GPS-tracked anti-fire (AF) liquid spray vehicles, as illustrated in FIGS. 7A, 7B and 9A, 9B, for example.

As illustrated in FIG. 18, the method generally involves: (a) applying, prior to the wild fire reaching the specified target region of land 74, a low-density anti-fire (AF) liquid mist stream in advance of the wild fire 75 so as to form a fire stall region 76, while providing a non-treated region 77 of sufficient size between the front of the wild fire 75 approaching the target region of land 73 and the fire stall region 76; and (b) applying a high-density anti-fire (AF) liquid spray stream in advance of the wild fire 75 to form a fire break region 74 beyond and contiguous with the fire stall region 76, and also continuous with the target region 73 to be protected from the wild fire.

As illustrated in FIG. 18, the fire stall region 76 is formed before the wild fire reaches the fire stall region 76. The fire stall region 76 operates to reduce the free-radical chemical reactions raging in the wild fire 75. This fire stall region 76 helps to reduce the destructive energy of the wild fire by the time the wild fire reaches the fire break region 74, and enabling the fire break region 74 to operate and significantly break the free radical chemical reactions in the wild fire 75 when the wild fire reaches the fire break region 74. This helps to suppress the wild fire 75 and protect the target region of land 73.

Figure 19B:
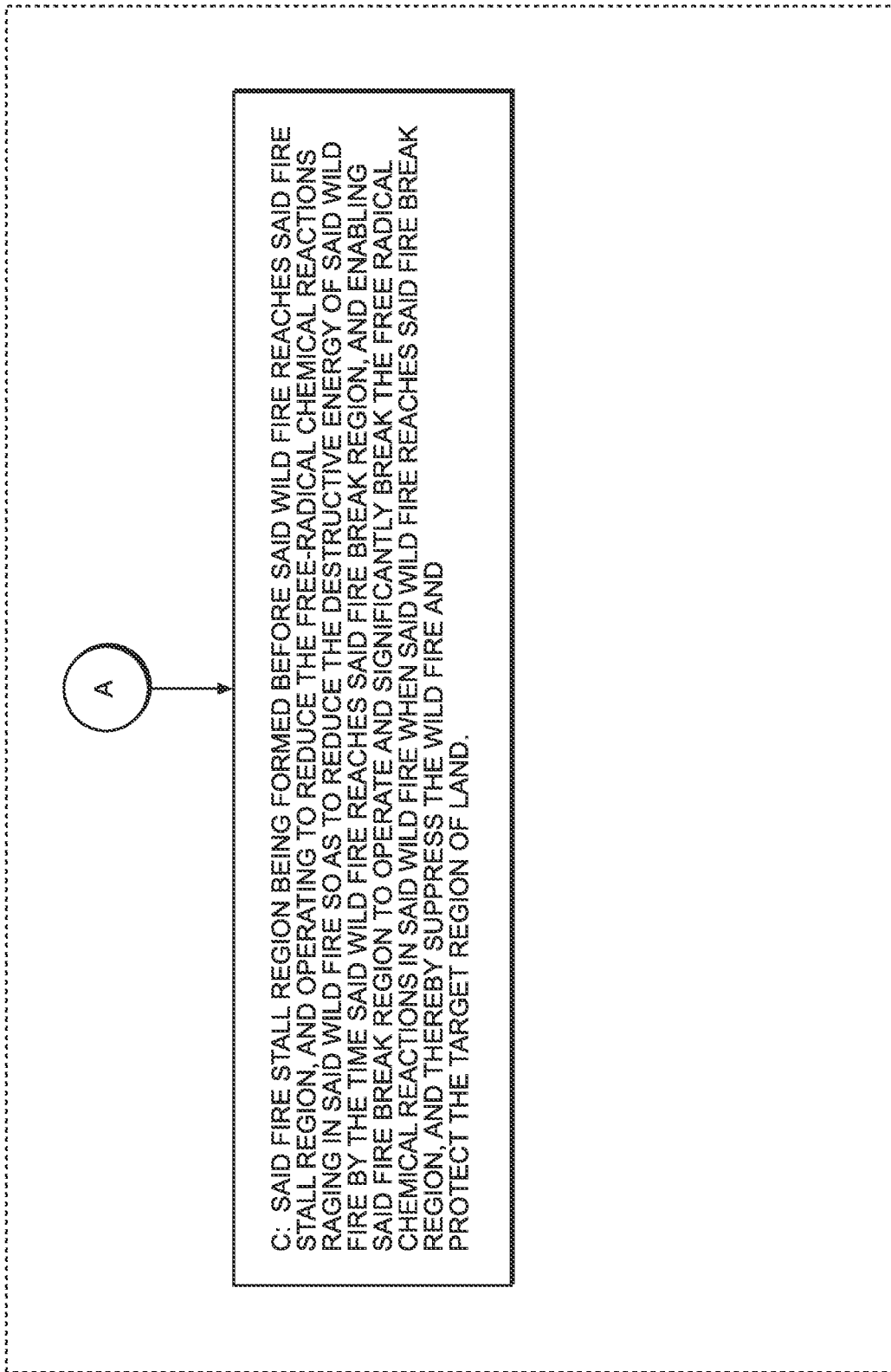

FIGS. 19A and 19B describe the method of suppressing a wild fire raging towards a target region of land 73 (and beyond) in a direction determined by prevailing winds and other environmental and weather factors, as illustrated in FIG. 18. Typically, the system used to practice this method of the present invention will employ a centralized GPS-indexed real-property/land database system 7 shown in FIG. 4 containing GPS-indexed maps of all land regions under management and fire-protection, developed using methods, equipment and services known in the GPS mapping art. Such GPS-indexed maps will contain the GPS coordinates for the vertices of each and every parcel in any given state, county and town in the country in which system is deployed. As shown in FIG. 4, this central GPS-indexed real property database 7 will be operably connected to the TCP/IP infrastructure 10 of the Internet, and accessible by system network 1 of the present invention.

As indicated at Block A in FIG. 19A, prior to the wild fire reaching the specified target region of land, a GPS-tracked AF spray vehicle 50 as shown for example in FIG. 9A applies a low-density anti-fire (AF) liquid mist 80 in advance of the wild fire so as to form a fire stall region 76 while providing a non-treated region 77 of sufficient size between the front of the wild fire approaching the target region of land 73 and the fire stall region 76. The fire stall region 76 is formed by a first GPS-guided aircraft system flying over the fire stall region during multiple passes and applying the low-density AF chemical liquid mist 80 over the fire stall region 76. The non-treated region 77 is defined by a first set of GPS coordinates $\{GPS_1(x,y)\}$ and, the fire stall region 76 is defined by a second set of GPS coordinates $\{GPS_2(x,y)\}$. Each of these regions are mapped out using global positioning system (GPS) methods, the GPS-indexed land database system 7, drone-type aircraft systems as shown in FIG. 8A, and space-based land-imaging satellites 14 having multi-spectral imaging capabilities, and operably connected to the infrastructure of the Internet. When used alone and/or together, these systems are capable of capturing real-time intelligence on the location and spread of a particular wild fire, its direction of propagation, intensity and other attributes. This captured data is provided to application servers in the data center 8 which, in turn, generate GPS coordinates determining the planned pathways of the GPS-traced AF chemical liquid spraying/misting aircraft systems, to provide the anti-fire protection over the GPS-indexed fire stall region 76 and GPS-specified non-treated region 75, as described in greater detail below.

As indicated at Block B in FIG. 19A, a second GPS-tracked AF spray vehicle as shown in FIG. 9A applies a high-density anti-fire (AF) liquid spray 81 over the land in advance of the wild fire to form a GPS-specified fire break region 74 beyond and contiguous with the GPS-specified fire stall region 76. The fire break region 74 is formed by the second GPS-guided aircraft flying over the fire break region 74 during multiple passes and applying the high-density AF chemical liquid spray 81 over the fire break region 74. The fire break region 74 is defined by a third set of GPS coordinates $\{GPS_3(x,y)\}$ mapped out using global positioning system (GPS) methods, the GPS-indexed land database system 7, drone-type aircraft systems as shown in FIG. 8A, and/or space-based land-imaging satellites 14 having multi-spectral imaging capabilities, and operably connected to the infrastructure of the Internet. When used alone and/or together, these systems are capable of capturing real-time intelligence on the location and spread of a particular wild fire, its direction of propagation, intensity and other attributes. This captured data is provided to application servers in the data center 8 which, in turn, generate GPS coordinates determining the planned pathways of the GPS-traced AF chemical liquid spraying/misting aircraft systems, to provide the anti-fire protection over GPS-specified fire break region 74, as described in greater detail below.

As indicated at Block C in FIG. 19B, the fire stall region 76 is formed before the wild fire 75 reaches the fire stall region 76, and operates to reduce the free-radical chemical reactions raging in the wild fire so as to reduce the destructive energy of the wild fire by the time the wild fire 75 reaches the fire break region 74, and enabling the fire break region 74 to operate and significantly break the free radical chemical reactions in the wild fire 75 when the wild fire reaches the fire break region 74, and thereby suppress the wild fire 75 and protect the target region of land 73 and beyond.

Figure 20:
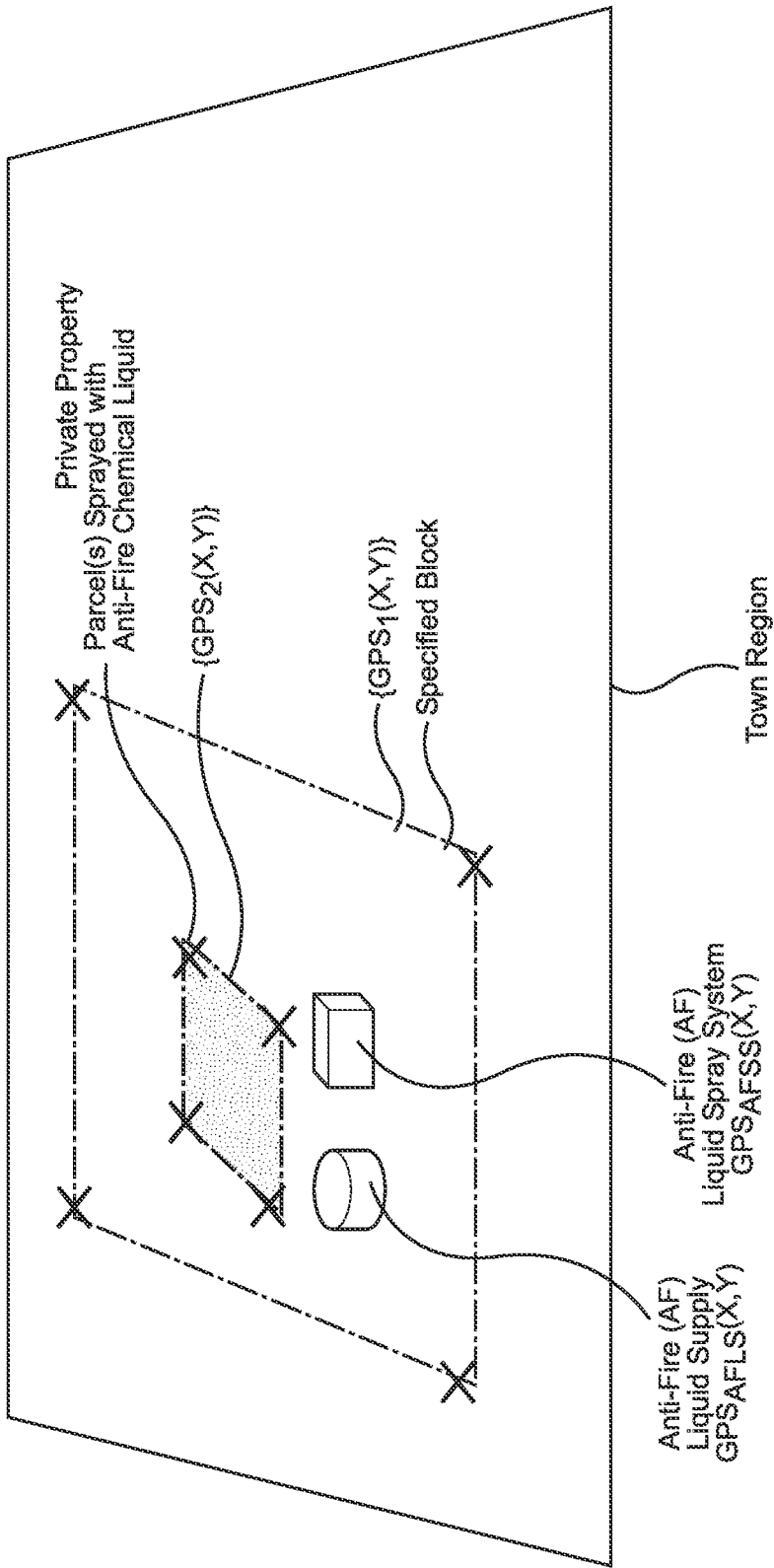
FIG. 20 is a graphical representation illustrating a method of reducing the risks of damage to private property due to wild fires by GPS-controlled application of anti-fire (AF) liquid spray, using the system network of the present invention.

Specification of a Method of Reducing the Risks of Damage to Private Property Due to Wild Fires by Managed Application of Anti-Fire (AF) Liquid Spray FIG. 20 illustrates a method of reducing the risks of damage to private property due to wild fires by managed application of anti-fire (AF) liquid spray. FIGS. 21A, 21B and 21C illustrates a method of reducing the risks of damage to private property due to wild fires by managed application of anti-fire (AF) liquid spray. Typically, this method is carried out using the system network of FIG. 4 and any one or more of the GPS-tracked anti-fire (AF) liquid spray vehicle systems 14A-14D represented in FIG. 4 and shown in FIGS. 6A, 6B, 7A, 7B, 8A, 8B, 9A, 9B, and 10A, 10B.

As indicated at Block A in FIG. 21A, the system registers each GPS-specified parcel of private real property in a specified County and State, which may or may not have buildings constructed thereon, and identifying the owner and tenants, as well as all pets, vehicles and watercrafts associated with the registered parcel of private property. Typically, the system will request the address of the property parcel, and will automatically determine its GPS coordinates that specify the vertices of the parcel using databases, and data processing methods, equipment and services, known in the GPS mapping art.

As indicated at Block B in FIG. 21A, the system collects intelligence relating to the County, risks of wild fires in the surrounding region, and historical data maintained in a network database, and generating GPS-specified anti-fire (AF) spray protection maps and task reports for execution.

As indicated at Block C in FIG. 21A, an AF chemical liquid spraying system is provided to a GPS-specified location for spraying one or more registered parcels of private property with AF chemical liquid spray.

As indicated at Block D in FIG. 21A, a supply of AF chemical liquid spray is provided to the GPS-specified location of the AF chemical liquid spraying system.

As indicated at Block E in FIG. 21A, the AF chemical liquid spraying system is provided with the supply of AF chemical liquid, As indicated at Block F in FIG. 21B, based on the GPS-specified anti-fire (AF) spray protection maps and task reports, the system issues orders to the private property owner, or its contractor, to apply AF chemical liquid spray on the private property using the AF chemical liquid spraying system.

As indicated at Block G in FIG. 21B, the private property owner executes the order and applies AF chemical liquid spray on the private property using the AF chemical liquid spraying system, and the system remotely monitors the consumption and application of AF chemical liquid at the private property on a given time and date, and automatically records the transaction in the network database 9C prior to the arrival and presence of wild fire in the region.

As indicated at Block H in FIG. 21B, the system updated the records in the network database associated with each application of AF chemical liquid spray on a GPS-specified parcel of private property.

As indicated at Block I in FIG. 21B, the system scheduled the next application of AF chemical liquid spray on the GPS-specified parcel of private property, factoring weather conditions and the passage of time.

As indicated at Block J in FIG. 21B, the system issues another order to the GPS-specified parcel of private property to re-apply AF chemical liquid spray on the private property to maintain active wild fire protection.

As indicated at Block K in FIG. 21C, the property owner executes (i.e. carries out) the order to reapply AF chemical liquid spray on the parcel of private property using the AF chemical liquid spraying system, and the system remotely monitors the application of AF chemical liquid at the private property on a given time and date, and records this transaction in the network database 9C.

As indicated at Block L in FIG. 21C, the system updates records on AF chemical liquid spray application in the network database 9C associated with reapplication of AF chemical liquid on the parcel of private property.

As indicated at Block M in FIG. 21C, the system schedules the next application of AF chemical liquid spray on the parcel of private property, factoring weather conditions and the passage of time.

Figure 22:
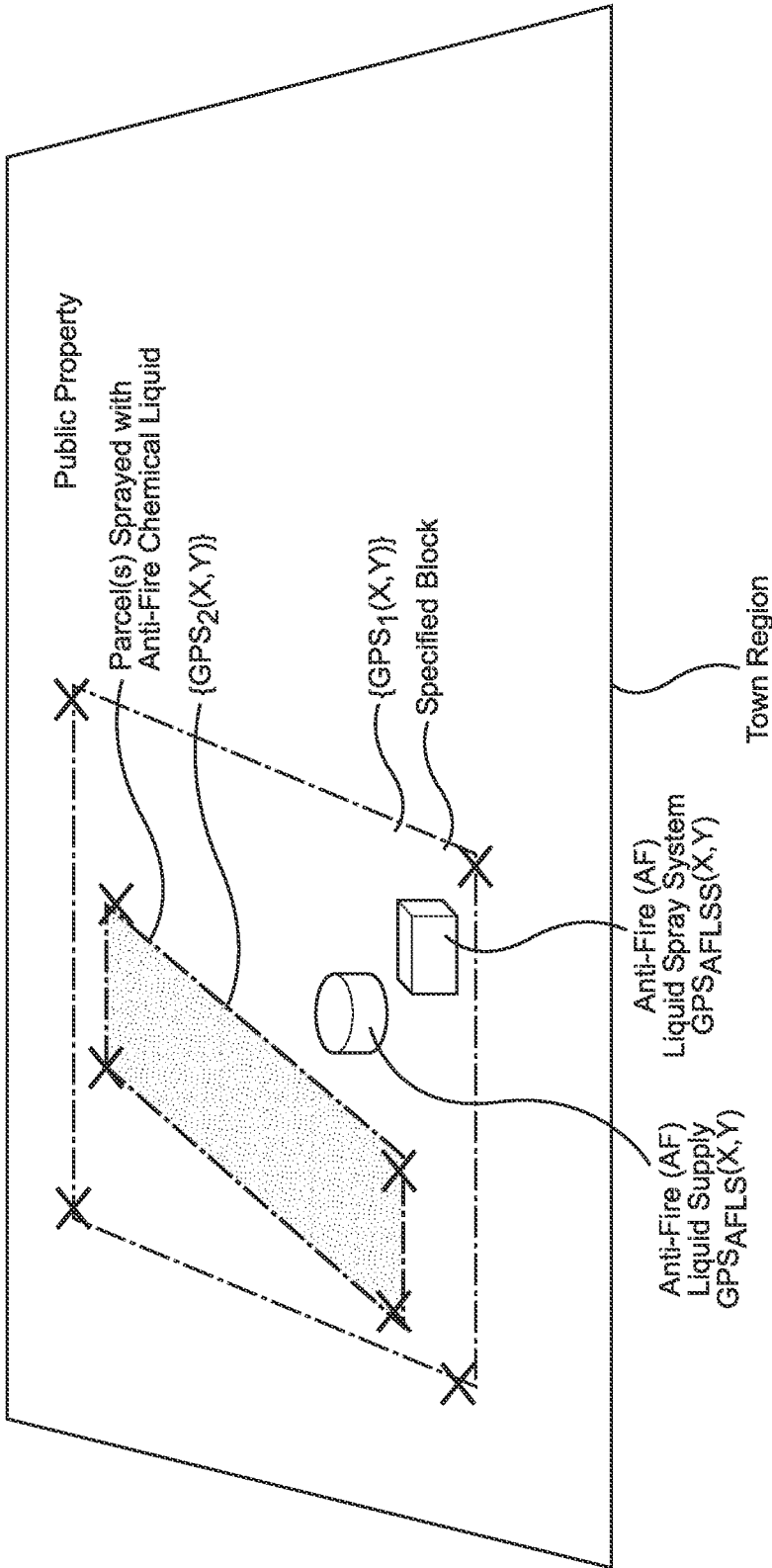
FIG. 22 is a graphical illustration showing a method of reducing the risks of damage to public property due to wild fires, by GPS-controlled application of anti-fire (AF) chemical liquid spray over ground cover and building surfaces prior to the arrival of wild fires, using the system network and methods of the present invention.
Figure 24:
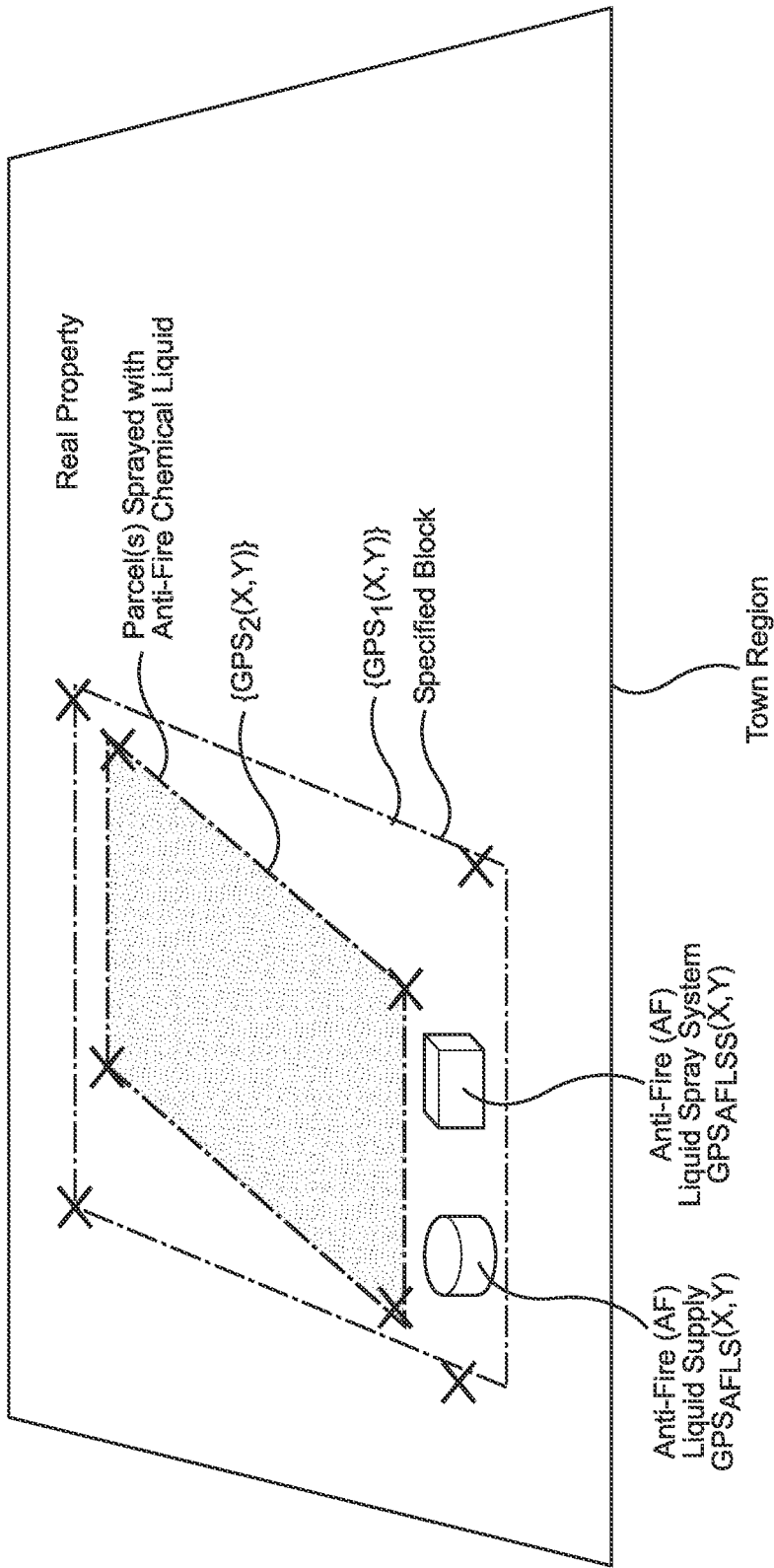
FIG. 24 is a graphical illustration showing a method of remotely managing the GPS-controlled application of antifire (AF) liquid spray to ground cover and buildings so as to reduce the risks of damage due to wild fires, using the system network and methods of the present invention.

Specification of a Method of Reducing the Risks of Damage to Public Property Due to Wild Fires, by Managed Spray Application of AF Liquid to Ground Cover and Building Surfaces Prior to the Arrival of Wild Fires FIG. 22 illustrates a method of reducing the risks of damage to public property due to wild fires, by managed spray application of AF chemical liquid to ground cover and building surfaces prior to the arrival of wild fires. FIGS. 23A, 23B and 23C illustrate a method of reducing the risks of damage to public property due to wild fires by managed application of anti-fire (AF) liquid spray. Typically, this method is carried out using the system network of FIG. 4 and any one or more of the GPS-tracked anti-fire (AF) liquid spray vehicle systems 14A-14D represented in FIG. 4 and shown in FIGS. 6A, 6B, 7A, 7B, 8A, 8B, 9A, 9B, and 10A, 10B.

As indicated at Block A in FIG. 23A, each GPS-specified parcel of public real property in a specified County and State is registered with the system. Such parcels of property may or may not have buildings constructed thereon. As part of registration with the system network 1, supported by the network database 9C, it is necessary to identify the owner and tenants, as well as all pets, vehicles and watercrafts associated with the registered parcel of public property. Typically, the system will request the address of the property parcel, and will automatically determine its GPS coordinates that specify the vertices of the parcel using databases, and data processing methods, equipment and services, known in the GPS mapping art.

As indicated at Block B in FIG. 23A, the system collects various kinds of intelligence relating to the County, risks of wild fires in the surrounding region, and historical weather and related data maintained in a network database 9C, and generates GPS-specified anti-fire (AF) spray protection maps and task reports for review and execution, along with GPS-specified spray plans (e.g. flight plans) for GPS-tracked anti-fire (AF) liquid spray vehicle systems 30 and 60, and GPS-specified spray plans.

As indicated at Block C in FIG. 23A an AF chemical liquid spraying system is provided to a GPS-specified location for spraying one or more registered parcels of public property with AF chemical liquid spray.

As indicated at Block D in FIG. 23A, a supply of AF chemical liquid spray is provided to the registered location of the AF chemical liquid spraying system.

As indicated at Block E in FIG. 23A, the AF chemical liquid spraying system is filled with the provided supply of AF chemical liquid.

As indicated at Block F in FIG. 23B, based on the anti-fire (AF) spray protection maps and task reports, the system issues orders to the public property owner, or its contractor, to apply AF chemical liquid spray on the public property using the AF chemical liquid spraying system 60.

As indicated at Block G in FIG. 23B, the public property owner executes the order and applies AF chemical liquid spray on the public property using the AF chemical liquid spraying system, and the system remotely monitors the consumption and application of AF chemical liquid at the public property on a given time and date, and automatically records the transaction in the network database prior to the presence of wild fire in the region.

As indicated at Block H in FIG. 23B, the system updates records in the network database 9C associated with each application of AF chemical liquid spray on a GPS-specified parcel of public property.

As indicated at Block I in FIG. 23B, the system schedules the next application of AF chemical liquid spray on the GPS-specified parcel of public property, factoring weather conditions and the passage of time.

As indicated at Block J in FIG. 23B, the system issues another order to the GPS-specified parcels of public property to re-apply AF chemical liquid spray on the public property to maintain active fire protection.

As indicated at Block K in FIG. 23C, the property owner executes the order to reapply AF chemical liquid spray on the GPS-specified parcels of public property using the AF chemical liquid spraying system, and the system remotely monitors the application of AF chemical liquid at the public property on a given time and date, and records this transaction in the network database 9C.

As indicated at Block L in FIG. 23C, the system updates records on AF chemical liquid spray application in the network database 9C associated with reapplication of AF chemical liquid on the GPS-specified parcels of public property.

As indicated at Block M in FIG. 23C, the system schedules the next application of AF chemical liquid spray on the GPS-specified parcels of public property, factoring weather conditions and the passage of time.

Specification of a Method of Remotely Managing the Application of Anti-Fire (AF) Liquid Spray to Ground Cover and Buildings so as to Reduce the Risks of Damage Due to Wild Fires FIG. 24 is a graphical illustration showing a method of remotely managing the application of anti-fire (AF) liquid spray to ground cover and buildings so as to reduce the risks of damage due to wild fires. FIGS. 25A and 25B describes the high level steps carried out by the method in FIG. 24 to reduce the risks of damage due to wild fires. Typically, this method is carried out using the system network of FIG. 4 and any one or more of the GPS-tracked anti-fire (AF) chemical liquid spray vehicle systems 14A-14D represented in FIG. 4 and shown in FIGS. 6A, 6B, 7A, 7B, 8A, 8B, 9A, 9B, and 10A, 10B.

As indicated at Block A in FIG. 25A, the system registers each GPS-specified parcel of real property in a specified County and State, which may or may not have buildings constructed thereon, and identifying the owner and tenants, as well as all pets, vehicles and water crafts associated with the registered parcel of real property. Typically, the system will request the address of the property parcel, and will automatically determine (or estimate) its GPS coordinates that specify the vertices of the parcels using databases, and data processing methods, equipment and services, known in the GPS mapping art. The GPS address of each parcel will be stored in the centralized GPS-indexed land database system 7 shown in FIG. 4

As indicated at Block B in FIG. 25A, the system collects intelligence relating to the County, risks of wild fires in the surrounding region, and historical data maintained in a network database, and generates GPS-specified anti-fire (AF) spray protection maps and task reports for execution.

As indicated at Block C in FIG. 25A, an AF chemical liquid spraying system is provided to a GPS-specified location for spraying the GPS-specified parcels of real property with AF chemical liquid spray.

As indicated at Block D in FIG. 25A, a supply of AF chemical liquid spray is provided to the GPS-specified location of the AF chemical liquid spraying system.

As indicated at Block E in FIG. 25A, the AF chemical liquid spraying system is filled with the provided supply of AF chemical liquid.

As indicated at Block F in FIG. 25B, prior to the arrival of a wild fire to the region, and based on the anti-fire (AF) spray protection maps generated by the system, the system issues a request to property owners, or their registered contractors, to apply AF chemical liquid spray on GPS-specified properties using deployed AF chemical liquid spraying systems.

As indicated at Block G in FIG. 25B, in response to the issued request, the property owner or contractor thereof applies AF chemical liquid spray on the real property using the AF chemical liquid spraying system, and the system remotely monitors the consumption and application of the AF chemical liquid on the property on a given date, and automatically records the transaction in the network database.

As indicated at Block H in FIG. 25B, the system updates records in the network database associated with each application of AF chemical liquid spray on one or more GPS-specified parcels of real property.

In the illustrative embodiment, Hartindo AF31 Total Fire Inhibitor (from Hartindo Chemicatama Industri of Jakarta, Indonesia http://hartindo.co.id, or its distributor Newstar Chemicals of Malaysia) is used as a clean anti-fire (AF) chemical liquid when practicing the present invention. A liquid dye of a preferred color from Sun Chemical Corporation http://www.sunchemical.com can be added to Hartindo AF31 liquid to help visually track where AF chemical liquid has been sprayed during the method of wild fire suppression. However, in some applications, it may be desired to maintain the AF chemical liquid in a clear state, and not employ a colorant. Also, the clinging agent in this AF chemical liquid formulation (i.e. Hartindo AF31 liquid) will enable its chemical molecules to cling to the surface of combustible materials, including vegetation, so that it is quick to defend and break the combustion phase of fires (i.e. interfere with the free radicals driving combustion).

Specification of the Method of Qualifying Real Property for Reduced Property Insurance, Based on Verified Spray-Based Clean Anti-Fire (AF) Chemical Liquid Treatment, Prior to Presence of Wild Fires, Using the System Network of the Present Invention FIG. 26 describes the method of qualifying real property for reduced property insurance, based on verified spray-based clean anti-fire (AF) chemical liquid treatment prior to presence of wild fires, using the system network of the present invention 1 described in great technical detail hereinabove.

As indicated at Block A in FIG. 26, a clean anti-fire (AF) chemical liquid is periodically sprayed over the exterior surfaces of a wood-framed building and surrounding real property to provide Class-A fire-protection to the property in the face of an approaching wild fire.

As indicated at Block B in FIG. 26, the spray-based Class-A fire protection treatment is verified and documented using captured GPS-coordinates and time/date stamping data generated by the GPS-tracked AF-liquid spraying system (20, 30, 40, 50 and/or 60) deployed on the system network 1 and used to apply fire protection treatment.

As indicated at Block C in FIG. 26, the spray protection treatment data, generated by the GPS-tracked anti-fire (AF) liquid spraying system used to apply the spray-based class-a fire protection treatment, is wirelessly transmitted to the central network database, to update the central network database 9C1 on the system network.

As indicated at Block D in FIG. 26, a company underwriting property insurance for the wood-framed building accesses the central network database 9C1 on the system network 1, to verify the database records maintained for each spray-based Class-A fire-protection treatment relating to the property and any wood-framed buildings thereon, to qualify the property/building owner for lower property insurance premiums, based on the verified Class-A fire-protection status of the sprayed property/building.

As indicated at Block E in FIG. 26, upon the outbreak of a wild fire about the insured wood-framed building/property, the local fire departments can use the mobile application 12 designed to command center administrators, a provided with suitable filters and modifications, to instantly and remotely assess the central network database 9C1, so as to quickly determine and identify the Class-A fire-protected status of the property and any wood-framed buildings thereon by virtue of timely clean anti-fire (AF) chemical liquid application on the property, and advise fireman fighting and managing wild fires that the Property has been properly defended against wild fire.

By virtue of this method of the presence invention described above, it is now possible to better protect real property and buildings against wild fires when using the system network of the present invention 1, and at the same time, for property insurance underwriters to financially encourage and incentivize property owners to comply with the innovative clean anti-fire (AF) chemical liquid spray programs disclosed and taught herein that improve the safety and defense of neighborhoods against the destructive energy carried by wild fires.

Modifications to the Present Invention which Readily Come to Mind

The illustrative embodiments disclose the use of clean anti-fire chemicals from Hartindo Chemicatama Industri, particular Hartindo AAF31, for clinging to the surfaces of wood, lumber, and timber, and other combustible matter, wherever wild fires may travel. However, it is understood that alternative clean anti-fire chemical liquids may be used to practice the various wild fire suppression methods according to the principles of the present invention.

These and other variations and modifications will come to mind in view of the present invention disclosure.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A method of managing the proactive spraying of environmentally-clean anti-fire (AF) chemical liquid on GPS-specified property surfaces so as to inhibit fire ignition and flame spread in the presence of wild fire, said method comprising:
   (a) deploying a wireless system network supporting a command center, a network database, a plurality of mobile anti-fire chemical liquid spraying systems, and a plurality of mobile computing systems, each being operably connected to a wireless communication network;
   (b) in said network database, registering the GPS address of one or more GPS-specified parcels of property in a specified region, which may or may not have buildings constructed thereon;
   (c) deploying at least one of said mobile anti-fire chemical liquid spraying systems to a GPS-specified location, for spraying the GPS-specified parcels of property with an environmentally-clean anti-fire chemical liquid;
   (d) deploying a supply of said environmentally-clean anti-fire chemical liquid to the GPS-specified location of each said mobile anti-fire chemical liquid spraying system, and filling said mobile anti-fire chemical liquid spraying system with said supply of environmentally-clean anti-fire chemical liquid;
   (e) using said deployed mobile anti-fire chemical liquid spraying system to apply said environmentally-clean anti-fire chemical liquid spray to said GPS-specified parcel of property, while remotely monitoring the application of the environmentally-clean anti-fire chemical liquid sprayed on said GPS-specified parcel of property on a given date, and automatically recording the GPS-tracked spraying operations in said network database; and
   (f) updating data records in said network database associated with each application of environmentally-clean anti-fire chemical liquid spray on one or more said GPS-specified parcels of property.

2. The method of claim 1, wherein after step (d) and before step (e), the method further comprises:
   (i) collecting intelligence data, including historical data, pertaining to risks of fire ignition by wild fires in surrounding regions, and storing said intelligence data in said network database;
   (ii) based on said intelligence data, said command center generating a GPS-specified anti-fire spray protection map and task report for execution; and
   (iii) prior to the arrival of a wild fire to the specified region, said command center transmitting a request to said GPS-specified location, to apply said environmentally-clean anti-fire chemical liquid spray to said GPS-specified parcel of property, using said deployed mobile anti-fire chemical liquid spraying system.

3. The method of claim 2, wherein step (i) comprises using remote imaging systems including multi-spectral imaging (MSI) systems and/or hyper-spectral-imaging (HSI) systems, for remotely sensing and gathering data about wild fires and wild fire progress in GPS-specified regions.

4. The method of claim 2, wherein step (i) comprises using space/satellite-based and/or drone-based airborne vehicles remotely-controlled by a human operator, or guided under an automated navigation system.

5. The method of claim 2, wherein step (i) comprises using remote sensing technologies including a Moderate Resolution Imaging Spectro-radiometer (MODIS) satellite system for generating MODIS imagery subsets from MODIS direct readout data acquired to produce satellite wild fire detection data maps.

6. The method of claim 2, wherein step (i) further comprises, during each wild fire data sensing and mapping mission, capturing a series of multi-spectral imaging (MSI) images and hyper-spectral-imaging (HSI) images of said specified region during a wild fire, and mapping said captured images to GPS-specific coordinates, and transmitting said mapped data to said network database for storage, analysis and generation of GPS-specified flight plans, for supporting anti-fire (AF) chemical liquid spray operations designed to stall and suppress said wild fires, and mitigate risk of damage to property and harm to human and animal life.

7. The method of claim 1, wherein step (d) comprises deploying said environmentally-clean anti-fire chemical liquid spray having a clinging agent which, when dried on the sprayed surface of property, enables its chemical molecules to cling to the surface of combustible materials, including vegetation, so that said chemical molecules interferes with the combustion phase of an incident wild fire.

8. The method of claim 2, wherein step (i) comprises using deployed remote imaging systems enabling said command center to collect intelligence data about wild fire ignition risks and generate reports for transmission to said mobile computing systems used by home owners, contractors and administrators.

9. The method of claim 1, wherein step (d) comprises using remote data sensing and capture instruments for (i) determining GPS-specified navigation plans for mobile anti-fire chemical liquid spraying systems, and (ii) practicing GPS-guided methods of wild fire defense.

\* \* \* \* \*